US012582991B2

(12) United States Patent
Soto-Moreno et al.

(10) Patent No.: US 12,582,991 B2
(45) **Date of Patent: *Mar. 24, 2026**

(54) DIGITAL MICROFLUIDICS DEVICES AND METHODS OF USING THEM

(71) Applicant: INTEGRA Biosciences AG, Zizers (CH)

(72) Inventors: Jorge Abraham Soto-Moreno, San Francisco, CA (US); Mais Jehan Jebrail, Toronto (CA); Alejandro Tocigl, Mountain View, CA (US); Foteini Christodoulou, San Francisco, CA (US); Carl David Martin, Livermore, CA (US); Morgan Marin Watson, Oakland, CA (US); Rohit Lal, San Francisco, CA (US); Joshua Shen, Union City, CA (US); Ronan Barry Hayes, San Francisco, CA (US); Gregory Arthur Ray, San Francisco, CA (US); Peter Tirtowijoyo Young, Berkeley, CA (US); Spencer Todd Seiler, San Francisco, CA (US); Ik Pyo Hong, Toronto (CA); Mohan Gurunathan, San Francisco, CA (US); Lubomir Daltchev, Sunnyvale, CA (US); Rodolfo Wilhelmy-Preciado, San Francisco, CA (US); Juan Matias de Carli, Buenos Aires (AR); Jobelo Andres Quintero Rodríguez, Bogota (CO); Matias Jorge Lescano, Buenos Aires (AR)

(73) Assignee: INTEGRA Biosciences AG, Zizers (CH)

( * ) Notice: Subject to any disclaimer, the term of this patent is extended or adjusted under 35 U.S.C. 154(b) by 1213 days.

This patent is subject to a terminal disclaimer.

(21) Appl. No.: 17/434,531

(22) PCT Filed: Feb. 28, 2020

(86) PCT No.: PCT/US2020/020255

§ 371 (c)(1),
(2) Date: Aug. 27, 2021

(87) PCT Pub. No.: WO2020/176816

PCT Pub. Date: Sep. 3, 2020

(65) Prior Publication Data

US 2022/0219172 A1 Jul. 14, 2022

Related U.S. Application Data

(60) Provisional application No. 62/811,540, filed on Feb. 28, 2019.

(51) Int. Cl.
*B01L 3/00* (2006.01)

(52) U.S. Cl.
CPC ..... *B01L 3/502792* (2013.01); *B01L 2200/04* (2013.01); *B01L 2200/085* (2013.01);
(Continued)

(58) Field of Classification Search
CPC .......... B01L 3/502792; B01L 2200/04; B01L 2200/085; B01L 2200/146;
(Continued)

(56) References Cited

U.S. PATENT DOCUMENTS 4,469,863 A 9/1984 Ts'o et al.
4,492,322 A 1/1985 Hieftje et al.
(Continued)

FOREIGN PATENT DOCUMENTS

CA 2470847 A1 7/2003
CA 2740113 A1 4/2010
(Continued)

OTHER PUBLICATIONS

Jebrail et al.; U.S. Appl. No. 18/766,551 entitled "Microfluidic two-dimensional capillary manipulation devices and methods," filed Jul. 8, 2024.

(Continued)

*Primary Examiner* — Samuel P Siefke
(74) *Attorney, Agent, or Firm* — Shay Glenn LLP

(57) ABSTRACT

Digital microfluidic (DMF) methods and apparatuses (including devices, systems, cartridges, DMF readers, etc.), and in particular DMF apparatuses and methods that may be used to safely manually add or remove fluid within a cartridge while it is actively applying DMF. Also described herein are DMF readers for use with a DMF cartridges, including those including multiple and/or redundant safety (Continued)

interlocks. Also described herein are DMF reader devices having a cover with active control of microfluidics on the cover while actively controlling DMF on the reader base.

14 Claims, 117 Drawing Sheets

(52) U.S. Cl.
CPC ... *B01L 2200/146* (2013.01); *B01L 2300/043* (2013.01); *B01L 2300/046* (2013.01); *B01L 2300/0609* (2013.01); *B01L 2300/0663* (2013.01); *B01L 2400/0427* (2013.01); *B01L 2400/0487* (2013.01)

(58) Field of Classification Search
CPC ......... B01L 2300/043; B01L 2300/046; B01L 2300/0609; B01L 2300/0663; B01L 2400/0427; B01L 2400/0487; B01L 2200/143; B01L 9/527; B01L 2200/145; B01L 2200/147; B01L 2300/021; B01L 2300/022; B01L 2300/041; B01L 2300/0645; B01L 2300/0883; B01L 2300/165; B01L 2300/1822; B01L 2300/1827; B01L 2400/0666; B01L 7/525
See application file for complete search history.

(56) References Cited

U.S. PATENT DOCUMENTS

| | | | |
|---|---|---|---|
| 4,569,575 | A | 2/1986 | Le Pesant et al. |
| 4,636,785 | A | 1/1987 | Le Pesant |
| 4,818,052 | A | 4/1989 | Le Pesant et al. |
| 5,034,506 | A | 7/1991 | Summerton et al. |
| 5,130,238 | A | 7/1992 | Malek et al. |
| 5,216,141 | A | 6/1993 | Benner |
| 5,235,033 | A | 8/1993 | Summerton et al. |
| 5,270,185 | A | 12/1993 | Margolskee |
| 5,386,023 | A | 1/1995 | Sanghvi et al. |
| 5,399,491 | A | 3/1995 | Kacian et al. |
| 5,409,818 | A | 4/1995 | Davey et al. |
| 5,411,876 | A | 5/1995 | Bloch et al. |
| 5,455,166 | A | 10/1995 | Walker |
| 5,486,337 | A | 1/1996 | Ohkawa |
| 5,602,240 | A | 2/1997 | De Mesmaeker et al. |
| 5,637,684 | A | 6/1997 | Cook et al. |
| 5,644,048 | A | 7/1997 | Yau |
| 5,681,702 | A | 10/1997 | Collins et al. |
| 5,705,365 | A | 1/1998 | Ryder et al. |
| 5,710,029 | A | 1/1998 | Ryder et al. |
| 5,806,515 | A | 9/1998 | Bare et al. |
| 5,888,779 | A | 3/1999 | Kacian et al. |
| 6,007,690 | A | 12/1999 | Nelson et al. |
| 6,074,725 | A | 6/2000 | Kennedy |
| 6,217,972 | B1 | 4/2001 | Beroz et al. |
| 6,294,063 | B1 | 9/2001 | Becker et al. |
| 6,352,838 | B1 | 3/2002 | Krulevitch et al. |
| 6,353,149 | B1 | 3/2002 | Stone |
| 6,401,552 | B1 | 6/2002 | Elkins |
| 6,495,369 | B1 | 12/2002 | Kercso et al. |
| 6,565,727 | B1 | 5/2003 | Shenderov |
| 6,579,721 | B1 | 6/2003 | Natan et al. |
| 6,596,988 | B2 | 7/2003 | Corso et al. |
| 6,656,428 | B1 | 12/2003 | Clark et al. |
| 6,723,985 | B2 | 4/2004 | Schultz et al. |
| 6,773,566 | B2 | 8/2004 | Shenderov |
| 6,787,111 | B2 | 9/2004 | Roach et al. |
| 6,887,384 | B1 | 5/2005 | Frechet et al. |
| 6,911,132 | B2 | 6/2005 | Pamula et al. |
| 6,989,234 | B2 | 1/2006 | Kolar et al. |
| 7,057,031 | B2 | 6/2006 | Olejnik et al. |
| 7,147,763 | B2 | 12/2006 | Elrod et al. |
| 7,163,612 | B2 | 1/2007 | Sterling et al. |
| 7,214,302 | B1 | 5/2007 | Reins et al. |
| 7,323,345 | B1 | 1/2008 | Stjernstrom |
| 7,328,979 | B2 | 2/2008 | Decre et al. |
| 7,329,545 | B2 | 2/2008 | Pamula et al. |
| 7,349,014 | B2 | 3/2008 | Higashihara |
| 7,390,463 | B2 | 6/2008 | He et al. |
| 7,391,020 | B2 | 6/2008 | Bousse et al. |
| 7,439,014 | B1 | 10/2008 | Pamula et al. |
| 7,445,926 | B2 | 11/2008 | Mathies et al. |
| 7,531,120 | B2 | 5/2009 | Van Rijn et al. |
| D599,832 | S | 9/2009 | Chapin et al. |
| 7,713,456 | B2 | 5/2010 | Dodd et al. |
| 7,727,723 | B2 | 6/2010 | Pollack et al. |
| 7,745,207 | B2 | 6/2010 | Jovanovich et al. |
| 7,763,471 | B2 | 7/2010 | Pamula et al. |
| 7,815,871 | B2 | 10/2010 | Pamula et al. |
| 7,816,121 | B2 | 10/2010 | Pollack et al. |
| 7,822,510 | B2 | 10/2010 | Paik et al. |
| 7,851,184 | B2 | 12/2010 | Pollack et al. |
| 7,897,737 | B2 | 3/2011 | Wu et al. |
| 7,901,947 | B2 | 3/2011 | Pollack et al. |
| 7,919,330 | B2 | 4/2011 | de Guzman et al. |
| 7,939,021 | B2 | 5/2011 | Smith et al. |
| 7,998,436 | B2 | 8/2011 | Pollack et al. |
| 8,007,739 | B2 | 8/2011 | Pollack et al. |
| 8,041,463 | B2 | 10/2011 | Pollack et al. |
| 8,053,239 | B2 | 11/2011 | Wheeler et al. |
| 8,088,578 | B2 | 1/2012 | Hua et al. |
| 8,093,062 | B2 | 1/2012 | Winger |
| 8,137,917 | B2 | 3/2012 | Pollack et al. |
| 8,187,864 | B2 | 5/2012 | Wheeler et al. |
| 8,190,371 | B2 | 5/2012 | Allawi et al. |
| 8,202,686 | B2 | 6/2012 | Pamula et al. |
| 8,202,736 | B2 | 6/2012 | Mousa et al. |
| 8,208,146 | B2 | 6/2012 | Srinivasan et al. |
| 8,268,246 | B2 | 9/2012 | Srinivasan et al. |
| 8,304,253 | B2 | 11/2012 | Yi et al. |
| 8,317,990 | B2 | 11/2012 | Pamula et al. |
| 8,349,276 | B2 | 1/2013 | Pamula et al. |
| 8,364,315 | B2 | 1/2013 | Sturmer et al. |
| 8,367,370 | B2 | 2/2013 | Wheeler et al. |
| 8,389,297 | B2 | 3/2013 | Pamula et al. |
| 8,394,641 | B2 | 3/2013 | Winger |
| 8,399,222 | B2 | 3/2013 | Siva et al. |
| 8,426,213 | B2 | 4/2013 | Eckhardt et al. |
| 8,440,392 | B2 | 5/2013 | Pamula et al. |
| 8,454,905 | B2 | 6/2013 | Pope et al. |
| 8,460,528 | B2 | 6/2013 | Pollack et al. |
| 8,470,153 | B2 | 6/2013 | Feiglin et al. |
| 8,470,606 | B2 | 6/2013 | Srinivasan et al. |
| 8,481,125 | B2 | 7/2013 | Yi et al. |
| 8,492,168 | B2 | 7/2013 | Srinivasan et al. |
| 8,562,807 | B2 | 10/2013 | Srinivasan et al. |
| 8,591,830 | B2 | 11/2013 | Sudarsan et al. |
| 8,592,217 | B2 | 11/2013 | Eckhardt |
| 8,613,889 | B2 | 12/2013 | Pollack et al. |
| 8,637,317 | B2 | 1/2014 | Pamula et al. |
| 8,637,324 | B2 | 1/2014 | Pollack et al. |
| 8,653,832 | B2 | 2/2014 | Hadwen et al. |
| 8,658,111 | B2 | 2/2014 | Srinivasan et al. |
| 8,685,344 | B2 | 4/2014 | Sudarsan et al. |
| 8,685,754 | B2 | 4/2014 | Pollack et al. |
| 8,702,938 | B2 | 4/2014 | Srinivasan et al. |
| 8,716,015 | B2 | 5/2014 | Pollack et al. |
| 8,809,068 | B2 | 8/2014 | Sista et al. |
| 8,821,705 | B2 | 9/2014 | Bjornson et al. |
| 8,845,872 | B2 | 9/2014 | Pollack et al. |
| 8,846,414 | B2 | 9/2014 | Sista et al. |
| 8,852,952 | B2 | 10/2014 | Pollack et al. |
| 8,872,527 | B2 | 10/2014 | Sturmer et al. |
| 8,877,512 | B2 | 11/2014 | Srinivasan et al. |
| 8,888,969 | B2 | 11/2014 | Soleymani et al. |
| 8,901,043 | B2 | 12/2014 | Eckhardt et al. |
| 8,926,065 | B2 | 1/2015 | Winger |
| 8,927,296 | B2 | 1/2015 | Sista et al. |
| 8,936,708 | B2 | 1/2015 | Feiglin et al. |
| 8,951,732 | B2 | 2/2015 | Pollack et al. |
| 8,980,198 | B2 | 3/2015 | Srinivasan et al. |
| 9,005,544 | B2 | 4/2015 | Van Dam et al. |

(56) References Cited

U.S. PATENT DOCUMENTS 9,011,662 B2 4/2015 Wang et al.
9,039,973 B2 5/2015 Watson et al.
9,046,514 B2 6/2015 Sista et al.
9,091,649 B2 7/2015 Pollack et al.
9,140,635 B2 9/2015 Graham et al.
9,188,615 B2 11/2015 Sturmer et al.
9,223,317 B2 12/2015 Winger
9,238,222 B2 1/2016 Delattre et al.
9,248,450 B2 2/2016 Bauer
9,377,439 B2 6/2016 Lee et al.
9,435,765 B2 9/2016 Reimitz et al.
9,446,404 B2 9/2016 Bauer et al.
9,476,811 B2 10/2016 Mudrik et al.
9,476,856 B2 10/2016 Pamula et al.
9,513,253 B2 12/2016 Winger
9,517,469 B2 12/2016 Shenderov et al.
9,594,056 B2 3/2017 Fobel et al.
9,851,365 B2 12/2017 Mousa et al.
9,975,117 B2 5/2018 Lee et al.
10,232,374 B2 3/2019 Jebrail et al.
10,464,067 B2 11/2019 Jebrail et al.
10,596,572 B2 3/2020 Hong et al.
11,097,276 B2 8/2021 Jebrail et al.
11,738,345 B2 * 8/2023 Soto-Moreno .... B01L 3/502792
422/504
2002/0150683 A1 10/2002 Trojan et al.
2003/0017551 A1 1/2003 Parthasarathy et al.
2003/0136451 A1 7/2003 Beebe et al.
2003/0194716 A1 10/2003 Knoll
2004/0171169 A1 9/2004 Kallury et al.
2004/0211659 A1 10/2004 Velev
2005/0115836 A1 6/2005 Reins
2005/0133370 A1 6/2005 Park et al.
2005/0148091 A1 7/2005 Kitaguchi et al.
2005/0191759 A1 9/2005 Bjergaard et al.
2005/0220675 A1 10/2005 Reed et al.
2006/0091015 A1 5/2006 Lau
2006/0132542 A1 6/2006 Bruker et al.
2006/0231398 A1 10/2006 Sarrut et al.
2006/0272942 A1 12/2006 Sirringhaus
2007/0023292 A1 2/2007 Kim et al.
2007/0095407 A1 5/2007 Chen et al.
2007/0138664 A1 6/2007 Chen et al.
2007/0148763 A1 6/2007 Huh et al.
2007/0258864 A1 11/2007 Braymer et al.
2007/0269825 A1 11/2007 Wang et al.
2008/0110753 A1 5/2008 Fourrier et al.
2008/0131904 A1 6/2008 Parce et al.
2008/0156983 A1 7/2008 Fourrier et al.
2008/0169197 A1 7/2008 McRuer et al.
2008/0185339 A1 8/2008 Delapierre et al.
2008/0210558 A1 9/2008 Sauter-Starace et al.
2008/0211849 A1 9/2008 Pierik et al.
2008/0241831 A1 10/2008 Fan et al.
2008/0293051 A1 11/2008 Levy et al.
2009/0017197 A1 1/2009 Zhang et al.
2009/0017453 A1 1/2009 Maples et al.
2009/0051736 A1 2/2009 Sugahara
2009/0056285 A1 3/2009 Kramer et al.
2009/0124721 A1 5/2009 Chen et al.
2009/0207206 A1 8/2009 Harada
2009/0286297 A1 11/2009 Pihl et al.
2010/0015614 A1 1/2010 Beer et al.
2010/0022414 A1 1/2010 Link et al.
2010/0025250 A1 2/2010 Pamula et al.
2010/0032293 A1 2/2010 Pollack et al.
2010/0048410 A1 2/2010 Shenderov et al.
2010/0087012 A1 4/2010 Shenderov
2010/0120130 A1 5/2010 Srinivasan et al.
2010/0130369 A1 5/2010 Shenderov et al.
2010/0136544 A1 6/2010 Agresti et al.
2010/0165784 A1 7/2010 Jovanovich et al.
2010/0206094 A1 8/2010 Shenderov
2010/0236927 A1 9/2010 Pope et al.
2010/0236928 A1 9/2010 Srinivasan et al.
2010/0236929 A1 9/2010 Pollack et al.
2010/0270156 A1 10/2010 Srinivasan et al.
2010/0288368 A1 11/2010 Beebe et al.
2010/0311599 A1 12/2010 Wheeler et al.
2011/0024793 A1 2/2011 Jeon
2011/0076685 A1 3/2011 Moeller et al.
2011/0097763 A1 4/2011 Pollack et al.
2011/0104725 A1 5/2011 Pamula et al.
2011/0104747 A1 5/2011 Pollack et al.
2011/0107822 A1 5/2011 Bunner et al.
2011/0147216 A1 6/2011 Fan et al.
2011/0220501 A1 9/2011 Witkowski et al.
2011/0240471 A1 10/2011 Wheeler et al.
2011/0247934 A1 10/2011 Wang et al.
2011/0293851 A1 12/2011 Bollström et al.
2011/0303542 A1 12/2011 Srinivasan et al.
2011/0311980 A1 12/2011 Pollack et al.
2012/0000777 A1 1/2012 Garrell et al.
2012/0045748 A1 2/2012 Willson et al.
2012/0045768 A1 2/2012 Arunachalam et al.
2012/0149018 A1 6/2012 Dahlberg et al.
2012/0190027 A1 7/2012 Loeffert et al.
2012/0190589 A1 7/2012 Anderson et al.
2012/0208705 A1 8/2012 Steemers et al.
2012/0208724 A1 8/2012 Steemers et al.
2012/0259233 A1 10/2012 Chan et al.
2012/0261264 A1 10/2012 Srinivasan et al.
2012/0289581 A1 11/2012 Chang et al.
2012/0325665 A1 12/2012 Chiou et al.
2013/0017544 A1 1/2013 Eckhardt et al.
2013/0018611 A1 1/2013 Sturmer
2013/0062205 A1 3/2013 Hadwen et al.
2013/0068622 A1 3/2013 Schertzer et al.
2013/0105318 A1 5/2013 Bhattacharya et al.
2013/0118900 A1 * 5/2013 Reimitz ........... G01N 27/44782
204/600
2013/0123979 A1 5/2013 Elliot et al.
2013/0126358 A1 5/2013 Lee et al.
2013/0157259 A1 6/2013 Choi et al.
2013/0168250 A1 7/2013 Fogleman et al.
2013/0171546 A1 7/2013 White et al.
2013/0177915 A1 7/2013 Too et al.
2013/0203606 A1 8/2013 Pollack et al.
2013/0215492 A1 8/2013 Steckl et al.
2013/0217113 A1 8/2013 Srinivasan et al.
2013/0225450 A1 8/2013 Pollack et al.
2013/0236377 A1 9/2013 Kim et al.
2013/0270114 A1 10/2013 Feiglin
2013/0284956 A1 10/2013 Kwon
2013/0288254 A1 10/2013 Pollack et al.
2013/0293246 A1 11/2013 Pollack et al.
2013/0306480 A1 11/2013 Chang et al.
2014/0005066 A1 1/2014 Boles et al.
2014/0054174 A1 2/2014 Wang
2014/0124037 A1 5/2014 Foley
2014/0141409 A1 5/2014 Foley et al.
2014/0161686 A1 6/2014 Bort et al.
2014/0170664 A1 6/2014 Roche et al.
2014/0174926 A1 6/2014 Bort et al.
2014/0179539 A1 6/2014 Lohman et al.
2014/0194305 A1 7/2014 Kayyem et al.
2014/0216559 A1 8/2014 Foley
2014/0272965 A1 9/2014 Handique et al.
2014/0273100 A1 9/2014 Saito et al.
2014/0335069 A1 11/2014 Graham et al.
2014/0353157 A1 12/2014 Hoffmeyer et al.
2015/0001078 A1 1/2015 Feiglin
2015/0008123 A1 1/2015 Cheng et al.
2015/0021182 A1 1/2015 Rival et al.
2015/0075986 A1 3/2015 Cyril et al.
2015/0111237 A1 4/2015 Graham et al.
2015/0144489 A1 5/2015 Hoffmeyer et al.
2015/0148549 A1 5/2015 Van Dam et al.
2015/0198604 A1 7/2015 Ermantraut et al.
2015/0205272 A1 7/2015 Yi et al.
2015/0212043 A1 7/2015 Pollack
2015/0238959 A1 8/2015 Prakash et al.
2015/0258520 A1 9/2015 Griffiths et al.
2015/0267242 A1 9/2015 Foegeding et al.

(56) References Cited

U.S. PATENT DOCUMENTS

| | | | |
|---|---|---|---|
| 2015/0322272 | A1 | 11/2015 | Pokroy et al. |
| 2016/0068901 | A1 | 3/2016 | Eckhardt et al. |
| 2016/0108432 | A1 | 4/2016 | Punnamaraju et al. |
| 2016/0108433 | A1 | 4/2016 | Fair et al. |
| 2016/0116438 | A1 | 4/2016 | Pamula et al. |
| 2016/0129437 | A1 | 5/2016 | Kayyem et al. |
| 2016/0161343 | A1 | 6/2016 | Smith et al. |
| 2016/0175859 | A1 | 6/2016 | Yi et al. |
| 2016/0199832 | A1 | 7/2016 | Jamshidi et al. |
| 2016/0273032 | A1 | 9/2016 | Esfandyarpour |
| 2016/0298173 | A1 | 10/2016 | Wang et al. |
| 2016/0319354 | A1 | 11/2016 | Tocigl et al. |
| 2016/0370317 | A9 | 12/2016 | Sudarsan et al. |
| 2017/0023477 | A1 | 1/2017 | Duer et al. |
| 2017/0113221 | A1 | 4/2017 | Hottman et al. |
| 2017/0184546 | A1 | 6/2017 | Fobel et al. |
| 2017/0315090 | A1 | 11/2017 | Wheeler et al. |
| 2017/0354973 | A1 | 12/2017 | Sustarich et al. |
| 2018/0001286 | A1 | 1/2018 | Wu |
| 2018/0015469 | A1 | 1/2018 | Reiter et al. |
| 2018/0059056 | A1 | 3/2018 | Taylor et al. |
| 2018/0080064 | A1 | 3/2018 | Lee et al. |
| 2018/0095067 | A1 | 4/2018 | Huff et al. |
| 2018/0099275 | A1 | 4/2018 | Wu et al. |
| 2018/0120335 | A1 | 5/2018 | Mousa et al. |
| 2018/0193831 | A1 | 7/2018 | Hopper |
| 2018/0221882 | A1 | 8/2018 | Roberts et al. |
| 2018/0250672 | A1 | 9/2018 | Jamshidi et al. |
| 2018/0345279 | A1 | 12/2018 | Anderson et al. |
| 2019/0060900 | A1 | 2/2019 | Breinlinger et al. |
| 2019/0168223 | A1 | 6/2019 | Soto-Moreno et al. |
| 2019/0210026 | A1 | 7/2019 | Jebrail et al. |
| 2019/0329258 | A1 | 10/2019 | Kinney et al. |
| 2019/0374950 | A1 | 12/2019 | Fobel et al. |
| 2020/0061621 | A1 | 2/2020 | Jebrail et al. |
| 2020/0114359 | A1 | 4/2020 | Jebrail et al. |
| 2020/0164367 | A1 | 5/2020 | Wunsch et al. |
| 2020/0179933 | A1 | 6/2020 | Jebrail et al. |
| 2020/0254458 | A1 | 8/2020 | Hong et al. |
| 2020/0261913 | A1 | 8/2020 | Williams et al. |
| 2020/0316606 | A1 | 10/2020 | Soto-Moreno et al. |
| 2020/0324290 | A1 | 10/2020 | Jebrail et al. |
| 2021/0069714 | A1 | 3/2021 | Jebrail et al. |
| 2021/0291175 | A1 | 9/2021 | Gartner et al. |
| 2022/0118455 | A1 | 4/2022 | Jebrail et al. |
| 2022/0401957 | A1 | 12/2022 | Jebrail et al. |
| 2023/0049633 | A1 | 2/2023 | Jebrail et al. |
| 2023/0219083 | A1 | 7/2023 | Jebrail et al. |
| 2023/0219092 | A1 | 7/2023 | Jebrail et al. |
| 2023/0249185 | A1 | 8/2023 | Jebrail et al. |
| 2023/0398541 | A1 | 12/2023 | Soto-Moreno et al. |
| 2024/0198343 | A1 | 6/2024 | Jebrail et al. |
| 2025/0073717 | A1 | 3/2025 | Jebrail et al. |
| 2025/0153182 | A1 | 5/2025 | Jebrail et al. |
| 2025/0170574 | A1 | 5/2025 | Jebrail et al. |

FOREIGN PATENT DOCUMENTS

| | | | |
|---|---|---|---|
| CA | 2881783 | A1 | 2/2014 |
| CN | 1668527 | A | 9/2005 |
| CN | 101609063 | A | 12/2009 |
| CN | 101681695 | A | 3/2010 |
| CN | 102549804 | A | 7/2012 |
| CN | 102719526 | A | 10/2012 |
| CN | 102740976 | A | 10/2012 |
| CN | 102836653 | A | 12/2012 |
| CN | 103014148 | A | 4/2013 |
| CN | 103170383 | A | 6/2013 |
| CN | 103502386 | A | 1/2014 |
| CN | 103946712 | A | 7/2014 |
| CN | 104144748 | A | 11/2014 |
| CN | 104321141 | A | 1/2015 |
| CN | 104995261 | A | 10/2015 |
| CN | 105764490 | A | 7/2016 |
| CN | 105849032 | A | 8/2016 |
| CN | 106092865 | A | 11/2016 |
| DE | 19949735 | A1 | 5/2001 |
| EP | 2111554 | B1 | 5/2013 |
| GB | 2533952 | A | 7/2016 |
| JP | H11318430 | A | 11/1999 |
| JP | 2002321449 | A | 11/2002 |
| JP | 2006220606 | A | 8/2006 |
| JP | 2007132749 | A | 5/2007 |
| JP | 2010500596 | A | 1/2010 |
| JP | 2010098133 | A | 4/2010 |
| JP | 2010515877 | A | 5/2010 |
| JP | 2010180222 | A | 8/2010 |
| JP | 2012525687 | A | 10/2012 |
| JP | 2013064725 | A | 4/2013 |
| JP | 2015529815 | A | 10/2015 |
| WO | WO2000/067907 | A2 | 11/2000 |
| WO | WO2001/025137 | A1 | 4/2001 |
| WO | WO2003/045556 | A2 | 6/2003 |
| WO | WO2004/055260 | A1 | 7/2004 |
| WO | WO2004/074169 | A1 | 9/2004 |
| WO | WO2005/068993 | A1 | 7/2005 |
| WO | WO2005/118129 | A1 | 12/2005 |
| WO | WO2006/000828 | A2 | 1/2006 |
| WO | WO2006/102309 | A2 | 9/2006 |
| WO | WO2007/120240 | A2 | 10/2007 |
| WO | WO2007/123908 | A2 | 11/2007 |
| WO | WO2007/130294 | A2 | 11/2007 |
| WO | WO2007/136386 | A2 | 11/2007 |
| WO | WO2008/066828 | A2 | 6/2008 |
| WO | WO2009/026339 | A2 | 2/2009 |
| WO | WO2009/052348 | A2 | 4/2009 |
| WO | WO2009/111723 | A1 | 9/2009 |
| WO | WO2009/111769 | A2 | 9/2009 |
| WO | WO2009/140671 | A2 | 11/2009 |
| WO | WO2010/003188 | A1 | 1/2010 |
| WO | WO2010/006166 | A2 | 1/2010 |
| WO | WO2010/027894 | A2 | 3/2010 |
| WO | WO2010/042637 | A2 | 4/2010 |
| WO | WO2010/069977 | A1 | 6/2010 |
| WO | WO2010/091334 | A2 | 8/2010 |
| WO | WO2010/111265 | A1 | 9/2010 |
| WO | WO2011/002957 | A2 | 1/2011 |
| WO | WO2011/062557 | A1 | 5/2011 |
| WO | WO2012/061832 | A1 | 5/2012 |
| WO | WO2012/172172 | A1 | 12/2012 |
| WO | WO2013/006312 | A2 | 1/2013 |
| WO | WO2013/040562 | A2 | 3/2013 |
| WO | WO2013/090889 | A1 | 6/2013 |
| WO | WO2013/096839 | A1 | 6/2013 |
| WO | WO2013/116039 | A1 | 8/2013 |
| WO | WO2013/176767 | A1 | 11/2013 |
| WO | WO2014/078100 | A1 | 5/2014 |
| WO | WO2014/083622 | A1 | 6/2014 |
| WO | WO2014/100473 | A1 | 6/2014 |
| WO | WO2014/106167 | A1 | 7/2014 |
| WO | WO2014/108185 | A1 | 7/2014 |
| WO | WO2014/183118 | A1 | 11/2014 |
| WO | WO2015/023745 | A1 | 2/2015 |
| WO | WO2015/077737 | A1 | 5/2015 |
| WO | WO2015/172255 | A1 | 11/2015 |
| WO | WO2015/172256 | A1 | 11/2015 |
| WO | WO2016/006184 | A1 | 1/2016 |
| WO | WO2016/094589 | A1 | 6/2016 |
| WO | WO2016/128544 | A1 | 8/2016 |
| WO | WO2016/182814 | A2 | 11/2016 |
| WO | WO2016/197013 | A1 | 12/2016 |
| WO | WO2017/094021 | A1 | 6/2017 |
| WO | WO2017/223026 | A1 | 12/2017 |
| WO | WO2018/119253 | A1 | 6/2018 |
| WO | WO2018/126082 | A1 | 7/2018 |
| WO | WO2019/023133 | A1 | 1/2019 |
| WO | WO2019/046860 | A1 | 3/2019 |
| WO | WO2019/075211 | A1 | 4/2019 |
| WO | WO2019/226919 | A1 | 11/2019 |
| WO | WO2020/160520 | A1 | 8/2020 |
| WO | WO2020/176816 | A8 | 9/2020 |
| WO | WO2021/016614 | A1 | 1/2021 |

(56) References Cited

FOREIGN PATENT DOCUMENTS

WO WO2021/092325 A1 5/2021
WO WO2021/173621 9/2021

OTHER PUBLICATIONS

Jebrail et al.; U.S. Appl. No. 18/728,444 entitled "Mechanical microfluidic manipulation," filed Jul. 11, 2024.
Davoust et al.; Evaporation Rate of Drop Arrays within a Digital Microsystem; Procedia Engineering; vol. 47; pp. 1-4; Jan. 1, 2012.
Nge et al.; Advances in microfluidic materials, functions, integration, and applications. Chemical reviews; 113(4); pp. 2550-2583; Apr. 10, 2013.
Jebrail et al.; U.S. Appl. No. 17//967,671 entitled "Evaporation Management In Digital Mecrofluidic Devices," filed Oct. 17, 2022.
Soto-Moreno et al.; U.S. Appl. No. 18/064,893 entitled "Digital microfluidics devices and methods of use thereof," filed Dec. 12, 2022.
Tecan; Freedom EVO; 16 pages; retrieved from the internet: https (/instruments.cz/wp-content/uploads/2018/04/EVO.pdf) Oct. 4, 2023.
Jebrail et al.; U.S. Appl. No. 18/451,828 entitled "Methods of mechanical microfluidic manipulation," filed Aug. 17, 2023.
Soto-Moreno et al.; U.S. Appl. No. 17/728,952 entitled "Digital microfluidics devices and methods of using them," filed Apr. 25, 2022.
Soto-Moreno et al.; U.S. Appl. No. 17/775,373 entitled "Digital microfluidics systems, apparatus and method of using them," filed May 9, 2022.
Chemical Book; Paraffin Wax; 2 pages; retrieved from the internet (https://www.chemicalbook.com/ChemicalProductProperty_EN_CB2854418.htm) on May 16, 2024.
merriam-webster.com; Replenish (definition); 11 pages; retrieved from the internet (https://www.merriam-webster.com/dictionary/replenish) on Jul. 22, 2024.
Jebrail et al.; U.S. Appl. No. 18/642,774 entitled "Control of evaporation in digital microfluidics," filed Apr. 22, 2024.
Davoust et al.; Evaporation rate of drop arrays within a digital microfluidic system; Sensors and Actuators B Chemical; 189; pp. 157-164; Dec. 2013.
Soto-Moreno et al.; U.S. Appl. No. 17/630,048 entitled "Digital microfluidics devices and methods of use thereof," filed Jan. 25, 2022.
Jebrail et al.; U.S. Appl. No. 18/528,671 entitled "Microfluidic devices and methods," filed Dec. 4, 2023.
Jebrail et al.; U.S. Appl. No. 18/568,534 entitled "Apparatuses and methods for digital microfluidics and micro-electroporation," filed Dec. 8, 2023.
Jebrail et al.; U.S. Appl. No. 18/402,701 entitled "Sequencing by synthesis using mechanical compression," filed Jan. 2, 2024.
Jebrail et al.; U.S. Appl. No. 18/416,693 entitled "Evaporation management in digital microfluidic devices," filed Jan. 18, 2024.
Ratcharak et al.; Surface coating with poly (trifluoroethyl methacrylate) through rapid expansion of supercritical CO2 solutions; The Journal of Supercritical Fluids; vol. 89; pp. 106-112; May 1, 2014.
Abdelgawad et al., All-terrain droplet actuation, Lab on a Chip, 8(5), pp. 672-677, May 2008.
Abdelgawad et al.; Low-cost, rapid-prototyping of digital microfluidics devices, Microfluidics and Nanofluidics, 4, pp. 349-355, Apr. 2008.
Abdelgawad et al.; Rapid prototyping in copper substrates for digital microfluidics, Adv. Mater., 19(1), pp. 133-137; Jan. 2007.
Abdelgawad et al.; Hybrid microfluidics: a digital-to-channel interface for in-line sample processing and chemical separations, Lab on a Chip, 9(8), pp. 1046-1051, Apr. 2009.
Abdelgawad; Digital Microfluidics for Integration of Lab-on-a-Chip Devices (Doctoral dissertation); University of Toronto; © 2009.
Albrecht et al.; Laboratory testing of gonadal steroids in children; Pediatric Endocrinology Reviews; 5(suppl 1); pp. 599-607; Oct. 2007.
Analog Devices; 24-bit Capicitance-to-Digital converter with temperature sensor, AD7745/AD7746; Analog Devices; Norwood, MA; 28 pages; (year of pub. sufficiently earlier than effective US filing date and any foreign priority date) 2005.
Analog Devices; Extending the capacitive input range of AD7745/AD7746 Capicitance-to-Digital converter; Analog Devices; Norwood, MA; 5 pages; (year of pub. sufficiently earlier than effective US filing date and any foreign priority date) 2009.
Ankarberg-Lindren et al.; A purification step prior to commercial sensitive immunoassay is necessary to achieve clinical usefulness when quantifying serum 17 ?-estradiol in prepubertal children. Eur J Endocrinol, 158, pp. 117-124, Jan. 2008.
Armstrong et al.; A study of plasma free amino acid levels. II. Normal values for children and adults, Metabolism, 22(4), pp. 561-569, Apr. 1973.
Asiello et al.; Miniaturized isothermal nucleic acid amplification, a review; Lab Chip; 11(8); pp. 1420-1430; Apr. 2011.
Au et al., Integrated microbioreactor for culture and analysis of bacteria, algae and yeast, Biomedical Microdevices, 13(1), pp. 41-50, Feb. 2011.
Au et al.; A new angle on pluronic additives: Advancing droplets and understanding in digital microfluidics; Langmuir; 27; pp. 8586-8594; Jun. 2011.
Banatvala et al., Rubella, The Lancet, 363(9415), pp. 1127-1137, Apr. 2004.
Banér et al.; Signal amplification of padlock probes by rolling circle replication; Nuc. Acids Res., 26(22); pp. 5073-5078; Nov. 1998.
Barany; Genetic disease detection and DNA amplification using cloned thermostable ligase; PNAS; 88(1); pp. 189-193; Jan. 1991.
Barbulovic-Nad et al., A microfluidic platform for complete mammalian cell culture, Lab on a Chip, 10(12), pp. 1536-1542; Jun. 2010.
Barbulovic-Nad et al.; Digital microfluidics for cell-based assays, Lab Chip, 8(4), pp. 519-526; Apr. 2008.
Baxendale et al.; Multistep synthesis using modular flow reactors: bestmann-ohira reagent for the formation of alkynes and triazoles; Angewandle Chemie International Edition; 48(22); pp. 4017-4021; May 2009.
Beattie et al.; Endogenous sex hormones, breast cancer risk, and tamoxifen response: an ancillary study in the NSABP Breast Cancer Prevention Trial P-1, J Natl Cancer Inst, 98(2), pp. 110-115, Jan. 2006.
Beaucage et al., The Functionalization of Oligonucleotides Via Phosphoramidite Derivatives, Tetrahedron, 49(10), pp. 1925-1963, Mar. 1993.
Belanger et al.; Omental and subcutaneous adipose tissue steroid levels in obese men. Steroids, 71(8), pp. 674-682, Aug. 2006.
Bergkvist et al., Improved chip design for integrated solid-phase microextraction in on-line proteomic sample preparation, Proteomics, 2(4), pp. 422-429, Apr. 2002.
Bi et al.; Dumbbell probe-mediated cascade isothermal amplification: A novel strategy for label-free detection of microRNAs and its application to real sample assay; Analytica Chimica Acta; 760; pp. 69-74; Jan. 2013.
Blankenstein et al.; Intratumoral levels of estrogens in breast cancer. J Steroid Biochem Mol Biol, 69(1-6), pp. 293-297, Apr.-Jun. 1999.
Bodamer et al.; Expanded newborn screening in Europe, Journal of Inherited Metabolic Disease, 30(4), pp. 439-444, Aug. 2007.
Bohlen et al.; Fluorometric assay of proteins in the nanogram range, Archives of Biochemistry and Biophysics, 155(1), pp. 213-220, Mar. 1973.
Boles et al.; Droplet-Based Pyrosequencing Using Digital Microfluidics; Analytical Chemistry; 83(22); pp. 8439-8447; Oct. 14, 2011.
Bollström et al.; A Multilayer Coated Fiber-Based Substrate Suitable For Printed Functionality; Organic Electronics; 10(5); pp. 1020-1023; Aug. 2009.
Bonneil et al., Integration of solid-phase extraction membranes for sample multiplexing: Application to rapid protein identification from gel-isolated protein extracts, Electrophoresis, 23(20), pp. 3589-3598, Oct. 2002.

(56) References Cited

OTHER PUBLICATIONS

Brassard et al.; Water-oil core-shell droplets for electrowetting-based digital microfluidic devices; Lab Chip; 8(8); pp. 1342-1349; Aug. 2008.
Brill et al., Synthesis of oligodeoxynucleoside phosphorodithioates via thioamidites, J. Am. Chem. Soc., 111(6), pp. 2321-2322, Mar. 1989.
Brivio et al.; Integrated microfluidic system enabling (bio)chemical reactions with on-line MALDI-TOF mass spectrometry, Anal. Chem., 74(16), pp. 3972-3976, Aug. 2002.
Burstein; Aromatase inhibitor-associated arthralgia syndrome. Breast, 16 (3), pp. 223-234, Jun. 2007.
Carlsson et al., Screening for genetic mutations, Nature, 380(6571), pp. 207, Mar. 1996.
Chace et al.; A biochemical perspective on the use of tandem mass spectrometry for newborn screening and clinical testing, Clinical Biochemistry, 38(4), pp. 296-309; Apr. 2005.
Chace et al.; Rapid diagnosis of maple syrup urine disease in blood spots from newborns by tandem mass spectrometry, Clinical Chemistry, 41(1), pp. 62-68, Jan. 1995.
Chace et al.; Rapid diagnosis of phenylketonuria by quantitative analysis for phenylalanine and tyrosine in neonatal blood spots by tandem mass spectrometry, Clinical Chemistry, 39(1), pp. 66-71; Jan. 1993.
Chace et al.; Use of tandem mass spectrometry for multianalyte screening of dried blood specimens from newborns, Clinical Chemistry, 49(11), pp. 1797-1817, Nov. 2003.
Chace; Mass spectrometry in newborn and metabolic screening: historical perspective and future directions, Journal of Mass Spectrometry, 44(2), pp. 163-170, Feb. 2009.
Chang et al.; Integrated polymerase chain reaction chips utilizing digital microfluidics; Biomedical Microdevices; 8(3); pp. 215-225; Sep. 2006.
Chatterjee et al.; Droplet-based microfluidics with nonaqueous solvents and solutions, Lab Chip, 6(2), pp. 199-206, Feb. 2006.
Chen et al.; Selective Wettability Assisted Nanoliter Sample Generation Via Electrowetting-Based Transportation; Proceedings of the 5th International Conference on Nanochannels, Microchannels and Minichannels (ICNMM); Puebla, Mexico; Paper No. ICNMM2007-30184; pp. 147-153; Jun. 18-20, 2007.
Chen et al.; The chemistrode: a droplet-based microfluidic device for stimulation and recording with high temporal, spatial, and chemical resolution; Proceedings of the National Academy of Sciences; 105(44); pp. 16843-16848; Nov. 2004.
Cheng et al., Paper-Based ELISA, Angewandte Chemie, 49(28), pp. 4771-4774, Jun. 2010.
Cheng et al.; Highly Sensitive Determination of microRNA Using Target-Primed and Branched Rolling-Circle Amplification; Angew. Chem.; 121(18); pp. 3318-3322; Apr. 2009.
Chetrite et al.; Estradiol inhibits the estrone sulfatase activity in normal and cancerous human breast tissues. Journal of Steroid Biochemistry and Molecular Biology, 104(3-5), pp. 289-292, May 2007.
Cho et al.; Creating, transporting, cutting, and merging liquid droplets by electrowetting-based actuation for digital microfluidic circuits, J. Mems 2003, 12(1), pp. 70-80, Feb. 2003.
Choi et al., Automated digital microfluidic platform for magnetic-particle-based immunoassays with optimization by design of experiments, Anal. Chem., 85(20), pp. 9638-9646; Oct. 2013.
Choi et al., Digital Microfluidics, Annu. Rev. Anal. Chem., 5, pp. 413-440, (Epub) Apr. 2012.
Christiansen; Hormone Replacement Therapy and Osteoporosis; Maturitas, 23, Suppl. pp. S71-S76, May 1996.
Chuang et al.; Direct Handwriting Manipulation of Droplets By Self-Aligned Mirror-EWOO Across A Dielectric Sheet; 19th IEEE International Conf. on Micro Electro Mechanical Systems (MEMS); Instanbul, Turkey; pp. 538-541; Jan. 22-26, 2006.
Cipriano et al.; The cost-effectiveness of expanding newborn screening for up to 21 inherited metabolic disorders using tandem mass spectrometry: results from a decision-analytic model, Value in Health, 10(2), pp. 83-97, Mar.-Apr. 2007.
Cooney et al.; Electrowetting droplet microfluidics on a single planar surface, Microfluid. Nanofluid., 2(5), pp. 435-446; Sep. 2006.
Coregenomics; How do SPRI beads work; 31 pages; retrieved from the internet (http://core-genomics.blogspot.com/2012/04/how-do-spri-beads-work.html); Apr. 28, 2012.
Cottam et al.; Accelerated synthesis of titanium oxide nanostructures using microfluidic chips; Lab on a Chip; 7(2); pp. 167-169; Feb. 2007.
Crabtree et al.; Microchip injection and separation anomalies due to pressure effects, Anal. Chem., 73(17), pp. 4079-4086, Sep. 2001.
Cunningham; Testosterone replacement therapy for late-onset hypogonadism. Nature Clinical Practice Urology, 3(5), pp. 260-267, May 2006.
Cuzick; Chemoprevention of breast cancer. Women's Health, 2(6), pp. 853-861, Nov. 2006.
Dahlin et al.; Poly(dimethylsiloxane)-based microchip for two-dimensional solid-phase extraction-capillary electrophoresis with an integrated electrospray emitter tip, Anal. Chem., 77(16), pp. 5356-5363, Aug. 2005.
Dambrot; Of microchemistry and molecules: Electronic microfluidic device synthesizes biocompatible probes; 4 pages, retrieved from the internet (https://phys.org/news/2012-01-microchemistry-molecules-electronic-microfluidic-device.html); Jan. 26, 2012.
Danton et al.; Porphyrin profiles in blood, urine and faeces by HPLC/electrospray ionization tandem mass spectrometry. Biomedical Chromatography, 20(6-7), pp. 612-621, Jun.-Jul. 2006.
De Mesmaeker et al.; Comparison of rigid and flexible backbones in antisense oligonucleotides; Bioorganic & Medicinal Chem. Lett; 4(3); pp. 395-398; Feb. 1994.
Deligeorgiev et al.; Intercalating Cyanine Dyes for Nucleic Acid Detection; Recent Pat Mat Sci; 2(1); pp. 1-26; Jan. 2006.
Dempcy et al., Synthesis of a thymidyl pentamer of deoxyribonucleic guanidine and binding studies with DNA hornopolynucleotides, Proc. Natl. Acad. Sci., 92(13), pp. 6097-6101, Jun. 1995.
Deng et al.; Rapid determination of amino acids in neonatal blood samples based on derivatization with isobutyl chloroformate followed by solid-phase microextraction and gas chromatography/mass spectrometry. Rapid Communications in Mass Spectrometry, 18(1), pp. 2558-2564, Nov. 2004.
Denneulin et al.; Infra-red assisted sintering of inkjet printed silver tracks on paper substrates; J Nanopart Res; 13(9); pp. 3815-3823; Sep. 2011.
Dibbelt et al.; Determination of natural and synthetic estrogens by radioimmunoassay: Comparison of direct and extraction methods for quantification of estrone in human serum. Clinical Laboratory, 44(3), 137-143, Mar. 1998.
Dietzen et al.; National academy of clinical biochemistry laboratory medicine practice guidelines: follow-up testing for metabolic disease identified by expanded newborn screening using tandem mass spectrometry; executive summary, Clinical Chemistry, 55(9), pp. 1615-1626, Sep. 2009.
Diver et al.; Warning on plasma oestradiol measurement. Lancet, 330(8567), p. 1097, Nov. 1987.
Divino Filho et al.; Simultaneous measurements of free amino acid patterns of plasma, muscle and erythrocytes in healthy human subjects, Clinical Nutrition, 16(6), pp. 299-305, Dec. 1997.
Dixon et al.; An inkjet printed, roll-coated digital microfluidic device for inexpensive, miniaturized diagnostic assays; Lab on a Chip; 16(23); pp. 4560-4568; Nov. 2016.
Djerassi; Chemical birth of the pill. American Journal of Obstetrics and Gynecology, 194(1), pp. 290-298, Jan. 2006.
Dobrowolski et al.; DNA microarray technology for neonatal screening, Acta Paediatrica Suppl, 88(432), pp. 61-64, Dec. 1999.
Doebler et al.; Continuous-flow, rapid lysis devices for biodefense nucleic acid diagnostic systems; Journal of the Association for Laboratory Automation; 14(3); pp. 119-125; Jun. 2009.
Dong et al.; Highly sensitive multiple microRNA detection based on flourescence quenching of graphene oxide and isothermal strand-displacement polymerase reaction; Anal Chem; 84; pp. 4587-4593; Apr. 2012.

(56) References Cited

OTHER PUBLICATIONS

Dryden et al.; Integrated digital microfluidic platform for voltammetric analysis; Analytical Chemistry: 85(18); pp. 8809-8816; Sep. 2013.
Duffy et al.; Rapid prototyping of microfluidic systems in Poly (dimethylsiloxane), Anal. Chem., 70(23), pp. 4974-4984, Dec. 1998.
Edgar et al.; Capillary electrophoresis separation in the presence of an immiscible boundary for droplet analysis, Anal. Chem., 78(19), pp. 6948-6954 (author manuscript, 15 pgs.), Oct. 2006.
Egholm et al., PNA hybridizes to complementary oligonucleotides obeying the Watson-Crick hydrogen-bonding rules, Nature, 365(6446), pp. 566-568, Oct. 1993.
Egholm et al., Recognition of guanine and adenine in DNA by cytosine and thymine containing peptide nucleic acids (PNA), J. Am. Chem. Soc., 114(24), pp. 9677-9678; Nov. 1992.
Ehrmann; Polycystic ovary syndrome. New England Journal of Medicine; 352 (12); pp. 1223-1236; Mar. 2005.
Ekstrom et al., Miniaturized solid-phase extraction and sample preparation for MALDI MS using a microfabricated integrated selective enrichment target, Journal of Proteome Research, 5(5), pp. 1071-1081, May 2006.
Ekstrom et al., Polymeric integrated selective enrichment target (ISET) for solid-phase-based sample preparation in MALDI-TOF MS, Journal of Mass Spectrometry, 42(11), pp. 1445-1452, Nov. 2007.
Ekstrom et al.,On-chip microextraction for proteomic sample preparation of in-gel digests, Proteomics, 2(4), pp. 413-421, Apr. 2002.
El-Ali et al.; Cells on chips; Nature (2006) insight Review; 442(7101); pp. 403-411; Jul. 2006.
Fair; Digital microfluidics: Is a true lab-on-a-chip possible ?; Microfuid. Nanofluid .; 3(3); pp. 245-281; Jun. 2007.
Falk et al.; Measurement of Sex Steroid Hormones in Breast Adipocytes: Methods and Implications; Cancer Epidemiol Biomarkers Prev; 17(8); pp. 1891-1895; Aug. 2008.
Fan et al.; Cross-scale electric manipulations of cells and droplets by frequency-modulated dielectrophoresis and electrowetting; Lab Chip; 8(8); pp. 1325-1331; Aug. 2008.
Fan et al.; Electrically Programmable Surfaces for Configurable Patterning of Cells; Advanced Materials; 20(8); pp. 1418-1423; Apr. 2008.
Fan et al.; Integrated barcode chips for rapid, multiplexed analysis of proteins in microliter quanties of blood; Nature Biotechnology; 26(12); pp. 1373-1378; 15 pages (Author Manuscript); Dec. 2008.
Faure et al.; Improved electrochemical detection of a transthyretin synthetic peptide in the nanomolar range with a two-electrode system integrated in a glass/PDMS microchip; Lab on a Chip; 14(15); pp. 2800-2805, Aug. 2014.
Fobel et al.; DropBot: An open-source digital microfluidic control system with precise control of electrostatic driving force and instantaneous drop velocity measurement; Applied Physics Letters; 102(19); 193513 (5 pgs.); May 2013.
Foote et al., Preconcentration of proteins on microfluidic devices using porous silica membranes, Analytical Chemistry, 77(1), pp. 57-63, Jan. 2005.
Freire et al.; A practical interface for microfluidics and nanoelectrospray mass spectrometry, Electrophoresis, 29(9), pp. 1836-1843, May 2008.
Fridley et al., Controlled release of dry reagents in porous media for tunable temporal and spatial distribution upon rehydration, Lab Chip, 12(21), pp. 4321-4327 (author manuscript, 14 pgs.), Nov. 2012.
Fu et al., Controlled Reagent Transport in Disposable 2D Paper Networks, Lab. Chip, 10(7), pp. 918-920 (author manuscript, 9 pgs. ), Apr. 2010.
Gao et al.; Unusual conformation of a 3'-thioformacetal linkage in a DNA duplex; J. Biomol. NMR; 4(1); pp. 17-34; Jan. 1994.
Gentili et al.; Analysis of free estrogens and their conjugates in sewage and river waters by solid-phase extraction then liquid chromatography-electrospray-tandem mass spectrometry. Chromatographia 56(1), pp. 25-32, Jul. 2002.
Gerasimova et al.; Fluorometric method for phenylalanine microplate assay adapted for phenylketonuria screening, Clinical Chemistry, 35(10), pp. 2112-2115, Oct. 1989.
Gong et al., All-Electronic Droplet Generation On-Chip With Real-Time Feedback Control For EWOD Digital Microfluidics, Lab Chip, 8(6), pp. 898-906 (author manuscript, 20 pgs.), Jun. 2008.
Gong et al.; Portable digital microfluidics platform with active but disposable lab-on-chip; 17th IEEE International Conference on Micro Electro Mechanical Systems; Maastricht, Netherlands; pp. 355-358; Jan. 24-29, 2004.
Gong et al.; Two-dimensional digital microfluidic system by multilayer printed circuit board, 18th IEEE International Conference on Micro Electro Mechanical Systems (MEMS 2005); IEEE; pp. 726-729; Jan. 30-Feb. 3, 2005.
Goto et al.; Colorimetric detection of loop-mediated isothermal amplification reaction by using hydroxy naphthol blue; Biotechniques; 46(3); pp. 167-172; Mar. 2009.
Gottschlich et al.; Integrated microchip-device for the digestion, separation and postcolumn labeling of proteins and peptides, J. Chromatogr. B. 745(1), pp. 243-249, Aug. 2000.
Govindarajan et al., A low cost point-of-care viscous sample preparation device for molecular diagnosis in the developing world; an example of microfluidic origami, Lab Chip, 12(1), pp. 174-181, Jan. 2012.
Green et al.; Neonatal screening by DNA microarray: spots and chips, Nature Reviews Genetics, 6(2), pp. 147-151, Feb. 2005.
Hatch et al., Integrated preconcentration SDS-PAGE of proteins in microchips using photopatterned cross-linked polyacrylamide gels, Analytical Chemistry, 78(14), pp. 4976-4984, Jul. 2006.
He et al. (ed); Food microbiological inspection technology; Chapter 5: Modern food microbiological inspection technology; China Quality Inspection press; pp. 111-113; (English Translation included) Nov. 2013.
Henderson et al.; Estrogens as a cause of human cancer: The Richard and Hinda Rosenthal Foundation award lecture. Cancer Res, 48(2), pp. 246-253, Jan. 1988.
Hennequin et al.; Synthesizing microcapsules with controlled geometrical and mechanical properties with microfluidic double emulsion technology; Langmuir; 25(14); pp. 7857-7861; Jul. 2009.
Herdewijn et al.; 2'-5'-Oligoadenylates (2-5A) As Mediators of Interferon Action. Synthesis and Biological Activity of New 2-5A Analogues. E. De Clerq (ed.) Frontiers in Microbiology, 231-232, Springer, Dordrecht Jan. 1987.
Hertz et al.; Estrogen-progestogen combinations for contraception. Journal of the American Medical Association, 198(9), pp. 1000-1006, Nov. 1966.
Hong et al.; Three-dimensional digital microfluidic manipulation of droplets in oil medium; Scientific Reports; 5 (Article No. 10685); 5 pgs.; Jun. 2015.
Horn et al.; Oligonucleotides with alternating anionic and cationic phosphoramidate linkages: Synthesis and hybridization of stereo-uniform isomers; Tetrahedron Lett.; 37(6); pp. 743-746; Feb. 1996.
Hou et al.; Microfluidic devices for blood fractionation; Micromachines; 2(3); pp. 319-343; Jul. 20, 2011.
Huh et al.; Reversible Switching of High-Speed Air-Liquid Two-Phase Flows Using Electrowetting-Assisted Flow-Pattern Change, J. Am. Chem. Soc., 125, pp. 14678-14679; Dec. 2003.
Ihalainen et al.; Application of paper-supported printed gold electrodes for impedimetric immunosensor development; Biosensors; 3(1); pp. 1-17; Mar. 2013.
Jacobson et al.; High-Speed Separations on a Microchip, Anal. Chem., 66(7), pp. 1114-1118, Apr. 1994.
Jacobson et al.; Precolumn Reactions with Electrophoretic Analysis Integrated on a Microchip, Anal. Chem., 66(23), pp. 4127-4132, Dec. 1994.
Jebrail et al., Combinatorial Synthesis of Peptidomimetics Using Digital Microfluidics, J. Flow Chem., 2(3), pp. 103-107; (online) Aug. 2012.
Jebrail et al., Let's get digital: digitizing chemical biology with microfluidics, Curr. Opin. Chem. Biol., 14(5), 574-581, Oct. 2010.

(56) References Cited

OTHER PUBLICATIONS

Jebrail et al., Synchronized synthesis of peptide-based macrocycles by digital microfluidics, Angew. Chem. Int. Ed. Eng., 49(46), pp. 8625-8629, Nov. 2010.
Jebrail et al., World-to-digital-microfluidic interface enabling extraction and purification of RNA from human whole blood, Analytical Chemistry, 86(8), pp. 3856-3862, Apr. 2014.
Jebrail et al.; A Solvent Replenishment Solution for Managing Evaporation of Biochemical Reactions in Air-Matrix Digital Microfluidics Devices, Lab on a Chip, 15(1), pp. 151-158; Jan. 2015.
Jebrail et al.; Digital Microfluidic Method for Protein Extraction by Precipitation; Analytical Chemistry; 81(1); pp. 330-335; Jan. 2009.
Jebrail et al.; Digital Microfluidics for Automated Proteomic Processing, Journal of Visualized Experiments, 33 (e1603), 5 pgs., Nov. 2009.
Jebrail et al.; Digital microfluidics: a versatile tool for applications in chemistry, biology and medicine; Lab Chip; 12 (14); pp. 2452-2463; Jul. 2012.
Jemere et al., An integrated solid-phase extraction system for sub-picomolar detection, Electrophoresis, 23(20), pp. 3537-3544, Oct. 2002.
Jenkins et al., The biosynthesis of carbocyclic nucleosides; Chem. Soc. Rev.; 24(3); pp. 169-176; Jan. 1995.
Jensen et al., Free-running enzymatic oligonucleotide synthesis for data storage applications; bioRxiv; 1:355719; 7 pages; Jan. 2018.
Jessome et al.; lon Suppression: A Major Concem in Mass Spectrometry. LC-GC North America, 24(5), pp. 498-510, May 2006.
Jia et al.; Ultrasensitive detection of microRNAs by exponential isothermal amplification; Angew. Chem. Int. Ed. Engl.; 49(32); pp. 5498-5501; Jul. 2010.
Jung et al.; Hybridization of Alternating Cationic/Anionic Oligonucleotides to RNA Segments; Nucleosides & Nucleotides; 13(6-7); pp. 1597-1605; Jul. 1994.
Kaaks et al.; Postmenopausal serum androgens, oestrogens and breast cancer risk: The European prospective investigation into cancer and nutrition. Endocrine-Related Cancer, 12(4), pp. 1071-1082, Dec. 2005.
Keng et al., Micro-chemical synthesis of molecular probes on an electronic microfluidic device, PNAS, 109(3), pp. 690-695; Jan. 2012.
Kiedrowski et al., Parabolic Growth of a Self-Replicating Hexadeoxynucleotide Bearing a 3'-5'-Phosphoamidate Linkage; Angew. Chemie Intl. Ed .; 30(4); pp. 423-426; Apr. 1991.
Kim et al.; Automated digital microfluidic sample preparation for next-generation DNA sequencing; JALA; Journal of the Association for Laboratory Automation; 16(6); pp. 405-414; Dec. 2011.
Kim et al., A Microfluidic DNA Library Preparation Platform for Next-Generation Sequencing, PLoS ONE, 8(7), Article ID: e68988; 9 pgs., Jul. 2013.
Kim et al.; Microfabricated Monolithic Multinozzle Emitters for Nanoelectrospray Mass Spectrometry; Anal Chem; 79(10); pp. 3703-3707; May 2007.
Koster et al.; Drop-based microfluidic devices for encapsulation of single cells; Lab on a Chip; 8(7); pp. 1110-1115; Jul. 2008.
Kralj et al.; Integrated continuous microfluidic liquid-liquid extraction. Lab on a Chip, 7(2), pp. 256-263, Feb. 2007.
Kutter et al., Solid phase extraction on microfluidic devices, Journal of Microcolumn Separations, 12(2), pp. 93-97, Jan. 2000.
Kutter et al., Solvent—Programmed Microchip Open-Channel Electrochromatography, Analytical Chemistry, 70(15), pp. 3291-3297, Aug. 1998.
Labrie et al.; Androgen glucuronides, instead of testosterone, as the new markers of androgenic activity in women. The Journal of Steroid Biochemistry and Molecular Biology, 99(4-5), pp. 182-188, Jun. 2006.
Labrie; Intracrinology. Molecular and Cellular Endocrinology, 78(3), pp. C113-C118, Jul. 1991.
Lamar et al.; Serum sex hormones and breast cancer risk factors in postmenopausal women. Cancer Epidemiol Biomarkers Prev, 12(4), pp. 380-383, Apr. 2003.
Langevin et al., A rapid and unbiased method to produce strand-specific RNA-Seq libraries from small quantities of starting materiaRNA Biol., 10(4), pp. 502-515, (online) Apr. 2013.
Lawyer et al.; High-level expression, purification, and enzymatic characterization of full-length Thermus aquaticus DNA polymerase and a truncated form deficient in 5' to 3' exonuclease activity; Genomne Res; 2(4); pp. 275-287; May 1993.
Lawyer et al.; Isolation, characterization, and expression in *Escherichia coli* of the DNA polymerase gene from Thermus aquaticus; J. Biol. Chem.; 264; pp. 6427-6437; Apr. 1989.
Lebrasseur et al.; Two-dimensional electrostatic actuation of droplets using a single electrode panel and development of disposable plastic film card; Sensors and Actuators A; 136(1); pp. 368-386; May 2007.
Lee et al.; Electrowetting and electrowetting-on-dielectric for microscale liquid handling, Sens. Actuators A, 95(2), pp. 259-268, Jan. 2002.
Lee et al.; Removal of bovine serum albumin using solid-phase extraction with in-situ polymerized stationary phase in a microfluidic device; Journal of Chromatography A; 1187(1-2); pp. 11-17; Apr. 2008.
Lee et al.; Surface-Tension-Driven Microactuation Based on Continuous Electrowetting; J. Microelectromechanical Systems; 9(2); pp. 171-180; Jun. 2000.
Leriche et al.; Cleavable linkers in chemical biology; Bioorganic & Medicinal Chemistry; 20(2); pp. 571-582; Jan. 15, 2012.
Letsinger et al., Cationic oligonucleotides, J. Am. Chem. Soc., 110(13), pp. 4470-4471, Jun. 1988.
Letsinger et al., Effects of pendant groups at phosphorus on binding properties of d-ApA analogues, Nucl. Acids Res., 14(8), pp. 3487-3499, Apr. 1986.
Letsinger et al., Phosphoramidate analogs of oligonucleotides, J. Org. Chem., 35(11), pp. 3800-3803, Nov. 1970.
Lettieri et al., A novel microfluidic concept for bioanalysis using freely moving beads trapped in recirculating flows, Lab on a Chip, 3(1), pp. 34-39, Feb. 2003.
Levy et al.; Genetic screening of newborns, Annual Review of Genomics and Human Genetics, 1, pp. 139-177, Sep. 2000.
Li et al., A perspective on paper-based microfluidics: Current status and future trends, Biomicrofluidics, 6(1), pp. 011301 (13 pgs), Mar. 2012.
Ll et al., Application of microfluidic devices to proteomics research: identification of trace-level protein digests and affinity capture of target peptides, Molecular & cellular Proteomics, 16(2), pp. 157-168, Feb. 2002.
Li et al., Paper-based microfluidic devices by plasma treatment, Anal. Chem., 80(23), pp. 9131-9134, Nov. 2008.
Li et al.; A Low-Cost and High resolution droplet position detector for an intelligent electrowetting on dielectric device; Journal of Lab. Automation 2015; 20(6); pp. 663-669; Dec. 2015.
Li et al.; One-step ultrasensitive detection of microRNAs with loop-mediated isothermal amplification (LAMP); Chem Commun; 47(9); pp. 2595-2597; Mar. 2011.
Li et al.; Test structure for characterizing low voltage coplanar EWOD system; IEEE Transaction on Semiconductor Manufacturing; IEEE Service Center; Piscataway, NJ.; 22(1); pp. 88-95; Feb. 4, 2009.
Liana et al.; Recent Advances in Paper-Based Sensors; Sensors; 12(9); pp. 11505-11526; Aug. 2012.
Link et al.; Electric Control of Droplets in Microfluidic Devices; Angew Chem Int Ed Engl; 45(16); pp. 2556-2560; Apr. 2006.
Liu et al., Three-dimensional paper microfluidic devices assembled using the principles of origami, JACS, 133(44), pp. 17564-17566, Nov. 2011.
Liu et al.; Attomolar ultrasensitive microRNA detection by DNA-scaffolded silver-nanocluster probe based on isothermal amplification; Anal Chem; 84(12); pp. 5165-5169; Jun. 2012.
Lizardi et al.; Mutation detection and single-molecule counting using isothermal rolling-circle amplification; Nat. Genet.; 19(3); pp. 225-232; Jul. 1998.
Locascio et al.; Surface chemistry in polymer microfluidic systems; in Lab-on-a-Chip; Elsevier Science; 1st Ed.; pp. 65-82; Oct. 2003.
Loeber; Neonatal screening in Europe; the situation in 2004, Journal of Inherited Metabolic Disease, 30(4), pp. 430-438, Aug. 2007.

(56) References Cited

OTHER PUBLICATIONS

Lohman et al.; Efficient DNA ligation in DNA-RNA hybrid helices by Chlorella virus DNA ligase; Nucleic Acids Research; 42(3); pp. 1831-1844; Nov. 2013.
Luk et al.; Pluronic Additives: A Solution to Sticky Problems in Digital Microfluidics, Langmuir, 24(12), pp. 6382-6389, Jun. 2008.
Luk et al; A digital microfluidic approach to proteomic sample processing; Analytical Chemistry; 81(11); pp. 4524-4530; Jun. 2009.
Mag et al., Synthesis and selective cleavage of an oligodeoxynucleotide containing a bridged internucleotide 5'-phosphorothioate linkage, Nucleic Acids Res., 19(7), pp. 1437-1441, Apr. 1991.
Mais et al.; A solvent replenishment solution for managing evaporation of biochemical reactions in air-matrix digital microfluidics devices; Lab on a Chip; 15(1); pp. 151-158; Jan. 2015.
Makamba et al.; Surface modification of poly(dimethylsiloxane) microchannels; Electrophoresis; 24(21); pp. 3607-3619, Nov. 2003.
Malloggi et al.; Electrowetting—A versatile tool for controlling microdrop generation, Eur. Phys. J. E, 26(1), pp. 91-96, May 2008.
Mandl et al.; Newborn screening program practices in the United States: notification, research, and consent, Pediatrics, 109(2), pp. 269-273, Feb. 2002.
Maroney et al.; A Rapid, quantitative assay for direct detection of microRNAs and other small RNAs using splinted ligation; RNA; 13(6); pp. 930R936; Jun. 2007.
Maroney et al.; Direct detection of small RNAs using splinted ligation; Nat. Protocols3(2); pp. 279-287; Jan. 2008.
Marre et al.; Synthesis of micro and nanostructures in microfluidic systems; Chemical Society Reviews; 39(3); pp. 1183-1202; Mar. 2010.
Martinez et al., Simple Telemedicine for Developing Regions: Camera Phones and Paper-Based Microfluidic Devices for Real-Time, Off-Site Diagnosis, Anal. Chem., 80(10), pp. 3699-3707, May 2008.
Martinez et al., Three-dimensional microfluidic devices fabricated in layered paper and tape, PNAS, 105(50), pp. 19606-19611, Dec. 2008.
Martinez et al.; Patterned paper as a platform for inexpensive low-vol. portable bioassays, Angewandte Chemie, 46(8), pp. 1318-1320, Feb. 2007.
Martinez-Sanchez et al.; MicroRNA Target Identification—Experimental Approaches; Biology; 2; pp. 189-205; Jan. 2013.
Matern et al.; Reduction of the false-positive rate in newborn screening by implementation of MS/MS-based second-tier tests: the Mayo Clinic experience (2004-2007), Journal of Inherited Metabolic Disease, 30(4), pp. 585-592, Aug. 2007.
Mauney, Thermal Considerations for Surface Mount Layouts, in Texas Instruments Portable Power Supply Design Seminar, 16 pgs., 2006.
Mega; Heterogenous ion-exchange membranes RALEX; 3 pgs.; retrieved Mar. 1, 2016 from the internet: http://www.mega.cz/heterogenous-ion-exchange-membranes-ralex.html.
Meier et al., The photochemistry of stilbenoid compounds and their role in materials technology, Chem. Int. Ed. Engl., 31(11), pp. 1399-1420, Nov. 1992.
Mellors et al.; Fully Integrated Glass Microfluidic Device for Performing High-Efficiency Capillary Electrophoresis and Electrospray Ionization Mass Spectrometry, Analytical Chemistry, 80(18), pp. 6881-6887 (Author Manuscript, 18 pgs.), Sep. 2008.
Michigan Dept. of Community Health; Specimen collection procedure from Michigan Newborn Screening Program, 37 pgs., (retrieved Feb. 9, 17 online: http:/web.archive.org/web/20100715000000*/http://www.michigan.gov/documents/Bloodco2_60773_7.pdf) Jul. 2009.
Miller et al.; A digital microfluidic approach to homogeneous enzyme assays, Anal. Chem., 80(5), pp. 1614-1619, Mar. 2008.
Millington et al.; Digital Microfluidics: A Future Technology in the Newborn Screening Laboratory?, Seminars in Perinatology, 34(2), pp. 163-169 (Author Manuscript, 14 pgs.), Apr. 2010.
Millington et al.; Digital Microfluidics: A novel platform for multiplexed detection of LSDs with potential for newbom screening (conference presentation); Oak Ridge Conference; 15 pgs.; 2009.
Millington et al.; Tandem mass spectrometry: a new method for acylcamitine profiling with potential for neonatal screening for inborn errors of metabolism, Journal of Inherited Metabolic Disease, 13(3), pp. 321ý324, May 1990.
Millington et al.; The Analysis Of Diagnostic Markers Of Genetic Disorders In Human Blood And Urine Using Tandem Mass Spectrometry With Liquid Secondary Ion Mass Spectrometry, International Journal of Mass Spectrometry, 111, pp. 211-228, Dec. 1991.
Miralles et al.; A Review of Heating and Temperature Control in Microfluidic Systems: Techniques and Applications; Diagnostics; 3; pp. 33-67; Jan. 2013.
Mitchell et al.; Circulating microRNAs as stable blood-based markers for cancer detection; Proc Nat Acad Sci; 105(30); pp. 10513-10518; Jul. 2008.
Moon et al.; An integrated digital microfluidic chip for multiplexed proteomic sample preparation and analysis by MALDI-MS. Lab Chip, 6(9), pp. 1213-1219, Sep. 2006.
Moqadam et al.; The Hunting of Targets: Challenge in miRNA Research; Leukemia; 27(1); pp. 16-23; Jan. 2013.
Mousa et al.; Droplet-scale estrogen assays in breast tissue, blood, and serum, Science Translational Medicine, 1(1), 6 pgs., Oct. 2009.
Murran et al.; Capacitance-based droplet position estimator for digital microfluidic devices; Lab Chip; 12(11); pp. 2053-2059; May 2012.
Nakamura et al.; Simple and accurate determination of CYP2D6 gene copy No. by a loop-mediated isothermal amplification method and an electrochemical DNA chip; Clinica Chimica Acta; 411(7-8); pp. 568-573; Apr. 2010.
Nelson et al.; Incubated protein reduction and digestion on an EWOD digital microfluidic chip for MALDI-MS, Analytical Chemistry, 82(23), pp. 9932-9937, Dec. 2010.
Newborn Screening Ontario, The newbom screening ontario unsatisfactory sample indicator (educational resource), 3 pgs., retrieved online: https:/www.newbomscreening.on.ca/en/health-care-providers/submitters/report-cards/nso_unsatisfatory_sample_indicator_jan_2017, (web address was available to applicant(s) at least as of Jan. 2010).
Ng et al., Digital microfluidic magnetic separation for particle-based immunoassays, Anal. Chem., 84(20), 8805-8812, Oct. 2012.
Nilsson et al.; RNA-templated DNA ligation for transcript analysis; Nucl. Acid Res.; 29(2); pp. 578-581; Jan. 2001.
Njiru; Loop-Mediated Isothermal Amplification Technology: Towards Point of Care Diagnostics; PLoS; 6(6); pp. e1572 (4 pgs.); Jun. 2012.
Notomi et al.; Loop-mediated isothermal amplification of DNA; Nucleic Acid Research; 28(12); p. e63 (7 pgs.); Jun. 2000.
Okubo et al.; Liquid-liquid extraction for efficient synthesis and separation by utilizing micro spaces. Chemical Engineering Science, 63(16), pp. 4070-4077, Aug. 2008.
Oleschuk et al., Trapping of bead-based reagents within microfluidic systems: On-chip solid-phase extraction and electrochromatography, Analytical Chemistry, 72(3), pp. 585-590, Feb. 2000.
Padilla et al.; Newborn screening in the Asia Pacific region, Journal of Inherited Metabolic Disease, 30(4), pp. 490-506, Aug. 2007.
Palluk et al.; De novo DNA synthesis using polymerase-nucleotide conjugates; Nature biotechnology; 36(7); pp. 645-650; Jun. 18, 2018.
Paik et al., Coplanar digital microfluidics using standard printed circuit board processes, in Proceedings 9th Int'l Conf Miniaturized Systems for Chemistry and Life Sciences (MicroTAS 2005), Boston, MA, USA, pp. 566-568, Oct. 9-13, 2005.
Paneri et al.; Effect of change in ratio of electrode to total pitch length in EWOD based microfluidic system; InComputer Applications and Industrial Electronics (ICCAIE); 2010 International Conference; pp. 25-28; Dec. 5, 2010.
Parida et al.; Rapid detection and differentiation of Dengue virus serotypes by a real-time reverse transcription-loop-mediated isothermal amplification assay; J Clinical Microbiology; 43(6); pp. 2895-2903; Jun. 2005.

(56) References Cited

OTHER PUBLICATIONS

Pauwels et al., Biological-Activity of New 2-5a Analogs, Chemica Scripta, 26(1), pp. 141-145, Mar. 1986.
Peltonen et al., Printed electrodes on tailored paper enable electrochemical functionalization of paper; TAPPI Nanotechnology Conference; Espoo, Finland; 20 pgs.; Sep. 2010.
Peterschmitt et al.; Reduction of false negative results in screening of newborns for homocystinuria, New England Journal of Medicine, 341(21), 1572-1576, Nov. 1999.
Petersen et al., On-chip electro membrane extraction, Microfluidics and Nanofluidics, 9(4), pp. 881-888, Oct. 2010.
Pitt et al.; Hormone replacement therapy for osteoporosis. Lancet, 335 (8695), p. 978, Apr. 1990.
Pollack et al.; Electrowetting-based actuation of droplets for integrated microfluidics; Lab on a Chip; 2(2); pp. 96-101; May 2002.
Pollack et al.; Electrowetting-based actuation of liquid droplets for microfluidic applications, Appl. Phys. Lett., 77(11), pp. 1725-1726, Sep. 2000.
Provincial Health Services Authority (British Columbia Perinatal Health Program), Perinatal Services BC Neonatal Guideline 9: Newborn Screening. 29 pgs., (retrieved Feb. 9, 2017 online: http://www.perinatalservicesbc.ca/health-professionals/guidelines-standards/newbom) guideline revised: Dec. 2010.
Rahhal et al.; The impact of assay sensitivity in the assessment of diseases and disorders in children. Steroids, 73(13), pp. 1322-1327, Dec. 2008.
Rashad; Clinical applications of tandem mass spectrometry: ten years of diagnosis and screening for inherited metabolic diseases, Journal of Chromatography B: Biomedical Sciences and Applications, 758(1), pp. 27-48, Jul. 2001.
Rashed et al.; Diagnosis of inborn errors of metabolism from blood spots by acylcarnitines and amino acids profiling using automated electrospray tandem mass spectrometry, Pediatric Research, 38(3), 324-331, Sep. 1995.
Rawls, Optimistic About Antisense: Promising clinical results and chemical strategies for further improvements delight antisense drug researchers; Chemical & Engineering News; 75(22); pp. 35-39; Jun. 2, 1997.
Ren et al., Automated on-chip droplet dispensing with volume control by electro-wetting actuation and capacitance metering, Sens. Actuator B Chem., 98(2-3), pp. 319-327, Mar. 2004.
Ren et al.; Design and testing of an interpolating mixing architecture for electrowetting-based droplet-on-chip chemical dilution; 12th International Conference on Transducers, Solid-State Sensors, Actuators and Microsystems; vol. 2; Boston, MA, USA; pp. 619-622; Jun. 8-12, 2003.
Ro et al.; Poly (dimethylsiloxane) microchip for precolumn reaction and micellar electrokinetic chromatography of biogenic amines, Electrophoresis, 23(7-8), pp. 1129-1137, Apr. 2002.
Roman et al.; Fully integrated microfluidic separations systems for biochemical analysis, J. Chromatogr. A, 1168(1-2), pp. 170-188, Oct. 2007.
Roman et al.; Sampling and Electrophoretic Analysis of Segmented Flow Streams in a Microfluidic Device, Anal. Chem., 80(21), pp. 8231-8238 (author manuscript, 19 pgs.), Nov. 2008.
Sabourin et al.; Interconnection blocks: a method for providing reusable, rapid, multiple, aligned and planar microfluidic interconnections; Journal of Micromechanics and Microengineering; 19(3); 10 pages; doi:10.1088/0960-1317/19/3/035021; Feb. 18, 2009.
Sadeghi et al.; On Chip Droplet Characterization: A Practical, High-Sensitivity Measurement of Droplet Impedance in Digital Microfluidics; Anal. Chem.; 84(4); pp. 1915-1923; Feb. 2012.
Sahai et al.; Newborn screening, Critical Reviews in Clinical Laboratory Sciences, 46(2), pp. 55-82, (online) Mar. 2009.
Samsi et al.; A Digital Microfluidic Electrochemical Immunoassay; Lab On A Chip; 14(3); pp. 547-554; Feb. 2014.
Sanghvi & Cook (Ed.); Carbohydrate Modifications in Antisense Research; Chapters 2 and 3, American Chemical Society, Washington DC; (207th National Meeting of the American Chemical Society Mar. 13-17, 1994, San Jose, CA); Dec. 1994.
Sanghvi & Cook (Ed.); Carbohydrate Modifications in Antisense Research; Chapters 6 and 7, American Chemical Society, Washington DC; (207th National Meeting of the American Chemical Society Mar. 13-17, 1994, San Jose, CA); Dec. 1994.
Santen et al.; Superiority of gas chromatography/tandem mass spectrometry assay (GC/MS/MS) for estradiol for monitoring of aromatase inhibitor therapy. Steroids. 72(8), pp. 666-671, Jul. 2007.
Sasano et al.; From Endocrinology to Intracrinology. Endocr Pathol, 9(1), pp. 9-20, Spring 1998.
Satoh et al.; Electrowetting-based valve for the control of the capillary flow, J. Appl. Phys., 103(3), 034903, Feb. 2008.
Satoh et al.; On-chip microfluidic transport and mixing using electrowetting and incorporation of sensing functions, Anal. Chem., 77(21), pp. 6857-6863, Nov. 2005.
Sawai et al., Synthesis and properties of oligoadenylic acids containing 2?-5? phosphoramide linkage, Chem. Lett., 13(5), pp. 805-808, May 1984.
Schertzer et al.; Using capacitance measurements in EWOD devices to identify fluid composition and control droplet mixing; Sens. Actuators B; 145(1); pp. 340-347; Mar. 2010.
SCRIVER_Commentary; A Simple Phenylalanine Method For Detecting Phenylketonuria in Large Populations Of Newborn Infants by Guthrie et al., Pediatrics, 32(3), 338-343, Sep. 1963.
Shah et al., On-demand droplet loading for automated organic chemistry on digital microfluidics, Lab Chip, 13(14), pp. 2785-2795, Jul. 2013.
Shamsi et al; A digital microfluidic electrochemical immunoassay; Lab on a Chip; 14(3); pp. 547-554; (year of pub. sufficiently earlier than effective US filing date and any foreign priority date) 2014.
Shih et al., A feedback control system for high-fidelity digital microfluidics, Lab Chip, 11(3), pp. 535-540, Feb. 2011.
Simpson et al.; Estrogen—the Good, the Bad, and the Unexpected. Endocr Rev, 26(3), pp. 322-330; May 2005.
Sinha et al., A Versatile Automated Platform for Micro-scale Cell Stimulation Experiments, J. Vis. Exp., e50597, 8 pgs., Aug. 2013.
Sinton et al.; Electroosmotic velocity profiles in microchannels, Colloids Surf. A, 222(1-3), pp. 273-283, Jul. 2003.
Skendzel, Rubella immunity: Defining the level of protective antibody, Am. J. Clin. Pathol., 106(2), 170-174, Aug. 1996.
Smith et al.; Diagnosis and Management of Female Infertility. Journal of the American Medical Association 290(13), pp. 1767-1770, Oct. 2003.
Sooknanan et al., Nucleic Acid Sequence-Based Amplification, Ch. 12; Molecular Methods for Virus Detection (1st Ed.), Academic Press, Inc., pp. 261-285; Jan. 1995.
Sprinzl et al., Enzymatic incorporation of ATP and CTP analogues into the 3' end of IRNA, Eur. J. Biochem., 81(3), pp. 579-589, Dec. 1977.
Srinivasan et al.; An integrated digital microfluidic lab-on-a-chip for clinical diagnostics on human physiological fluids, Lab Chip, 4(4), pp. 310-315, Aug. 2004.
Stanczyk et al.; Standardization of Steroid Hormone Assays Why, How, and When?, Cancer Epidemiol Biomarkers Prev, 16(9), pp. 1713-1719, Sep. 2007.
Steckl et al.; Flexible Electrowetting And Electrowetting On Flexible Substrates; Proc. SPIE 7956; Advances in Display Technologies; and E-papers and Flexible Displays; 795607 (6 pgs.); Feb. 2011.
Stegink et al.; Plasma amino acid concentrations and amino acid ratios in normal adults and adults heterozygous for phenylketonuria ingesting a hamburger and milk shake meal, American Journal of Clinical Nutrition, 53(3), pp. 670-675, Mar. 1991.
Sun et al.; Rapid and direct microRNA quantification by an enzymatic luminescence assay; (author manuscript; 17 pgs.) Analytical Biochemistry; 429(1); pp. 11-17; Oct. 2012.
Svoboda et al.; Cation exchange membrane integrated into a microfluidic device; Microelectronic Engineering; 86; pp. 1371-1374; Apr.-Jun. 2009.
Szarewski et al.; Contraception. Current state of the art. British Medical Journal, 302(6787), pp. 1224-1226, May 1991.
Szymczak et al.; Concentration of Sex Steroids in Adipose Tissue after Menopause. Steroids, 63(5-6), pp. 319-321, May/Jun. 1998.

(56) References Cited

OTHER PUBLICATIONS

Tachibana et al.; Application of an enzyme chip to the microquantification of L-phenylalanine, Analytical Biochemistry, 359(1), pp. 72-78, Dec. 2006.
Tan et al.; A lab-on-a-chip for detection of nerve agent sarin in blood; Lab Chip; 8(6); pp. 885-891; Jun. 2008.
Tang et al.; Mechano-regulated surface for manipulating liquid droplets; Nature Communications; 10 pages; DOI: 10.1038/ncomms14831; ; Apr. 4, 2017.
Teh et al.; Droplet microfluidics, Lab Chip, 8(2), pp. 198-220, Feb. 2008.
Theberge et al.; Microdroplets in microfluidics: an evolving plarform for discoveries in chemistry and biology; Angewandte Chemie International Edition; 49(34); pp. 5846-5868; Aug. 2010.
Therrell et al.; Newborn screening in North America, Journal of Inherited Metabolic Disease, 30(4), pp. 447-465, Aug. 2007.
Tian et al., Printed two-dimensional micro-zone plates for chemical analysis and ELISA, Lab on a Chip, 11(17), pp. 2869-2875, Sep. 2011.
Tobjörk et al., IR-sintering of ink-jet printed metal-nanoparticles on paper, Thin Solid Films, 520(7), pp. 2949-2955, Jan. 2012.
Tomita et al.; Loop-mediated isothermal amplification (LAMP) of gene sequences and simple visual detection of products; Nature Protocols; 3(5); pp. 877-882; (online) Apr. 2008.
Torkkeli; Droplet microfluidics on a planar surface; VTT Technical Research Centre of Finland; Publications 504; 214 pages (Dissertation); Oct. 2003.
Turgeon et al.; Combined Newborn Screening for Succinylacetone, Amino Acids, and Acylcarnitines in Dried Blood Spots, Clinical Chemistry, 54(4), pp. 657-664, Apr. 2008.
Udenfriend et al.; Fluorescamine: a reagent for assay of amino acids, peptides, proteins, and primary amines in the picomole range, Science, 178(4063), pp. 871-872, Nov. 1972.
Unger et al.; Monolithic microfabricated valves and pumps by multilayer soft lithography, Science, 288(5463), pp. 113-116, Apr. 2000.
Univ. of Maryland—Baltimore Washington Medical Center; Plasma amino acids, 6 pgs., retrieved Feb. 10, 17 from: http://www.mybwmc.org/library/1/003361, Web address available to applicant(s) at least as of Jan. 2010.
Verkman; Drug Discovery In Academia; Am J Physiol Cell Physiol; 286(3); pp. C465-C474; Feb. 2004.
Walker et al.; A Chemiluminescent DNA Probe Test Based on Strand Displacement Amplification (Chapter 15); Molecular Methods for Virus Detection (1st Ed.), Academic Press, Inc., pp. 329-349; Jan. 1995.
Walker et al.; A passive pumping method for microfluidic devices, Lab Chip, 2(3), pp. 131-134, Aug. 2002.
Wang et al., Paper-based chemiluminescence ELISA: lab-on-paper based on chitosan modified paper device and, Biosens. Bioelectron., 31(1), pp. 212-218, Jan. 2012.
Wang et al., Simple and covalent fabrication of a paper device and its application in sensitive chemiluminescence immunoassay, Analyst, 137(16), pp. 3821-3827, Aug. 2012.
Wang et al.; An integrated microfluidic device for large-scale in situ click chemistry screening; Lab on a Chip; 9(16); 9(16); pp. 2281-2285; 9 pages (Author Manuscript); Aug. 2009.
Wang et al.; Highly sensitive detection of microRNAs based on isothermal exponential amplification-assisted generation of catalytic G-quadruplexDNAzyme; Biosensors and Bioelectronics, 42; pp. 131-135; Apr. 2013.
Washburn et al.; Large-scale analysis of the yeast proteome by multidimensional protein identification technology, Nat. Biotechnol., 19(3), pp. 242-247, Mar. 2001.
Watson et al.; Multilayer hybrid microfluidics: a digital-to-channel interface for sample processing and separations; Anal. Chem.; 82(15); pp. 6680-6686; Aug. 2010.
Wheeler et al.; Electrowetting-Based Microfluidics for Analysis of Peptides and Proteins by Matrix-Assisted Laser Desorption/Ionization Mass Spectrometry; Anal Chem; 76(16); pp. 4833-4838; Aug. 2004.
Wheeler; Chemistry. Putting electrowetting to work; Science; 322(5901); pp. 539-540; Oct. 2008.
Wlodkowic et al.; Tumors on chips: oncology meets microfluidics; Current opinion in Chemical Biology; 14(5); pp. 556-567; Oct. 2010.
Wu et al.; Design, Simulation and Fabrication of Electrowetting-Based Actuators for Integrated Digital Microfluidics; Proceedings of the 1st IEEE International Conference on Nano/Micro Engineered and Molecular Systems; Zhuhai, China; pp. 1097-1100; Jan. 18-21, 2006.
Wu et al.; Electrophoretic separations on microfluidic chips, J. Chromatogr. A, 1184(1-2), pp. 542-559, Mar. 2008.
Yan et al., A microfluidic origami electrochemiluminescence aptamer-device based on a porous Au-paper electrode and a phenyleneethynylene derivative, Chem. Commun. (Camb), 49(14), pp. 1383-1385, Feb. 2013.
Yan et al., Paper-based electrochemiluminescent 3D immunodevice for lab-on-paper, specific, and sensitive point-of-care testing, Chem.—Eur. J., 18(16), pp. 4938-4945, Apr. 2012.
Yi et al.; Spangler et al., Eds; Channel-to-droplet extractions for on-chip sample preparation, in Proceedings of Solid-State Sensor, Actuator and Microsystems Workshop, pp. 128-131, Jun. 2006.
Yin et al.; One-step, multiplexed fluorescence detection of microRNAs based on duplex-specific nuclease signal amplification; J. American Chem. Soc.; 134(11); pp. 5064-5067; Mar. 2012.
Yoon et al.; Preventing Biomolecular Adsorption in Electrowetting-Based Biofluidic Chips; Anal Chem; 75; pp. 5097-5102; Aug. 2003.
Yoon; Open-Surface Digital Microfluidics; The Open Biotechnology Journal; 2(1); pp. 94-100; Apr. 2008.
Young et al.; Calculation of DEP and EWOD Forces for Application in Digital Microfluidics, J. Fluids Eng., 130(8), pp. 081603-1-081603-9, Jul. 2008.
Yu et al., Monolithic porous polymer for on-chip solid-phase extraction and preconcentration prepared by photoinitiated in situ polymerization within a microfluidic device, Analytical Chemistry , 73(21), pp. 5088-5096, Nov. 2001.
Yu et al., Preparation of monolithic polymers with controlled porous properties for microfluidic chip applications using photoinitiated free-radical polymerization, Journal of Polymer Science, Part A: Polymer Chemistry, 40(6), pp. 755-769, Mar. 2002.
Yu et al.; A plate reader-compatible microchannel array for cell biology assays; Lab Chip; 7(3); pp. 388-391; Mar. 2007.
Yu et al.; Microfabrication of a digital microfluidic platform integrated with an on-chip electrochemical cell; Journal of Micromechanics and Microrgineering: 23(9); pp. 10 pages; doi: 10.1088/0960-1317/23/9/095025; Aug. 2013.
Yu et al.; Microfabrication of a digital microfluidic platform integrated with an on-chip electrochemical cell; Journal of Micromechanics and Microengineering: 23(9); dol: 10.1088/0960-1317/23/9/095025, 10 pages; Aug. 28, 2013.
Yu et al.; Parallel-plate lab-on-chip electrochemical analysis; Journal of Micromechanics and Microengineering: 24(1); 7 pages; doi: 10.1088/0960-1317/24/1/015020; Dec. 16, 2013.
Yue; Undergraduate Chemistry experiment (11); Hunan Normal University Press; First Edition; p. 96; (Machine Translation included); Oct. 2008.
Yung et al.; Micromagnetic-microfluidic blood cleansing devices; Lab on a Chip; 9(9); pp. 1171-1177; May 2009.
Zaffanello et al.; Multiple positive results during a neonatal screening program: a retrospective analysis of incidence, clinical implications and outcomes, Journal of Perinatal Medicine, 33(3), pp. 246-251, May 2005.
Zhang et al.; Multiplexed detection of microRNAs by tuning DNA-scaffolded silver nanoclusters; Analyst; 138(17); pp. 4812-4817; Sep. 2013.
Zhang et al.; The permeability characteristics of silicone rubber; In Proceedings of 2006 SAMPE Fall Technical Conference; 10 pages; Nov. 6, 2006.

(56) References Cited

OTHER PUBLICATIONS

Zhao et al., Lab on Paper, Lab Chip, 8(12), pp. 1988-1991, Dec. 2008.

Znidarsic-Plazl et al.; Steroid extraction in a microchannel system—mathematical modelling and experiments. Lab Chip, 7(7). pp. 883-889, Jul. 2007.

Zuker; Mfold Web Server for Nucleic Acid Folding and Hybridization Prediction; Nucleic Acid Research ; 31(13); pp. 3406-3415; Jul. 2003.

Zytkovicz et al.; Tandem mass spectrometric analysis for amino, organic, and fatty acid disorders in newborn dried blood spots: a two-year summary from the New England Newborn Screening Program, Clinical Chemistry, 47(11), pp. 1945-1955, Nov. 2001.

Cervantes et al.; U.S. Appl. No. 17/427,290 entitled "Nonfouling compositions and methods for manipulating and processing encapsulated droplets," filed Jul. 30, 2021.

Jebrail et al.; U.S. Appl. No. 17/405,800 entitled "Air-matrix digital microfluidics apparatuses and methods for limiting evaporation and surface fouling," filed Aug. 18, 2021.

Jebrail et al.; U.S. Appl. No. 18/873,323 entitled "Hydrophobic cartridge for digital microfluidics," filed Dec. 9, 2024.

Cervantes et al.: U.S. Appl. No. 18/979,544 entitled "Non fouling compositions and methods for manipulating and processing encapsulated droplets," filed Dec. 12, 2024.

Linder et al.; Reagent-loaded cartridges for valveless and automated fluid delivery in microfluidic devices; Analytical Chemistry; 77(1); pp. 64-71; Jan. 1, 2005.

Tirumala; Ionic winds: A new frontier for air cooling; Electronics Cooling; Technical Brief; 8 pages; retrived from the internet (https://www.electronics-cooling.com/2012/03/ionic-winds-a-new-frontier-for-air-cooling/) on Sep. 11, 2025.

* cited by examiner

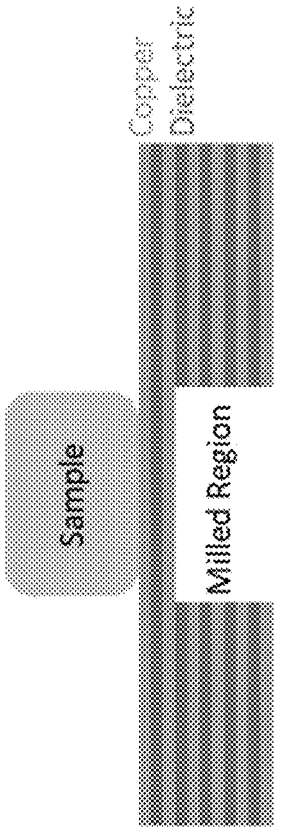
FIG. 29
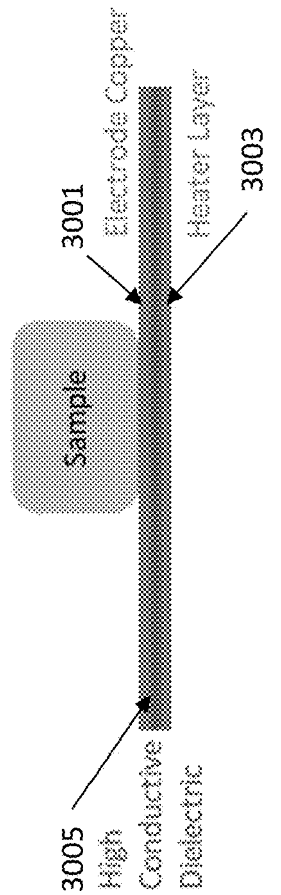
FIG. 30
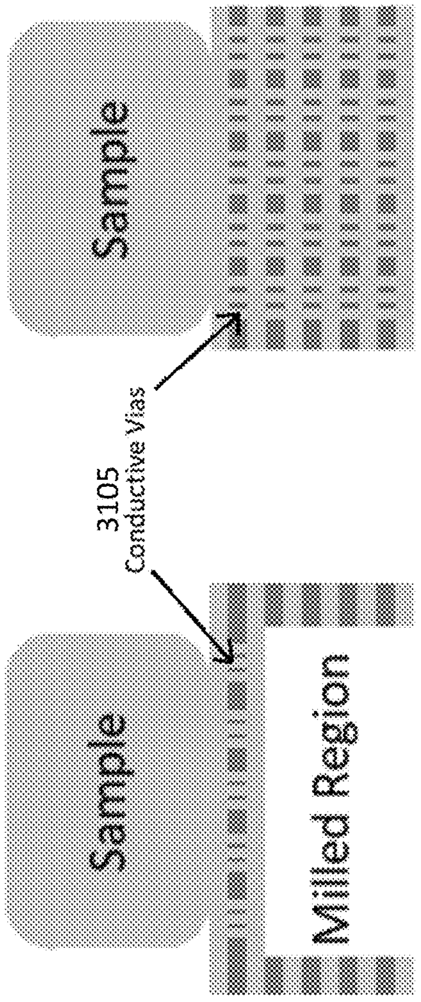
FIG. 31A
FIG. 31B

SECTION A - A

SECTION A - A

SECTION A - A

Angled floor to aid dispense

Slot shaped filling port to prevent pipette tip from sealing

Chimney feature to prevent draining

Ultrasonically welded cap

Volume is 1.8mL

-Chimneys in corners prevent fluid from backflowing into channels
-Can also add absorbent pads
-Volumes: 2.2mL and 1.1mL Ultrasonically welded cap FIG. 74A
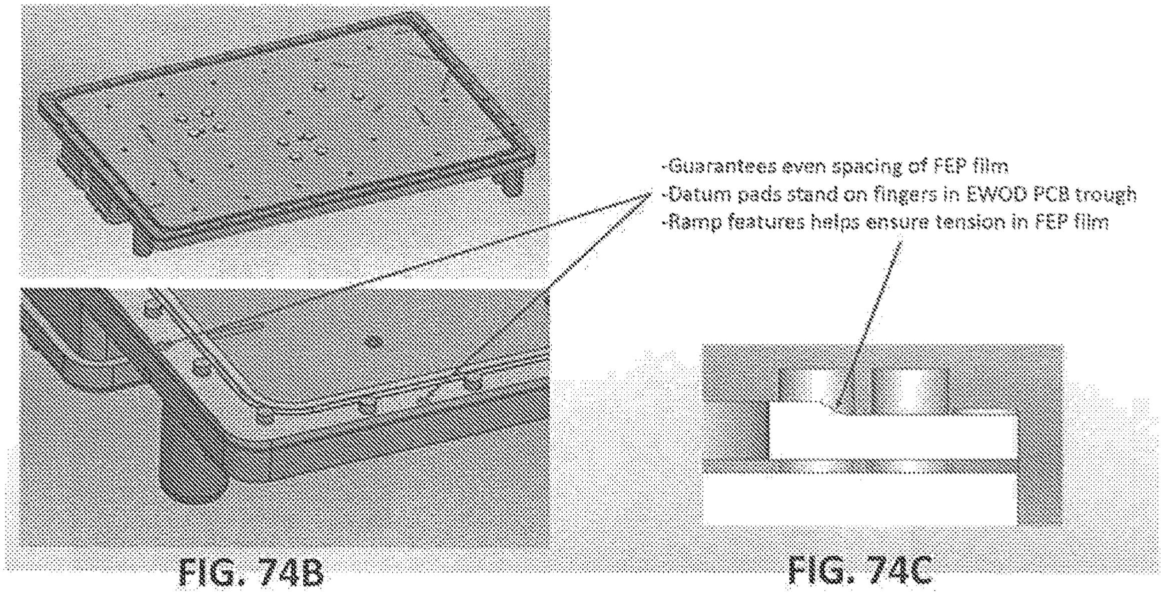
FIG. 74B
FIG. 74C
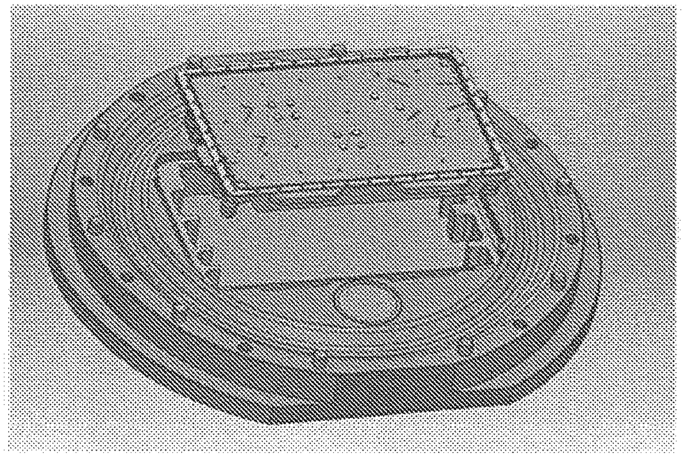
Concept 1
Place Cartridge into FEP Fixture nest
FIG. 75A Place die cut FEP film over posts, film must align with holes on the cartridge Place clamp over base to tension the film Heat stake posts on cartridge to rivet in the FEP film Apply 3M 300LSE double sided tape to spacer and cut off excess to match form of the spacer Snap in tension frame into cartridge holes Remove tape liner and apply spacer to un-wrinkled FEP film and cut out outer dimensions of spacers. Drop the spacer and FEP assembly onto the cartridge and make sure to mate to all holes. (FEP may need to be cut away from holes)

Protocol selection

Timeline, reagents and time required review

Errors
Errors arise when the compiler will not be able to generate a logical protocol for the device.
These errors might include missing re-agent volumes, and other similar mistakes.

FIG. 94
To Start of Protocol following actions shift over to accommodate new action
To Middle of Protocol following actions shift over to accommodate new action

Non-Editable Protocol View
Viewing the protocol on the device shows a non-editable version of the protocol that the user can skim through to verify their choice before running the protocol.

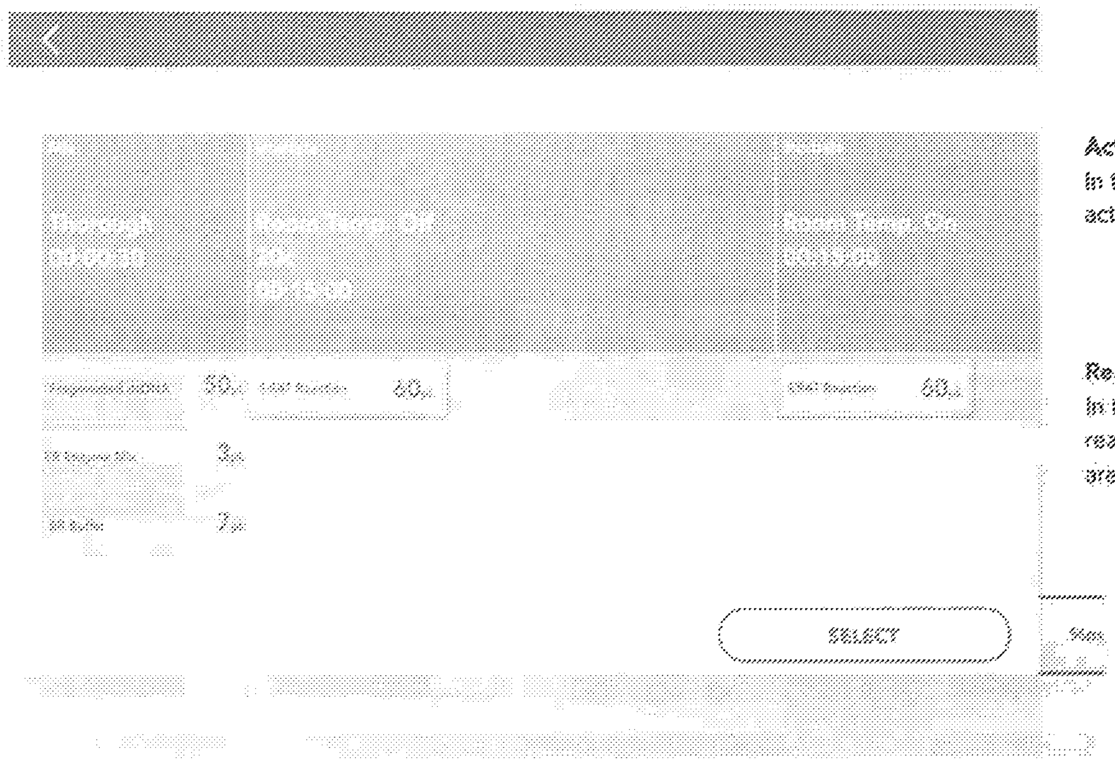

Action Specifications
In the non-editable version of the protocol viewer, the actions specifications are listed in simple text

Reagent Specifications
In the non-editable version of the protocol viewer, the reagent inputs are listed in simple text, and the outputs are listed in simple text in a 70% opaque white rectangle

FIG. 97

DIGITAL MICROFLUIDICS DEVICES AND METHODS OF USING THEM

CROSS REFERENCE TO RELATED APPLICATIONS

This patent application claims priority to U.S. provisional patent application No. 62/811,540, filed on Feb. 28, 2019, titled "DIGITAL MICROFLUIDICS DEVICES AND METHODS OF USING THEM," which is herein incorporated by reference in its entirety.

This patent application may be related to International Application no. PCTUS2018049415, filed on Sep. 4, 2018 (titled "DIGITAL MICROFLUIDICS DEVICES AND METHODS OF USING THEM"), which claims priority to U.S. Provisional Patent Application No. 62/553,743, filed on Sep. 1, 2017 (titled "DIGITAL MICROFLUIDICS DEVICES AND METHODS OF USING THEM"), and U.S. Provisional Patent Application No. 62/557,714, filed on Sep. 12, 2017 (titled "DIGITAL MICROFLUIDICS DEVICES AND METHODS OF USING THEM"), each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This application generally relates to digital microfluidic (DMF) apparatuses and methods. In particular, the apparatuses and methods described herein are directed to air-gap DMF apparatuses that include a cartridge including the air matrix and ground electrodes and a durable component including the drive electrodes.

BACKGROUND

Digital microfluidics (DMF) has is a powerful preparative technique for a broad range of biological and chemical applications. DMF enables real-time, precise, and highly flexible control over multiple samples and reagents, including solids, liquids, and harsh chemicals, without need for pumps, valves, or complex arrays of tubing. DMF may be referred to as (or may include) so-called electrowetting-on-demand (EWOD). In DMF, discrete droplets of nanoliter to microliter volumes are dispensed from reservoirs onto a planar surface coated with a hydrophobic insulator, where they are manipulated (transported, split, merged, mixed) by applying a series of electrical potentials to an array of electrodes. Complex reaction series can be carried out using DMF alone, or using hybrid systems in which DMF is integrated with channel-based microfluidics.

It would be highly advantageous to have an air-matrix DMF apparatus, including a cartridge that is easy to use, and may be reliably and inexpensively made. Described herein are methods and apparatuses, including systems and devices, that may address these issues.

SUMMARY OF THE DISCLOSURE

Described herein are digital microfluidic (DMF) methods and apparatuses (including devices and systems, such as cartridges, DMF controllers/readers, etc.). Although the methods and apparatuses described herein may be specifically adapted for air matrix DMF apparatuses (also referred to herein as air gap DMF apparatuses), these methods and apparatus may be configured for use in other DMF apparatuses (e.g., oil gap, etc.). The methods and apparatuses described herein may be used to handle relatively larger volumes that have been possible with traditional DMF apparatuses, in part because the separation between the plates forming the air gap of the DMF apparatus may be larger (e.g., greater than 280 micrometers, 300 micrometers or more, 350 micrometers or more, 400 micrometers or more, 500 micrometers or more, 700 micrometers or more, 1 mm or more, etc.). In addition, any of the apparatuses and methods described herein may be configured to include a disposable cartridge that has the dielectric layer forming the bottom of the cartridge; the driving electrodes do not have to be a part of the cartridge; theses apparatuses may be adapted to allow the dielectric to be securely held to the electrodes during operation, which has proven very challenging, particularly when the dielectric layer is slightly flexible. In addition, these apparatuses may be adapted for safe use, particularly when applying fluid to the cartridge even when the voltages necessary to move or retain droplets are being applied. Finally, the apparatuses and methods described herein may be easier and faster to use, and may include a more efficient and intuitive user interface as well as the ability to create, modify, store, and/or transfer a large variety of microfluidics control protocols.

Any of the methods and apparatuses described herein may include a cartridge in which the ground electrode is included as part of the cartridge. In some variations, the ground electrode may be formed into a grid pattern forming a plurality of cells. The grid pattern may result in clear windows allowing visualization through the ground electrode even when a non-transparent ground electrode (e.g., an opaque or translucent material, such as a metallic coating including, for example, a silver conductive ink) is used to form the ground electrode. The grid pattern may mirror the arrangement of the driving electrodes in the DMF apparatus onto which the cartridge may be placed. For example, the grid pattern cover the spaces between adjacent electrodes when the ground electrode is adjacent to the drive electrodes across the air gap. Alternatively, the ground electrode may be formed of a material that is transparent or sufficiently transparent so that it may be imaged through. In some variations the ground electrode is a conductive coating. The ground electrode may electrically continuous (e.g., electrically contiguous) but may include one or more openings, e.g., through which a droplet within the air gap may be visualized. Thus, in any of these variations the upper plate of the cartridge may be transparent or sufficiently transparent to be visualized through, at least in one or more regions.

For example, a cartridge for a digital microfluidics (DMF) apparatus may have a bottom and a top, and may include: a sheet of dielectric material having a first side and a second side, the first side forming an exposed bottom surface on the bottom of the cartridge, wherein at least the second side of the sheet of dielectric material comprises a first hydrophobic surface; a top plate having first side and a second side; a ground electrode on first side of the top plate. The ground electrode may comprise a grid pattern forming a plurality of open cells. The cartridge may also include a second hydrophobic surface on the first side of the top plate covering the ground electrode; and an air gap separating the first hydrophobic layer and the second hydrophobic layer, wherein the air gap comprises a separation of greater than 280 micrometers.

In any of the cartridges described herein the top plate may include a plurality of cavities within the thickness of the top plate; these cavities may be closed (e.g., sealed) and/or filled with a thermally insulating material having a low thermal mass and low thermal conductivity. In some variations the insulating material comprises air. The cavities may be positioned over the air gap regions that will correspond to heating and/or cooling regions (e.g., thermally controlled regions); the lower thermal mass in these regions may allow for significantly more rapid heating/cooling of a droplet in the air gap under the cavity/cavities. The thickness of the top plate in these regions may therefore include the cavity; the cavity bottom (corresponding to the bottom surface of the top plate) may be less than 1 mm thick (e.g., less than 0.9 mm, 0.8 mm, 0.7 mm, 0.6 mm, 0.5 mm, 0.4 mm, 0.3 mm, 0.2 mm, 0.1 mm, 90 microns, 80 microns, 70 microns, 60 microns, 50 microns, 40 microns, 30 microns, etc.). The cavity bottom may preferably be as thin as possible while providing structural support for the electrode and any dielectric coating on the bottom surface of the top plate. The cavity upper surface may be substantially thicker (e.g., 1.5×, 2×, 3×, 4×, 5×, etc.) than the cavity bottom surface.

The dielectric material forming the bottom surface may be made hydrophobic (e.g., by coating, including dip-coating, etc., impregnating with a hydrophobic material, etc.) and/or it may itself be hydrophobic. For example, the bottom surface (e.g., the bottom surface of a cartridge) may be formed of a film that is both a dielectric and a hydrophobic material. For example, the bottom surface may be a Teflon film (which may include an adhesive or an adhesive portion, such as a Teflon tape) that is both hydrophobic and acts as a dielectric. Other films may include plastic paraffin films (e.g., "Parafilm" such as PARAFILM M). However, in particular, films (such as Teflon films) that are able to withstand a high temperature (e.g., 100 degrees C. and above) are preferred.

A cartridge for a digital microfluidics (DMF) apparatus may generally include a bottom and a top, and may include: a sheet of dielectric material having a first side and a second side, the first side forming an exposed bottom surface on the bottom of the cartridge; a first hydrophobic layer on the second side of the sheet of dielectric material; a top plate having first side and a second side; a ground electrode on first side of the top plate, wherein the ground electrode comprises a grid pattern forming a plurality of open cells; a second hydrophobic layer on the first side of the top plate covering the ground electrode; and an air gap separating the first hydrophobic layer and the second hydrophobic layer, wherein the air gap comprises a separation of greater than 280 micrometers (e.g., greater than 300 micrometers, greater than 400 micrometers, etc.).

The term "cartridge" may refer to a container forming the air gap, and may be inserted into a DMF reading/driving apparatus. The cartridge may be disposable (e.g., single use or limited use). The cartridge may be configured to allow visualization of fluid (droplets) in the air gap. The grid pattern may be particularly useful to allow visualization while still providing the appropriate ground reference to the driving electrode(s). The entire grid may be electrically coupled to form single return (ground) electrode, or multiple ground electrodes may be positioned (via separate and/or adjacent grids) on the top plate.

As mentioned, the grid pattern of the ground electrodes is formed of a non-transparent material.

As used herein the term "grid" may refer to a pattern of repeating open cells ("windows") of any appropriate shape and size, in which the border forming the open cells are formed by an integrated (and electrically continuous) material, such as a conductive ink, metal coating, etc. A grid as used herein is not limited to a network of lines that cross each other to form a series of squares or rectangles; the grid pattern may be formed by forming openings into an otherwise continuous plane of conductive material forming the ground electrode.

Thus, in general, the grid pattern of the ground electrodes may be formed of a conductive ink. For example, the grid pattern of the ground electrodes may be formed of silver nanoparticles. The grid pattern may be printed, screened, sprayed, or otherwise layered onto the top plate.

In general, the borders between the open cells forming the grid pattern may have a minimum width. For example, the minimum width of the grid pattern between the open cells may 50 micrometers or greater (e.g., 0.1 mm or greater, 0.2 mm or greater, 0.3 mm or greater, 0.4 mm or greater, 0.5 mm or greater, 0.6 mm or greater, 0.7 mm or greater, 0.8 mm or greater, 0.9 mm or greater, 1 mm or greater, etc.). As mentioned, the open cells (e.g., "windows") formed by the grid pattern may be any shape, including quadrilateral shapes (e.g., square, rectangular, etc.) or elliptical shapes (e.g., oval, circular, etc.)

and/or other shapes (+ shapes, H-shapes, etc.).

In general, the grid pattern of the ground electrode may extend over the majority of the top plate (and/or the majority of the cartridge). For example, the grid pattern of the ground electrode may extend over 50% or more of the first side of the top plate (e.g., 55% or more, 60% or more, 65% or more, 70% or more, 80% or more, 90% or more, etc.).

In any of the cartridges described herein, the sheet of dielectric material may be flexible. This flexibility may be helpful for securing the dielectric to the drive electrodes to ensure complete contact between the dielectric and the drive electrode(s). Typically, the sheet of dielectric material may be sufficiently compliant so that it may bend or flex under a relatively low force (e.g., 50 kPa of pressure or more). The sheet of dielectric may be any appropriate thickness; for example, the sheet may be less than 30 microns thick (e.g., less than 20 microns thick, etc.).

As will be described in greater detail below, any of these apparatuses may include a microfluidics channel formed in the second side of the top plate, wherein the microfluidics channel extends along the second side of the top plate and at least one opening between the microfluidics channel and the air gap.

The top plate may be formed of any appropriate material, including in particular, clear or transparent materials, (e.g., an acrylic, etc.).

For example, a cartridge for a digital microfluidics (DMF) apparatus may include: a flexible sheet of dielectric material having a first side and a second side, the first side forming an exposed bottom surface on the bottom of the cartridge; a first hydrophobic layer on the second side of the sheet of dielectric material; a top plate having first side and a second side; a ground electrode on first side of the top plate, wherein the ground electrode comprises a grid pattern formed of a non-transparent material forming a plurality of open cells along the first side of the top plate; a second hydrophobic layer on the first side of the top plate covering the ground electrode; and an air gap separating the first hydrophobic layer and the second hydrophobic layer, wherein the air gap comprises a separation of greater than 280 micrometers (e.g., 300 micrometers or more, 400 micrometers or more, etc.). Typically, the cartridge has a bottom and a top.

As mentioned, also described herein are cartridges in which microfluidics channels are integrated into the DMF components, including in particular the top plate of the DMF apparatus. Applicants have found that integrating one or more microfluidics channels into the top plate may permit the cartridge to be more compact, as well as allow a higher degree of control and manipulation of processes within the air gap that are otherwise being controlled by the electrowetting of the DMF system.

For example, a cartridge for a digital microfluidics (DMF) apparatus (the cartridge having a bottom and a top) may include: a sheet of dielectric material having a first side and a second side, the first side forming an exposed bottom surface on the bottom of the cartridge; a first hydrophobic layer on the second side of the sheet of dielectric material; a top plate having first side and a second side; a ground electrode on first side of the top plate; a second hydrophobic layer on the first side of the top plate covering the ground electrode; an air gap separating the first hydrophobic layer and the second hydrophobic layer; a microfluidics channel formed in the second side of the top plate, wherein the microfluidics channel extends along the second side of the top plate; an opening between the microfluidics channel and the air gap; and a cover covering the microfluidics channel, wherein the cover includes one or more access ports for accessing the microfluidics channel.

As mentioned, the sheet of dielectric material may be flexible, and may form the bottom-most surface of the cartridge. The sheet may generally be flat (planar) through it may be flexible. The outer surface may be protected with a removable (e.g., peel-off) cover. The dielectric properties may be those generally consistent with a DMF (and particularly an air-matrix DMF) apparatus. The dielectric may be coated on the inner (second) side with the first hydrophobic layer. The hydrophobic layer may be a coating of a hydrophobic material that is relatively inert (e.g., non-reactive with the aqueous droplets that are moved in the air gap).

The top plate may be planar and may be coextensive (or larger) than the bottom dielectric material. The top plate may be any appropriate thickness, and in particular, may be sufficiently thick so that microfluidic channels, chambers and control regions may be attached, formed and/or embedded into the second side of the top plate. The ground electrode may be formed on all or some of the first side of the top plate, as mentioned above, and a second hydrophobic layer may be coated over the ground electrode and/or top plate (particularly where open windows through the ground plate expose the top plate). In any of these examples, the thickness of the electrode coating may be minimal, so that the electrodes may be considered flush with the top plate bottom (first) side of the top plate.

In any of the apparatuses and methods described herein, the air gap separating the first hydrophobic layer and the second hydrophobic layer (e.g., between the dielectric and the top plate) may be relatively large, compared to traditional DMF air-gap systems (e.g., >280, 400 micrometers or more, 500 micrometers or more, 1 mm or more, etc.).

The microfluidics channel formed in the second side of the top plate typically extends through the top plate along the second side of the top plate and an access opening between the microfluidics channel and the air gap may be formed between the microfluidics channel and the air gap, into the top plate. Any of the apparatuses described herein may also include a cover covering the microfluidics channel. The cover may be formed of any appropriate material, including acrylic. The cover may include one or more ports or openings into the microfluidics channel and/or into the air gap.

The microfluidics channel may be configured to contain any appropriate amount of fluid, which may be useful for mixing, adding, removing or otherwise interacting with droplets in the air gap. For example, the microfluidics channel may be configured to hold 0.2 milliliters or more of fluid (e.g., 0.3 ml or more, 0.4 ml or more, 0.5 ml or more, 0.6 ml or more, 0.7 ml or more, 0.8 ml or more 0.9 ml or more, 1 ml or more of fluid, 1.5 ml or more, 2 ml or more, 3 ml or more, 4 ml or more, 5 ml or more, 6 ml or more, 7 ml or more, 8 ml or more, 9 ml or more, 10 ml or more, etc.) within the microfluidics channel. The microfluidics channel may connect to one or more reservoirs (e.g., waste reservoir, storage reservoir, etc.) and/or may connect to one or more additional microfluidics channels.

For example, the microfluidics channel may comprise a first microfluidics channel and the opening between the microfluidics channel and the air gap may comprise a first opening; the apparatus may further include a second microfluidics channel formed in the second side of the top plate, wherein the second microfluidics channel extends along the second side of the top plate, and a second opening between the second microfluidics channel and the air gap, wherein the first and second openings are adjacent to each other. The first and second openings may be a minimum distance apart, which may allow the formation of a "bridging droplet" in the air gap having a minimum size. For example, the first and second openings may be within about 2 cm of each other on the surface of the top plate (e.g., within about 1 cm or each other, within about 9 mm or each other, within about 8 mm of each other, within about 7 mm of each other, within about 6 mm of each other, within about 5 mm of each other, within about 4 mm of each other, within about 3 mm or each other, within about 2 mm of each other, within about 1 mm of each other, etc.).

Any of these cartridge may also include a window from the top of the cartridge to the air gap through which the air gap is visible. This may allow imaging into the air gap. This imaging may be used to detect output (e.g., reaction outputs, such as binding, colorimetric assays, RT-PCR, etc.). The window may be any appropriate size; for example, the window may form between 2 and 50% of the top of the cartridge. The window may be on one side of the cartridge and/or at one end of the cartridge. Multiple imaging windows may be used.

As mentioned, the bottom of the cartridge is formed by the first side of the sheet of dielectric material. The top of the cartridge may include a plurality of openings into the air gap.

In general, the cartridge may include one or more reagent reservoirs on the second side of the top plate. For example, the cartridge, in either a reservoir or within the air gap, may include one or more reagents, including in particular lyophilized (e.g., "freeze dried") reagents. For example, the cartridge may include one or more freeze-dried reagent reservoirs on the second side of the top plate.

For example, a cartridge (having a bottom and a top) for a digital microfluidics (DMF) apparatus may include: a sheet of dielectric material having a first side and a second side, the first side forming an exposed bottom surface on the bottom of the cartridge; a first hydrophobic layer on the second side of the sheet of dielectric material; a top plate having first side and a second side; a ground electrode on first side of the top plate; a second hydrophobic layer on the first side of the top plate covering the ground electrode; an air gap separating the first hydrophobic layer and the second hydrophobic layer, wherein the air gap comprises a separation of greater than 500 micrometers; a first microfluidics channel and a second microfluidics channel, wherein the first and second microfluidics channels are formed in the second side of the top plate, wherein the first and second microfluidics channels extend along the second side of the top plate; a first opening between the first microfluidics channel and the air gap and a second opening between the second microfluidics channel and the air gap, wherein the first and second openings are adjacent to each other within about 2 cm; and a cover covering the microfluidics channel, wherein the cover includes one or more access ports for accessing the microfluidics channel.

Also described herein are DMF controllers (also referred to herein equivalently as DMF readers or DMF reader apparatuses) for use with any of the cartridges described herein. For example, the DMF reader apparatuses (devices) may be configured to apply a vacuum across the dielectric bottom surface of a cartridge so that the electrodes are in uniformly intimate contact with the dielectric forming each of the unit cells form moving a droplet of fluid within the air gap. The applicant have surprisingly found that simply adhesively securing the dielectric material to the electrodes is not sufficient, as it result in un-equal contact and variations in the power required to move droplets as well as inefficiencies in droplet movement, control and consistency. Further, the use of vacuum, even in combination with an adhesive, has similar problems, particularly when the dielectric is flexible. Described herein are apparatuses and methods of using them in which a vacuum is used to secure the dielectric bottom of a cartridge through a plurality of openings within the drive electrodes themselves, or surrounding/immediately adjacent to the drive electrodes. In variations in which the vacuum is applied through all or the some of the drive electrodes (e.g., spaced in a pattern on the seating surface, e.g., at the corners), the dielectric is consistently held onto the drive electrodes in a uniform manner, even when using a relatively low negative pressure for the vacuum. This configuration may also allow the formation of partitions or barriers within the cartridge by including protrusions on the cartridge-holding surface (onto which the cartridge is held)

For example, described herein are digital microfluidics (DMF) reader device configured to operate with a disposable cartridge having a bottom dielectric surface, a top plate with a ground electrode, and an air gap between the bottom dielectric and the top plate, the device comprising: a seating surface for seating the disposable cartridge; a plurality of drive electrodes on the seating surface, wherein each drive electrode comprises an opening therethrough; a vacuum pump for applying a vacuum to the vacuum ports; and a control for applying energy to sequentially activate and de-activate one or more selected drive electrodes to move a droplet within the air gap of the cartridge along a desired path within the air gap, wherein the DMF reader is configured to apply the vacuum to the vacuum manifold to secure each drive electrode to the bottom dielectric of the disposable cartridge when the disposable cartridge is placed on the seating surface.

In some variations, the apparatus includes a vacuum manifold that couples the vacuum pump to a plurality of vacuum ports for applying a vacuum.

The DMF reader devices described herein may be configured to operate with any of the cartridges described herein, and may be adapted for use with such cartridges. However, it should be understood that the cartridge is not a necessary part of the DMF reader apparatus. In general, these apparatuses may operate with a cartridge (e.g., a reusable or disposable cartridge) that has a bottom dielectric surface, a top plate with a ground electrode, and a gap (e.g., typically but not necessarily an air gap) between the bottom dielectric and the top plate.

The DMF apparatus may also generally include a seating surface for seating the disposable cartridge. The seating surface may include the drive electrodes, which may be flush or substantially flush with the seating surface, and/or any protrusions that may be used to form a partition within the gap region (e.g., air gap) of the cartridge by predictably deforming the dielectric into the gap region. The plurality of drive electrodes on the seating surface may be formed on the seating surface or milled into the seating surface. For example, the seating surface may be a substrate such as a printed circuit board (e.g., an electrically insulating surface), onto which the drive electrodes are attached or formed.

In general, as mentioned above, all or a majority of the drive electrodes in the electrode array, e.g., >50%, >60%, >70%, >80%, >90%, >95%, etc.) may include an opening that passes through the drive electrode and connects to the vacuum source. The vacuum source may be a vacuum manifold that connects these openings through the drive electrodes to a source of vacuum, such as a vacuum pump that is part of the apparatus, or a separate vacuum pump that is connected (e.g., wall vacuum) to the apparatus. The openings through the electrodes may be the same sizes, and they may be located anywhere on/through the drive electrodes. For example, they may pass through the centers of the drive electrodes, and/or through an edge region of the drive electrodes, etc. The openings may be any shape (e.g., round, oval, square, etc.). In some variations the size of the openings may be about 1 mm in diameter (e.g., 1.2 mm diameter, 1.1 mm diameter, 1.0 mm diameter, 0.9 mm diameter, 0.8 mm dieter, etc.).

Typically, the vacuum manifold may be coupled to and/or may include a plurality of vacuum ports that each couple to one (or in some variations, more than one) of the openings in the drive electrodes. The vacuum manifold may be located beneath the seating surface. For example, a vacuum manifold may be tubing or other channels beneath the seating surface that connects to the openings in the drive electrodes.

The amount of negative pressure (vacuum) applied by the vacuum manifold to retain the cartridge may be adjusted, selected and/or adapted to prevent deforming the film (and therefore the bottom surface of the air gap) of the cartridge. For example, the pressure may be maintained between −0.5 inches mercury (in Hg) and −25 in Hg (e.g., between a lower limit of about −0.5, 1, 1.5, 2, 2.5, 3, 3.5, 4, 4.5, 5, 5.5, 6, 6.5, 7, 8, 9, 10, 11, 12, 13, 14, 15, etc., in Hg and an upper limit of about 5, 6, 7, 8, 9, 10, 11, 12, 13, 14, 15, 16, 17, 18, 19, 20, 21, 22, etc. in Hg, including, e.g., less than about 4 in Hg, less than about 5 in Hg, less than about 6 in Hg, less than about 7 in Hg, less than about 8 in Hg, less than about 9 in Hg, less than about 10 in Hg, less than about 12 in Hg, less than about 15 in Hg, less than about 17 in Hg, less than about 19 in Hg, less than about 20 in Hg, less than about 22 in Hg, etc.).

The DMF apparatuses described herein typically include a controller for coordinating and driving the electrodes. This controller may include one or more processors, memory, and any other circuitry necessary or useful for operating the device, including coordinating the application of energy to activate/inactivate the drive electrodes, the pump(s) for vacuum and/or microfluidic control, one or more valves (e.g., for microfluidic control, vacuum control), temperature control (e.g., resistive heater, Peltier cooling, etc.) the motor(s) (e.g., for driving opening and closing the device door, the optics, etc.), one or more displays, etc.

As mentioned, any of these devices may include one or more projections extending from the seating surface, wherein the one or more projections are configured to form partitions in the air of the cartridge when the vacuum is applied through the openings in the drive electrodes.

Any of these apparatuses may include an optical reader configured to detect an optical signal from a cartridge seated on the seating surface. The optical reader may be movable or fixed. The optical reader may be used to detect (e.g., sense) a feed or change due to one or more interactions (e.g., binding, enzymatic reactions, etc.) in the droplet. The optical reader can be configured to detect an optical signal from a cartridge seated on the seating surface. Thus, the optical sensor(s) may provide a detection of a readout from the apparatus. Any of these device may include one or more motors, e.g., configured to move the optical reader.

The apparatus may also include one or more temperature sensors (e.g., thermistors, etc.). For example, the device may include one or more temperature sensors coupled to the seating surface. In some variations the thermistor may project from the seating surface and form a barrier or chamber within the air gap of the cartridge. Alternatively or additionally, the one or more temperature sensors may be within the substrate of the seating surface and in thermal contact with the seating surface, e.g., via a thermally conductive material, such as copper.

As mentioned, the devices described herein may include one or more heaters, including in particular resistive heaters. For example, the device may include a resistive heater underlying (or overlying) at least some of the drive electrodes; this may allow for temperature-regulated sub-regions of the apparatus. The entire driving electrode surface may also be cooled (e.g., by circulation of a cooling fluid) to slightly below room temperature (e.g., between 15 degrees C. and 25 degrees C., between 15 degrees C. and 22 degrees C., between 15 degrees C. and 20 degrees C., between 15 degrees C. and 18 degrees C., etc.).

The apparatus may also include one or more magnets above or underneath one or more of the drive electrodes configured to be activated to apply a magnetic field. Thus, magnetic beads may be used for binding material or other reactions within the DMF apparatus, and the magnetic beads may be selectively held within one or more regions of the device. For example, one or more neodymium magnets may be used, e.g., by moving the magnet closer or farther from the cartridge to hold magnetic particles in position (e.g., moving it up towards the electrodes by 3 mm, 4 mm, 5 mm, 6 mm, 7 mm, 8 mm, etc.). An electromagnet may be selectively activated or deactivated to hold/release magnetic particles.

Any of the apparatuses described herein may also include one or more Peltier coolers underlying at least some of the drive electrodes configured to cool to 10 degrees C. or less (e.g., 5 degrees C. or less, 7 degrees C. or less, 11 degrees C. or less, 12 degrees C. or less, 15 degrees C. or less, 20 degrees C. or less, etc.).

In addition to the seating surface, any of these DMF reader apparatuses may also include one or more cartridge trays into which the cartridge may be loaded, so that it can automatically be moved into position within the apparatus. For example, any of these apparatuses may include a cartridge tray for holding a cartridge in a predetermined orientation (which may be fixed by the shape of the cartridge and the receiving tray being complementary); the cartridge tray may be configured to move the disposable cartridge onto the seating surface. Once on the seating surface, the vacuum may be applied to lock it into position. In addition, connections may be made from the top of the cartridge to one or more microfluidics ports, e.g., for applying positive and/or negative pressure (e.g., vacuum) to drive fluid within a microfluidic channel on the top of the cartridge and/or into/out of the gap (e.g., air gap) region within the cartridge.

In general, any of these devices may include an outer housing, a front panel display, and one or more inputs (such as a touchscreen display, dial, button, slider, etc.), and/or a power switch. The apparatus may be configured to be stackable, and/or may be configured to operate in conjunction with a one or more other DMF apparatuses. In some variations, a single housing may enclose multiple cartridge seating surfaces, each having a separately addressable/controllable (by a single or multiple controllers) drive electrode arrays, allowing parallel processing of multiple cartridges; in these variations, all of some of the components (pumps, motors, optical sub-systems, controller(s), etc.) may be shared between the different cartridge seating surfaces.

Any of these devices may include an output configured to output signals detected by the device. The output may be on one or more displays/screens, and/or they may be electronic outputs transmitted to a memory or remote processor for storage/processing and/or display. For example, any of these apparatuses may include a wireless output.

As mentioned, any of the DMF apparatuses described herein may also include one or more microfluidic vacuum ports positioned above the seating surface and configured to engage with an access ports for accessing a microfluidics channel of the cartridge when the cartridge is seated on the seating surface.

For example, a digital microfluidics (DMF) reader device configured to operate with a disposable cartridge having a bottom dielectric surface, a top plate with a ground electrode, and an air gap between the bottom dielectric and the top plate, may include: a seating surface for seating the disposable cartridge; a plurality of drive electrodes on the seating surface, wherein each drive electrode comprises an opening therethrough; a plurality of vacuum ports, wherein each vacuum port is coupled to one or more of the openings in the drive electrodes; a vacuum pump for applying a vacuum to the vacuum ports; one or more projections extending from the seating surface; and a control for applying energy to sequentially activate and de-activate one or more selected drive electrodes to move a droplet within the air gap of the cartridge along a desired path within the air gap, wherein the DMF reader is configured to apply the vacuum to the vacuum ports to secure each drive electrode to the bottom dielectric of the disposable cartridge so that the one or more projections partition the air gap when the disposable cartridge is placed on the seating surface.

Also described herein are methods of preventing or reducing evaporation in any of these apparatuses. For example, described herein are methods of preventing droplet evaporation within an air-matrix digital microfluidic (DMF) apparatus, the method comprising: introducing an aqueous reaction droplet into an air gap of the air-matrix DMF apparatus which is formed between a first plate and a second plate of the air-matrix DMF apparatus; sequentially energizing driving electrodes on or in the first plate to move the aqueous reaction droplet within the air gap of the air-matrix DMF apparatus so that it combines with a droplet of nonpolar fluid within the air gap of the air-matrix DMF apparatus, forming a coated reaction droplet in which that the nonpolar fluid coats the aqueous reaction droplet and protects the reaction droplet from evaporation; and sequentially energizing the driving electrodes to move the coated reaction droplet within the air gap of the air-matrix DMF apparatus.

The volume of the nonpolar fluid may be less than the volume of the aqueous reaction droplet. Any of these methods may include combining, within the air gap of the air-matrix DMF apparatus, the coated droplet with one or more additional aqueous droplets. Any of these methods may also include removing the coating of nonpolar fluid by at least partially withdrawing the coated droplet out of the air gap of the air-matrix DMF apparatus into a microfluidic channel. The method may also include adding the droplet of nonpolar fluid into the air gap of the air-matrix DMF apparatus through an opening in the first or second plate. Generally, the droplet of nonpolar fluid may be liquid at between 10 degrees C. and 100 degrees C.

For example, a method of preventing droplet evaporation within an air-matrix digital microfluidic (DMF) apparatus may include: introducing an aqueous reaction droplet into an air gap of the air-matrix DMF apparatus which is formed between a first plate and a second plate of the air-matrix DMF apparatus; sequentially energizing driving electrodes on or in the first plate to move the aqueous reaction droplet within the air gap of the air-matrix DMF apparatus so that it combines with a droplet of nonpolar fluid within the air gap of the air-matrix DMF apparatus (although in some variations the nonpolar fluid may be combined with a sample prior to being loaded into the air gap), forming a coated reaction droplet in which that the nonpolar fluid coats the aqueous reaction droplet and protects the reaction droplet from evaporation, wherein the nonpolar fluid is liquid at between 10 degrees C. and 100 degrees C., further wherein the volume of the nonpolar fluid is less than the volume of the aqueous reaction droplet; and sequentially energizing the driving electrodes to move the coated reaction droplet within the air gap of the air-matrix DMF apparatus. Although the volume of the nonpolar liquid may be less than the droplet volume, the volume of nonpolar liquid jacketing the droplet may be larger than the volume (up to about 3× the volume) of the droplet.

The methods and apparatuses described herein may be particularly well suited for the use with large-volume droplets and processing. Typically most unit droplets of DMF apparatuses, and particularly air-matrix DMF apparatuses, are limited to about 4 microliters or less of aqueous fluid, and the air gap is limited to less than about 250 or 300 micrometers separation between the driving electrodes and the ground electrode (top and bottom plates of the air gap region). Described herein are methods of operating on larger volumes, in which the separation between the drive electrodes (e.g., bottom plate) and the ground electrodes (e.g., top plate) may be much larger (e.g., between about 280 micrometers and 3 mm, between about 300 micrometers and 3 mm, between about 400 micrometers and 1.5 mm, e.g., between 400 micrometers and 1.2 mm, etc., or 400 micrometers or more, 500 micrometers or more, 1 mm or more, etc.). Thus, the unit droplet size (the droplet on a single unit cell driven by a single drive electrode may be much larger, e.g., 5 microliters or more, 6 microliters or more, 7 microliters or more, 8 microliters or more, 9 microliters or more, 10 microliters or more, 11 microliters or more, 12 microliters or more, 13 microliters or more, 14 microliters or more, 15 microliters or more, etc., e.g., between 5-20 microliters, between 5-15 microliters, between 7 and 20 microliters, between 7 and 15 microliters, etc.).

Dispensing large droplets using electrowetting is routinely done with smaller volume (e.g., less than 5 microliters), however, dispensing larger volumes as a single unit has proven difficult, particularly with a high degree of accuracy and precision. Described herein are methods of dispensing a predetermined volume of liquid using electrowetting. For example, described herein are methods of dispensing a predetermined volume of fluid into an air gap of an air-matrix digital microfluidics (DMF) apparatus, wherein the air gap is greater than 280 micrometers (e.g., 300 micrometers or more, 400 micrometers or more, etc.) wide, further wherein the DMF apparatus comprises a plurality of driving electrodes adjacent to the air gap, the method comprising: flooding a portion of the air gap with the fluid from a port in communication with the air gap; applying energy to activate a first driving electrode adjacent to the portion of the air gap that is flooded; and applying suction to withdraw the fluid back into the port while the first electrode is activated, leaving a droplet of the fluid in the air gap adjacent to the activated first electrode.

Applying energy to activate the first driving electrode may include applying energy to activate one or more driving electrodes that are contiguous with the first driving electrode, and further wherein applying suction to withdraw the fluid back into the port while the first driving electrode is activated comprises withdrawing the fluid while the first driving electrode and the one or more driving electrodes that are contiguous with the first driving electrode are active, leaving a droplet of the fluid in the air gap adjacent to the activated first driving electrode and the one or more driving electrodes that are contiguous with the first driving electrode.

The first driving electrode may be separated from the port by a spacing of at least one driving electrode. Any of these methods may further comprise inactivating one or more driving electrodes adjacent a second portion of the air gap that is within the flooded portion of the air gap, and that is between the port and the first driving electrode. The air gap may be greater than 500 micrometers.

Flooding the portion of the air gap may comprises applying positive pressure to expel fluid from the port. The method may further comprising sequentially energizing driving electrodes adjacent to the air gap to move the droplet within the air gap of the air-matrix DMF apparatus.

Applying suction to withdraw the fluid back into the port while the first electrode is activated may comprise leaving a droplet of the fluid having a volume that is 10 microliters or greater in the air gap adjacent to the activated first electrode.

For example, a method of dispensing a predetermined volume of fluid into an air gap of an air-matrix digital microfluidics (DMF) apparatus, wherein the air gap is greater than 280 micrometers wide (e.g., 300 micrometers or more, 400 micrometers or more, etc.) further wherein the DMF apparatus comprises a plurality of driving electrodes adjacent to the air gap, may include: flooding a portion of the air gap with the fluid from a port in communication with the air gap; applying energy to activate a first driving electrode or a first group of contiguous driving electrodes adjacent to the portion of the air gap that is flooded, wherein the first driving electrode or the first group of contiguous driving electrodes are spaced apart from the port by one or more driving electrodes that are not activated; and applying suction to withdraw the fluid back into the port while the first electrode or first group of contiguous electrodes are activated, leaving a droplet of the fluid in the air gap adjacent to the first electrode or first group of contiguous electrodes.

Also described herein are control systems for DMF apparatuses, such as those described herein. In particular, described herein are control systems including graphical user interfaces for operating any of these apparatuses. These control systems (sub-systems) may include software, hardware and/or firmware. Thus, any of these apparatuses may be configured as instructions stored in a non-transient medium (e.g., memory) for performing any of them methods and procedures described herein.

For example, described herein are methods for controlling a digital microfluidics (DMF) apparatus, the method comprising: providing a graphical user interface comprising a menu of fluid handling control commands, including one or more of: move, heat, remove, cycle, wait, breakoff, mix and dispense; receiving a fluid handling protocol comprising user-selected fluid handling control commands; calculating a path for moving fluid within an air gap of the DMF apparatus based on the fluid handling protocol, wherein the path minimizes the amount of overlap in the path to avoid contamination; and executing the fluid handling protocol using the DMF apparatus based on the calculated path.

The fluid handling control commands may include at least one of: move, heat, remove, wait, and mix. For example, the fluid handling commands may include all: move, heat, remove, wait, and mix. A user may select icons corresponding to each of these commands, and may enter them in an order and/or may indicate incubation timing and temperature conditions. The apparatus may automatically determine the optimal path within the air-gap region of the cartridge in order to perform each of these steps (e.g., by moving the droplet(s) to the appropriate region of the cartridge including the heater, magnets, microfluidic ports, etc., so that the droplet(s) may be manipulated as required. For example, receiving the fluid handling protocol may comprise receiving a string of fluid handling control commands. Calculating the path may comprise calculating the path based on the arrangement of heating and cooling zones in the DMF apparatus. Calculating the path may comprise determining the shortest path that does not cross over itself. In general, executing the fluid handling protocol on the DMF apparatus may comprise executing the fluid handling protocol in a disposable cartridge coupled to the DMF apparatus.

Also described herein are digital microfluidics (DMF) reader devices configured to operate with a removable and/or disposable cartridge having a bottom dielectric surface, a top plate with a ground electrode, and an air gap between the bottom dielectric and the top plate, the device comprising: a seating surface for seating the disposable cartridge on an upper surface; a first plurality of drive electrodes on the seating surface, wherein all or some of the drive electrodes comprises an opening therethrough; a thermal control for applying thermal energy to a first region of the seating surface; a plurality of thermal vias, wherein the thermal vias comprise a thermally conductive material and are in thermal communication with the first region of the seating surface but are electrically isolated from the subset of electrodes and further wherein the thermal vias are in thermal communication with the thermal control; a plurality of vacuum ports, wherein each vacuum port is coupled to one or more of the openings through the drive electrodes; a vacuum pump for applying a vacuum to the vacuum ports; and a control for applying energy to sequentially activate and de-activate one or more selected drive electrodes to move a droplet within the air gap of the cartridge along a desired path within the air gap.

The thermal vias may have any appropriate dimensions. For example, each thermal via may have a diameter of between about 0.5 and about 2 mm (e.g., between about 0.5 mm and about 1.8 mm, between about 0.5 mm and about 1.5 mm, between about 0.5 mm and 1.2 mm, between about 0.8 mm and 1.2 mm, etc.). Any number of thermal vias may be used per cell (e.g., there may be between about 5-15 thermal vias associated with a region corresponding to a single electrode in the first region).

The thermal vias may each be filled with a thermally conductive material; the material may be electrically conductive or electrically insulative. In some variations the thermally conductive material is a metal. The reader may further include one or more resistive heaters underlying at least some of the drive electrodes.

The seating surface may be formed or at least partially formed on a printed circuit board (PCB), including on an array of electrodes formed on the PCB. As mentioned above, any of the readers described herein may include one or more magnets; in some variations the magnet(s) may be underneath one or more of the drive electrodes configured to be activated to apply a magnetic field. For example, the magnetic field may pass through an opening in the drive electrode. The reader may include one or Peltier coolers underlying at least some of the drive electrodes configured to cool to less than 10 degrees C.

Also described herein are methods of detecting the location and/or identity of a material in an air gap of a digital microfluidics (DMF) cartridge. The material may include a droplet (e.g., aqueous droplet) a wax, a droplet coated/ensheathed in a wax (e.g., liquid wax), an oil droplet, a droplet with magnetic particles, etc. The identity may be determined for a material at a specific location in the air gap, e.g., between the upper and lower surfaces forming the air gap in the cartridge. The cartridge may be divided up into cells (e.g., regions above individual drive electrodes.

For example a method of detecting the location and/or identity may include: disconnecting a reference electrode on a first side of the air gap of the DMF cartridge from a driving circuit; setting the voltage of one or more drive electrodes of an array of drive electrodes on a second side of the air gap to a high voltage while setting all other drive electrode of the array of drive electrodes to ground; sensing the voltage at the reference electrode; determining a capacitance between the first side of the air gap and the second side of the air gap based on the voltage sensed at the reference electrode; and identifying the material in the air gap adjacent to the one or more drive electrodes based on the determined capacitance.

The method may also include reconnecting the reference electrode to the driving circuit, and driving a droplet within the air gap by applying a voltage between the reference electrode and one the drive electrodes. These steps may be repeated iteratively, to track movement of material in the air gap.

Disconnecting the reference electrode may comprise allowing the reference electrode to float (e.g., not ground). The reference electrode may be the entire upper electrode (on the first side of the air gap, opposite from the array of drive electrodes). Disconnecting the reference electrode from the drive circuitry (e.g., from the controller driving movement of a droplet in the air gap by digital microfluidics) may include connecting the reference electrode to sensing circuitry for detecting the voltage at the reference electrode and therefore the capacitance of the air gap. The reference circuitry may include on or more reference capacitors arranged to allow measurement of the air gap capacitance.

Setting the voltage of the one or more of drive electrodes to a high voltage may comprises setting the one or more of the drive electrodes to between 10 and 400V (e.g., between 100V and 500V, e.g., about 300V, etc.).

Any of these methods may include determining a total capacitance for the air gap by setting the voltage of all of the drive electrodes of the array of drive electrodes to the high voltage while the reference electrode is disconnected from the driving circuit and sensing the voltage a the reference electrode to determine the total capacitance. The method may further include determining the total capacitance using one or more reference capacitors connected to the reference electrode when the reference electrode is disconnected from the driving circuit. For example, determining the capacitance between the first side of the air gap and the second side of the air gap based on the voltage sensed at the reference electrode may further comprise using the total capacitance.

Identifying the material in the air gap may comprise using a reference database comprising a plurality of ranges of capacitance to identify the material in the air gap based on the determined capacitance.

Also described herein are cartridges (e.g., disposable and/or removable cartridges) for a digital microfluidics (DMF) apparatus that include a tensioning frame to keep the bottom dielectric material in tension and therefore flat. For example, any of the cartridge described herein may include: a sheet of dielectric material having a first side and a second side, the first side forming an exposed bottom surface on the bottom of the cartridge, wherein at least the second side of the sheet of dielectric material comprises a first hydrophobic surface; a tensioning frame holding the sheet of dielectric material in tension so that it is substantially flat; a top plate having a first side and a second side and a thickness therebetween; a ground electrode on the first side of the top plate; a second hydrophobic surface on the first side of the top plate covering the ground electrode; and an air gap separating the first hydrophobic layer and the second hydrophobic layer, wherein the air gap comprises a separation of greater than 280 micrometers. Any of the other cartridge features described herein may be included with these cartridges.

Any of these cartridges may also include a lip extending at least partially (including completely) around, and proud of, the sheet of dielectric material. This lip may engage with a channel or trough on the seating surface. Alternatively or additionally, the cartridge may include a peripheral channel or trough into which a projection on the seating surface of the reader engages.

The tensioning frame may include an outer frame and an inner frame. The sheet may be held between the outer and inner frames. These cartridges may include any of the other cartridge features mentioned herein.

Any of the apparatuses described herein may include one or features to enhance safety and to prevent accidents. The voltages used for electrowetting (e.g., in DMF) may be hazardous to a user. In addition, in some variations, the cartridges described herein may be used to move fluids (including aqueous fluids) that require high voltages (e.g., higher than traditional DMF). However, in some variations it may also be beneficial to allow a user (e.g., technician) to add or remove material manually from the cartridge while the droplets can be moved within the cartridge by electrowetting. In such cases any of these devices and methods may include one or more safety interlocks to prevent injury to the user.

For example, described herein are digital microfluidics (DMF) reader devices that are configured to operate with a removable cartridge and include: a cartridge seat configured to seat the removable cartridge; an array of drive electrodes in electrical communication with the cartridge seat, the array of drive electrodes configured to apply a voltage to move a droplet within the cartridge by electrowetting; a clamp configured to move from an open clamp configuration in which the cartridge seat is exposed and a closed clamp configuration in which the clamp is latched over the cartridge seat so that the edges of the cartridge seat are covered by the clamp, wherein the clamp includes a window region allowing access to the cartridge when the cartridge is seated in the cartridge seat and the clamp is in the closed clamp configuration; a lid having an open lid configuration exposing the clamp and cartridge seat and a closed lid configuration in which the lid covers cartridge seat and the clamp when the clamp is in the closed clamp configuration; and a safety interlock configured to disable the application of the voltage to the array of drive electrodes unless the cartridge is seated in the cartridge seat and the clamp lid is in the closed clamp configuration, regardless of the configuration of the lid.

In some variation, the DMF reader device configured to operate with a removable cartridge includes: a cartridge seat configured to seat the removable cartridge; one or more vacuum ports in the cartridge seat configured to apply a negative pressure to secure the cartridge in the cartridge seat; an array of drive electrodes on the cartridge seat, the array of drive electrodes configured to apply a voltage to move a droplet within the cartridge by electrowetting; a clamp configured to move from an open clamp configuration in which the cartridge seat is exposed and a closed clamp configuration in which the clamp is latched over the cartridge seat so that at least the edges of the cartridge seat are covered by the clamp, wherein the clamp includes a window region allowing access to the cartridge when the cartridge is seated in the cartridge seat and the clamp is in the closed clamp configuration; a lid having an open lid configuration exposing the clamp and cartridge seat and a closed lid configuration in which the lid covers cartridge seat and the clamp when the clamp is in the closed clamp configuration; and a safety interlock configured to disable the application of the voltage to the array of drive electrodes unless the cartridge is seated in the cartridge seat, the clamp lid is in the closed clamp configuration and the one or more vacuum ports are applying the negative pressure to secure the cartridge in the cartridge seat.

The safety interlock is configured to permit the application of the voltage to the array of drive electrodes when the lid is in the open lid configuration.

Any of these apparatuses may include a cartridge sensor configured to sense the cartridge is seated in the cartridge seat. In some variations the cartridge may include one or more ports or plugs for plugging into the reader. For example, the cartridge may include a connector to connect to a return electrode on the reader.

Any of these apparatuses may include a clamp latch sensor configured to sense when the clamp is latched in the closed clamp configuration. The apparatus may include one or more vacuum ports configured to apply a negative pressure to secure the cartridge in the cartridge seat. For example, the apparatus may include a pressure sensor configured to sense when the negative pressure securing the cartridge is between 0.5 and 22 inches of mercury. Any of these apparatuses may include a lock configured to lock the lid. The lock may be a magnetic lock. In some variations the apparatus may include a lid sensor configured to determine when the lids is in the closed lid configuration. The lid sensor may be a magnetic sensor.

Any of these apparatuses may include a controller configured to control the array of drive electrodes and/or the pneumatic (pressure), and/or the safety interlock. For example, the safety interlock comprises one or more of software and firmware.

Also described are methods of operating any of these digital microfluidics (DMF) devices. For example, any of these methods may include: receiving a cartridge into a cartridge seat; latching a clamp over the cartridge so that the clamp covers an outer perimeter of the cartridge while permitting access to a top side of the cartridge through a window in the clamp; and enabling the application of a voltage to an electrode of an array of drive electrodes in the cartridge seat only when the DMF reader device senses that the cartridge is seated in the cartridge seat and the clamp is latched over the cartridge.

For example, a method of operating a digital microfluidics (DMF) reader device, the method comprising: receiving a cartridge into a cartridge seat; closing and latching a clamp over the cartridge so that the clamp covers an outer perimeter of the cartridge while permitting access to the cartridge through a window in the clamp; applying negative pressure to secure the cartridge in the cartridge seat; and enabling the application of a voltage to an electrode of an array of drive electrodes in the cartridge seat only when the DMF reader device senses that the cartridge is seated in the cartridge seat, the clamp is latched closed, and the cartridge is secured by the negative pressure against the plurality of electrodes in the cartridge seat.

In general, any of these methods may include adding fluid into the cartridge with the high voltage enabled. The method may include controlling the voltage of the drive electrodes to move one or more droplets in the cartridge by electrowetting.

Any of these methods may include closing a lid over the cartridge and clamp. For example, closing a lid over the cartridge and clamp and applying pressure from the lid to drive fluid within the cartridge. This may include adding fluid (e.g., one or more droplets of fluid) into an air gap of the cartridge using a pneumatic subsystem in the lid.

For example, a method of operating a digital microfluidics (DMF) reader device may include: sensing, using a cartridge sensor, that a cartridge is seated in a cartridge seat of the DMF reader device; sensing, using a clamp latch sensor, that a clamp is closed over the cartridge seat and latched; sensing that a cartridge is held in the cartridge seat by negative pressure; and enabling a voltage on a plurality of drive electrodes in electrical communication with the cartridge seat only when the cartridge is seated, the clamp is closed and latched, and a negative pressure is applied.

The DMF reader devices described herein may generally be configured so that the lid includes one or more pneumatic sources (e.g., pumps), and controls, such as a manifold, and/or sensors for controlling the application of pressure, either or both positive and negative, to the top of the cartridge.

For example, a digital microfluidics (DMF) reader device configured to operate with a removable cartridge may include: a cartridge seat configured to seat the removable cartridge; an array of drive electrodes on the cartridge seat, the array of drive electrodes configured to apply a voltage to move a droplet within the cartridge by electrowetting; one or more vacuum ports in the cartridge seat configured to apply a negative pressure to secure the cartridge in the cartridge seat; a clamp configured to move from an open clamp configuration in which the cartridge seat is exposed and a closed clamp configuration in which the clamp is secured over the cartridge seat, wherein the clamp allows access to the cartridge when the cartridge is seated in the cartridge seat and the clamp is in the closed clamp configuration; a lid having an open lid configuration exposing the clamp and cartridge seat and a closed lid configuration in which the lid covers cartridge seat and the clamp when the clamp is in the closed clamp configuration; a pneumatic pump in the lid configured to mate with the cartridge held in the cartridge seat to apply pressure to move fluid in the cartridge; and a controller configured to control the application of voltage to the array of drive electrodes and to control the application of pressure from pneumatic pump to move fluid in the cartridge.

A digital microfluidics (DMF) reader device configured to operate with a removable cartridge may include: a cartridge seat configured to seat the removable cartridge; an array of drive electrodes in electrical communication with the cartridge seat, the array of drive electrodes configured to apply a voltage to move a droplet within the cartridge by electrowetting; one or more vacuum ports in the cartridge seat configured to apply a negative pressure to secure the cartridge in the cartridge seat; a clamp configured to move from an open clamp configuration in which the cartridge seat is exposed and a closed clamp configuration in which the clamp is latched over the cartridge seat, wherein the clamp includes a window region allowing access to the cartridge when the cartridge is seated in the cartridge seat and the clamp is in the closed clamp configuration; a lid having an open lid configuration exposing the clamp and cartridge seat and a closed lid configuration in which the lid covers cartridge seat and the clamp when the clamp is in the closed clamp configuration; a pneumatic pump and manifold in the lid and configured to mate with the cartridge held in the cartridge seat; and a controller configured to control the application of voltage to the array of drive electrodes and to control the application of pressure from pneumatic pump and manifold to move fluid in the cartridge.

Any of the apparatuses (e.g., DMF reader apparatuses, such as devices) described herein may include a mechanical vibration engine configured to apply a mechanical vibration to all or a portion of a cartridge in the cartridge seat. As mentioned above, any of these devices may include a lock configured to lock the lid over the clamp and cartridge seat, such as (but not limited to) a magnetic lock.

Any of these devices may include a display screen on a front of the device and coupled to the computer. The lid may include a plurality of valves and one or more pressure sensors controlled by the controller for controlling the application of pressure from the pneumatic pump to move fluid in the cartridge. The controller may be configured to control the application of both positive and negative pressure by the pneumatic pump.

The devices described herein may generally include a thermal subsystem beneath the cartridge seat comprising one or more heaters configured to apply heat to a sub-region of the cartridge seat. The thermal subsystem may be a resistive heater and/or a TEC.

The pneumatic control system, e.g., in the lid, may include a pneumatic pump, as mentioned above. For example the pneumatic pump may be a syringe pump.

A method of operating a digital microfluidics (DMF) reader device may include: receiving a cartridge into a cartridge seat of the DMF reader device; latching a clamp over the cartridge to secure the cartridge in the cartridge seat; closing a lid over the clamp and cartridge so that a pneumatic subsystem within the lid is coupled with a top of the cartridge; applying negative pressure to seal a flat dielectric sheet on a bottom of the cartridge against an array of drive electrodes; pneumatically applying one or more droplets into an air gap within the cartridge using the pneumatic subsystem; and applying a voltage to one or more electrodes of the array of drive electrodes to drive the one or more droplets within the air gap by electrowetting.

As mentioned, any of these methods may include coupling an electrical port on the cartridge into a reference electrode port on the reader device when receiving the cartridge into the cartridge seat.

Negative pressure may be applied before or after latching the clamp over the cartridge. For example, negative pressure may be applied after latching the clamp over the cartridge.

Any of these methods may include adding one or more reagents into the cartridge through the clamp before closing the lid. For example, reagents may be added to the top of the cartridge manually or automatically. In some variations the use may pipette reagents into the cartridge.

As mentioned above, any of these methods may include enabling the application of the voltage to the one or more electrodes only after the DMF reader device determines that the cartridge is seated and the clamp is latched, but before the lid is closed.

Also described herein are apparatuses and methods that are configured to allow a user to generate a protocol to be executed by the DMF apparatus. For example, a user may (on a first computer, such as a laptop, desktop, tablet, smartphone, etc.) select, modify and/or create a protocol for execution by a DMF apparatus as described herein. The protocol may be tested, errors identified and corrected, and saved to a library of protocols specific to a user or institution, or may be published for general use. The protocol may be transmitted and/or downloaded to a DMF reader apparatus as described herein and may be executed on the DMF reader. In some variations the reader may implement the protocol and may guide (e.g., step) the user through the protocol, indicated what reagents should be added to what portion(s) of the cartridge, and/or if there are any problems during the performance of the protocol, and/or where to remove material from the cartridge. The user may be guided or instructed from the screen on the DMF reader apparatus.

Thus, descried herein are methods of generating or modifying a protocol for operation on a DMF reader. For example, a computer-implemented method may include: presenting a user interface comprising a protocol building window and an action icon window; displaying a plurality of action icons in the action icon window, wherein each action icon represents an action to be performed on a droplet; allowing a user to repeatedly: select an action icons from the action icon window and moving it to the protocol building window, wherein the action icon is shown as an action descriptor in protocol building window, arrange the action descriptor in a sequence in the protocol building window, and enter one or more user inputs into the action descriptor in the protocol building window; forming a protocol based on the sequence in the protocol building window; and determining, using the protocol, a path for one or more droplets within a cartridge implementing the protocol.

A computer-implemented method, comprising: presenting a user interface comprising a protocol building window and an action icon window; displaying a plurality of action icons in the action icon window, wherein each action icon represents an action to be performed on a droplet; allowing a user to repeatedly: select an action icons from the action icon window and moving it to the protocol building window, wherein the action icon is shown as an action descriptor in protocol building window, arrange the action descriptor in a sequence in the protocol building window, and enter one or more user inputs into the action descriptor in the protocol building window; identifying errors in the sequence of action descriptors when the user inputs a request to check the sequence of action descriptors in the protocol building window; displaying an indicator of any errors to the user and prompting the user to modify the user input associated with each error; forming a protocol based on the sequence in the protocol building window; and determining, using the protocol, a path for one or more droplets within a cartridge implementing the protocol.

A computer-implemented method, comprising: presenting a user interface comprising a protocol building window and an action icon window; displaying a plurality of action icons in the action icon window, wherein each action icon represents an action to be performed on a droplet, comprising one or more of: modifying the temperature of the droplet, eluting a material from the droplet, mixing material in the droplet, incubating the droplet, and washing a material in a droplet; allowing a user to repeatedly: select an action icons from the action icon window and moving it to the protocol building window, wherein the action icon is shown as an action descriptor in protocol building window, arrange the action descriptor in a sequence in the protocol building window, and enter one or more user inputs into the action descriptor in the protocol building window, wherein the user inputs comprise one or more of: reagent type, reagent volume, duration, and/or temperature; identifying errors in the sequence of action descriptors when the user inputs a request to check the sequence of action descriptors in the protocol building window; displaying an indicator of any errors to the user and prompting the user to modify the user input associated with each error; forming a protocol based on the sequence in the protocol building window; and determining, using the protocol, a path for one or more droplets within a cartridge implementing the protocol.

Any of these methods may also include displaying a regent menu in the user interface comprising a listing of reagents. For example, receiving from the user a command to enter a new reagent, receiving a name and viscosity (e.g., high viscosity/low viscosity, or a measured value of viscosity) of the new reagent, and adding the new reagent to the reagent menu. Allowing the user to enter one or more user inputs may include receiving a reagent from the reagent menu.

Selecting an action icon may comprise dragging and dropping an action icon from the action icon window into the protocol building window. Arranging the action descriptor may comprise displaying a different color for different types of action descriptors.

Allowing the user to repeatedly enter the one or more user inputs into the action descriptor in the protocol building window may include entering one or more of: reagent type, reagent volume, duration, or temperature. Examples of action descriptors may include washing, incubating, eluting, mixing, thermocycling, etc. For example, the action to be performed on a droplet may comprises one or more of: modifying the temperature of the droplet, eluting a material from the droplet, mixing material in the droplet, incubating the droplet, or washing a material in a droplet.

Any of these methods may include identifying errors in the sequence of action descriptors when the user inputs a request to check the sequence of action descriptors in the protocol building window. For example, any of these methods may include displaying an indicator of any errors to the user and prompting the user to modify the user input associated with each error. Displaying the indicator of any errors may comprise stepping through the protocol, flagging each error and prompting the user to modify the user input associated with the error. Identifying errors in the sequence of action descriptors may include modeling, in a computer processor, the protocol formed by the sequence of action descriptors within a cartridge of a digital microfluidics device.

Any of these methods may include displaying a plurality of action modules and allowing the user to select an action module from the plurality of action modules, and populating the protocol building window with a plurality of action descriptors based on the action module. The user may modify the existing action module (e.g. protocol) using any of the steps described above.

In general, any of these methods may include forming the protocol based on the sequence in the protocol building window comprises storing the protocol. These methods may also or alternatively include storing the protocol as an action module, e.g., storing the protocol on a remote server so that it may be accessed by a third party. Any of these methods may also or alternatively include annotating the protocol. Any of these methods may include accessing the protocol on a remote digital microfluidics device.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

In FIG. 3F the tray is shown extended. The dimensions show are for illustrative purposes only, and may be larger or smaller by, e.g., +/−5% (e.g., 10%, 15%, 20%, 25%, 30%, 35%, 40%, 50%, 75%, 100%, etc.).

FIG. 3I is a front view of an apparatus is configured to process six cartridges, and includes six access controls and display panels, which may be color coded. Within the outer housing shown, components such as the pumps, motor(s), optics, controllers, etc. may be shared, and/or multiple separate components (e.g., electrode arrays, sub-controllers, etc.) may be used. The housing may be configured to allow stacking of a plurality of apparatuses.

In FIG. 4A, 18 rows and 10 columns are shown; larger or smaller arrays may be used.

In FIG. 4B, a temperature sensor (e.g., thermistor) is shown.

In FIG. 5D the vacuum is off, and the dielectric is not secured against the electrodes. The dielectric may wrinkle, and may include regions of poor contact, including poor electrical contact. By comparison, FIG. 5E shows the dielectric held against the electrodes by a plurality of openings through the electrodes, which holds the dielectric uniformly against the electrodes, and results in surprisingly uniform electrical properties between the removable cartridge and the electrodes.

In FIG. 6, the removable cartridge has been made transparent (a microfluidics region above the top plate, air-gap and dielectric forming the DMF portion of the cartridge has been made transparent). The different regions are indicated by different boxes, and may be distributed in a particular arrangement over the array. For example, in FIG. 6, seven of the electrodes are configured as magnetic regions 605, which can apply a local (to that electrode) magnetic force to retain a magnetic bead or particle within a droplet on the electrode. Eight of the peripheral regions (each spanning six electrodes) are configured as cooling zones, which may be in thermal contact with a Peltier device or other thermal cooling region. In addition, in FIG. 6, six 16-electrode regions on the left side are configured as cooling zones which may also be in thermal contact with the same or different Peltier device (e.g., holding them below 10 deg. C.). Two central heating zones (one spanning five electrodes, the other spanning 32 electrodes) are also included, and may be thermally cycled over the entire zone or over regions of the zone(s). Four optically read zones (each spanning four electrodes) are spaced apart from each other on the right side perimeter of the device. In general, the heating and/or thermally cycling regions are centrally located, apart from the peripheral cooling/storage regions. There may be overlap between the zones, such as the magnetic zones and the heating/cooling zones.

FIG. 6 also shows, in a transparent view, a microfluidics portion that may be formed above (and in the top plate, as described) the air gap. For example, in FIG. 6, the microfluidics portion 611 includes a pair of serpentine microfluidics channels 615, 616 that each connect to an opening (which may be regulated by a valve) into the air gap. The microfluidics portion may also include valves. In FIG. 6, the microfluidics channel also includes a pair of ports 617, 618 through which positive and/or negative pressure may be applied to modulate (along with any valves) the movement of fluid in the microfluidics region and (in some variations) into or out of the air gap. The microfluidics portion may also include one or more waste chambers 621.

In FIG. 15A, the microfluidics portion of a cartridge is shown as a pair of channels each connected to an inlet/outlet, and each ending in a bridging region forming an opening into the air gap of the DMF portion of the cartridge (in this example, below the microfluidics portion). Fluid may be removed, added, washed, etc. into/out of the air gap of the DMF portion. In FIGS. 15B and 15C, fluid washed through the bridging droplet and into the air gap by alternating and applying suction between the inlet/outlet, as shown. In this example, external fluidic components (e.g., tubing and reservoirs) are integrated into the top plate of the DMF portion, allowing a compact form factor. The microfluidics channels may be used for adding/removing reagent (e.g., removing waste, washing, etc.). The bridging droplet may be an electrode or group of electrodes and the size of the droplet may be regulated by DMF.

In FIG. 17A, the fluid application and extraction device is connected through the top plate. In FIG. 17B, the fluid application and extraction device is connected from the side plate.

In FIG. 17C, the interface 1127 for the fluid lines, which may be microfluidic channels, including microfluidic channels formed in part by the top plate 1117, interfaces through the top plate, and (unlike FIG. 17A) the air gap in this interface region may be larger than the air gap in other portions of the DMF cartridge. in FIG. 17D, the air gap region is larger than in other regions of the cartridge. In any of the FIGS. 17A-17D, the fluid lines (e.g., 1143, 1145) and reservoirs (1105, 1107) may form part of the DMF apparatus, and may interface with a port on the cartridge, e.g., the top surface of the cartridge, and/or one or more valves.

FIGS. 21A-21B show the movement of the aqueous (polar) droplet while coated with a non-polar jacketing material that is moved along with the droplet. FIGS. 21C-21D illustrate adding additional polar material to the droplet, which expands to include the additional polar material.

As shown in FIGS. 22A-22D, droplet break off from a large volume may be used to dispense a predetermined volume. In FIG. 22A, a dispensing electrode is activated, spaced from the dispensing port (tube). In FIG. 22B, the reagent to be dispensed is applied into the air gap, flooding the region including the dispensing electrode that is separated from the dispensing port by at least one electrode. In FIG. 22C the reagent is then sucked back into the dispensing port, while the dispensing electrode(s) is/are active, but the electrode(s) between the dispensing port and the dispensing electrode(s) is/are not active, forming a neck, which (as shown in FIG. 22D) eventually breaks off, leaving the droplet of a predetermined volume on the dispensing electrode(s).

FIG. 29 is an example of a portion of a reader (e.g., cartridge seat portion) having a reduced thermal mass to enhance the rate of temperature regulation of cartridge held on the seat portion.

FIG. 30 is another example of a portion of a reader (e.g., cartridge seat portion) having a reduced thermal mass to enhance the rate of temperature regulation of cartridge held on the seat portion.

FIGS. 31A and 31B illustrate examples of readers include thermal vias for helping control the temperature of a cartridge (e.g., of one or more cells of an air gap of a cartridge).

FIG. 34A shows one example of a range of capacitances corresponding to the presence or absence of various materials (e.g., aqueous droplet, wax, etc.) in the air gap at a particular cell. FIG. 34B is a graph showing exemplary voltage measurements from the sensing electrode (top electrode). FIG. 34C is a graph showing an example of the change in electrical permittivity of water as a function of temperature.

FIG. 52A is a top view of a PCB of a reader to which a cartridge may be seated on.

FIG. 58A is a front perspective view, FIG. 59B is a rear view, FIG. 59C is a side view, FIG. 59D is a front view, FIG. 59E shows a plurality of reader devices in tandem, FIG. 59F shows the device of FIG. 59E with the lid and clamp open.

FIGS. 74A-74C illustrate the spacer forming the separation of the air gap in the cartridges described herein.

FIGS. 75A-75D illustrate a method for tensioning the dielectric bottom layer of a cartridge.

FIGS. 76A-76D illustrate another method of tensioning the dielectric bottom layer of a cartridge.

FIG. 77A illustrates an example of pinning features as described herein.

FIGS. 77B-77C show detail of the top layer of an air gap of a cartridge as described herein.

FIG. 78 is a user interface for a reader device.

FIG. 79 is an example of a user interface for guiding use of a reader device as described herein.

FIG. 80 is another example of a user interface for a reader device.

Figure 81:
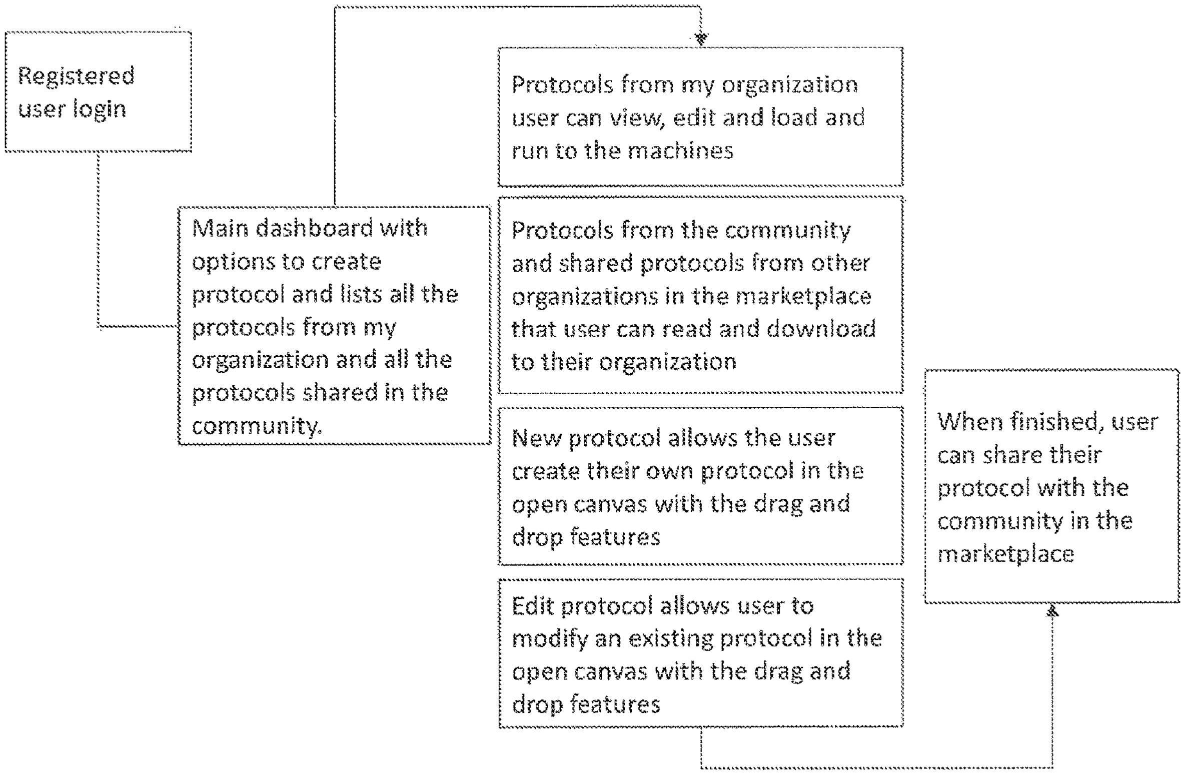

FIG. 81 schematically illustrates the use of a marketplace for laboratory protocols for the devices described herein.

Figure 82:
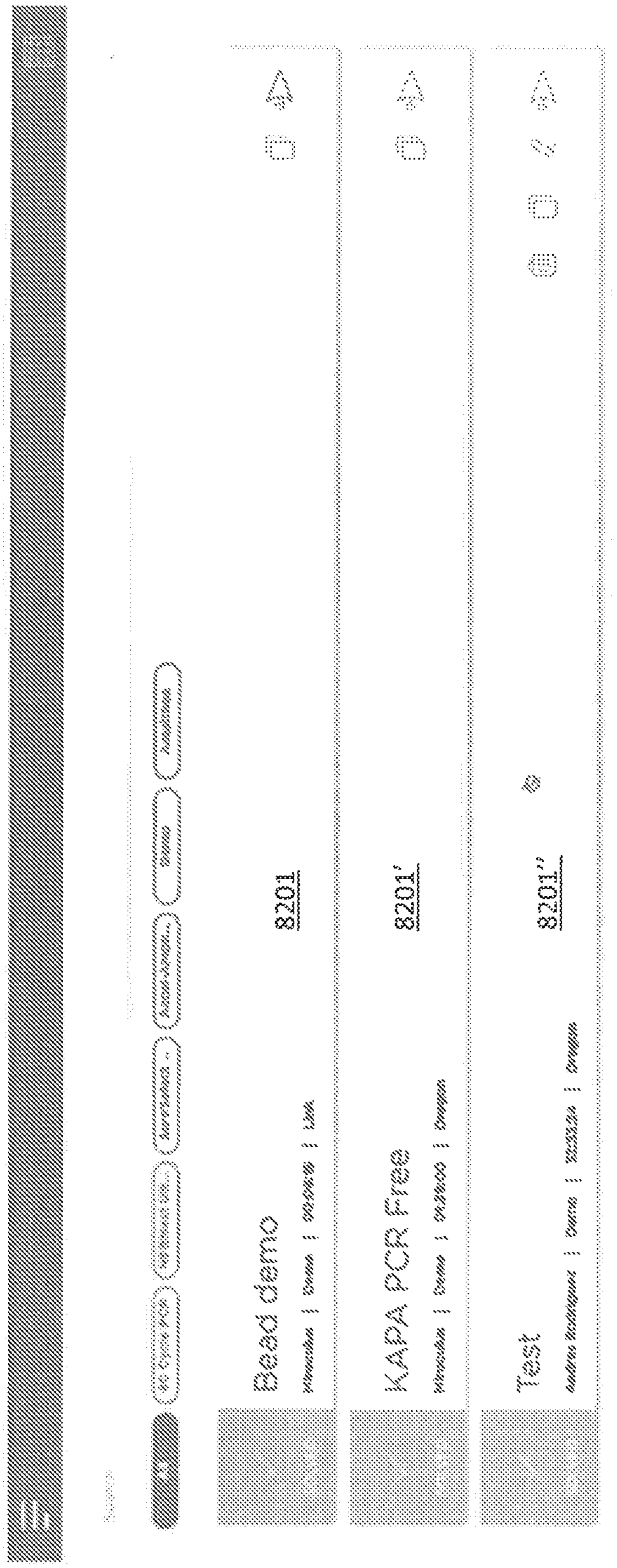

FIG. 82 shows one example of a user interface showing the selection of one or more protocols (predetermined protocols) that may be modified and/or used.

Figure 83:
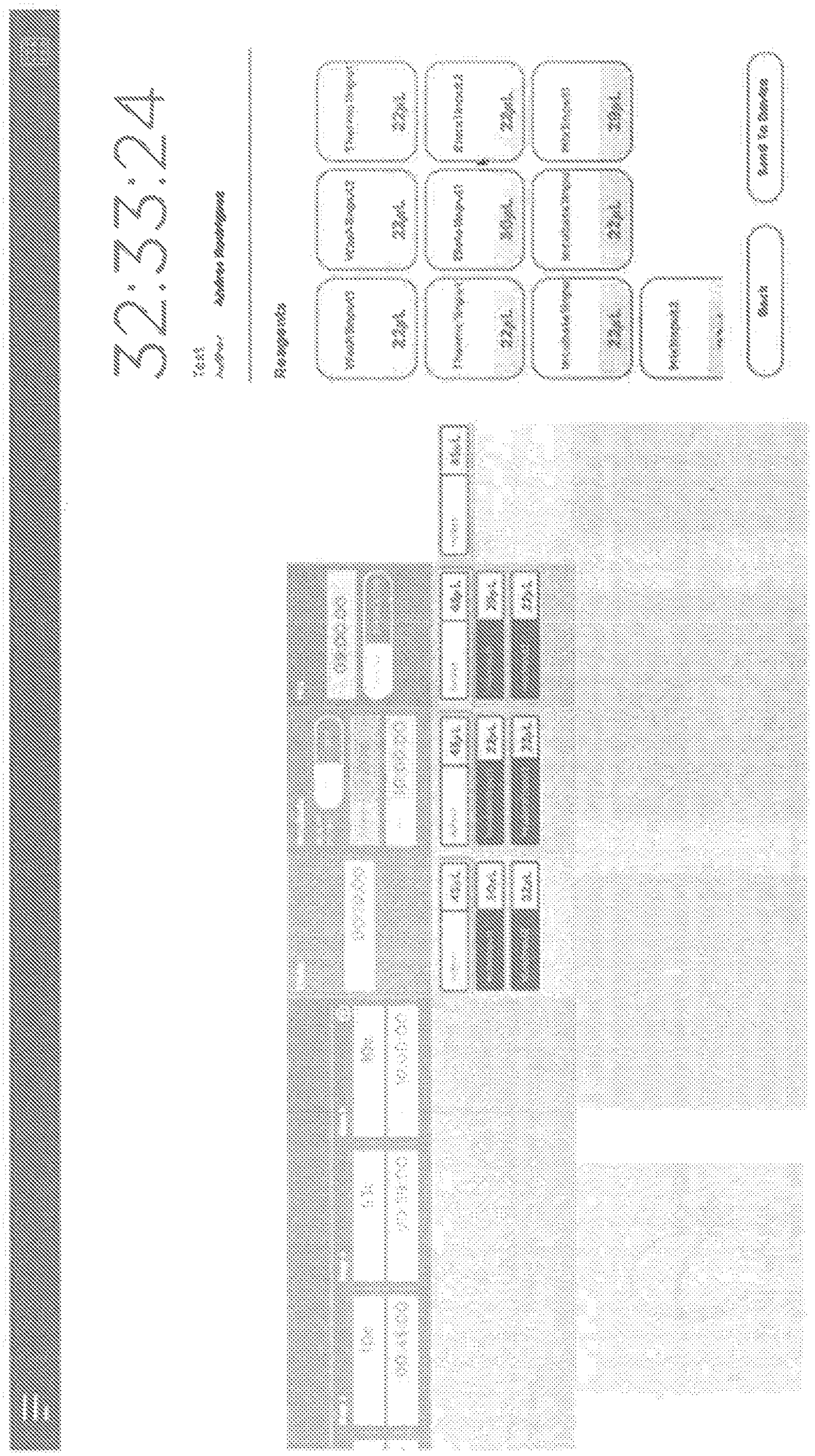

FIG. 83 illustrates a portion of a user interface comprising a protocol building window and an action icon window (showing a reagent menu as part of the action icon window).

Figure 84:
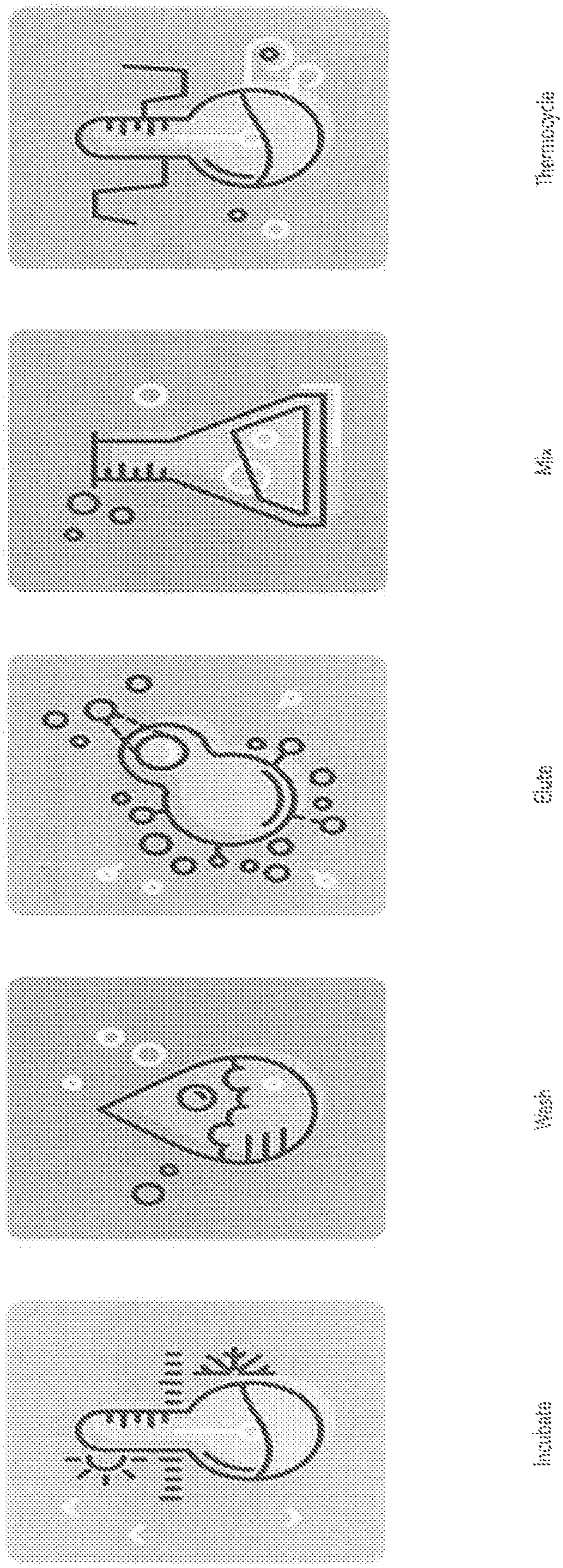

FIG. 84 illustrates examples of icons (e.g., action icons from an action icon window that can be moved to the protocol building window).

Figure 85:
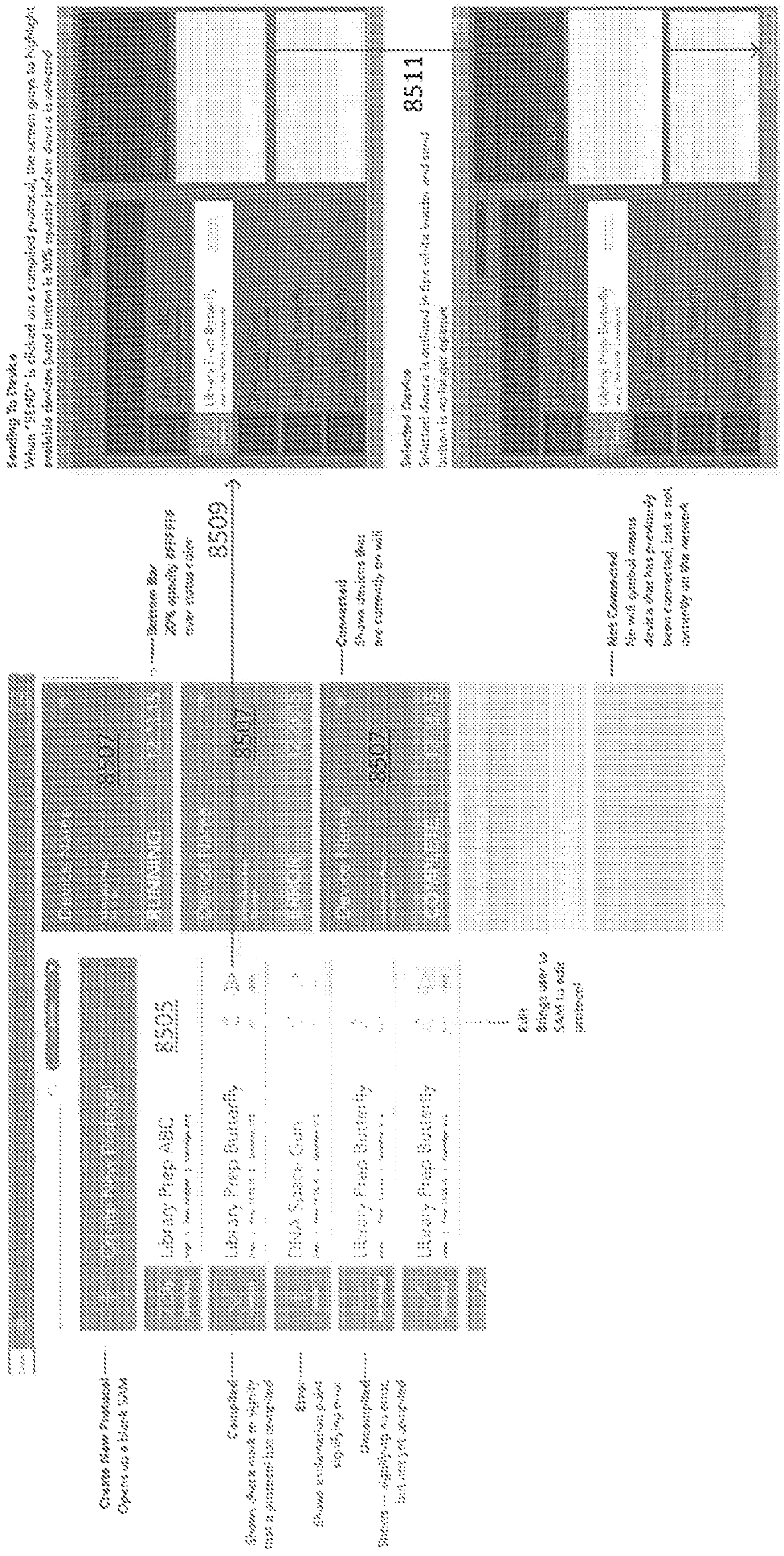

FIG. 85 is an example illustration of a cloud interface for programming an apparatus as described herein. In FIG. 85, a user interface (e.g., for a desktop, laptop, etc.) may allow selection of an existing protocol, modification of an existing protocol or creation of a new protocol. The user interface may also indicate the status of one or more apparatus (e.g., DMF reader devices) and/or may allow uploading/downloading or sending a protocol to one or more reader devices.

Figure 86:
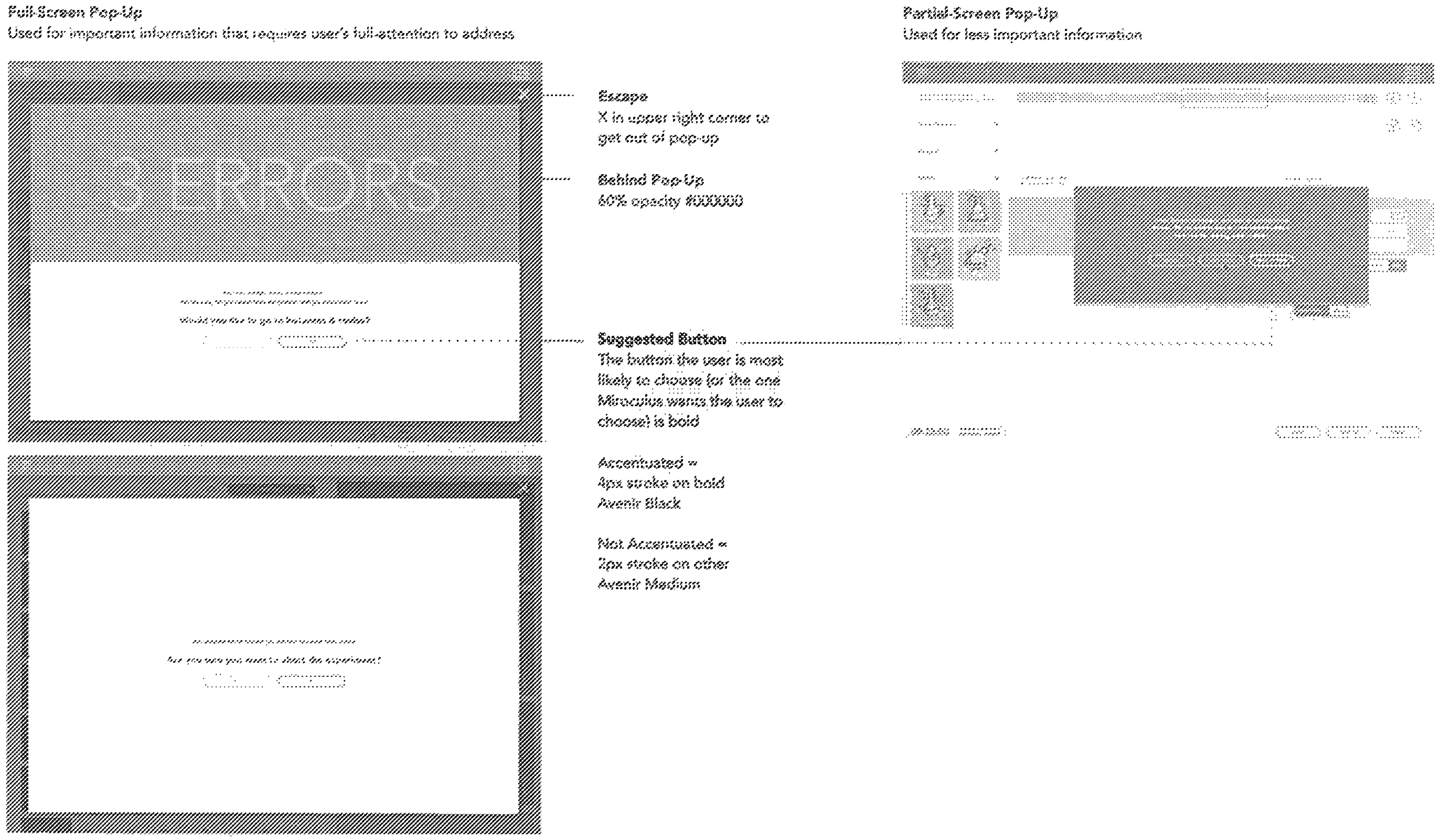

FIG. 86 illustrates examples of user interfaces for indicating errors have been automatically identified in a protocol being designed by a user, as well as for confirming aborting of an experiment and/or saving or overwriting a protocol.

Figure 87:
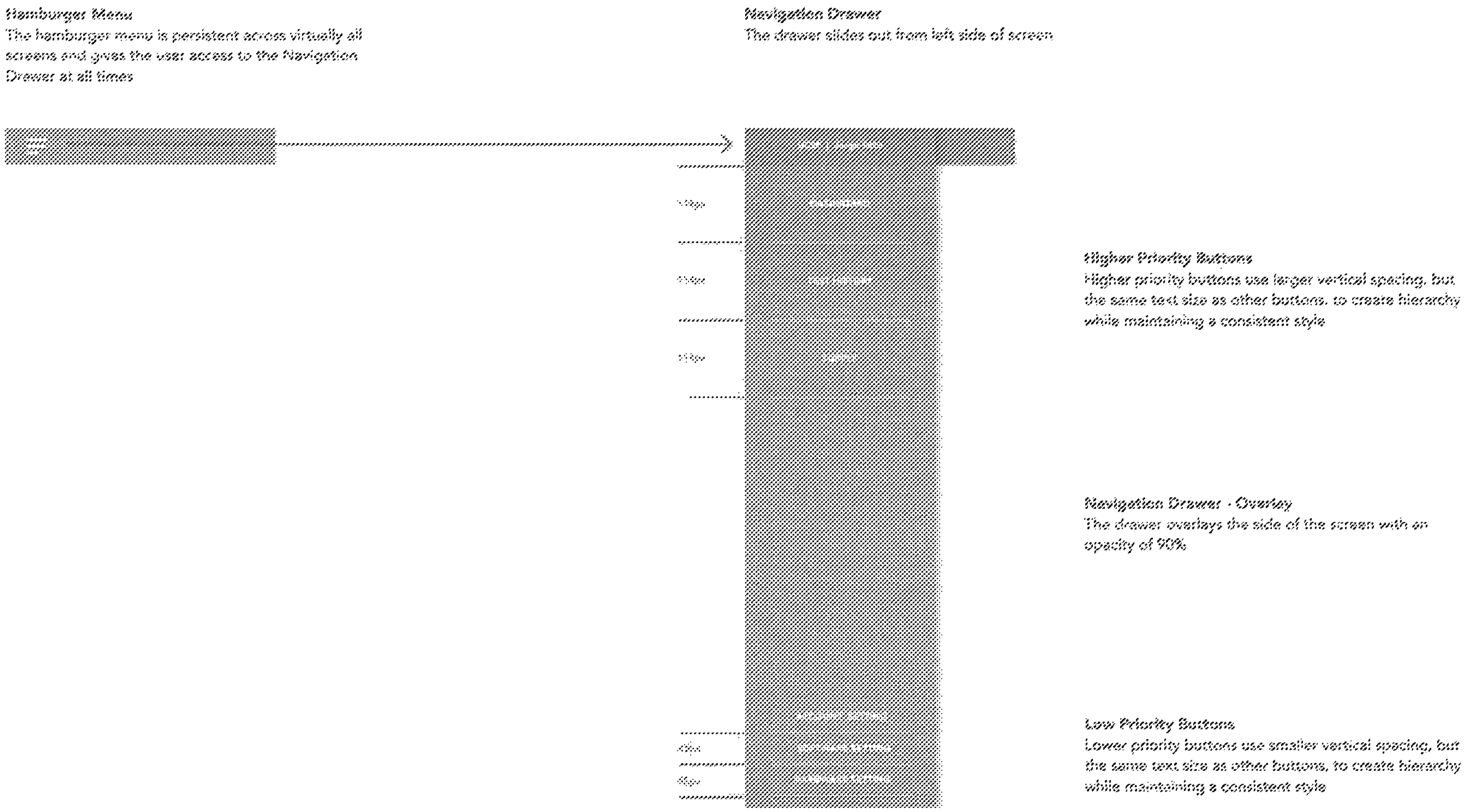

FIG. 87 illustrates an example of a user interface showing navigation options.

Figure 88:
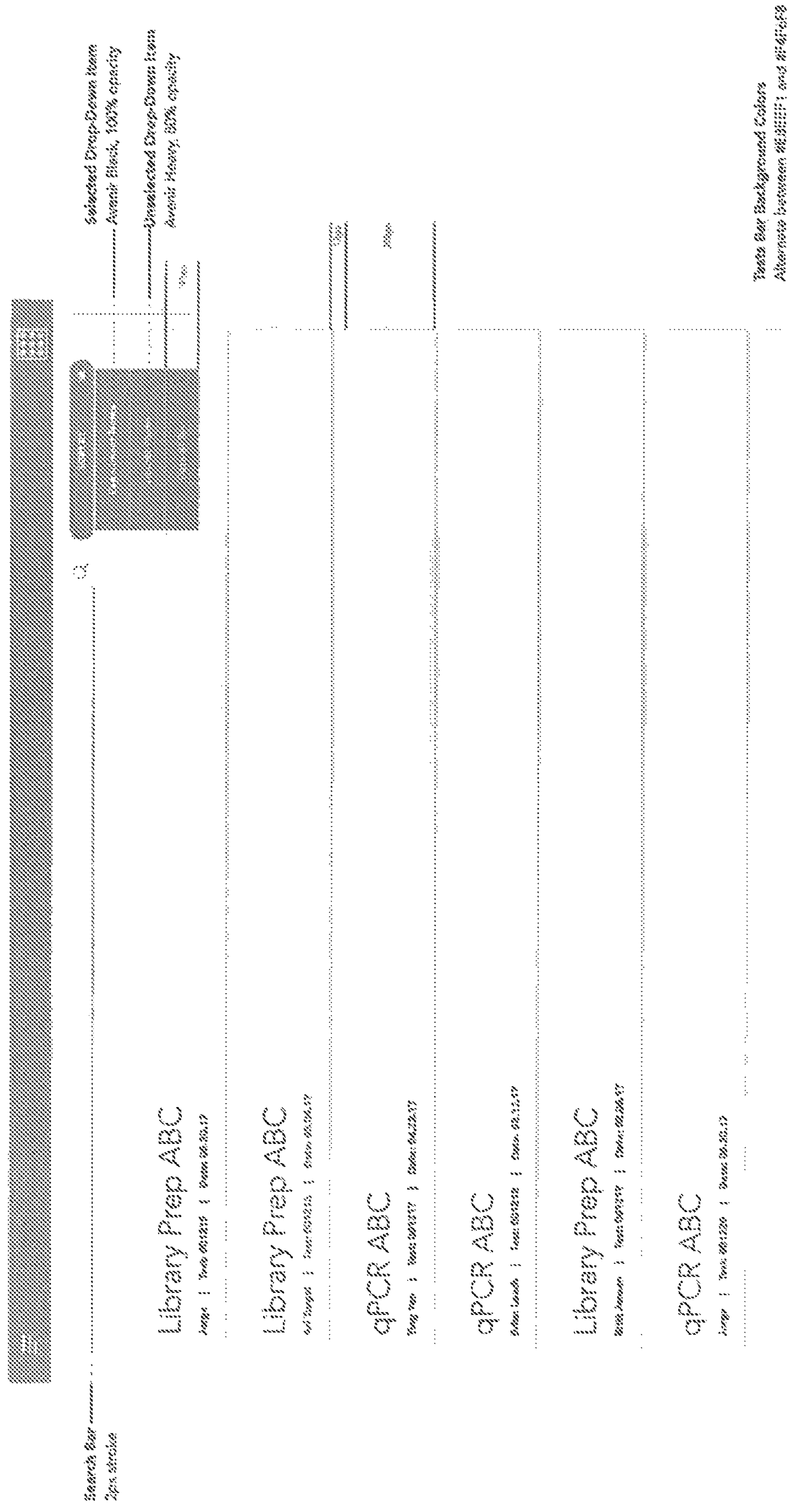

FIG. 88 illustrates another example of a user interface showing example protocols.

Figure 89:
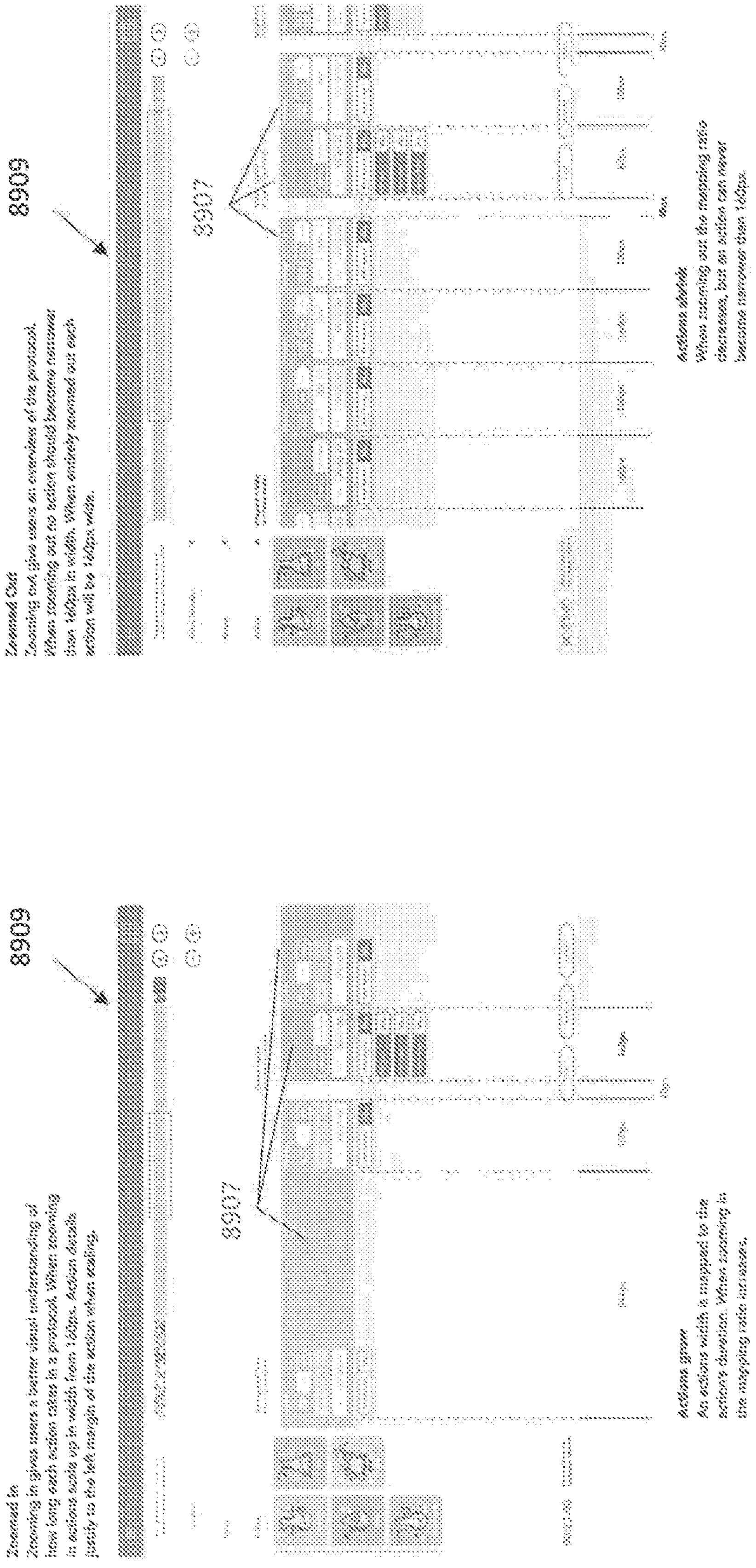

FIG. 89 is an example of a user interface (zoomed in on the left side) showing a protocol building window and an action icon window, in which the protocol building window includes a pair of action descriptors showing details of the actions within the exemplary protocol being designed. The right side of FIG. 89 shows a zoomed out view, providing an overview (with less detail) of each action descriptor in the protocol.

Figure 90:
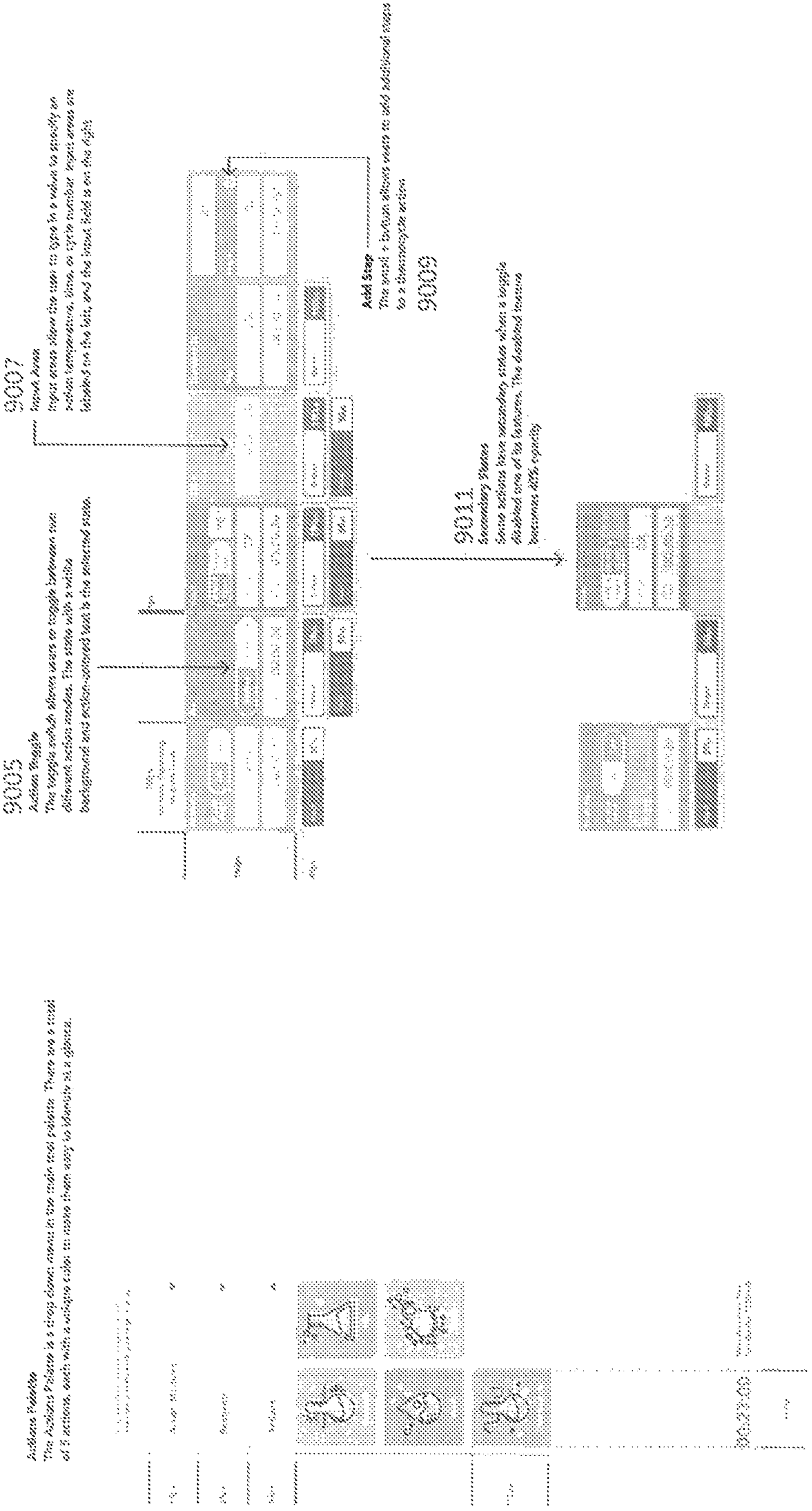

FIG. 90 is another example of a user interface showing the protocol building window (on right) and an action icon window (on the left), and illustrating user interactions with these windows.

Figure 91:
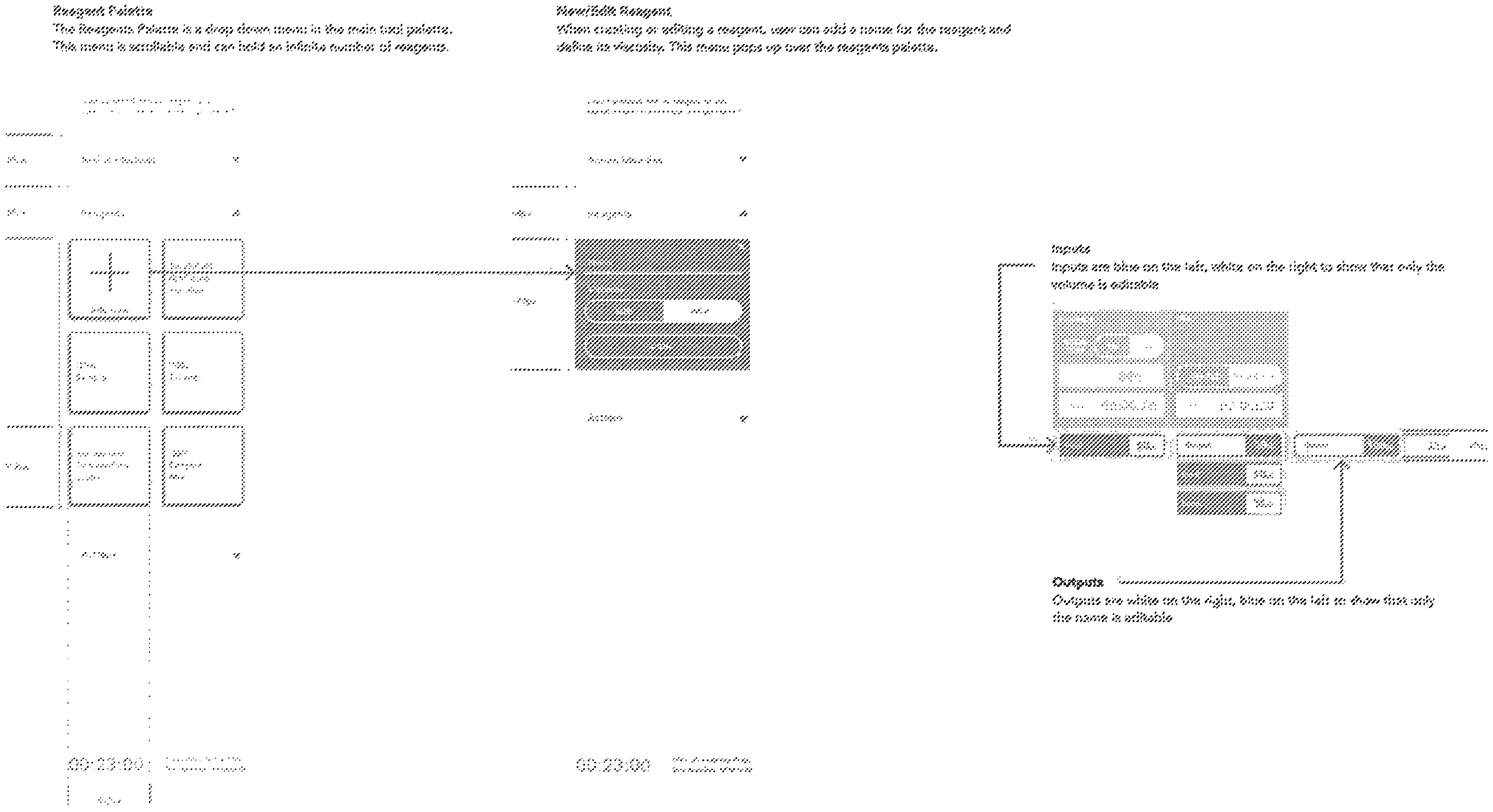

FIG. 91 illustrates the reagent menu ("reagent palate") including a listing of reagents and a control for entering new reagents, as well as a portion of a protocol building window (on left) in which reagents may be entered by a user.

Figure 92:
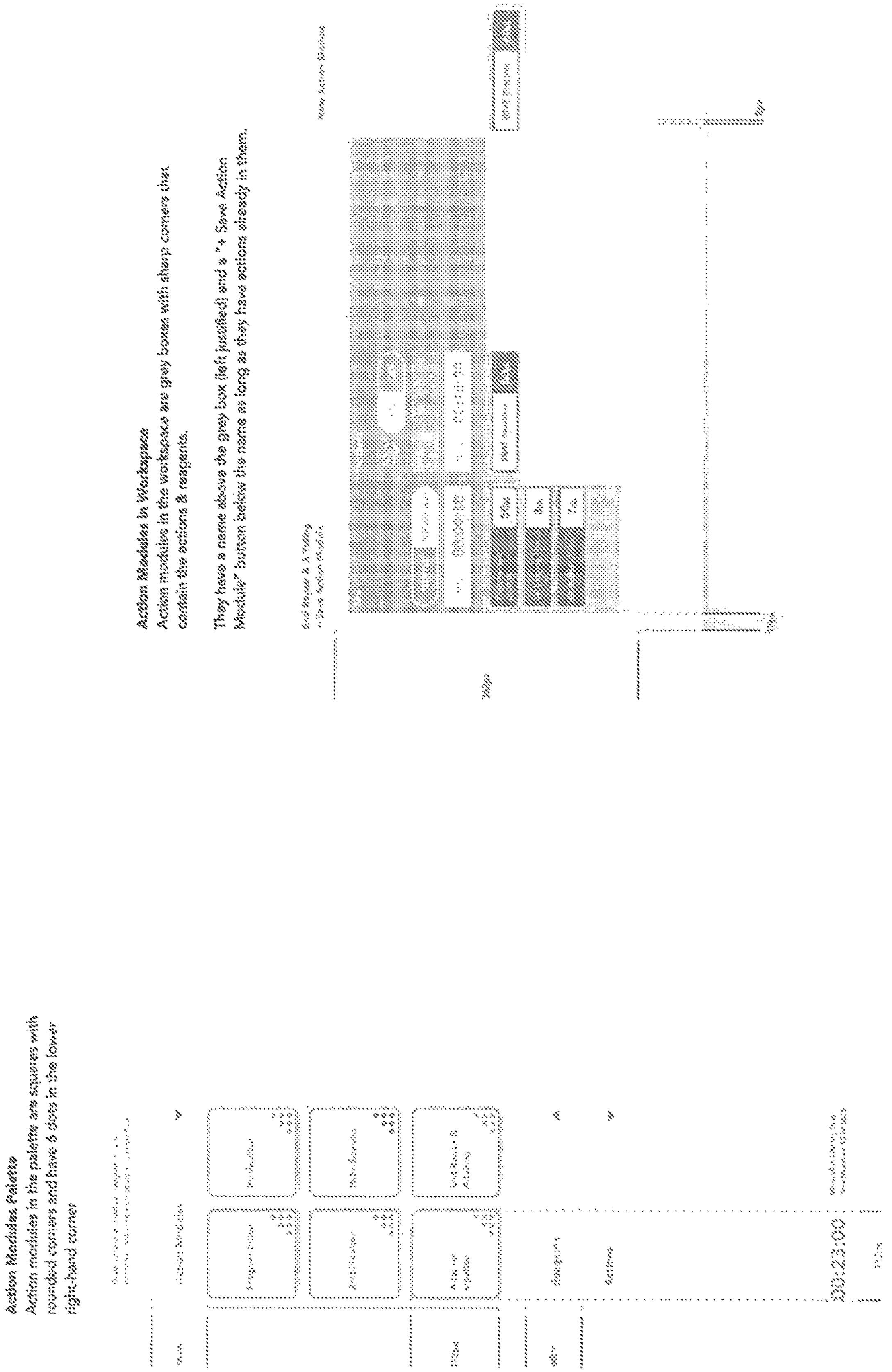

FIG. 92 illustrates an action module menu, displaying a plurality of action modules and allowing the user to select an action module from the plurality of action modules, and populating the protocol building window (on the right side of FIG. 92) with a plurality of action descriptors based on the action module.

Figure 93:
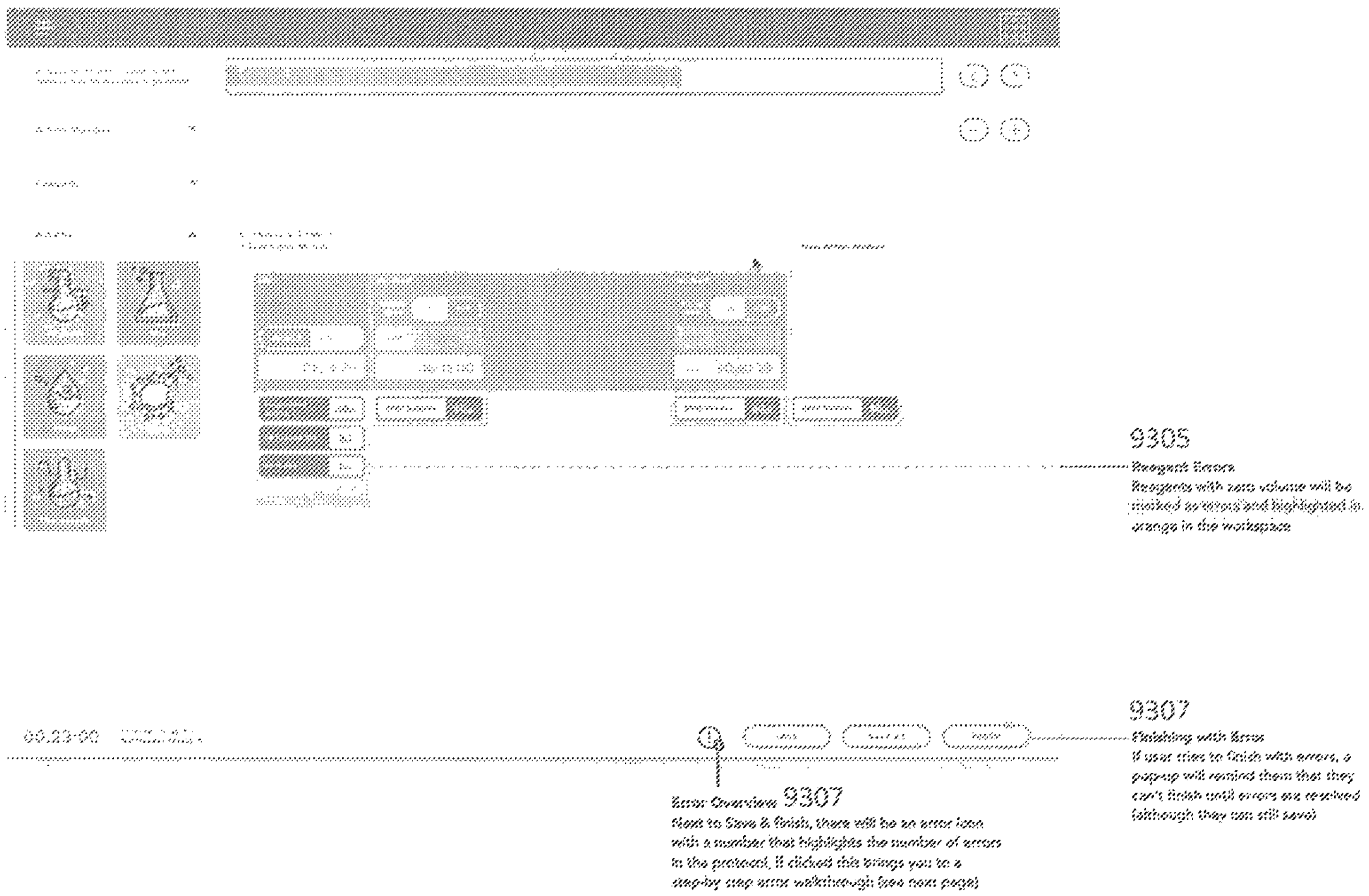

FIG. 93 illustrates the user interface including an error-detection input for determining errors in the designed protocol; errors may be marked on the user interface and the user prompted to correct the errors.

Figure 94:

FIG. 94 show examples of the user interface for designing a new protocol, including a protocol building window and an action icon window. As illustrated, the user interface may display a plurality of action icons (on the left of each screen) in the action icon window, wherein each action icon represents an action to be performed on a droplet, and allowing the user to repeatedly select an action icons from the action icon window and move it to the protocol building window. The action icon may be shown as an action descriptor in protocol building window, and the user may arrange the action descriptor in a sequence in the protocol building window and enter one or more user inputs into the action descriptor in the protocol building window. The top row of FIG. 94 illustrates the insertion of a new action at the start of the protocol in the protocol building window; the bottom row shows the insertion of a new action in the middle of the protocol.

Figure 95:
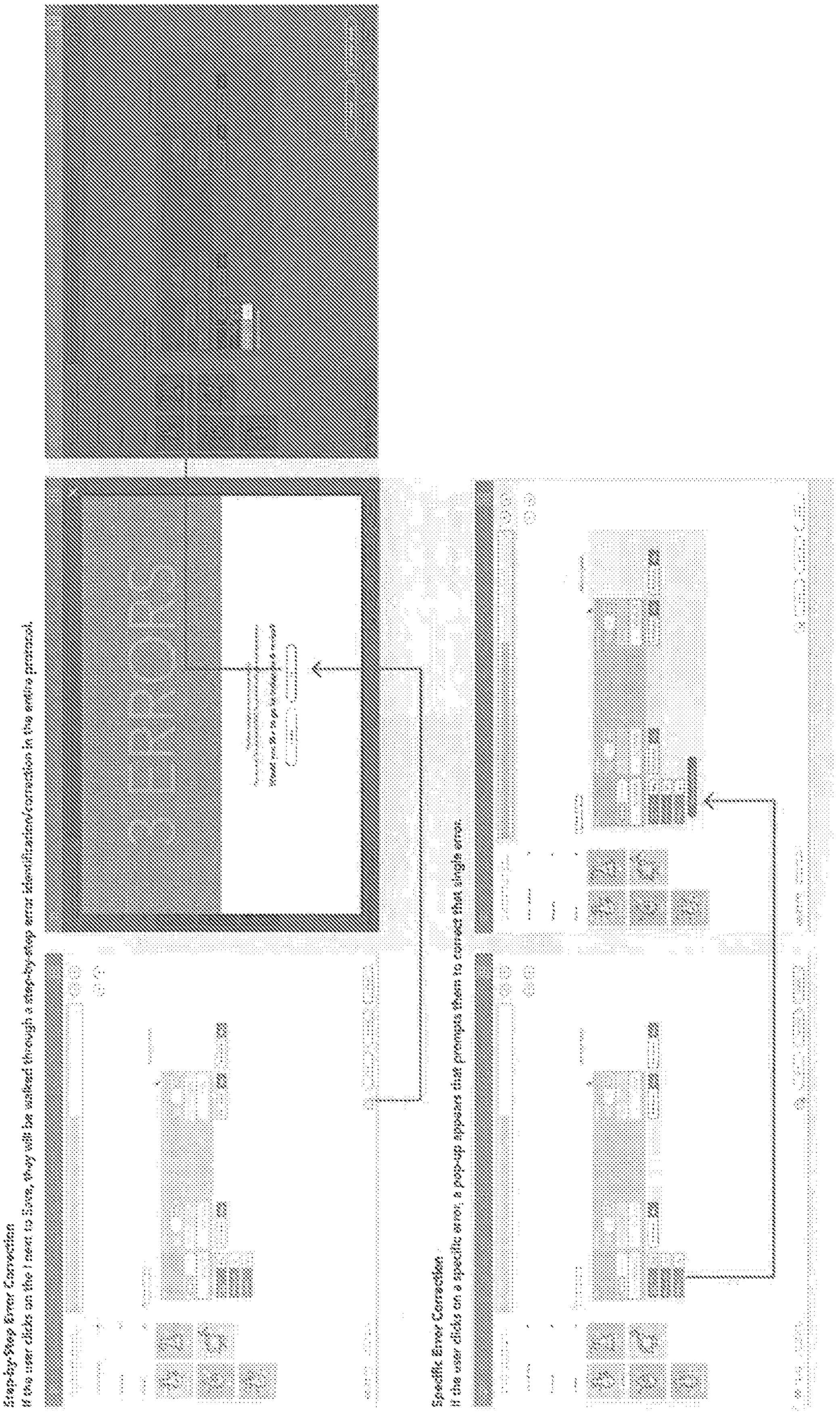

FIG. 95 illustrates a user interface for the step-by-step error correction following the automatic detection of errors, as well as the specific error correction, allowing a user to select (e.g., click on) a particular error identified on the user interface.

Figure 96:
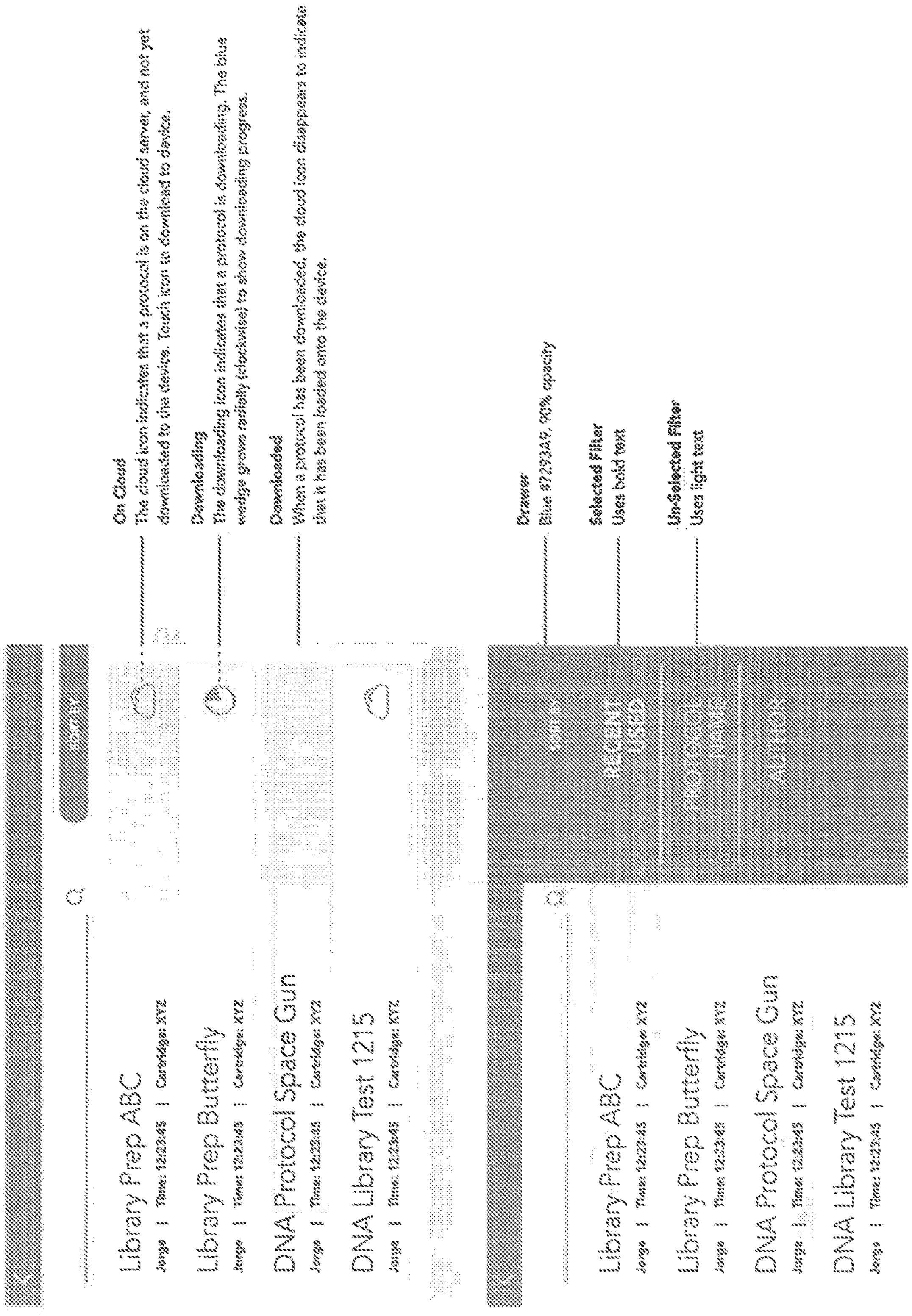

FIG. 96 is another example of a user interface, showing the listing of protocols as well as the status of the protocols.

FIG. 97 illustrates an example of a user interface on a DMF reader device, showing a protocol to be run on the device.

Figure 98:
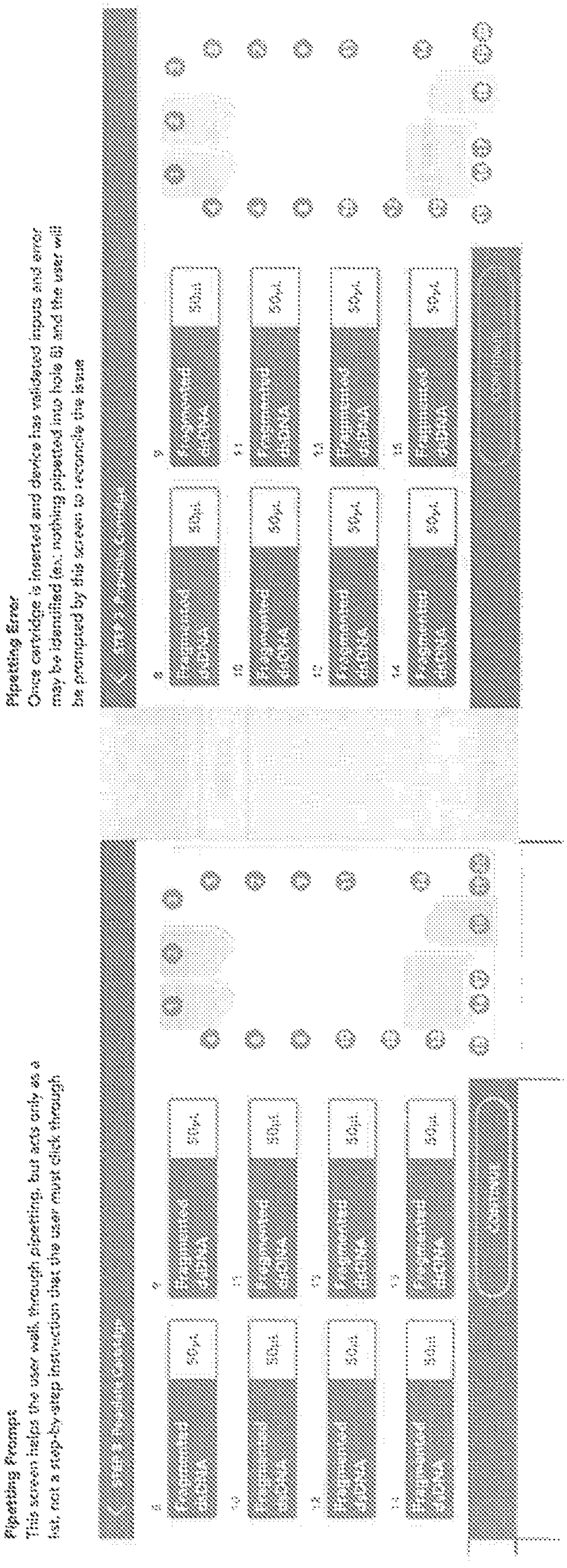

FIG. 98 illustrates the user interface on the DMF reader device that may be used to walk a user through the operation of the protocol, prompting the user (right side) to add one or more reagents into the cartridge as described herein. The user interface may also indicate errors (left side of FIG. 98) in pipetting/adding material into the cartridge during operation of the protocol.

Figure 99:
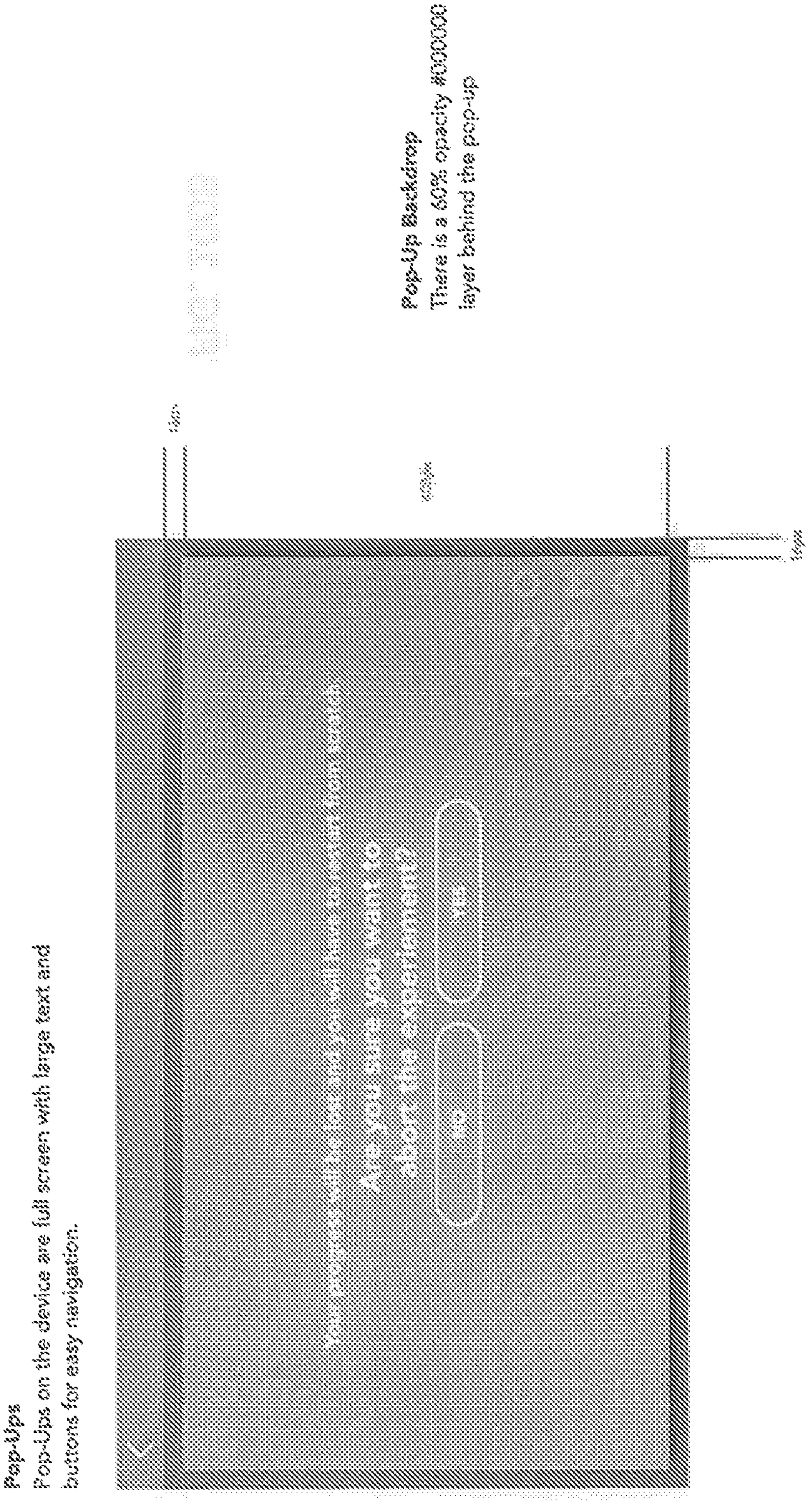

FIG. 99 illustrate an example of a pop-up user interface for display on a DMF reader device.

Figure 100A:
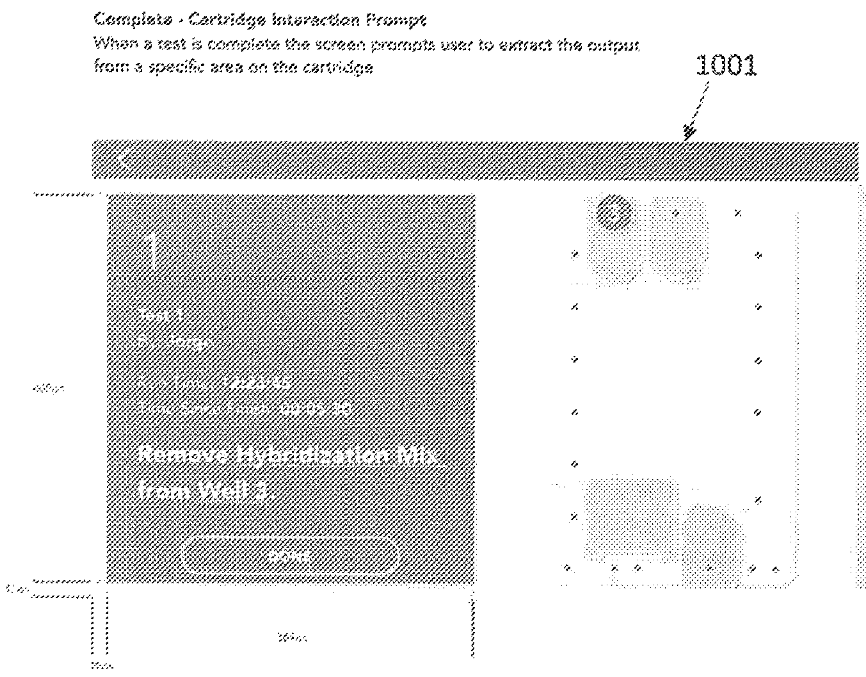

FIG. 100A is an example of a user interface for a DMF reader device indicating completion of the protocol.

Figure 100B:
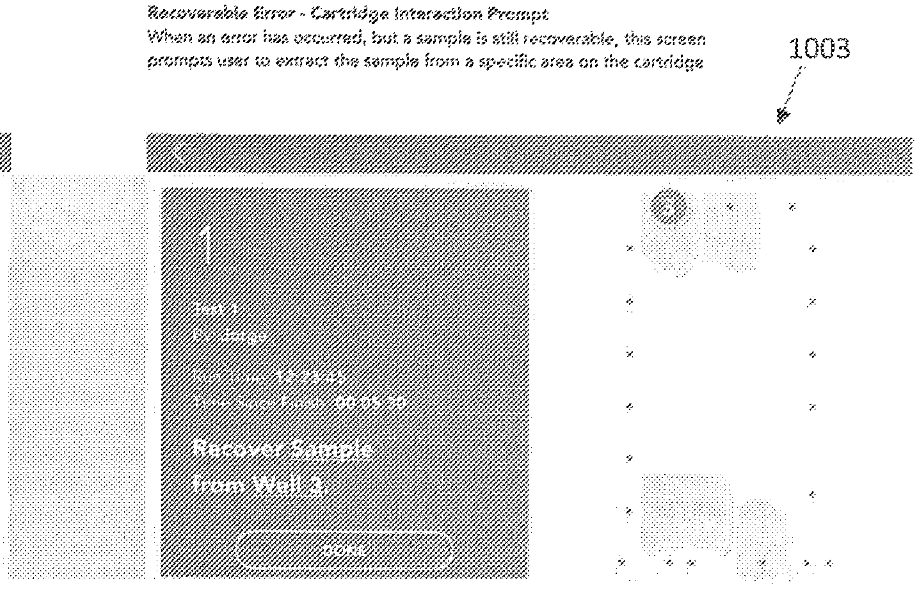

FIG. 100B is an example of a user interface for a DMF reader device indicating a recoverable error.

Figure 101A:
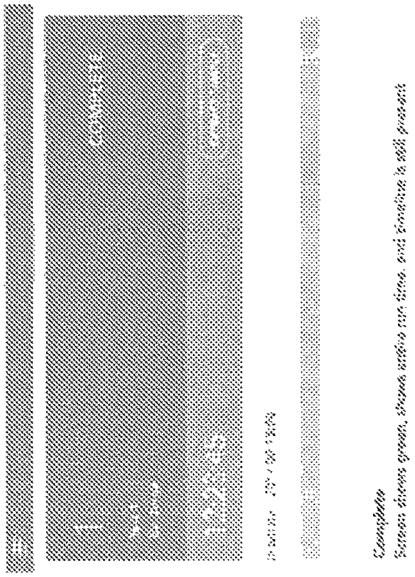

FIG. 101A is an example of a user interface for a DMF reader device indicating completion of the protocol, showing run time and guiding extraction of the sample.

Figure 101B:
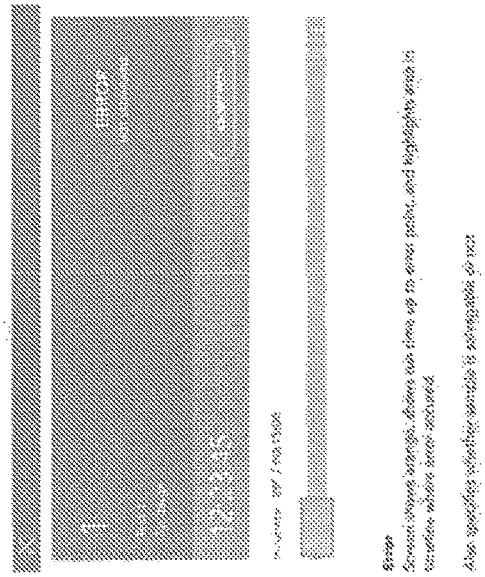

FIG. 101B is an example of a user interface for a DMF reader device indicating an error when performing the protocol, showing run time up to the error point.

Figure 101C:
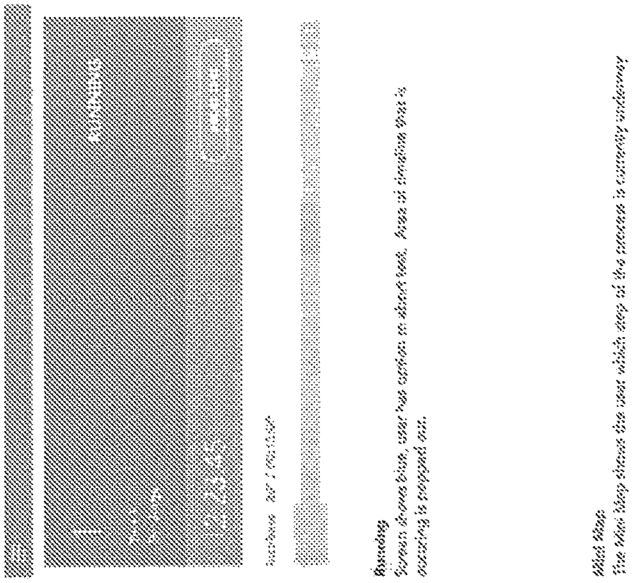

FIG. 101C is an example of a user interface showing the ongoing running protocol. The user interface includes a process map ("mini map") showing the steps of the protocol, and indicating which step is currently being performed.

Figure 102A:
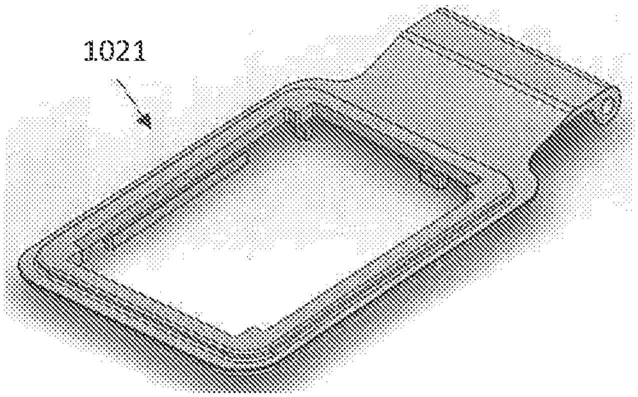
Figure 102B:
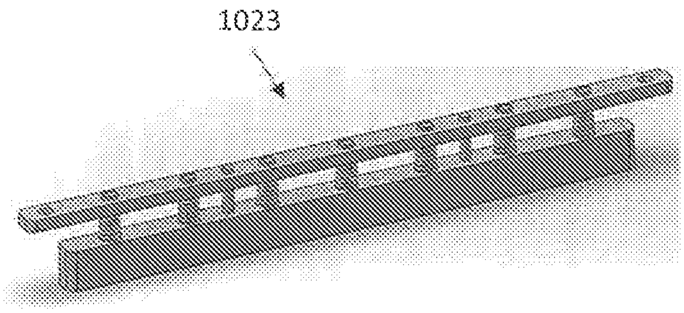
Figure 102C:
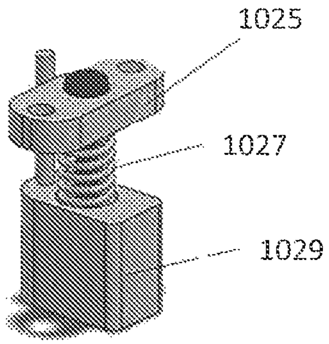
Figure 102D:
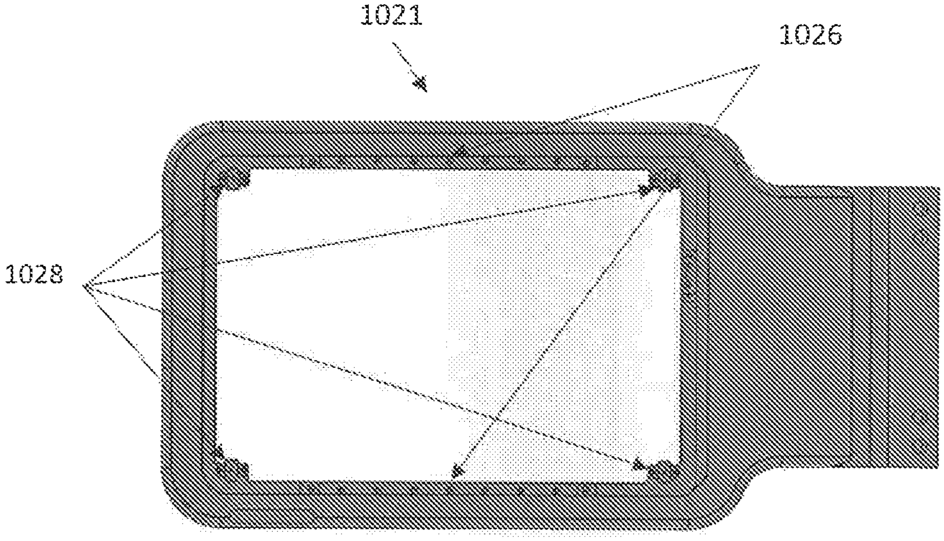

FIGS. 102A-102D illustrates an example of a clamp portion of an apparatus including a window region. In FIG. 102B a spring assembly on the bottom (underside) of the clamp is shown, allowing the clamp to adjust to a variety of different sizes and/or thicknesses of cartridges. FIG. 102C shows one example of a spring that may be included. FIG. 102D is an example of a bottom side of a clamp showing the spring assembly.

Figure 103:
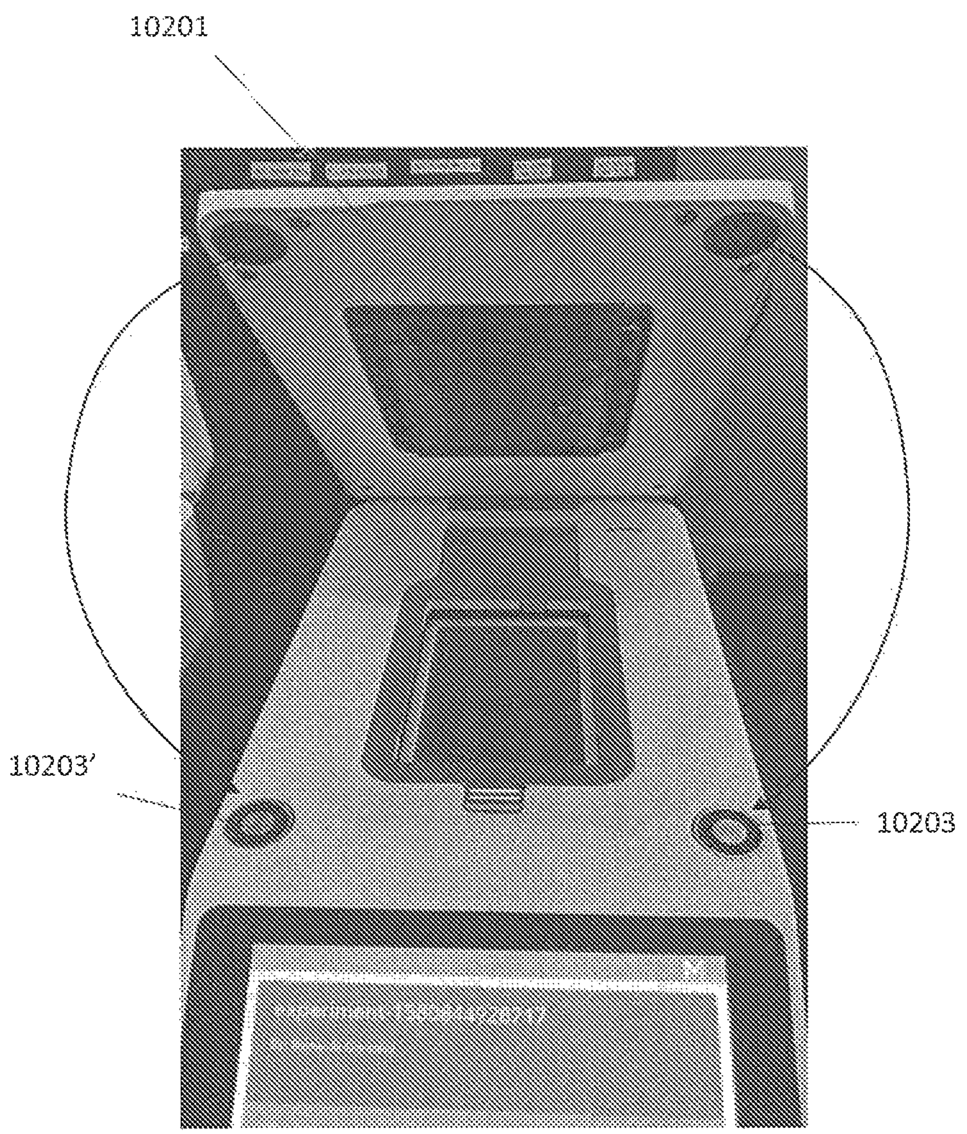

FIG. 103 is an example of a magnetically latching lid that may also include one or more magnetic sensors for detecting when the lid is closed.

DETAILED DESCRIPTION

Figures 1A, 1B, 1C:
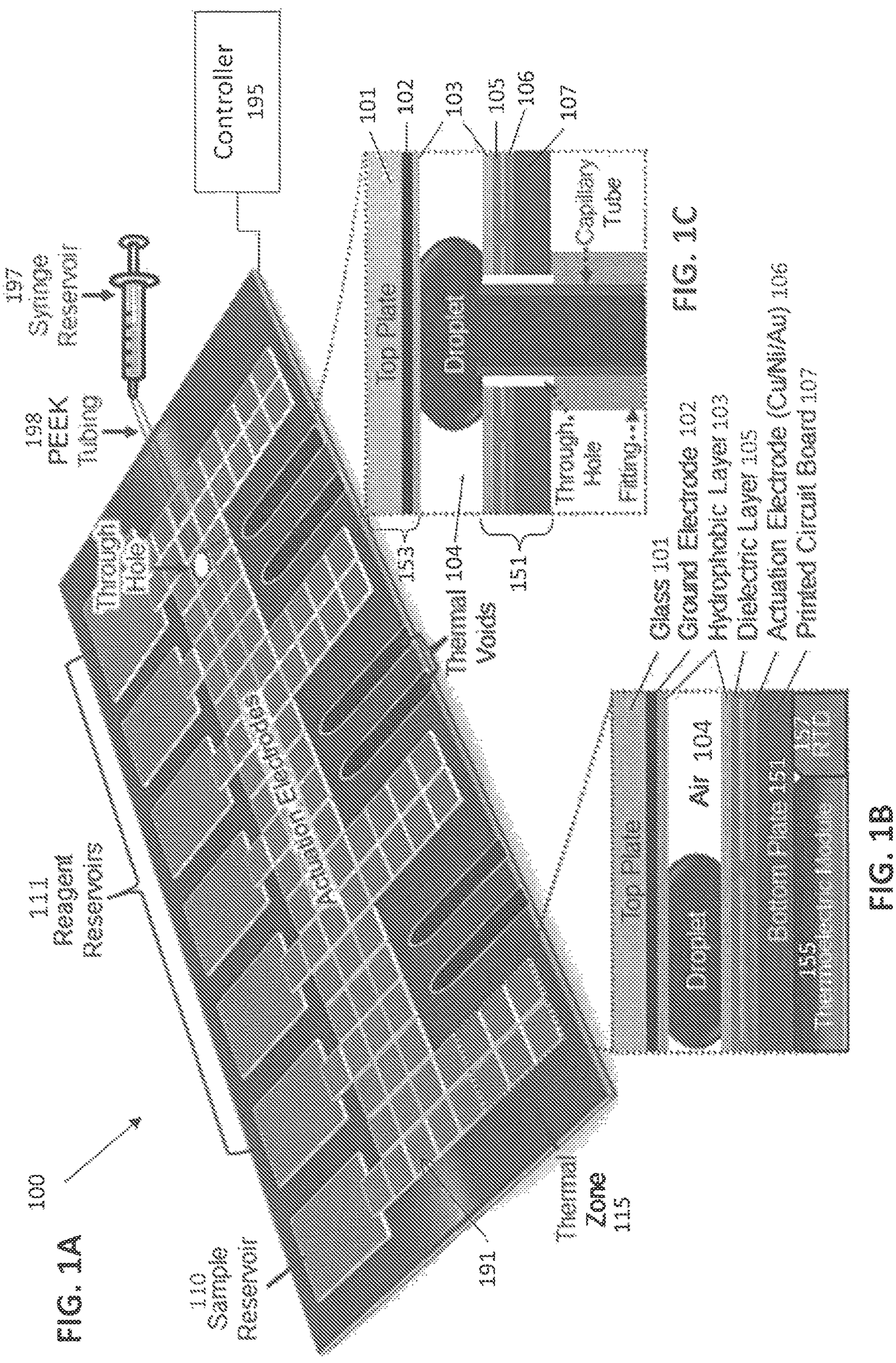
FIG. 1A is a schematic of one example of an air-matrix digital microfluidic (DMF) apparatus, from a top perspective view.
FIG. 1B shows an enlarged view through a section through a portion of the air-matrix DMF apparatus shown in FIG. 1A, taken through a thermally regulated region (thermal zone).
FIG. 1C shows an enlarged view through a second section of a region of the air-matrix DMF apparatus of FIG. 1A; this region includes an aperture through the bottom plate and an actuation electrode, and is configured so that a replenishing droplet may be delivered into the air gap of the air-matrix DMF apparatus from the aperture (which connects to the reservoir of solvent, in this example shown as an attached syringe).

For many applications it is most convenient to carry out DMF on an open surface, such that the matrix surrounding the droplets is ambient air. FIGS. 1A-1C illustrates one example of an air-matrix DMF apparatus. In general, the air-matrix DMF apparatus such as the one shown in FIG. 1A includes a plurality of unit cells 191 that are adjacent to each other and defined by having a single actuation electrode 106 opposite from a ground electrode 102; each unit cell may any appropriate shape, but may generally have the same approximate surface area. In FIG. 1A, the unit cells are rectangular. The droplets (e.g., reaction droplets) fit within the air gap between the first 153 and second 151 plates (shown in FIGS. 1A-1C as top and bottom plates). The overall air-matrix DMF apparatus may have any appropriate shape, and thickness. FIG. 1B is an enlarged view of a section through a thermal zone of the air-matrix DMF shown in FIG. 1A, showing layers of the DMF device (e.g., layers forming the bottom plate). In general, the DMF device (e.g., bottom plate) includes several layers, which may include layers formed on printed circuit board (PCB) material; these layers may include protective covering layers, insulating layers, and/or support layers (e.g., glass layer, ground electrode layer, hydrophobic layer; hydrophobic layer, dielectric layer, actuation electrode layer, PCB, thermal control layer, etc.). Any of these surfaces may be rigid (e.g., glass, PCB, polymeric materials, etc.). The air-matrix DMF apparatuses described herein also include both sample and reagent reservoirs, as well as a mechanism for replenishing reagents.

In the example shown in FIGS. 1A-1C, a top plate 101, in this case a glass material (although plastic/polymeric materials, including PCB, may be used) provides support and protects the layers beneath from outside particulates as well as providing some amount of insulation for the reaction occurring within the DMF device. The top plate may therefore confine/sandwich a droplet between the plates, which may strengthen the electrical field when compared to an open air-matrix DMF apparatus (without a plate). The upper plate (first plate in this example) may include the ground electrode and may be transparent or translucent; for example, the substrate of the first plate may be formed of glass and/or clear plastic. However, although it is transparent, it may be coated with a conductive material and/or may include a ground electrode adjacent to and beneath the substrate for the DMF circuitry (ground electrode layer 102). In some instances, the ground electrode is a continuous coating; alternatively multiple, e.g., adjacent, ground electrodes may be used. Beneath the grounding electrode layer is a hydrophobic layer 103. The hydrophobic layer 103 acts to reduce the wetting of the surfaces and aids with maintaining the reaction droplet in one cohesive unit.

The second plate, shown as a lower or bottom plate 151 in FIGS. 1A-1C, may include the actuation electrodes defining the unit cells. In this example, as with the first plate, the outermost layer facing the air gap 104 between the plates also includes a hydrophobic layer 103. The material forming the hydrophobic layer may be the same on both plates, or it may be a different hydrophobic material. The air gap 104 provides the space in which the reaction droplet is initially contained within a sample reservoir and moved for running the reaction step or steps as well as for maintaining various reagents for the various reaction steps. Adjacent to the hydrophobic layer 103 on the second plate is a dielectric layer 105 that may increase the capacitance between droplets and electrodes. Adjacent to and beneath the dielectric layer 105 is a PCB layer containing actuation electrodes (actuation electrodes layer 106). The actuation electrodes may form each unit cell. The actuation electrodes may be energized to move the droplets within the DMF device to different regions so that various reaction steps may be carried out under different conditions (e.g., temperature, combining with different reagents, magnetic regions, pump inlet regions, etc.). A support substrate 107 (e.g., PCB) may be adjacent to and beneath (in FIGS. 1B and 1C) the actuation electrode layer 106 to provide support and electrical connection for these components, including the actuation electrodes, traces connecting them (which may be insulated), and/or additional control elements, including the thermal regulator 155 (shown as a TEC), temperature sensors, optical sensor(s), magnets, pumps, etc. One or more controllers 195 for controlling operation of the actuation electrodes and/or controlling the application of replenishing droplets to reaction droplets may be connected but separate from the first 153 and second plates 151, or it may be formed on and/or supported by the second plate. In FIGS. 1A-1C the first plate is shown as a top plate and the second plate is a bottom plate; this orientation may be reversed. A source or reservoir 197 of solvent (replenishing fluid) is also shown connected to an aperture in the second plate by tubing 198.

As mentioned, the air gap 104 provides the space where the reaction steps may occur, providing areas where reagents may be held and may be treated, e.g., by mixing, heating/cooling, combining with reagents (enzymes, labels, etc.). In FIG. 1A the air gap 104 includes a sample reservoir 110 and a series of reagent reservoirs 111. The sample reservoir may further include a sample loading feature for introducing the initial reaction droplet into the DMF device. Sample loading may be loaded from above, from below, or from the side and may be unique based on the needs of the reaction being performed. The sample DMF device shown in FIG. 1A includes six sample reagent reservoirs where each includes an opening or port for introducing each reagent into the respective reservoirs. The number of reagent reservoirs may be variable depending on the reaction being performed. The sample reservoir 110 and the reagent reservoirs 111 are in fluid communication through a reaction zone. The reaction zone 112 is in electrical communication with actuation electrode layer 106 where the actuation electrode layer 106 site beneath the reaction zone 112.

The actuation electrodes 106 are depicted in FIG. 1A as a grid or unit cells. In other examples, the actuation electrodes may be in an entirely different pattern or arrangement based on the needs of the reaction. The actuation electrodes are configured to move droplets from one region to another region or regions of the DMF device. The motion and to some degree the shape of the droplets may be controlled by switching the voltage of the actuation electrodes. One or more droplets may be moved along the path of actuation electrodes by sequentially energizing and de-energizing the electrodes in a controlled manner In the example of the DMF apparatus shown, a hundred actuation electrodes (forming approximately a hundred unit cells) are connected with the seven reservoirs (one sample and six reagent reservoirs). Actuation electrodes may be fabricated from any appropriate conductive material, such as copper, nickel, gold, or a combination thereof.

In the example device shown in FIGS. 1A-1C, the DMF apparatus is typically integrated so that the electrodes (e.g., actuation electrodes and ground electrode(s)) are part of the same structure that may be loaded with sample and/or fluid. The electrode may be part of a cartridge, which may be removable. Although cartridges have been described (see, e.g., US20130134040), such cartridges have proven difficult to use, particularly when imaging through the device and when operating in an air-matrix apparatus.

In general, described herein are digital microfluidics apparatuses and methods. In particular, described herein are air-matrix digital microfluidics apparatuses, including systems and devices, and methods of operating them to process fluid samples. For example, a DMF apparatus may include a compact DMF driver/reader that is configured to work with a removable/disposable cartridge. The DMF driver/reader may include an array of drive electrodes that are adapted to align and secure a cartridge in position by applying negative and/or positive pressure at multiple points, and specifically at the electrode-contact points, on the cartridge. The cartridge may include an air gap that is open to the environment (e.g., to the air) via openings such as side (lateral) openings and/or top openings. The air gap may be formed between two dielectric layers. An upper, top, region may include one or more ground electrodes. The ground electrode may be advantageously formed of a non-transparent material that is patterned to include one or more windows that allow imaging through the top. These windows may be arranged over the electrode, so that the ground region extends opposite the drive electrodes and around and/or between the drive electrodes.

Any of the apparatuses described herein may also include a fluid application and extraction component (e.g., a fluid application and/or extraction device) that is connected through the top, or through the side of the cartridge, into the air gap. Any of the apparatuses described herein may include or use a non-polar jacketing material (e.g., a non-polar liquid such as a room temperature wax) that forms a protective jacket around the aqueous droplet(s) in the apparatus, and may be moved with the droplet. Also described herein are user interfaces for interacting with the apparatus, including user interfaces for controlling the apparatus to move, mix, combine, wash, magnetically concentrate, heat, cool, etc. These user interfaces may allow manual, automatic or semi-automatic entering, control and/or execution of a protocol.

Figure 2:
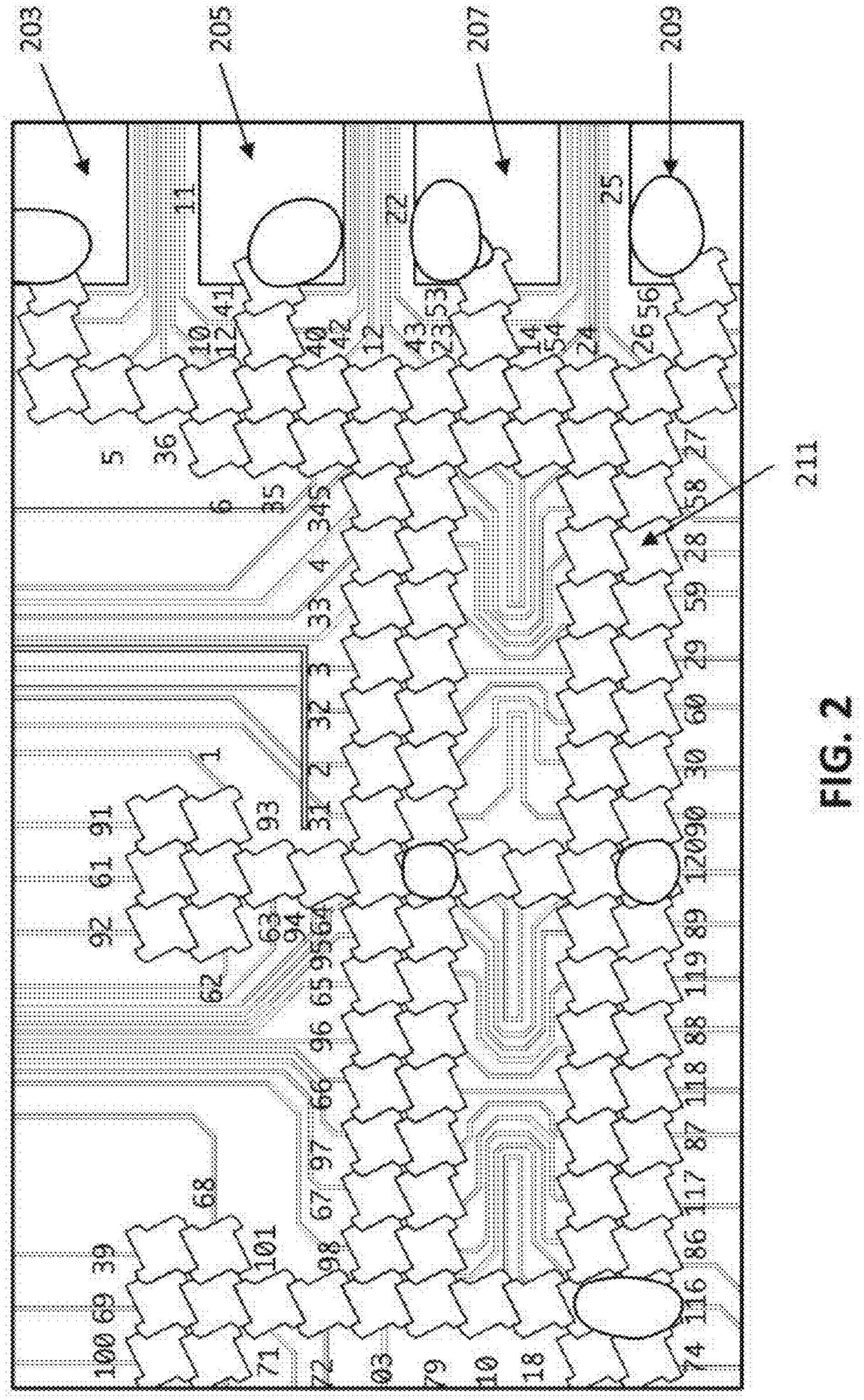
FIG. 2 is an example of a DMF surface using a rigid cartridge including the electrodes and an air-gap region, similar to that shown in FIGS. 1A-1C.

FIG. 2 illustrates an example of a DMF apparatus that is similar to the one shown in FIGS. 1A-1C. In FIG. 2, the DMF apparatus includes a plurality of drive electrodes 201 (which are shaped into non-square/non-rectangular shapes and positioned adjacent to each other in rows or lines. In FIG. 2, four reservoir regions 203, 205, 207, 209 are positioned on the right side, and may be preloaded or otherwise hold droplets of materials to be added during operation of the DMF apparatus. Some or all of the electrodes may be heated or cooled.

In the apparatus of FIG. 2, the DMF driving electrodes 211 are solid, planar electrodes. The application of energy between the driving electrodes and the ground or reference electrode result in movement of an aqueous (e.g. polar) droplet. In FIG. 2, the ground or reference electrode is formed as a conductive, transparent coating (e.g., ITO) on the upper plate, which is also clear (transparent). This allows the device to be monitored, including monitoring any of the cells, e.g., unit cells, from above the air matrix/air gap.

Figure 3A:
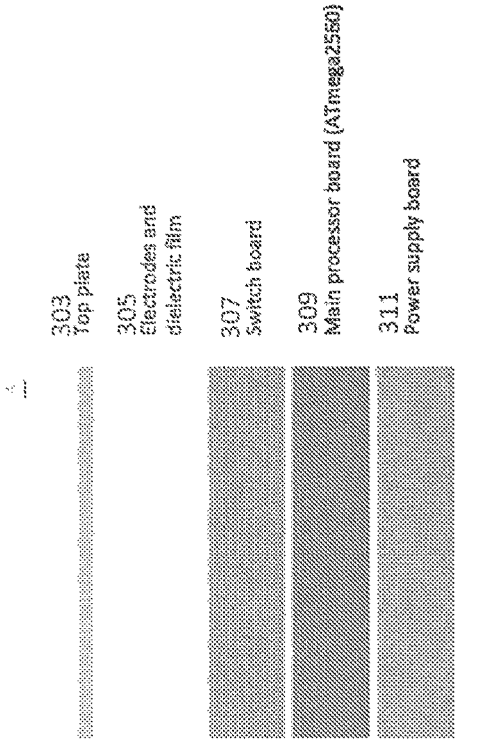
FIG. 3A shows an example of a typical DMF arrangement, e.g., using a rigid cartridge.
Figure 3B:
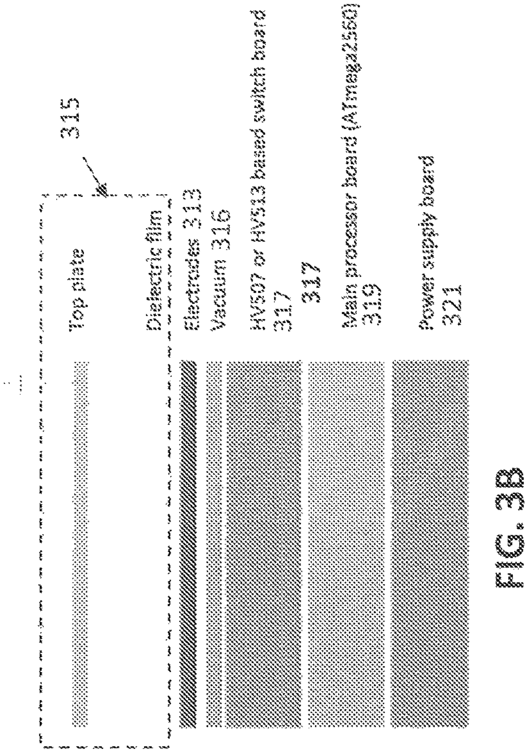
FIG. 3B shows an example of a DMF configuration in which the cartridge 315 is a disposable portion that does not include the electrodes but that is held onto the reusable electrodes by a plurality of localized vacuum ports (adjacent to or passing through the electrodes).

However, it would be beneficial to provide DMF reader apparatuses (e.g., devices, systems, etc.) that may be used with disposable cartridges that do not include the drive electrodes. FIGS. 3A and 3B show the different configurations of a DMF system that includes integrated drive electrodes (FIG. 3A) and a system in which the drive electrodes are part of the reader, but the cartridge includes only the ground electrodes (e.g., top plate), air gap and the dielectric bottom. For example, in FIG. 3A, the air gap is formed between the grounded top plate 303, and the drive electrodes and dielectric film 305 (e.g., a Teflon film). The drive electrodes and dielectric film may be part of a cartridge that includes the top plate, and may be separately attached onto the substrate (switch board 307) that connects to a main processor 309 and a power supply board 311.

In contrast, in FIG. 3B, the cartridge does not include the drive electrodes 313, but instead includes the top plate/ground electrode, dielectric and an air gap between them 315. As will be described in greater detail herein, a vacuum (e.g., vacuum manifold) may be positioned beneath the electrodes 313 to apply pressure (e.g., between 50 kPa and 250 kPa, 50 kPa or greater, 60 kPa or greater, 70 kPa or greater, 80 kPa or greater, 90 kPa or greater, 100 kPa or greater, 110 kPa or greater, etc.) to fully secure the dielectric, and therefore the rest of the cartridge, to the reader apparatus. The electrodes may be supported on a substrate, such as a printed circuit board or switch board 317, which may also be connected to the main processor 319 and power supply 321. As shown in FIG. 3B, the dielectric film may also be hydrophobic (e.g., a Teflon film may be used) or may be treated, coated, sprayed, dipped into, etc., a hydrophobic material to make at least the side facing the air-gap hydrophobic.

Figure 3C:
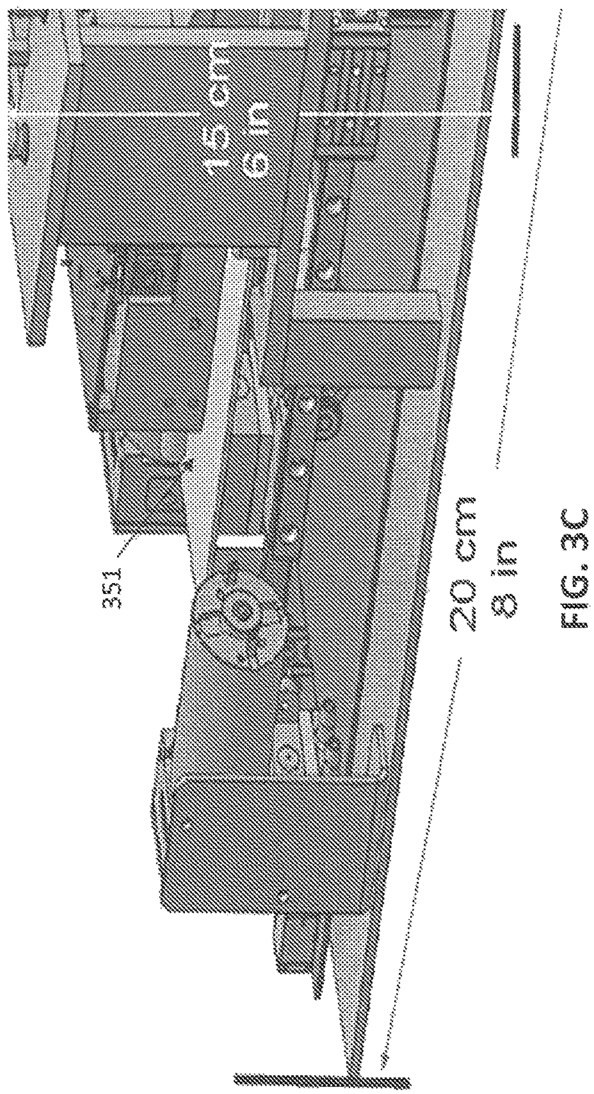
FIG. 3C is an example of a DMF apparatus configured as a compact driver/reader that is configured to work with a removable/disposable cartridge. The DMF apparatus includes an array of electrodes (e.g., greater than 500 different electrodes), and multiple independent regions for heating/cooling (thermal cycling, etc.) controlling magnetic beads, pumping microfluidic channels, automatic seating and sealing of the cartridge, as well as optical viewing/management.

FIG. 3C is an example of a compact DMF driver/reader that may be used with any of the cartridges described herein. In the side perspective view shown in FIG. 3C, dimensions (height of 15 cm or 6 inches, width of 20 cm or 8 inches) are exemplary only, but show the compact nature of the reader. The reader may include a cartridge seating surface 351, beneath which the vacuum, heating, cooling, magnetic and other components, including control circuitry may be positioned. In this example, microfluidics control components (e.g., valves, pumps, etc.) may be positioned above the cartridge seating surface, for control of these elements.

Figure 3D:
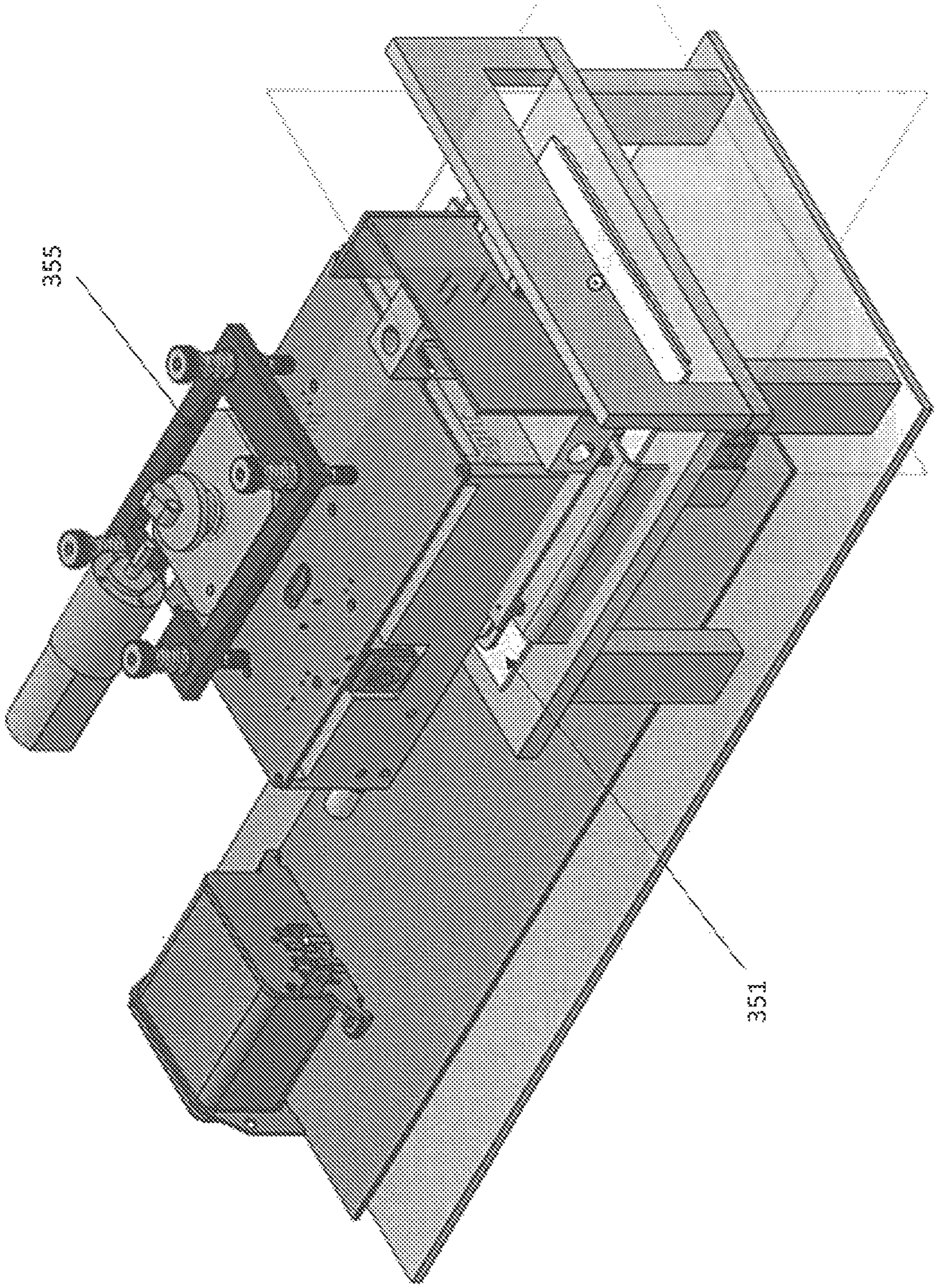
FIG. 3D is another example of a DMF apparatus as described herein configured as compact driver/reader that may include greater than 900 (e.g., greater than 920 different electrodes), independent heaters for isothermal regions and thermal cyclers, magnetic zones that can be independently engaged/disengaged, pumps and valves for operating microfluidics in the disposable cartridge (in addition to the DMF control via the plurality of electrodes), a vacuum manifold coordinated with the plurality of electrodes (e.g., having ports that pass through the electrodes to seal and secure the dielectric to the electrodes for accurate and reliable DMF control, multiple independent qPCR zones, multiple optical channels, and a draw-mechanism for inserting/removing the cartridge allowing access from both above and below the apparatus. The apparatus show in FIGS. 3C and 3D may provide liquid cooling of ambient and heating zones.
Figure 3E:
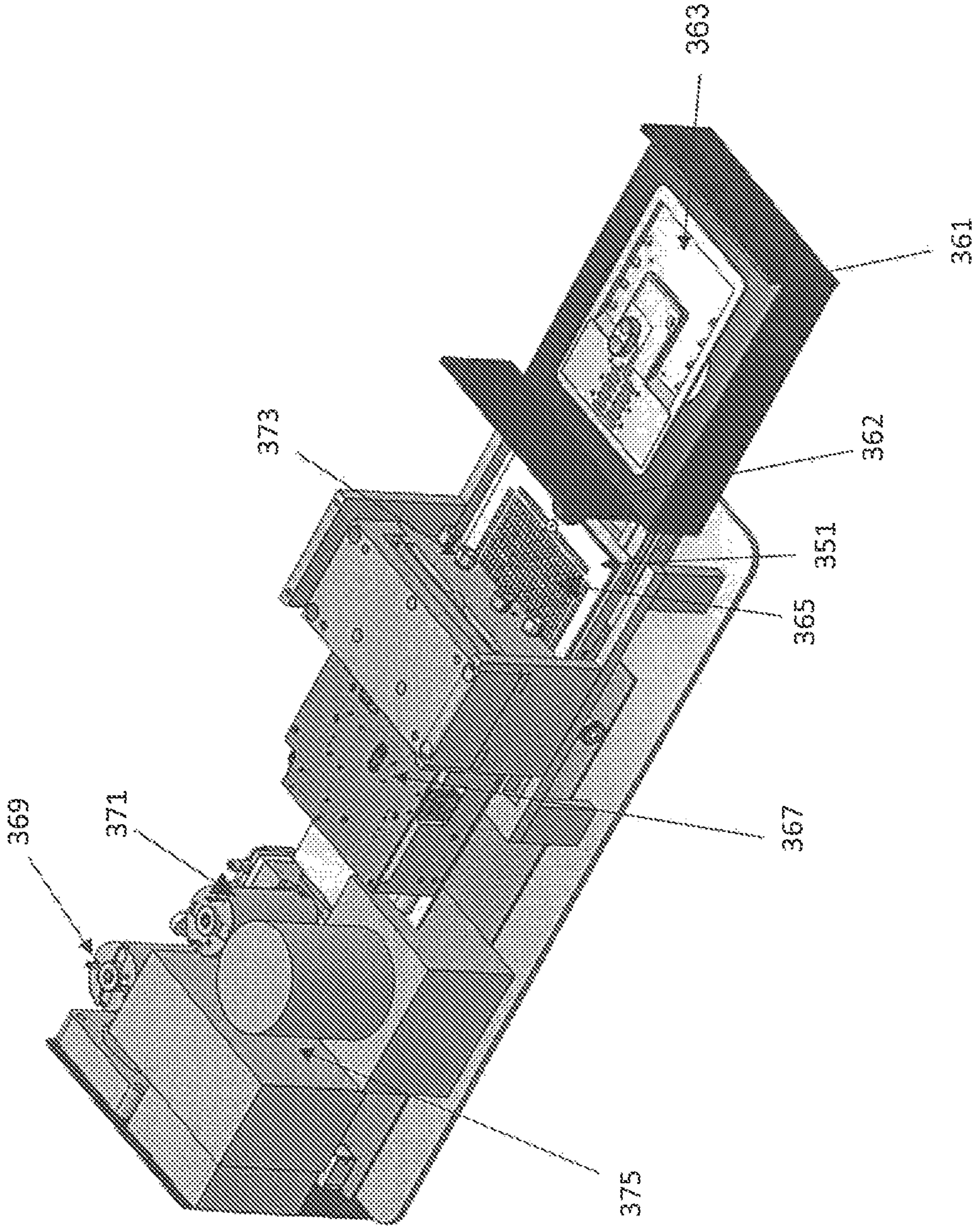
FIG. 3E is another example of the apparatus shown in FIGS. 3C-3D, showing an exemplary arrangement of the pumps (e.g., vacuum pumps to secure the cartridge, a liquid cooler and compressor, one or more motors for actuating the drawer that receives the cartridge and for actuating the optics, a control for opening/closing the drawer, a manifold for operating any microfluidics on the cartridge (in addition to or instead of the DMF), and an electrode array for driving DMF in the cartridge. In this example, a disposable cartridge is shown inserted into the apparatus.

FIG. 3D illustrate another example of a DMF reader apparatus including integrated drive electrodes on part of the seating surface. A drawer (not shown) may be used to insert/remove the cartridge and seat it onto the seating surface, where a vacuum may be used to secure the cartridge in position and make complete electrical contact between the drive electrodes and the dielectric of the cartridge. Both the microfluidics handing portion 355 and the optics (e.g., optical reader) may be positioned above the seating surface. FIG. 3E shows another perspective view of the apparatus of FIGS. 3C and 3D, showing the drawer 361 holding an exemplary disposable cartridge 363. The drawer may open/close (e.g., by pushing a control, such as a button 362) to pull the cartridge into and out of the apparatus, as shown, and position the cartridge on the seating surface which includes a driving electrode array 365, in which each of the driving electrodes (in this example, and shown in greater detail below) includes an opening for the application of a vacuum to hold the dielectric onto the driving electrodes. Above the seating surface, and therefore the cartridge, the microfluidics portion may engage with the cartridge when held on the seating surface. For example, a microfluidics valve manifold 367 may be included, and may connect to a pump or pump 369. The same, or a separate pump 371 may be used to provide the pressure for holding the dielectric onto the seating surface through the electrodes. The system may also include an optics sub-system 373 for imaging through at least a portion of the cartridge, in order to report-out data about the reaction being performed on the apparatus. A motor for driving the optics and/or the drawer opening/closing may also be included. A liquid cooler and compressor 375 may be included as well, for circulating a cooling liquid, e.g., under the cartridge.

Figure 3F:
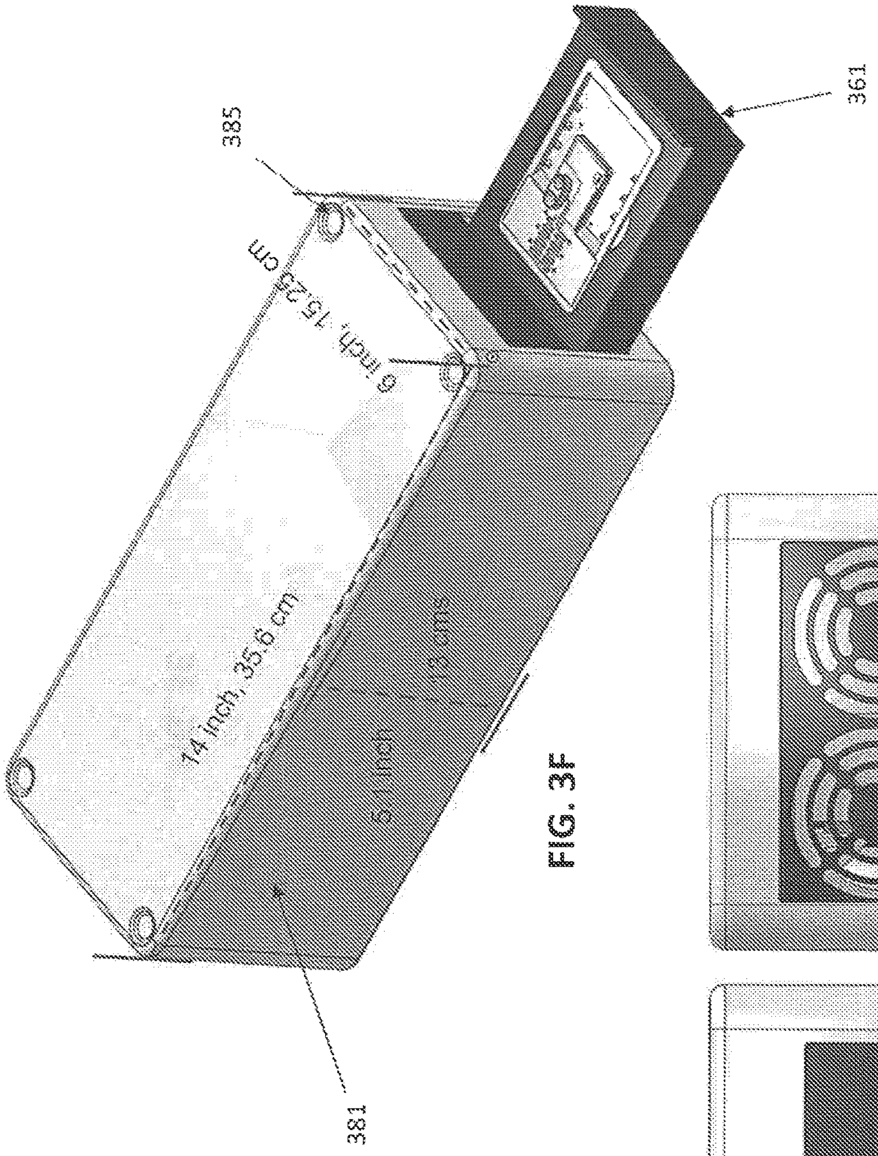
FIG. 3F is an example of the outer housing of an exemplary DMF apparatus such as the one shown in FIGS. 3C-3E, configured as a single tray (cartridge) apparatus.
Figure 3H:
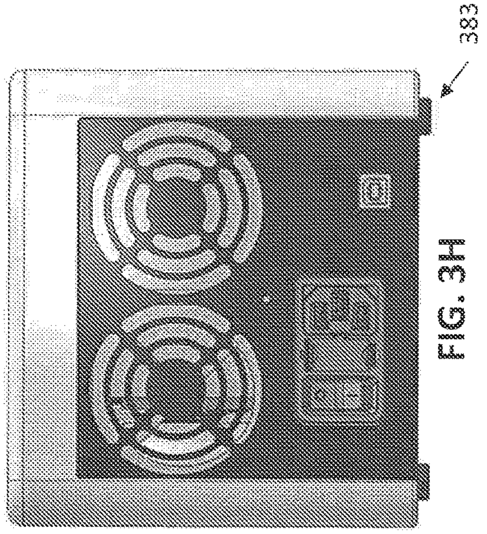
FIGS. 3G and 3H show an example of the front (FIG. 3G) and back (FIG. 3H) sides of the exemplary DMF apparatus of FIG. 3F. The tray for loading/unloading the cartridge is shown closed.
Figure 3G:
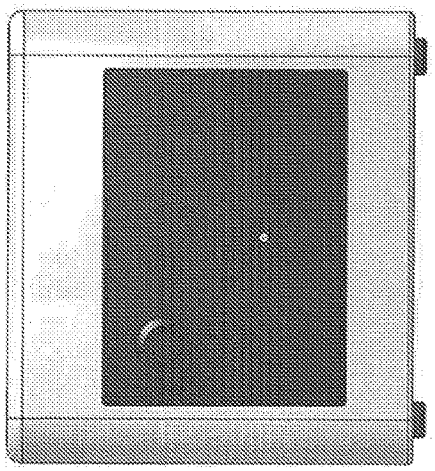

FIG. 3F shows a side perspective view of the apparatus of FIG. 3E with the drawer 361 open and the cover 381 on. The housing may include feet 383 that may engage with receiving sites 385 on the top surface, so that these device may be easily and securely stacked. FIGS. 3G and 3H show front and rear views, respectively.

Figure 3I:
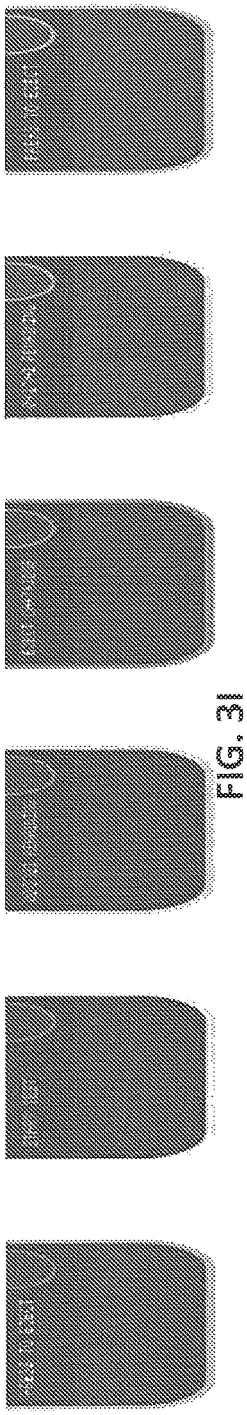
FIG. 3I illustrates another example of an exemplary DMF apparatus configured to process a plurality of cartridges.
Figure 3J:
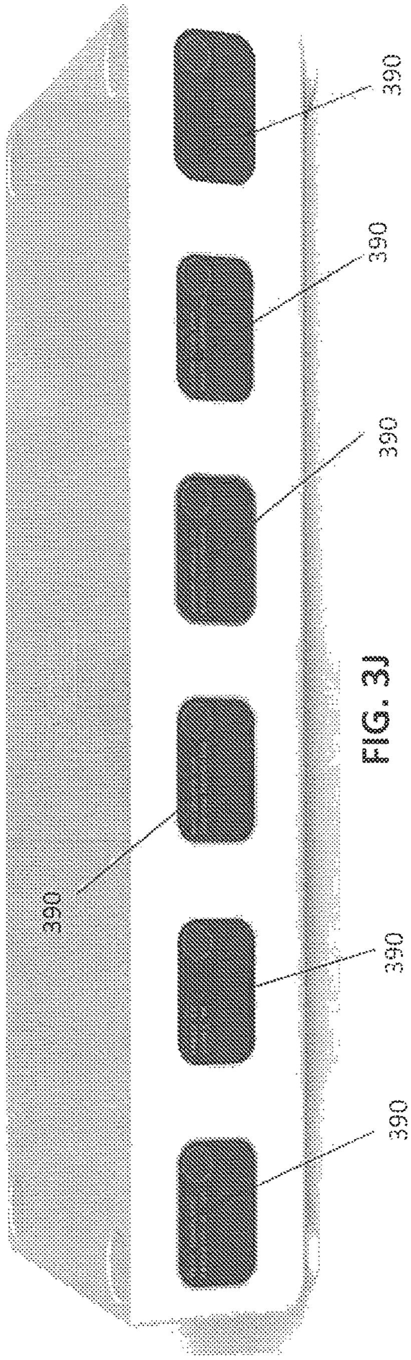
FIG. 3J is a front perspective view of the apparatus of FIG. 3I.
Figure 3K:
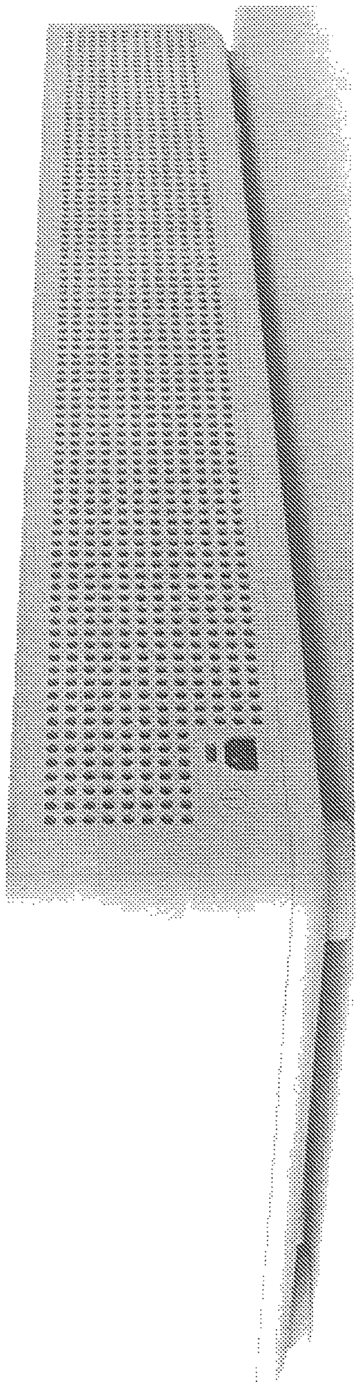
FIG. 3K illustrates an example of a back view of the multiplexed apparatus of FIGS. 3I-3J.
Figure 3L:
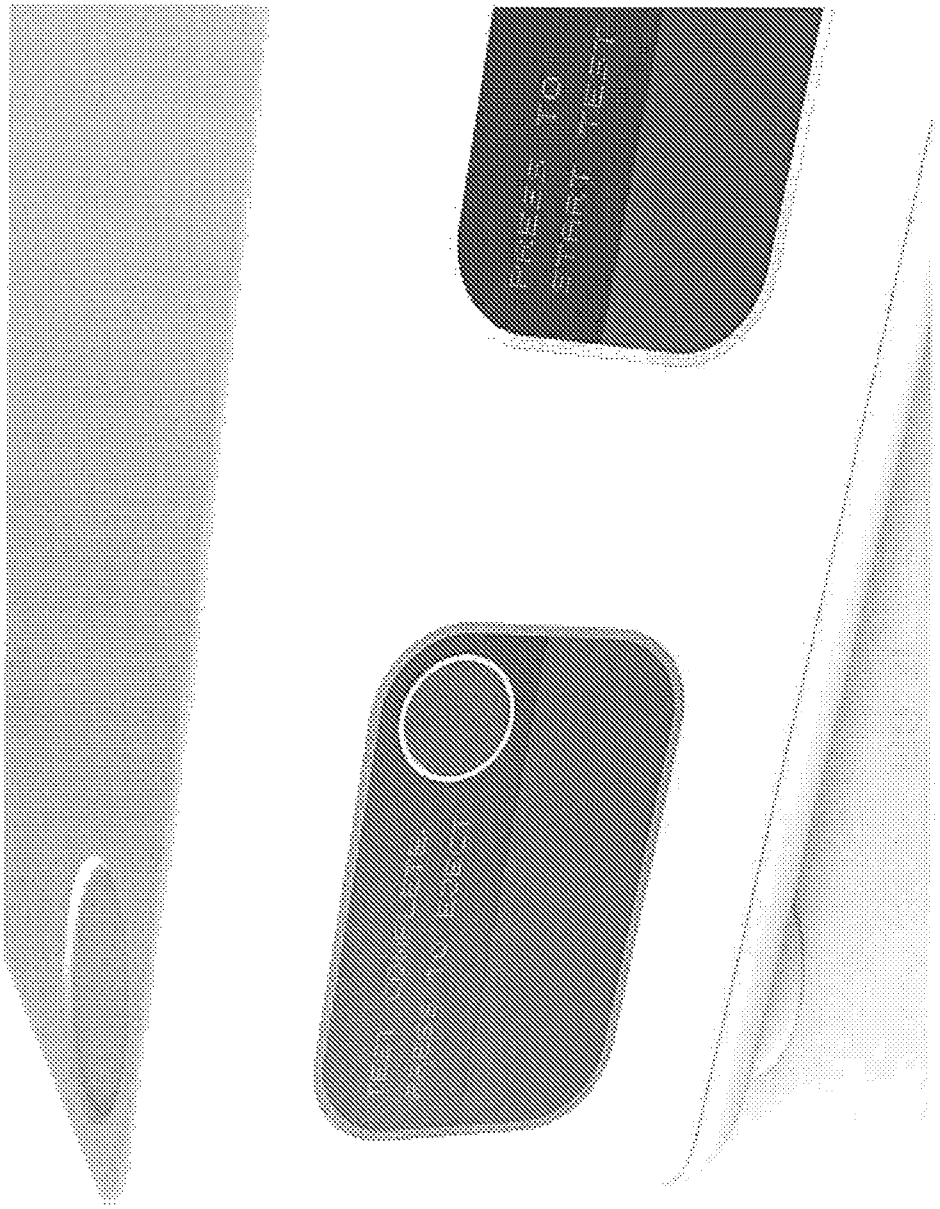
FIG. 3L is an enlarged view of the far left cartridge drawer, including a cartridge-specific display, input (e.g., button, touchscreen, etc.), and the cartridge drawer.

In some variations, the apparatus may include a plurality of cartridge-receiving sites (e.g., seating surfaces) for operating in parallel on multiple cartridges. For example, FIGS. 3I-3K illustrate an example of an apparatus in which six cartridge receiving drawers can be used to operate on up to six separate cartridges simultaneously. In this example, each receiving drawer may include a button for opening/closing the drawer, and a separate readout screen 390 may be included. FIGS. 3I and 3J show front, and front perspective views, respectively, and FIG. 3K is a rear view. In this variation, internal components, such as the processor(s) and optical sensor(s) may be shared between the different seating surfaces within each sub-region of the apparatus. FIG. 3L shows a detailed view of one example of a front of the apparatus.

Figure 4A:
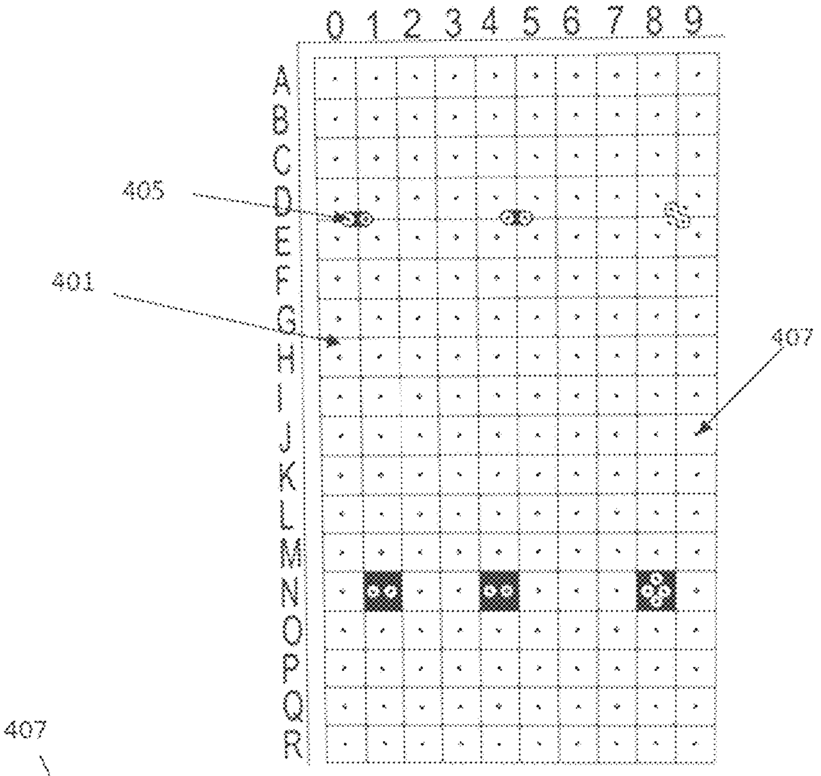
FIG. 4A shows a top view of the electrodes (e.g., electrode array) formed as part of the apparatus. The electrodes may include a plurality of vacuum openings through them, as shown. The electrodes may define different regions, including thermally controlled regions (e.g., regions having a thermistor and/or cooling and/or heating.
Figure 4B:
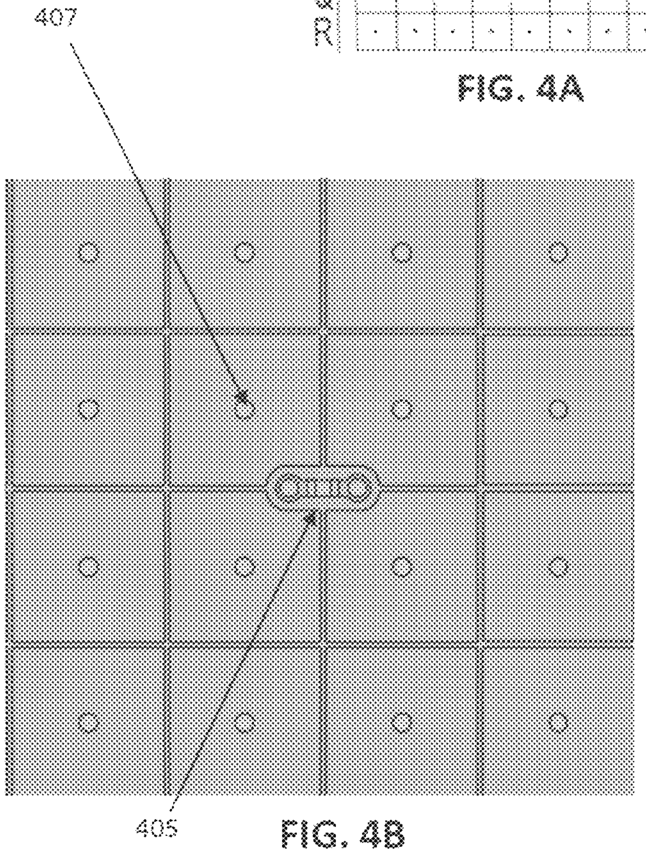
FIG. 4B shows an enlarged region of the electrodes, forming the upper electrode layer, showing the vacuum openings through most (e.g., >50%, 55%, 60%, 65%, 70%, 75%, 80%, 85%, 90%, 95%, etc.) or all of the electrodes. Although square electrodes are shown (with centered vacuum openings), other electrode shapes, e.g., interlocking, rectangular, circular, etc., or vacuum opening locations (off-centered, etc.) through the electrodes may be used.

The seating surface of an exemplary DMF reader device is shown in greater detail in FIGS. 4A-4C and FIGS. 9A-9C. In FIG. 4A, the seating surface includes an array of driving electrodes 401 (labeled in rows 0-9 and columns A-R). Each of these driving electrodes includes a central hole or opening through the electrode, through which a vacuum can be applied to hold the dielectric of the cartridge against the drive electrodes. In FIG. 4A, the seating surface also includes temperature sensors (thermistors 405) positioned between the electrodes in different orientations. FIG. 4B shows a slightly enlarged view of the seating surface, including the driving electrodes, showing a thermistor 405 between the driving electrodes. The vacuum openings 407 are more clearly visible in FIG. 4B. Any shape and size of driving electrodes may be used, including interlocking driving electrodes. In addition, the pattern of driving electrodes may be formed that is not monolithic; for example the electrode pattern may include open regions that do not include driving electrodes (e.g., regions surrounding driving electrodes, etc.) as shown in FIGS. 1A and 2.

Figure 4C:
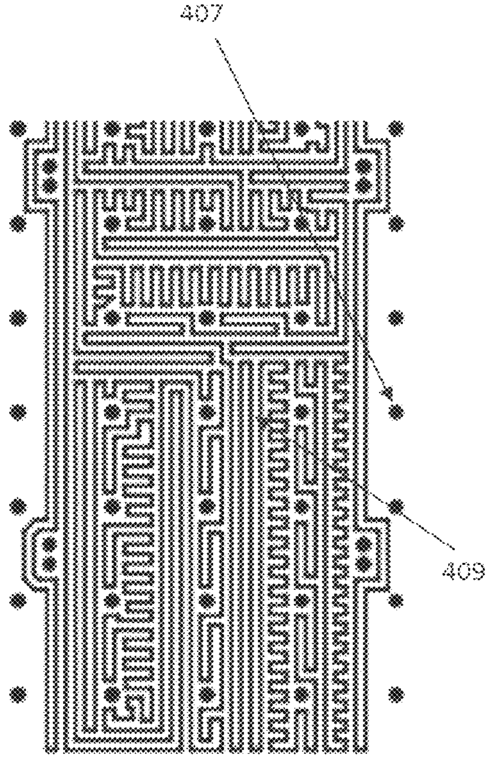
FIG. 4C illustrates a resistive heating layer that may be present beneath the electrode layer (such as is shown in FIG. 4B). One continuous, or multiple separate, trace(s) of resistive material may be used beneath the array. The black dots indicate the vacuum manifold (forming the plurality of vacuum openings through the electrodes. The resistive heating layer may be electrically isolated from the electrodes above them; the current applied through the resistive heating layer may be regionally controlled, by a controller. The controller may include PID control.

FIG. 4C shows an example of a heater that may be positioned underneath some of the drive electrodes, such as the sub-set of drive electrodes shown in FIG. 4B. In this example, resistive heating circuitry 409 may underlie the drive electrodes (e.g., embedded at any layer of the PCB forming the seating surface). In general, resistive heating and thermistors may be embedded at any layer of the electrode PCB board. The heater may be part of the PCB with the electrodes and thermistor, as shown in FIGS. 4A-4C. The current, and therefore the temperature of the driving electrodes and/or the adjacent dielectric (and therefore any droplet on the cell under the dielectric/driving electrode) may be regulated, e.g., by a PID control loop, in combination with the thermistor. To cool it down the dielectric (and the entire seating surface), a liquid cooler may be circulated through the substrate, e.g., on the bottom of the seating surface. In the example of FIG. 4C, the resistive heater is shown as a continuous trace of low-resistive material (e.g., having a resistance between about 10-15 ohms).

Any appropriate temperature regulating technique may be employed. For example, stirring (e.g., magnetic stirring) may be used. Even a small-volume droplet may contain a range of local temperatures, so the temperature distribution may have a standard deviation. This can be reduced by stirring, e.g., via magnetic beads. With enough stirring, the droplet may be brought close to isothermal. In any of these variations, the top plate may be used to help regulate the temperature. For example, the top plate may be used for heatsinking. A thermal conductor (e.g., a steel block) on top of the top plate may greatly speed up the time it takes for the top plate to cool down. If the top plate has a large thermal mass, or a mass is added to it, this may reduce the time needed for a set number of thermal cycles.

Differences in temperature between the top plate and a bottom heater (e.g., a buried heater) may help determine the temperature standard deviation. Heating the top plate in tandem with the electrode may reduce the time necessary to raise the temperature. For example, the top plate may include a local resistive heater, similar to that shown in FIG. 4C. The heated/cooled top plate may be achieved separately from the cartridge by including a top thermal mass that engages with the top of the cartridge when it is on the seating surface. For example, a heated and/or cooled top thermal mass may be a manifold that is pressed down onto the cartridge.

As mentioned, a liquid coolant may be applied to the bottom and/or the top of the cartridge. In particular, a circulating liquid coolant may be used. In some variations, the entire bottom of the cartridge may be cooled (e.g., to within 3-5 degrees of room temperature, e.g., between 15-35 degrees C.). In FIG. 5A, an example of a seating surface 501 is shown removed from the device to illustrate a liquid coolant coupled to the substrate of the seating surface so that coolant may be pumped into 503 and out of 505 through the seating surface 501.

Figure 5B:
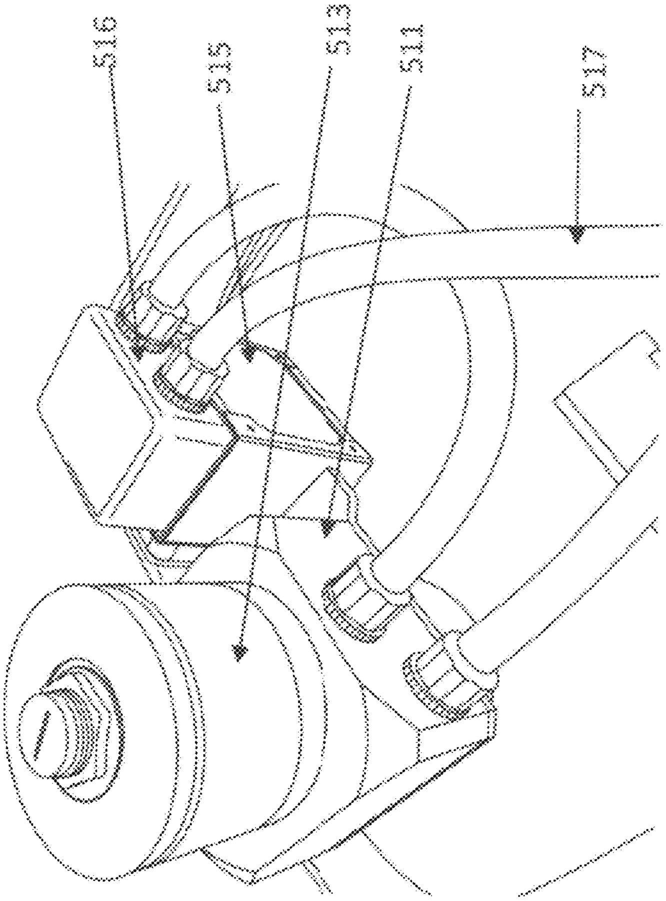
FIG. 5B shows an example of a fan and heatsink, reservoir and pump that may be used for the liquid coolant of the cartridge-contacting surface(s), including the electrodes. The pump, tubing, fan, heatsink and reservoir may be used to move water or liquid coolant below the electrodes so that the coolant can absorb the heat while passing below the electrodes, where it may then be re-circulated after being cooled again while passing through the fan and heatsink.
Figure 5A:
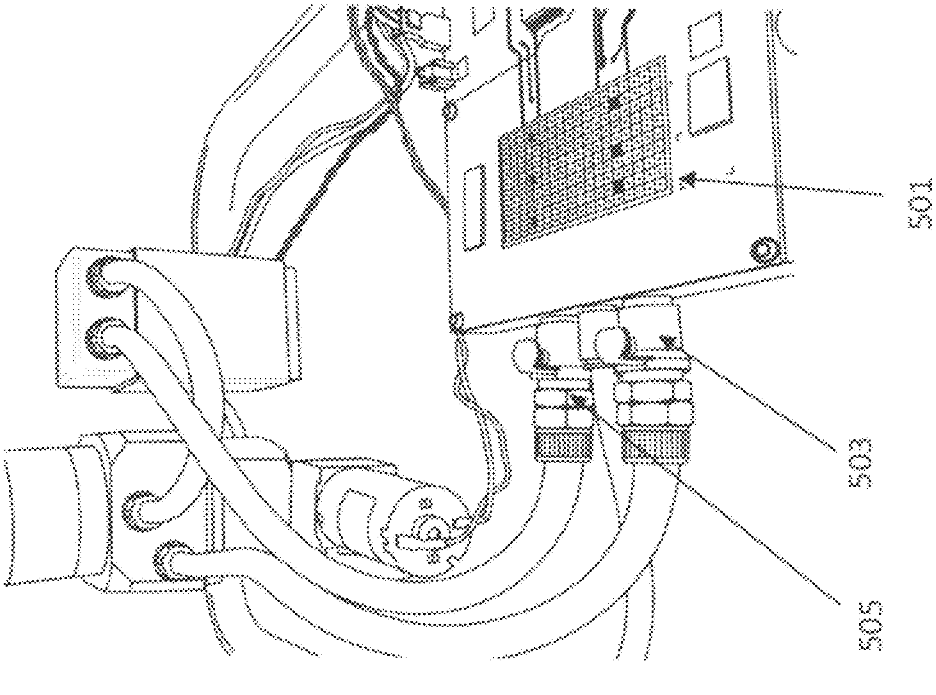
FIG. 5A shows a partially dis-assembled view of the apparatus, showing connections that may be made between the electrode-containing PCB, a liquid coolant, and the vacuum for securing the cartridge dielectric onto the electrodes.

FIG. 5B illustrates a pump 511, tubing 517, fan 515, heatsink 516 and a reservoir 513 are used to move water or liquid coolant below the electrodes. The coolant absorbs the heat while passing below the electrodes and is cooled again while passing through the fan and heatsink.

Figure 5D:
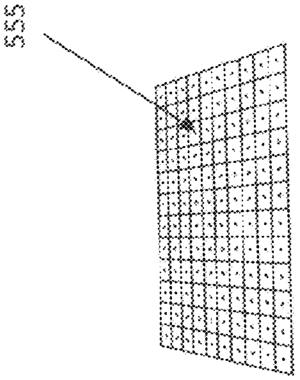
FIGS. 5D and 5E illustrate the application of vacuum to secure a cartridge (shown here as a proof of concept by just the dielectric material.
Figure 5E:
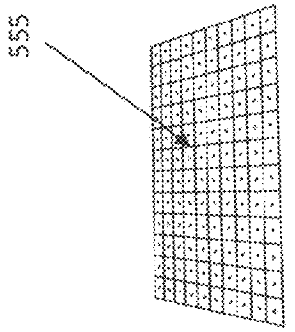

As mentioned above, the vacuum applied by the device through the openings in the electrodes permits the dielectric of the cartridge to be securely and releasably held. Openings that do not pass through the electrodes do not hold the dielectric smoothly on the seating surface. However, when the vacuum is applied through all of the driving electrodes that may be activated, the dielectric is held flat against the driving electrodes and a consistently lower energy may be applied. For example, FIGS. 5D and 5E illustrate securing a dielectric (shown unattached to a cartridge, for illustration purposes) onto a seating surface having electrodes with openings through which a vacuum is applied. In FIG. 5D the vacuum is off, and the dielectric 555 is loosely resting on the seating surface, with numerous wrinkles. In FIG. 5E, the vacuum is applied through the electrodes.

The use of a vacuum in this way allows for a reduced dielectric thickness, and thus lower power (e.g., voltage) requirements. Compared to the use of adhesive, or the use of a vacuum applied external to the electrodes, the configuration shown in FIGS. 5A-5E resulted in a reduction of the power requirements for DMF being halved. In the examples shown, the thickness of the dielectric may be between 7-13 microns. When an adhesive is used, the dielectric is almost twice as thick (e.g., 25 microns).

Figure 5C:
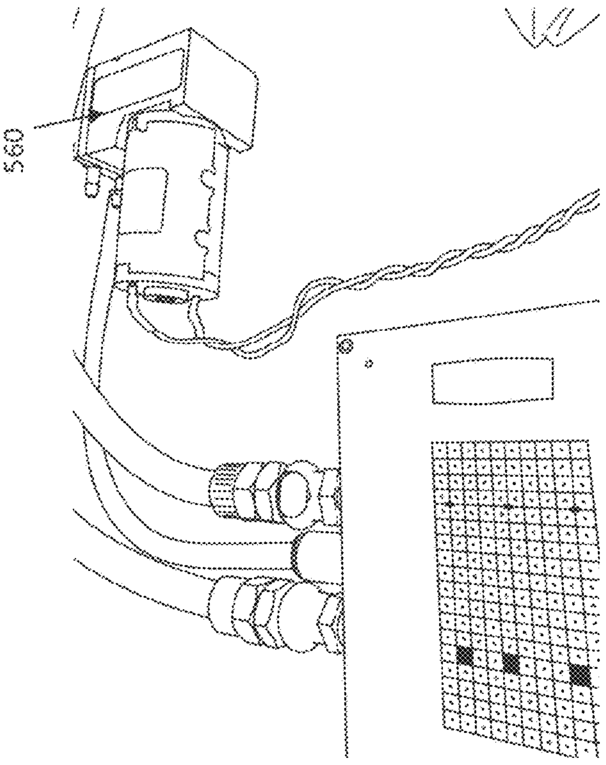
FIG. 5C shows another view of a PCB with the electrodes similar to that shown in FIGS. 4A-4C, connected to a vacuum pump as well as the liquid coolant (input and output).

In FIG. 5C, a pump 560 is shown connected via tubing to a vacuum manifold that is configured to pull air through the holes in the electrodes. The dielectric film sits on top and stays rigid as long as the pump is pulling air. In addition, any projection in the surface of the dielectric (particularly those that are around or slightly smaller than the width of the air gap of the cartridge) will not interfere with the seal, but will form enclosures, channels, barriers, or other structures within the air gap, which may help partition the air gap.

Figure 5F:
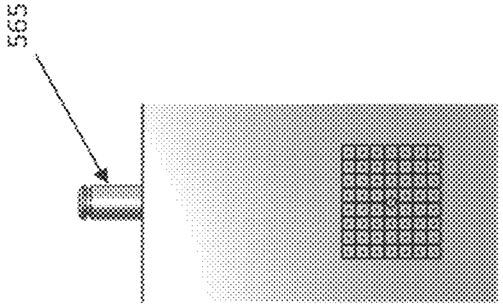
FIG. 5F shows an example of a top view of a PCB showing a small electrode array with holes formed through the central region of each electrode.
Figure 5G:
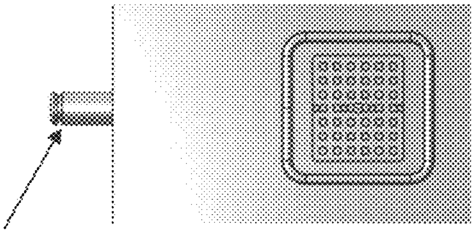
FIG. 5G shows a portion of the PCB of FIG. 5F below the electrodes (over which the other layers may be formed), showing the holes through the PCB forming that may be connected to the vacuum pump.

FIGS. 5F and 5G illustrate the upper and an intermediate layer of the seating surface, showing the connection between the vacuum source (via connector 565), though a mechanical and/or tubing manifold (FIG. 5G) and out of the openings through the electrodes (FIG. 5F).

Figure 9B:
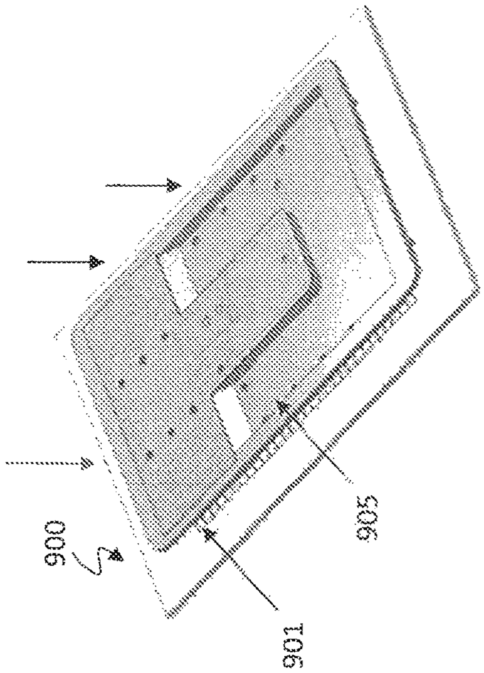
FIG. 9B shows a cartridge over the open array, held in place by a vacuum to keep it rigidly attached over the electrodes.
Figure 9A:
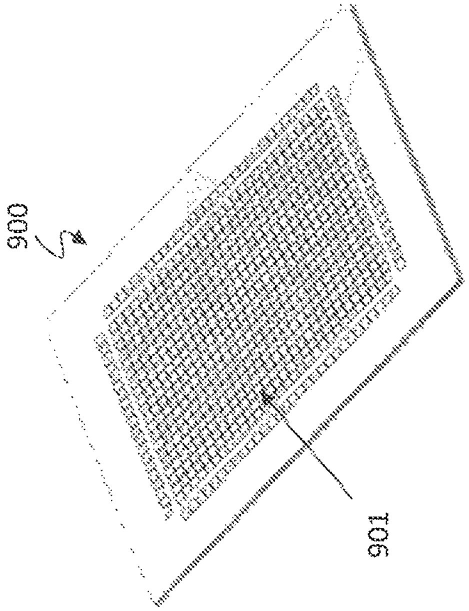
FIG. 9A shows an example of an open array of electrodes under a disposable plastic top plate and a dielectric.
Figure 9C:
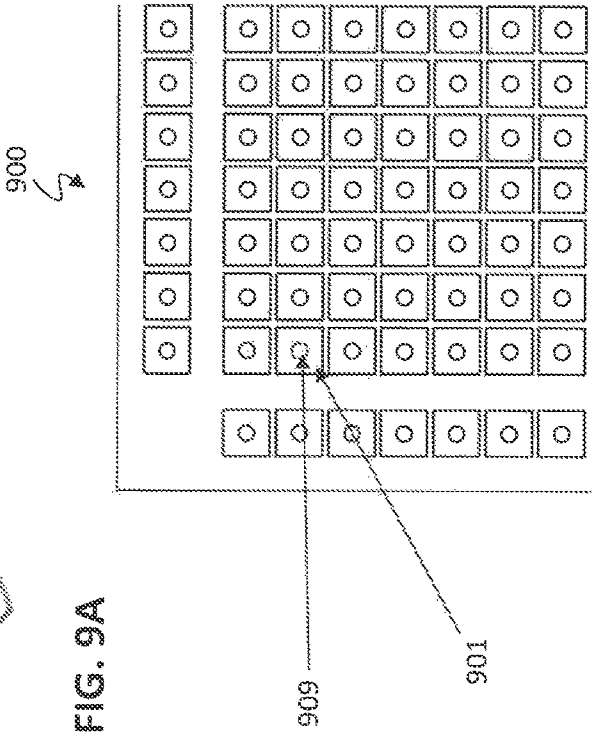
FIG. 9C illustrates the use of openings through the electrode array; these openings may be used to apply suction (e.g., vacuum) sufficient to hold the cartridge (e.g., the bottom, dielectric layer) aligned and secured to the apparatus. Positive pressure may be applied to release the cartridge.

FIGS. 9A to 9C illustrate an example of a seating surface 900 onto which the cartridge may be held by the vacuum ports through the electrodes. In FIG. 9A, the seating surface is formed on a substrate (e.g., a PCB or other electrically insulated surface), and includes an array of electrode 901, shown in this example as quadrilateral (e.g., square) shapes. Any other appropriate shape may be used. The drive electrodes 901 are thin conductive surfaces that may be flush or substantially flush with the seating surface, or may project slightly above the seating surface. In FIG. 9B, a cartridge 905 is shown placed atop the array of drive electrodes 901 on the seating surface 900. This cartridge may be placed on the seating surface by a drawer (as shown in FIGS. 3E and 3F, above. Once on the seating surface, a vacuum may be applied through all or a subset of the drive electrodes (e.g., those over which a fluid will be transported in the air gap) to hold the dielectric (and therefore the cartridge) in position. As mentioned above, without the vacuum being applied through the electrodes themselves, more energy may be required to drive fluid within the air gap reliably, and the dielectric must be thicker. FIG. 9C shows an enlarged view of a portion of the seating surface 900, showing electrodes 901 having a central opening 909 into the vacuum manifold.

The seating surface of the apparatus may be divided up into functional regions, controlling the location and operation of different portions, including heating, magnetic bead control, washing, adding solution(s), cooling, imaging/detecting, etc. These regions may be defined in the DMF reader apparatus. For example, returning now to FIG. 6, FIG. 6 illustrates different functional regions that are defined based on the connections within and/or beneath (or in some variations, above) the seating surface. For example, in FIG. 6, solution may be dispensed through the top of the cartridge (e.g., the top plate), via one or more holes. The drive electrodes under the secured dielectric may therefore form a plurality of unit cells (one drive electrode per unit cell), and each cell or region of cells (multiple cells) may be controlled to perform a specified function. For example, in FIG. 6, the DMF apparatus includes an arrangement of zones or unit cells such as cooling zones (e.g., cooling via underlying Peltier zone) 605 that are arranged around the periphery of the cartridge. These regions may also be used to store solution, and may be held at between 3 degrees C. and 20 degrees C. (e.g., below 10 degrees C., between about 2 degrees C. and 25 degrees). The central heating zone(s) 609 may be used for heating a droplet. One or more magnetic zones 603 may be used for turning on/off magnetic fields that may be useful to immobilize a magnetic particle (e.g., for removing a material, etc.). Any of the zones may overlap. For example, at least one unit cell in the heating zone may also be a magnetic zone. Other functional zones include imaging/optical zones. In this case, the dual functions may be possible because the magnet may be positioned right under the heating zone when using resistive heating.

Figure 6:
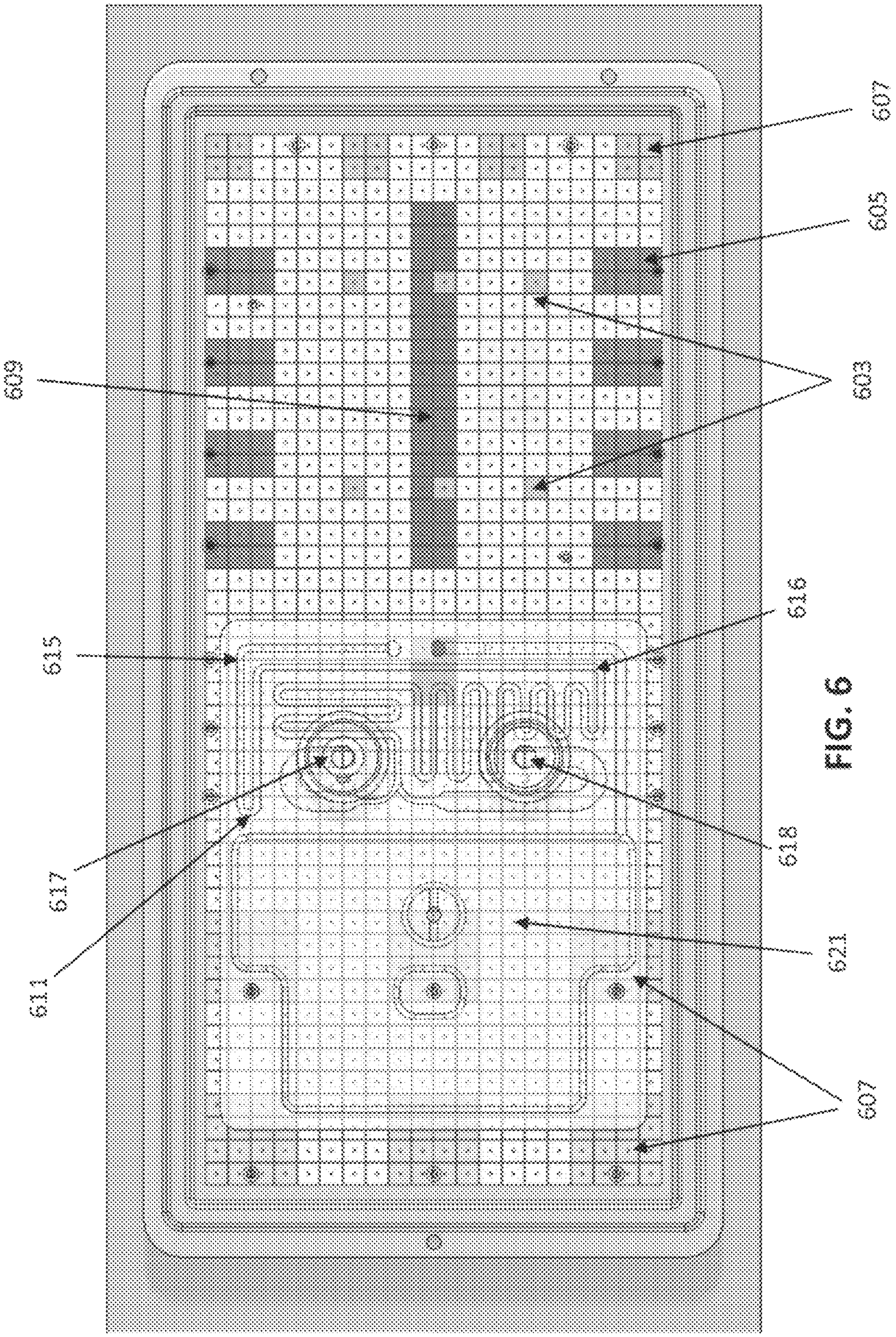
FIG. 6 illustrates the different functional regions that maybe formed by the electrode array and/or removable cartridge.

In addition to the zones formed by the configuration of the seating surface of the DMF apparatus, functional zones for providing an aliquot of solution, mixing a solution, and/removing solutions may be formed into the cartridge, e.g., but cutting into the top plate to provide intimate access the air gap. In FIG. 6, the upper (top plate) microfluidics region has been made transparent. In general, a micro channel may be used for mixing, dispensing and taking to waste on top plate from the air gap region. In addition, any of these cartridges may also include a reagent reservoir in the top plate. The microfluidics may be controlled by one or more valves (e.g., valve control) for dispensing and mixing and taking to waste.

Cartridges

In general a cartridge as described herein may include a dielectric, a first hydrophobic coating on the dielectric, a second hydrophobic coating on a ground electrode (and/or top pate) and the top plate onto which the ground electrode is coupled. The hydrophobic coating may be a Teflon coating, for example. The cartridge may also include one or more microfluidic channels, particularly those formed directly into the top plate with controlled access into the air gap.

For example, FIGS. 7A-7D illustrate one example of a cartridge 700 including a microfluidics region 703 on the upper surface, covered by a cover 703 having one or more access ports 705, 707 for accessing the microfluidics portion of the device. The cover 703 may also include one or more valves and/or one or more openings 709 that may be used for delivering removing fluid and/or gas (e.g., air). The cartridge may also include openings through the top plate 713, including openings that connect the microfluidics channel to the air gap region within the channel.

Figure 7A:
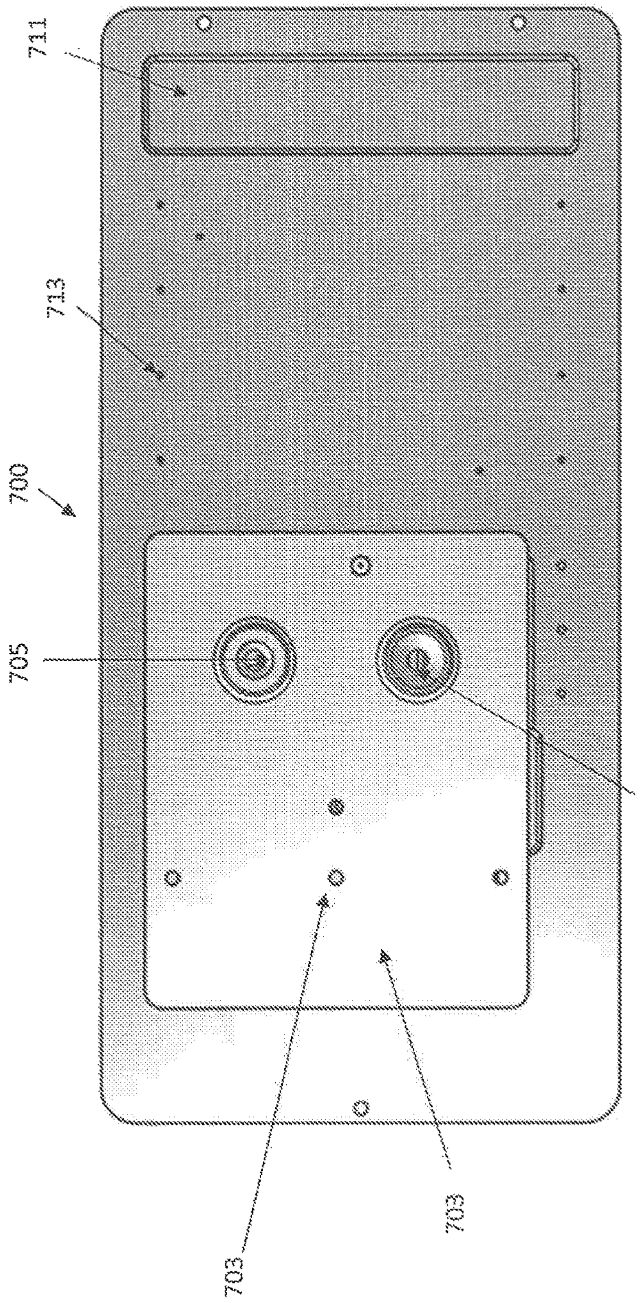
FIG. 7A is a top view of an exemplary cartridge as described herein. In this example the cartridge includes a DMF portion, including a top plate and dielectric, separated by an air gap, and a microfluidics portion that connects into the air gap, and may externally connect to a channel input and/or output. Fluid may be applied into the cartridge through one or more openings into the air gap (shown as small openings) and/or through the channel input/outputs. The right side of the cartridge includes a window region, allowing optical viewing through the cartridge.
Figure 7B:
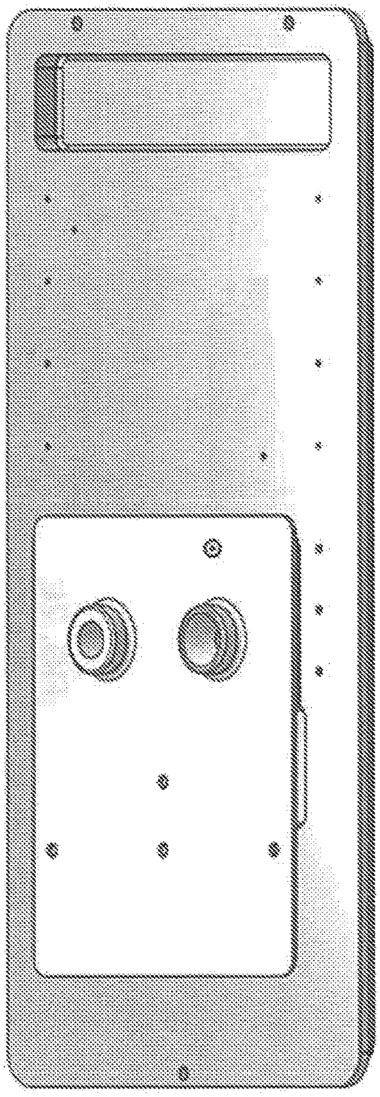
FIG. 7B shows a top perspective view of the cartridge of FIG. 7A.
Figure 7C:
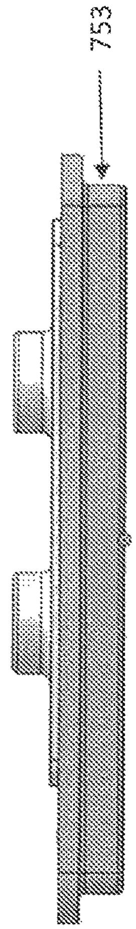
FIG. 7C is an end or side view from the left side of the cartridge of FIGS. 7A and 7B, showing the upper microfluidics channels and the lower DMF portion (showing the spacing between the top, ground, plate and the dielectric, forming the air gap.
Figure 7D:
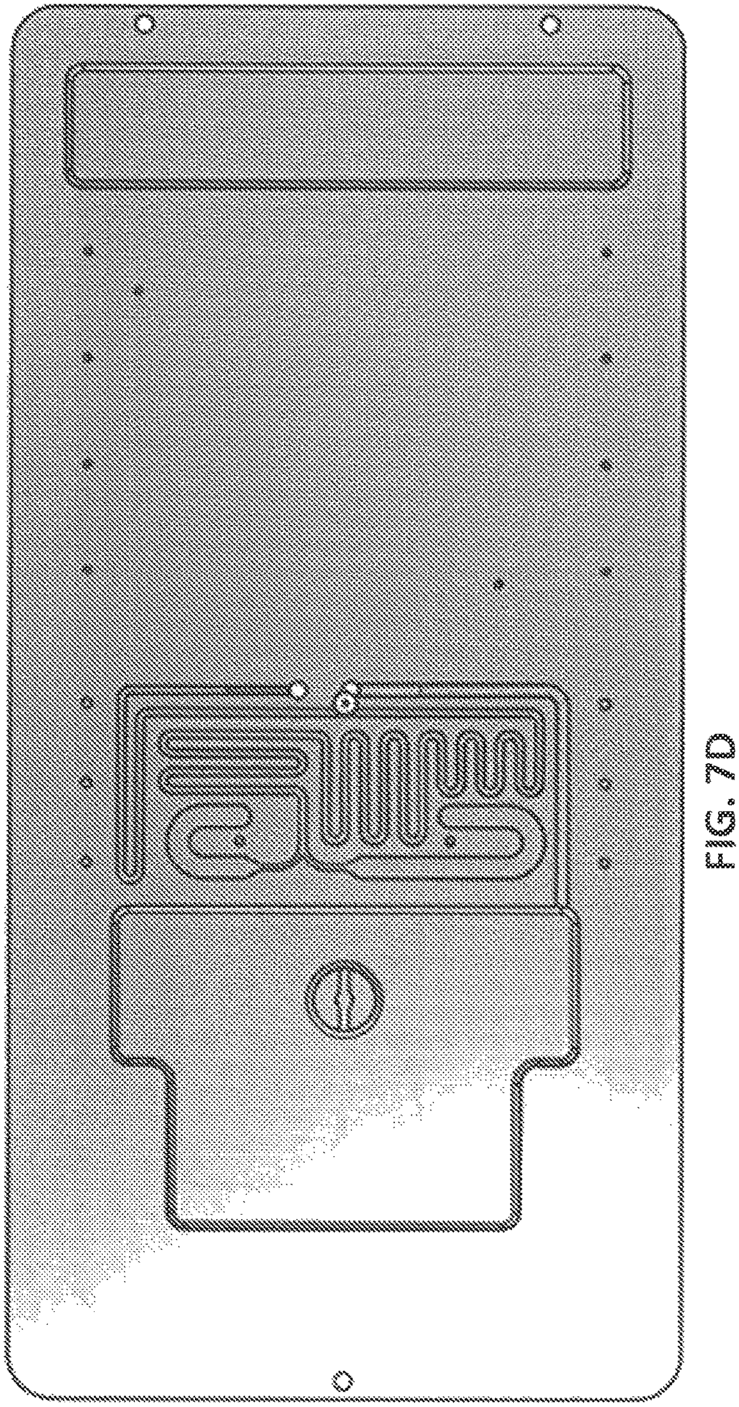
FIG. 7D is a top view of the cartridge of FIGS. 7A-7C, with the cover for the microfluidics channels removed, showing the channels.

Any of the cartridges described herein may also include one or more transparent window regions 711 for optically imaging one or more regions (readout regions) within the air gap. FIG. 7B is a top perspective view of the cartridge of FIG. 7A. FIG. 7B shows a side view of the cartridge, showing the lowest bottom dielectric film 751 material. The air gap is not visible in FIG. 7C, but may refer to the spacing 753 between the dielectric and the ground electrodes. FIG. 7D shows the top plate with the cover removed. Comparing FIG. 7A to FIG. 7D, with the top removed, both the first and the second microfluidics channels are shown, each with an opening from the microfluidics channel into the air gap. In FIG. 7D, the two channels may be simultaneously used by pushing/pulling fluid through one channel into the cell underlying them for rinsing, mixing, removing waste, etc. In FIGS. 7A-7D, there are via holes through the top plate in to air. Although the top plate may be thicker, in some variations it may be beneficial to include more reagents, including freeze-dried reagents that may be rehydrated.

Figure 8B:
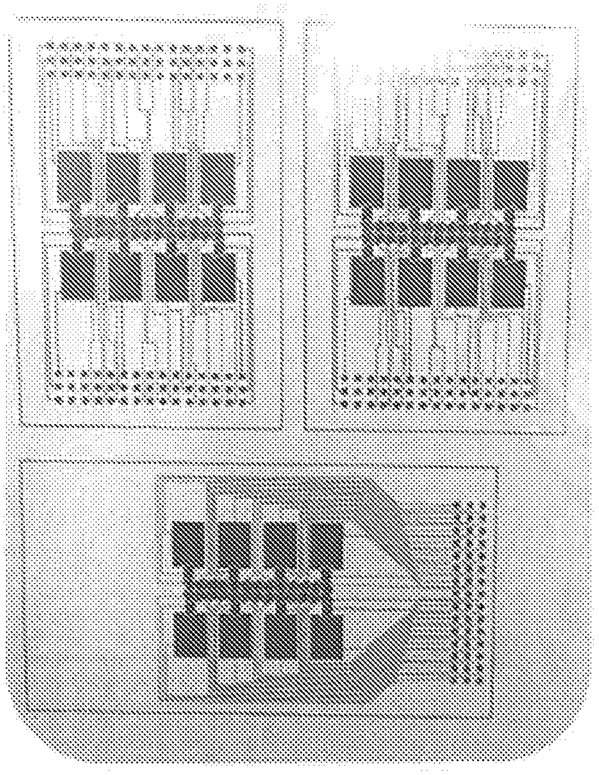
FIG. 8B shows paper digital microfluidics that may be used as part of a cartridge.
Figure 8A:
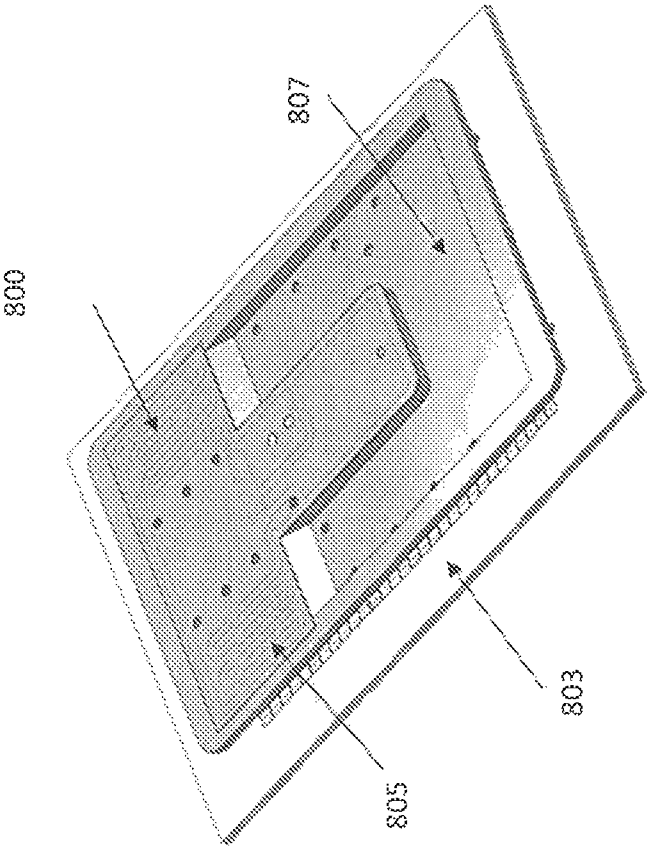
FIG. 8A is an example of a disposable cartridge, including a plastic top plate and a dielectric.

FIGS. 8A-8B illustrate different example of cartridges that may be used. In FIG. 8A, an exemplary cartridge 800 (similar to that shown in FIGS. 7A-7D) is shown over a seating surface 803 including electrodes. The cartridge 800 includes a microfluidics portion 805 formed above the air gap (not visible in FIG. 8A), on one end of the cartridge. The other end of the cartridge includes a window region 807 through which a portion of the air gap may be imaged. The both the front (window) region and the back (microfluidics) regions of the cartridge may include access regions for accessing the air gap and/or microfluidics portions. In FIG. 8B, three different DMF design configurations on paper are shown. Paper DMF devices were formed by inkjet printing arrays of silver driving electrodes and reservoirs connected to contact pads onto paper substrates.

Figure 10A:
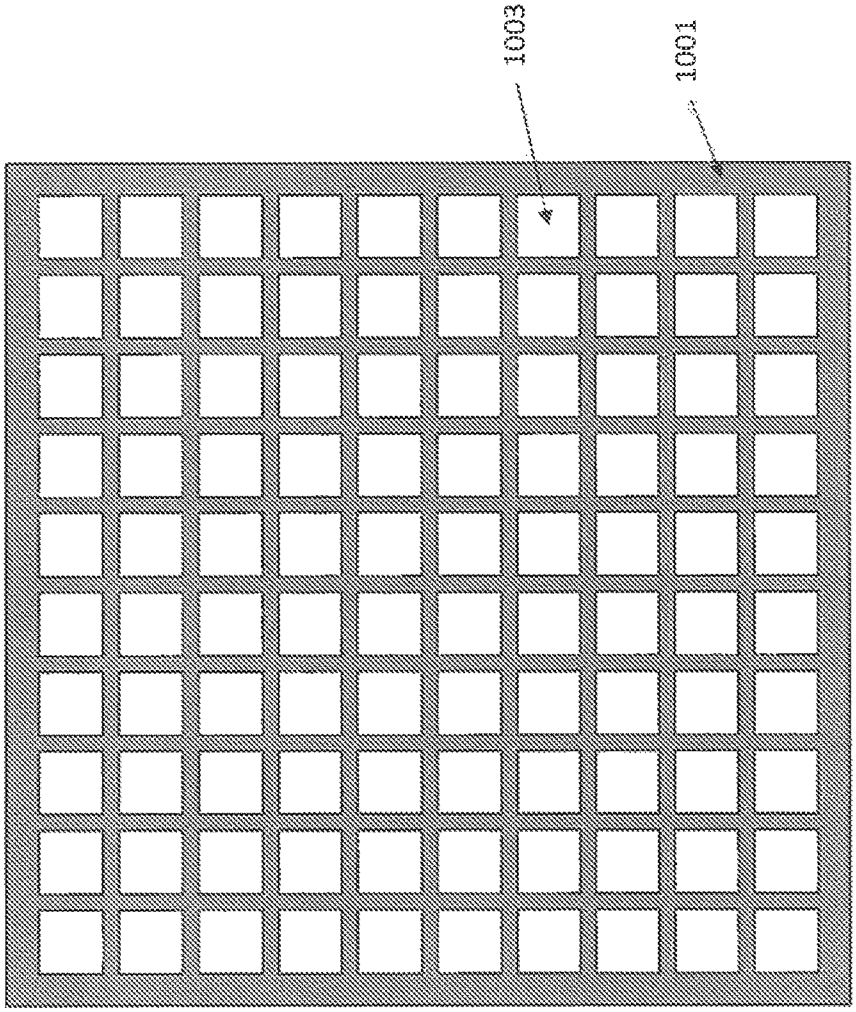
FIG. 10A schematically illustrates an example of a patterned ground electrode on a top plate as described herein.
Figure 10B:
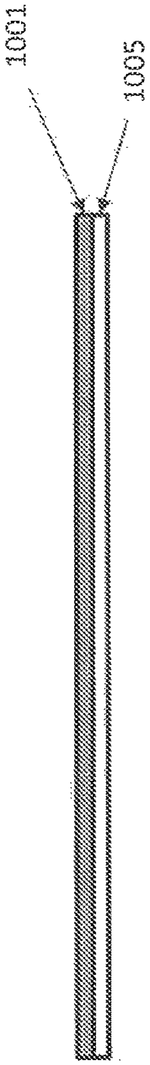
FIG. 10B shows a side view of the patterned top plate shown in FIG. 8A.

Within the cartridge, the top plate may be any appropriate material, including transparent materials, such as acrylics. The top plate may be formed of (or may contain) one or more conductive polymers. The ground electrode(s) may be formed on the top plate. In particular, the ground electrode may be formed of a conductive material, including in particular, printed conductive materials, such as conductive inks. The return electrode may be, in particular, a pattern (e.g., a grid pattern) having a plurality of window openings forming the grid. The pattern may be selected so that when the cartridge is secured to the seating surface of the reader the window openings align with the drive electrodes. In FIG. 10A, the ground electrode 1001 is shown, having a grid pattern including a plurality of open, square-shaped windows 1003. As already mentioned, the window openings forming the grid pattern may be any appropriate shape, including other quadrilateral shapes (e.g., rectangular, etc.), other polygonal shapes, elliptical (e.g., circular, oval, etc.) shapes, regular and non-regular shapes. An additional layer, such as a hydrophobic layer, may overlay both the conductive material pattern and the plate. FIG. 10B shows an exemplary side view (thickness not to scale) showing the plate 1005 and the conductive, patterned electrode 1001. In general, none of the figures described herein are necessarily show to scale, unless indicated otherwise.

Figure 11A:
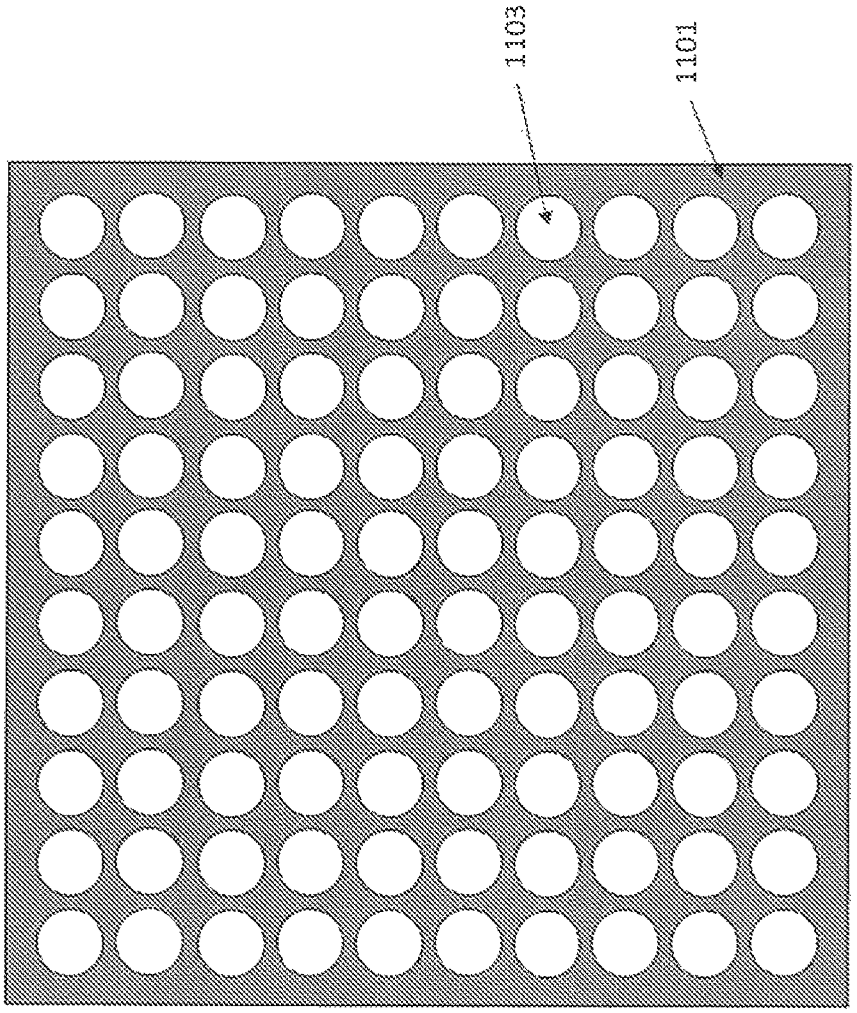
FIGS. 11A and 11B show front and side views, respectively, of another variation of a top plate including a ground electrode formed of a non-transparent conductive ink (e.g., silver conductive ink, carbon conductive ink, etc.), formed in a grid pattern including a plurality of window openings forming the grid.
Figure 11B:
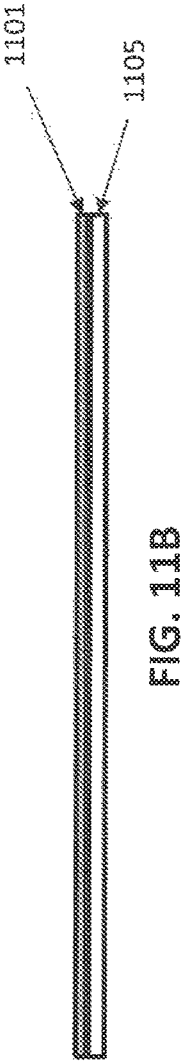

FIGS. 11A and 11B show another example of a ground electrode 1101 formed into a grid pattern, having elliptical 1103 (in this example, circular) window openings, formed onto a first plate 1105.

For example, the electrode may be formed of a conductive ink such as a silver ink, as shown in FIG. 8B. Such printable inks may have advantages over other conductive materials previously described, such as ITO, despite not being clear. The use of silver nanoparticles formed into a grid may result in lower, more repeatable and more accurate energy requirements. In FIG. 10A-10B, the pattern of the electrode has a minimum thickness of between about 50 and 200 microns (e.g., 100 microns). The outline around the open windows may be configured to be positioned over the spaces between adjacent electrodes in the drive electrode array. When the cartridge is aligned and secured in position over the drive electrodes, the overlap spacing between the drive electrodes on the bottom plate are covered, but the central regions (which in particular, may include openings for applying the vacuum as described above) may be centered in the window. Since many conductive inks (e.g., including silver ink) are not transparent, the open windows may allow visualization of the air gap beneath the ground electrode. Although the minimum thickness may be between 50 and 150 microns, in practice, the minimum thickness of the grid pattern may be greater than 100 microns width; for example, the minimum thickness may be between 100 and 200 microns.

Figure 12B:
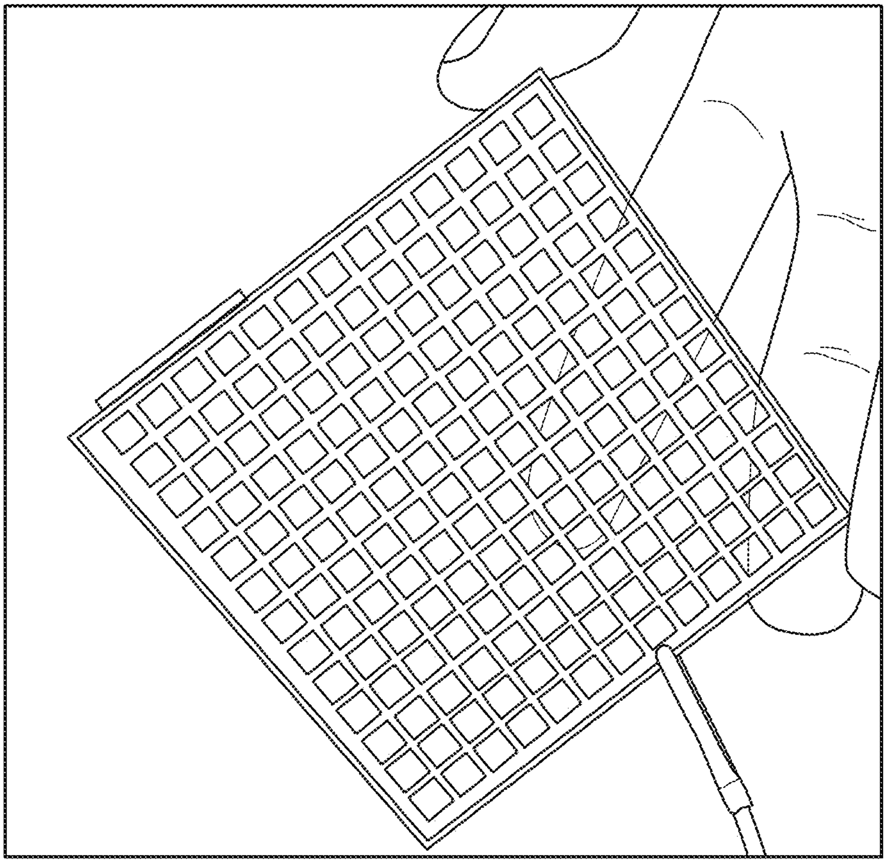
FIG. 12B shows an example of a patterned top plate ground electrode (including a plurality of openings there through).
Figure 12A:
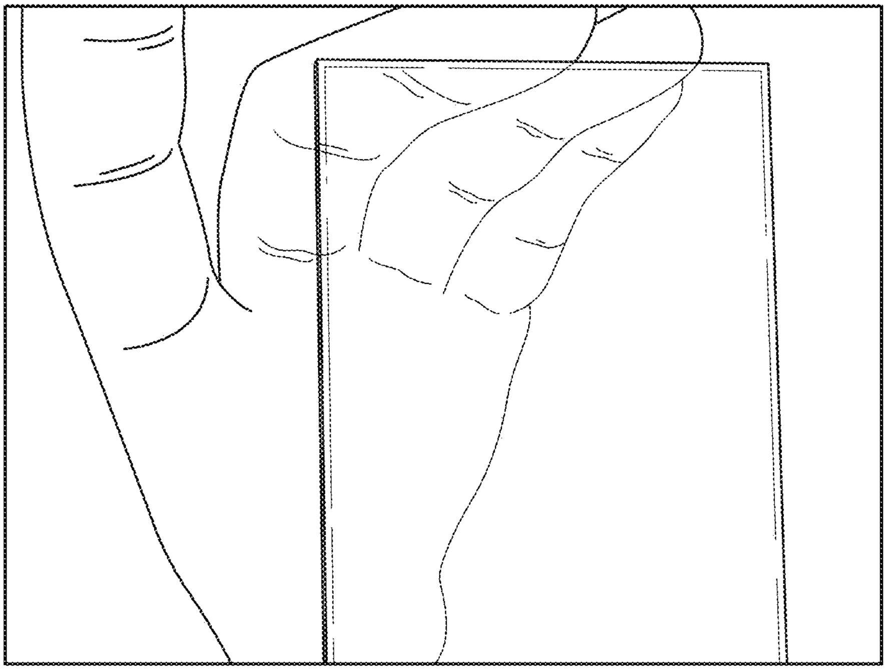
FIG. 12A is an example of conductive ink applied to form the ground electrode on a top plate.

The ground electrode may be formed onto a substrate (e.g., top plate) in any appropriate manner For example, FIGS. 12A and 12B illustrate two methods of forming the ground electrode. In FIG. 12A, the top electrode is formed by coating the clear substrate with a conductive ink, and allowing the resulting layer to dry. In FIG. 12B, a pattern such as those described above, is formed by a printing technique (e.g., screening, printing, etc.). In FIG. 12B, the pattern is formed by printing a conductive silver nanoparticle ink in a pattern similar to that shown in FIG. 10A.

Figure 13A:
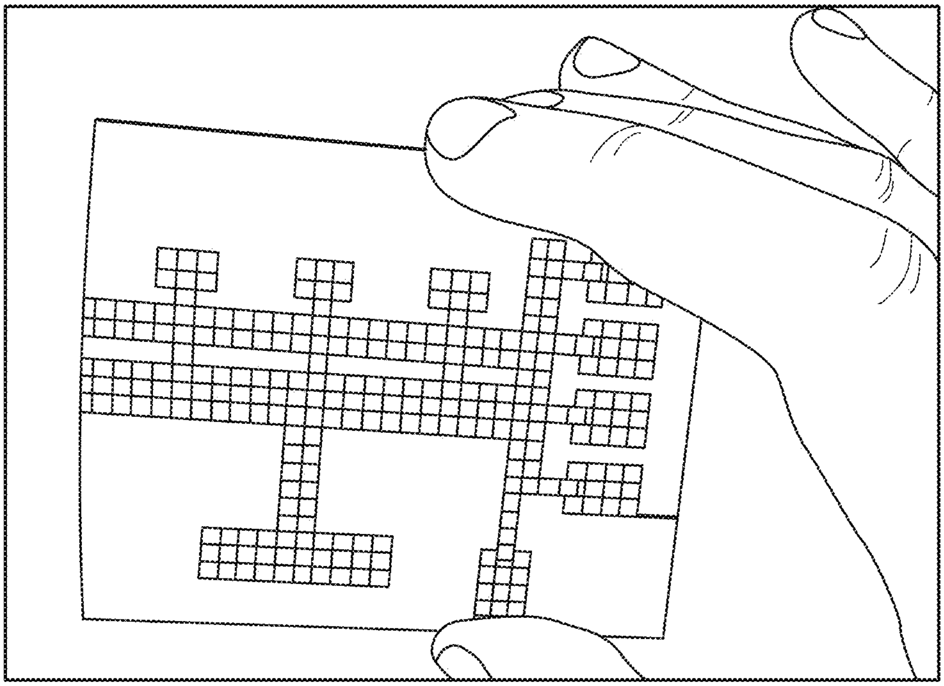
FIGS. 13A and 13B illustrate example of patterned ground electrodes (top plates) on a flexible, transparent substrate.
Figure 13B:
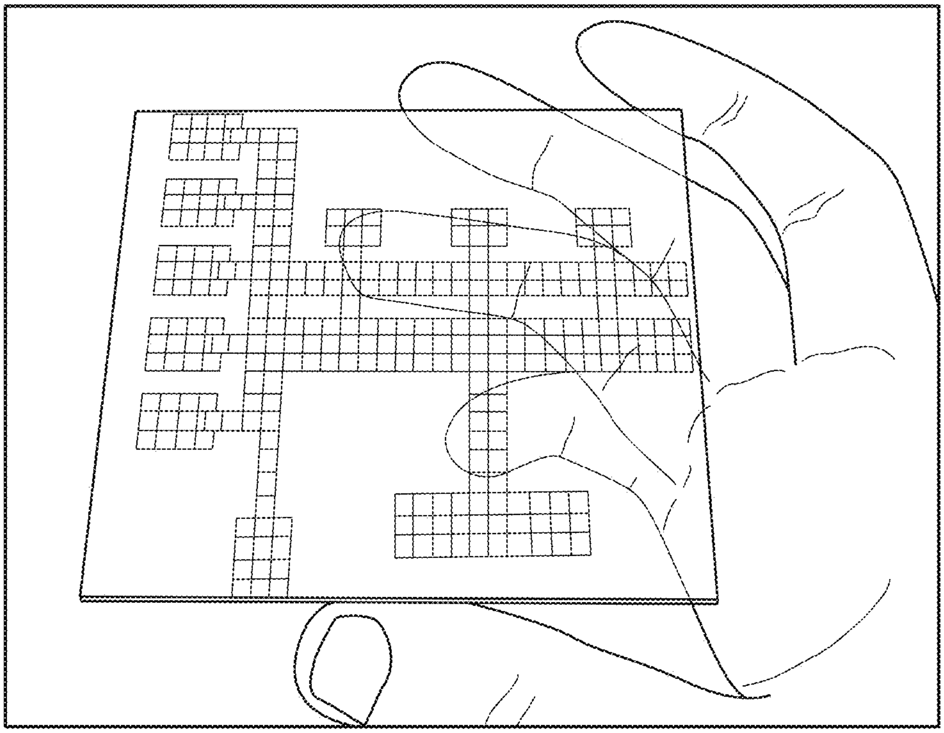
Figure 14C:
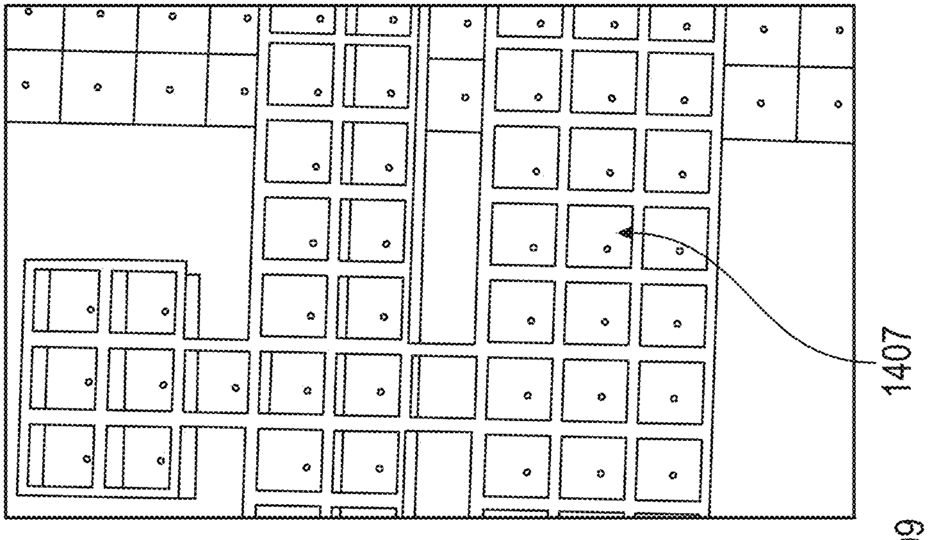
FIGS. 14A-14C illustrate operation of a DMF apparatus using a patterned ground electrode.
Figure 14B:
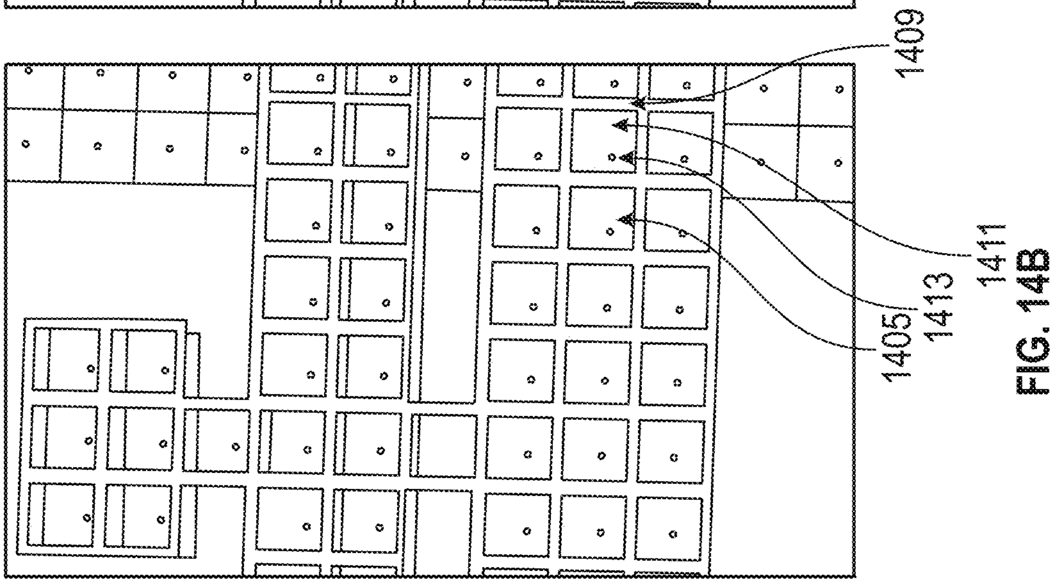
Figure 14A:
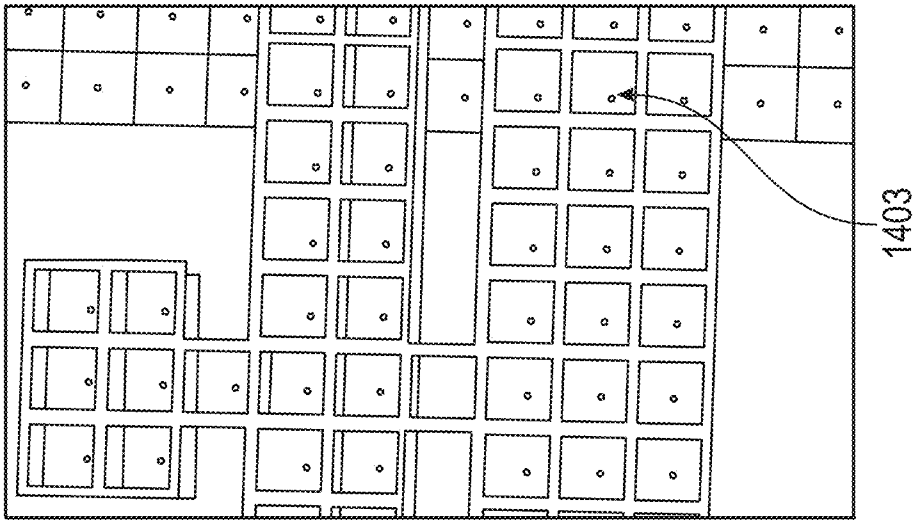

FIGS. 13A and 13B show an example of a top plate having a grid patterned ground electrode. In FIGS. 13A and 13B the grid pattern is formed into a second order pattern having regions including reservoirs for storing fluids in the air gap, as well as passages and chambers where different reactions (heating, mixing, cooling, etc.) may be performed. FIGS. 14A-14C illustrate operation of the ground plate of FIG. 13A-13B, showing the drive electrodes driving movement of a droplet using this ground plate configuration in the cartridge. In FIG. 14A a droplet 1403 is held in the air gap on a first unit cell. In FIG. 14A, the air gap is between a dielectric that is pulled down onto the seating surface and the driving electrodes by a vacuum pulled though the driving electrodes. The pattern of the grid forming the ground electrode matches the arrangement of the driving electrodes in the seating surface. The drive electrodes 1411 each include an opening 1413 connected to a vacuum manifold through which vacuum is applied to hold the dielectric, and therefore the cartridge, in position.

Between FIG. 14A and FIG. 14B, power is applied to the electrode underlying the droplet and to one or more adjacent electrodes in a sequence allowing a change in the electrowetting of the droplet, driving the droplet 1405 to the left, as shown in FIG. 14B; this process may be repeated, as shown in FIG. 14C, moving the droplet to another unit cell 1407 in the air gap. The movement using the grid-patterned ground electrode is equivalent or better than the movement of a monolithic ground electrode.

In any of these variations the return electrode(s) on the top plate of the cartridge may be formed of a material that is layered onto the top plate. For example, the electrically conductive layer forming the return electrode eon the top plate may be formed of aluminum and a film of dielectric and/or hydrophobic material. In some variations, the electrode(s) may be formed of ITO, an adhesive and a dielectric and/or hydrophobic film. In some variations the conductor may be formed of an ITO film (including a primer and Teflon coating).

Figure 15C:
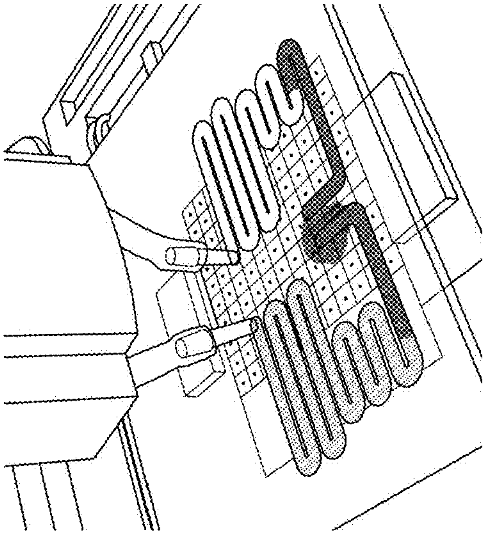
FIGS. 15A-15C illustrate one example of a microfluidics channel interfacing with a DMF air gap region as described herein.
Figure 15B:
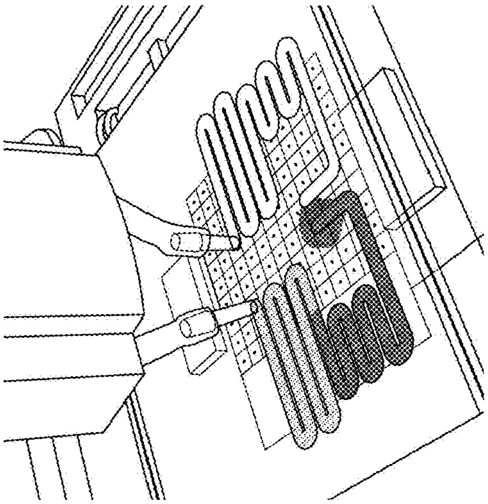
Figure 15A:
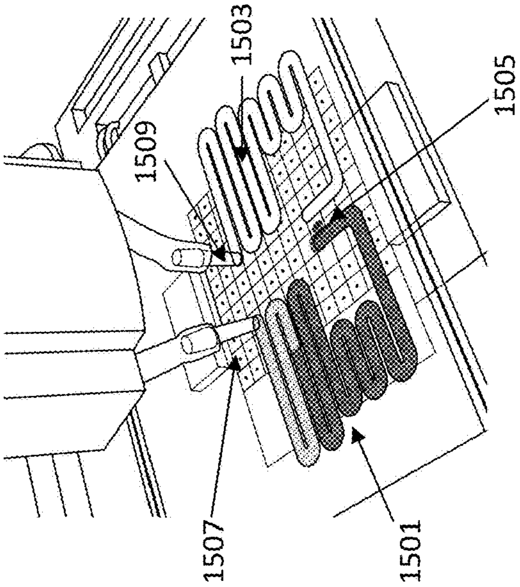

As already discussed above, any of these apparatuses and methods may include one or more microfluidics channel(s) integrated into the cartridge. In particular, the apparatus may include a microfluidics mixing and extraction region. This is illustrated in FIGS. 15A-15C. For example two microfluidics channels 1501, 1503 may be formed into the top plate of the air gap, and an opening in to the air gap may be positioned within a fixed distance from each other. Fluid may be passed from one microfluidics channel to another microfluidics channel, through the air gap. The region of the air gap between these openings may bridge these two regions 1505. This configuration may be used to mix a larger droplet (e.g., greater than 5 microliters, greater than 7 microliters, greater than 10 microliters, greater than 15 microliters, greater than 20 microliters, greater than 25 microliters, greater than 30 microliters, greater than 1 ml, etc.) than could be easily done within the air gap.

For example, in FIG. 15A, a first pressure source 1507 (negative pressure and/or positive pressure) is shown attached to one end of the microfluidics channel, and a second pressure source 1509 (positive and/or negative pressure) is shown attached to another microfluidics channel. Fluid may be withdrawn from the air gap through the opening 1505 into the first channel 1501; alternatively or additionally, by applying positive pressure 1507, fluid may be moved from the first channel 1501 into the air gap through the opening 1505; concurrently, fluid may be drawn from the air gap at or near the same opening 1505 into the second channel by applying negative pressure 1509 within the second channel. Alternating positive and negative pressure may pass relatively larger volumes of solution between the two microfluidics channels, in and out of the air gap, as shown in FIGS. 15B and 15C.

In the example shown in FIGS. 15A-15C, the top plate integrates microfluidic channels, as well as reservoirs and tubing; alternatively or additionally, one or more ports (e.g., for connecting to the pressure source(s), valves, and the like may be included. For example, a cover over the microfluidics channels may be included with port(s) and/or valves and the like. Positive and negative pressure may be applied within the microfluidics channel(s), for example, by reversing the polarity of a peristaltic pump.

Figure 16A:
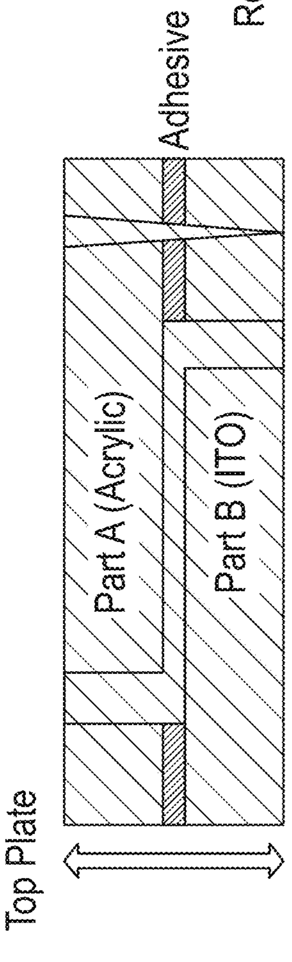
FIG. 16A shows one example of a section through a top plate to form a microfluidics channel immediately adjacent to the DMF portion (e.g., above or below the DMF portion, as part of the top plate).

FIGS. 16A-16D illustrate examples of microfluidics channels that may be included. For example, FIG. 16A illustrates the formation of a microfluidics channel formed in part by the top plate. In FIG. 16A, a portion of the channel may be formed in the plate (e.g., the acrylic plate) itself, where a second portion of the channel may be formed from another material that has its other side coated with a conductive material (i.e., indium tin oxide, copper, nickel, chromium and gold). The layers may be held together by an adhesive, and/or may be bonded together.

For example, microfluidic channels in any of the cartridges and apparatuses described herein may be formed by laser cutting. For example, in FIG. 16A, a raster channel may be cut into part B (the acrylic forming the top plate), and a hole may be cut in part B. In addition, one or more pump holes may be cut into part A. a double-sided adhesive (e.g., tape) may be used to secure part A to part B, and a roller may be used to place part A on part B, avoiding air bubbles. Thereafter, pipette holes may be cut out for dispensing reagents, and the bottom may be Teflon (e.g., hydrophobic) coated and the entire assembly baked at between 80-200 degrees (e.g., between 90-18 degrees, etc.). The ground electrode may already be formed onto the plate.

Figure 16B:
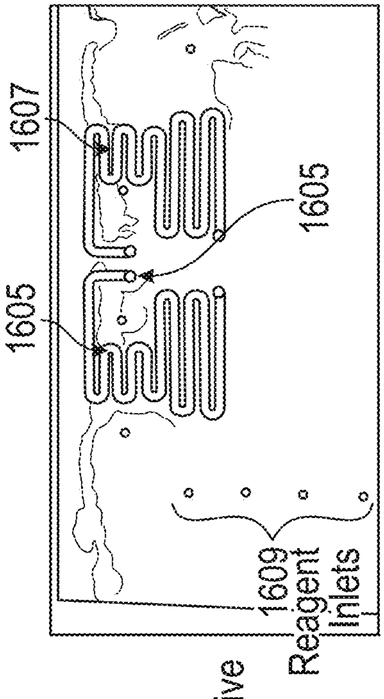
FIG. 16B shows an example of a top plate into which microfluidic channels have been formed.
Figure 16C:
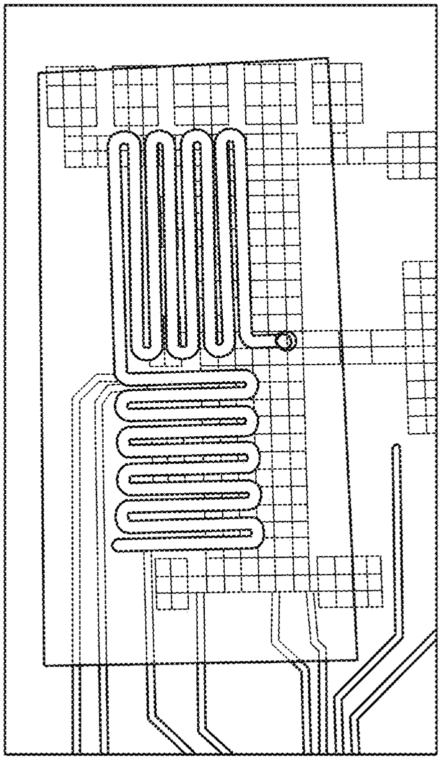
FIG. 16C is another example of a top plate of a DMF apparatus configured as a microfluidics channel. The top plate is shown as an acrylic material into which channels and holes have been formed (e.g., by milling, cutting, rastering, etc.).
Figure 16D:
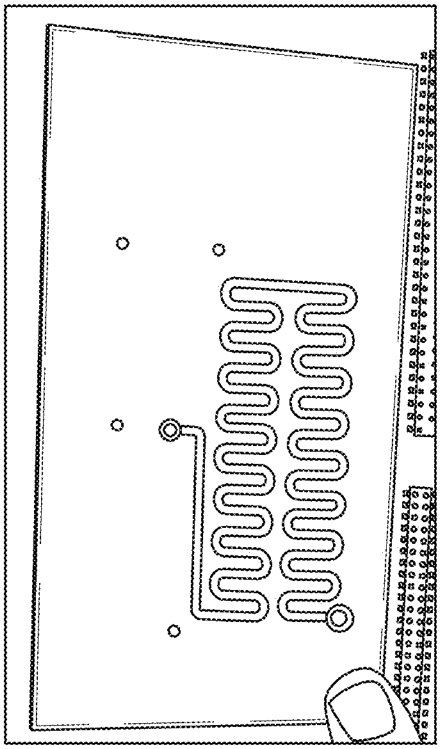
FIG. 16D shows another example of a microfluidics channel formed into a top plate of a DMF portion of a cartridge.

FIG. 16B illustrates another example of a set of microfluidic channels 1605, 1607 formed into the top plate. A set of reagent inlets 1609 are shown as well, providing openings into the air gap region for loading regents. Alternatively or additionally, reagents may be pre-loaded (wet or dry/lyophilized) into the cartridge, including in one or more reservoirs above the top plate or in the top plate, e.g., in a microfluidics channel, and/or directly into the air gap region. FIGS. 16C and 16D illustrate additional examples of microfluidics channels that may be formed into a top plate of a cartridge.

Figure 17A:
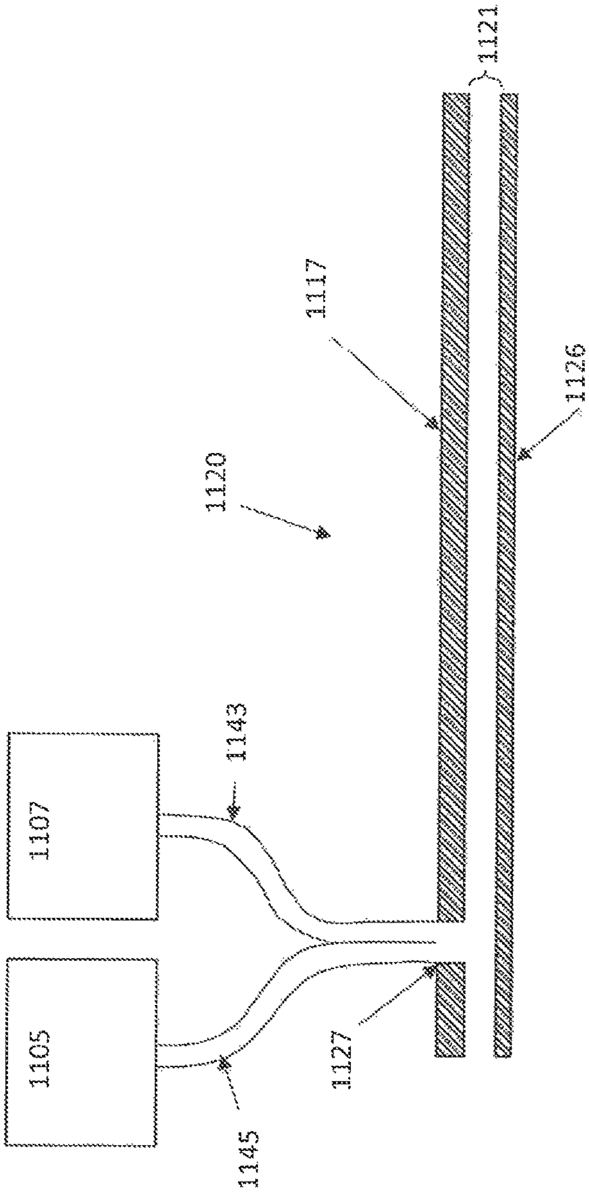
FIGS. 17A and 17B illustrate extraction and mixing of fluid in a DMF apparatus (e.g., cartridge) as described herein, using a fluid application and extraction technique that includes a bifurcated channel, allowing a large volume of fluid to be exchanged between two reservoirs.
Figure 17B:
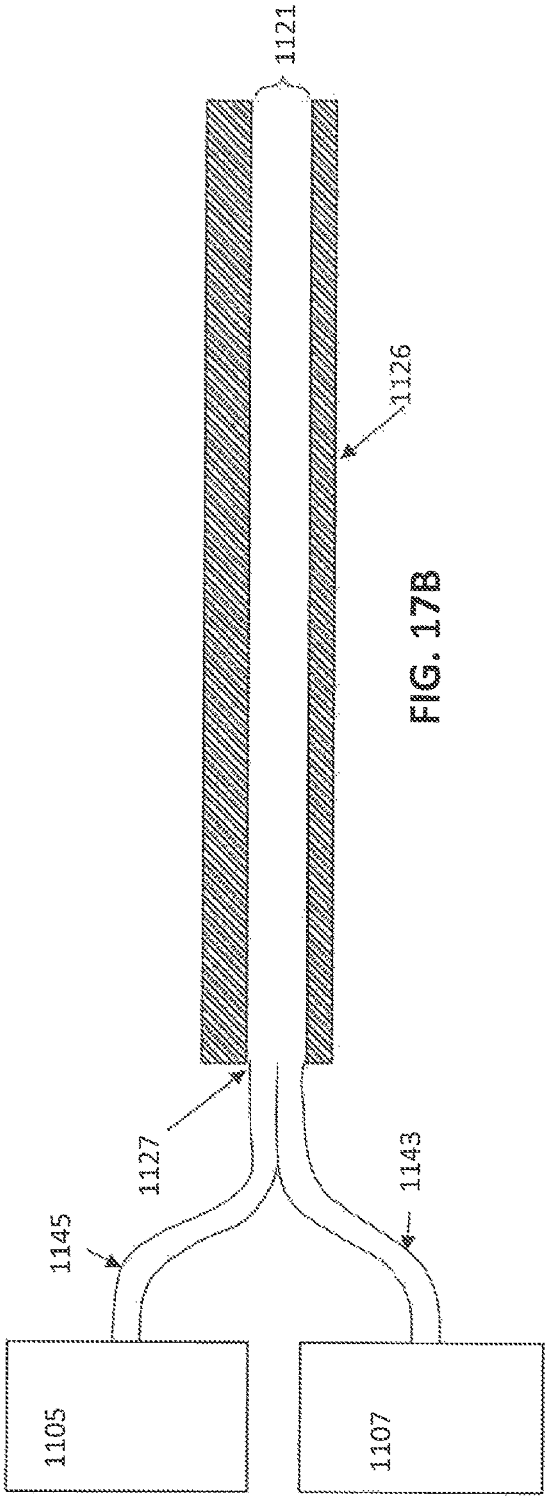

FIGS. 17A and 17B illustrate schematically examples of a method for applying and removing (including washing) fluid to/from the air gap of a DMF apparatus 1120. In FIG. 17A, for example, the air gap 1121 of the cartridge is formed between the top plate 1117 and the bottom dielectric 1126. A connector interface 1127 connects a combined inlet/outlet port for a first fluid channel 1143 and a second fluid channel 1145. These fluid channels may be connected one or more reservoirs 1105, 1107. As already described above, in some variations, two separate connector interfaces (ports) may be used, one connected to each fluid line (e.g., which may be a microfluidics channel, as described above). A bridging droplet in the air gap region 1121 may connect to both inlet and outlet lines, and fluid may be drawn into and out of the fluid lines 1143, 1145 to mix the droplet, add fluid to the droplet, remove fluid from the droplet, expose a solid phase capture element (e.g., magnetic bead, non-magnetic bead, etc.) to the same fluid repetitively to deplete the fluid from the analyte of interest, e.g., to concentrate the analyte on the solid phase or other surfaces), etc.

Figure 17C:
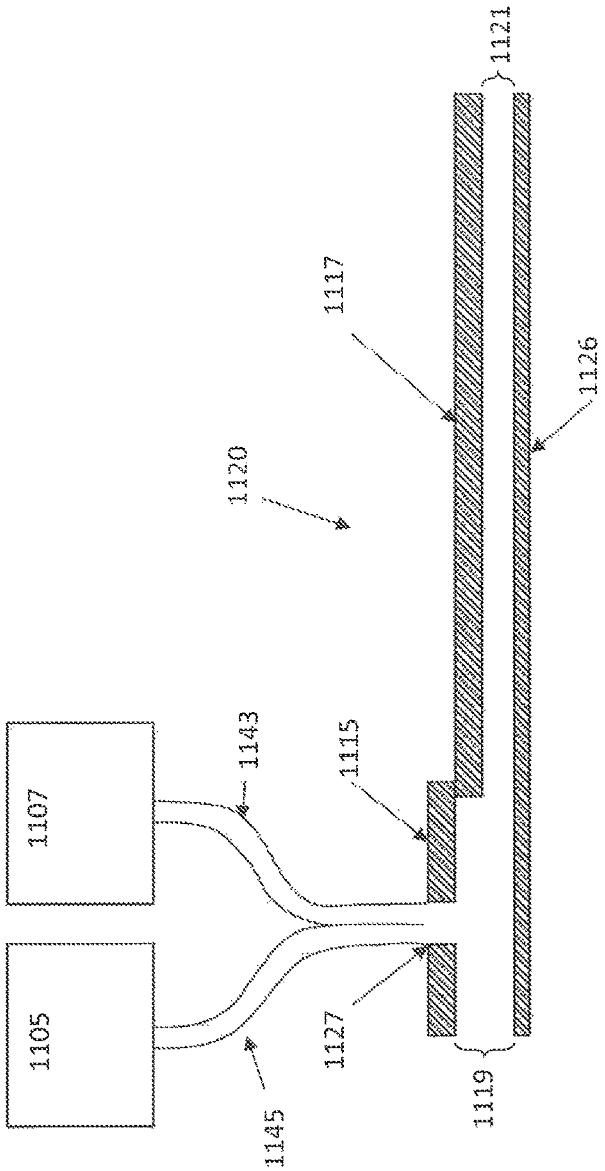
FIG. 17C is another example of a DMF cartridge configured for mixing, extraction, adding, etc. fluid with one or more droplets in the air gap of the DMF cartridge.
Figure 17D:
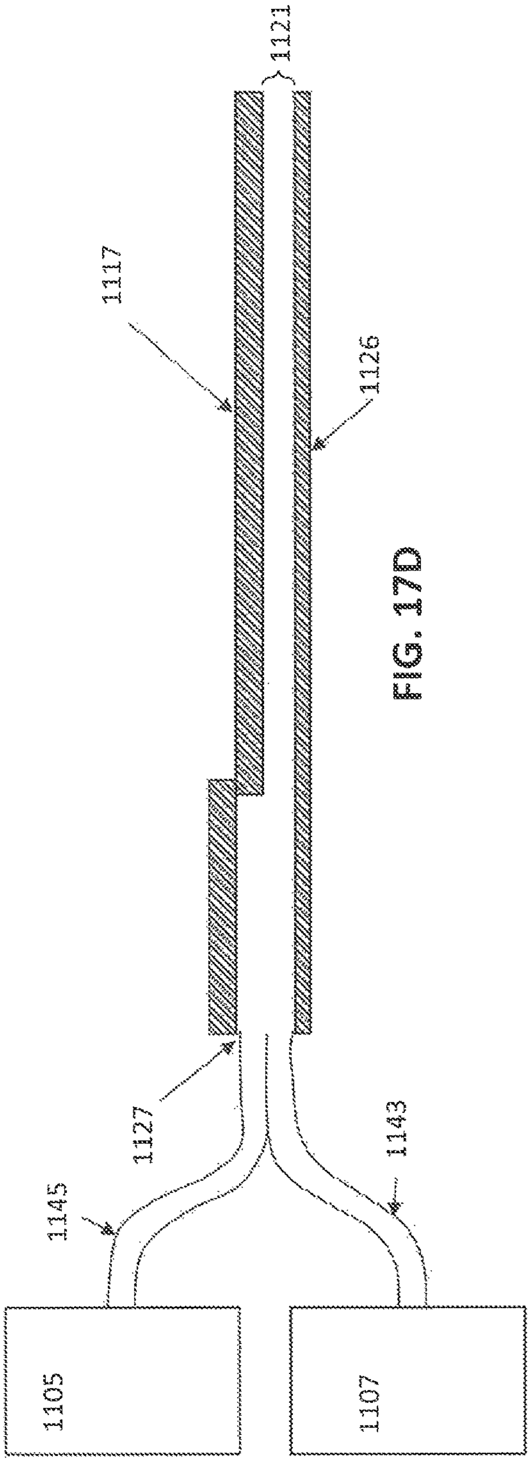
In FIG. 17D, the interface 1127 for the fluid line(s) is at the edge of the air gap, similar to FIG. 17B.

Alternatively, as shown in FIGS. 17C and 17D, the cartridge may include air gaps of different heights. For example, in FIG. 17D, the air gap for the region around the connector interface 1127 may be greater (e.g., between 0.5 and 2 mm) larger than the air gap between other regions of the top plate and the dielectric 1121, as a portion of the top plate 1115 (or a separate top plate 1115 connected to another top plate 1117) may be spaced further from the dielectric 1126. Similarly, in FIG. 17D, the air gap 1119 near the connector interface at the edge of the apparatus may be larger than the air gap 1121 in other regions, e.g., by spacing a portion of the top plate 1117 further from the dielectric 1126 bottom layer.

Figure 18C:
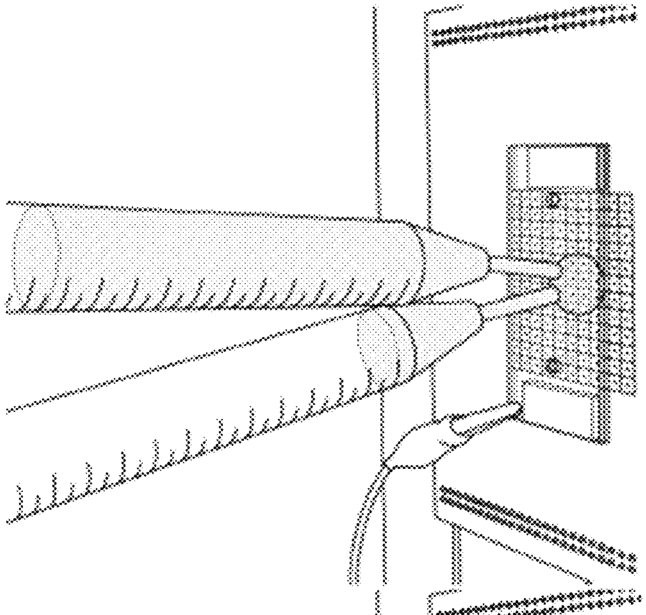
FIGS. 18A-18C illustrate operation of a fluid application and extraction device similar to the one shown in FIG. 17A.
Figure 18B:
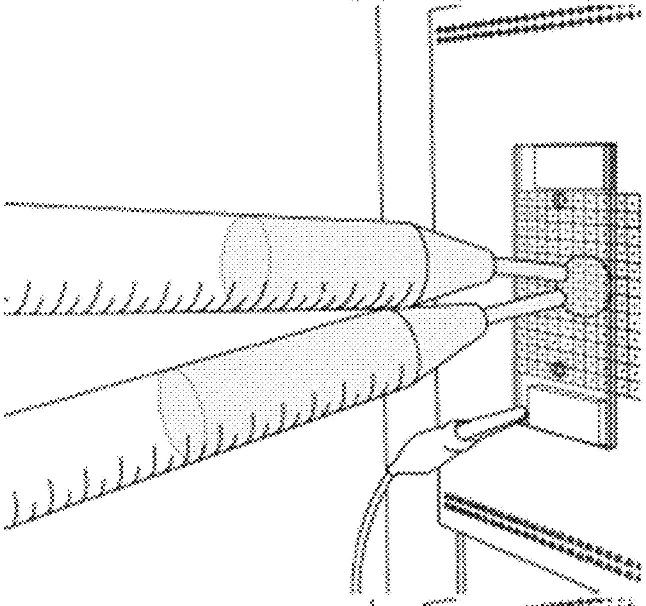
Figure 18A:
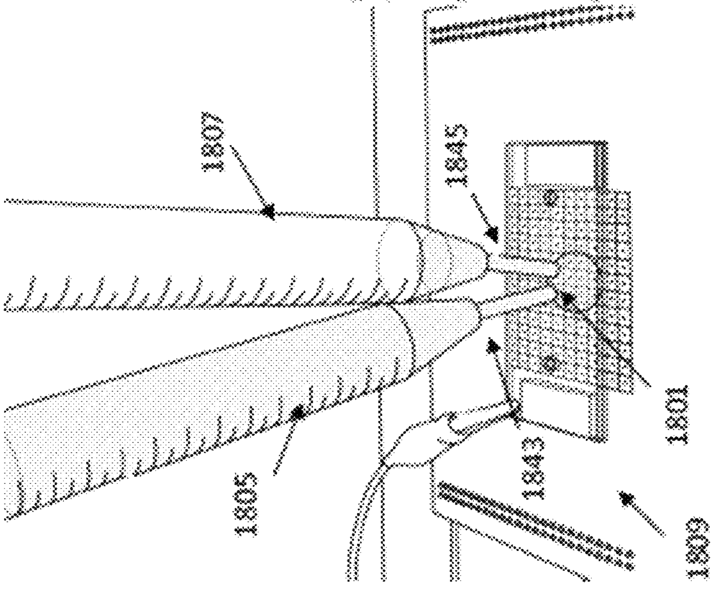

A prototype DMF apparatus and cartridge illustrating the principle shown in FIG. 17C is illustrated in FIGS. 18A-18C, and was used to demonstrate the proof of principle for mixing larger volumes of solution in an air gap of a DMF cartridge. In FIG. 18A, the upper plate of the DMF cartridge included an opening through the top plate 1801 connected to a first fluid line 1843 and a second fluid line 1845. By alternating negative pressure (suction) between the first and second fluid line, fluid was moved back and forth between the first reservoir 1805 and the second reservoir 1807, as shown in the sequence of FIGS. 18A, 18B and 18C. In this example, magnetic particles holding an analyte of interest are magnetically held within the air gap (e.g., against the bottom, e.g., hydrophobic coated dielectric) by the DMF apparatus 1809 while the fluid is exchanged between the reservoirs, enhancing binding and/or rinsing.

Figure 19A:
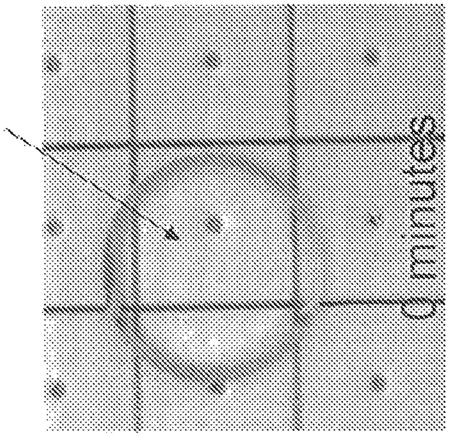
FIGS. 19A-19C illustrates the effect of evaporation on a droplet over 2 minutes in an air-gap DMF apparatus held at 95 degrees C., showing substantial evaporation.
Figure 19B:
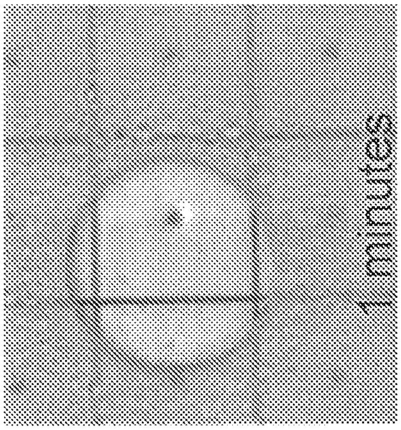
Figure 19C:
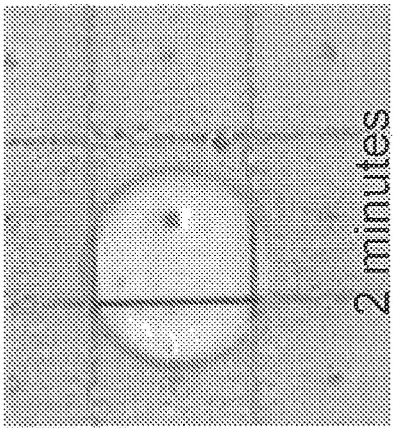
Figure 20A:
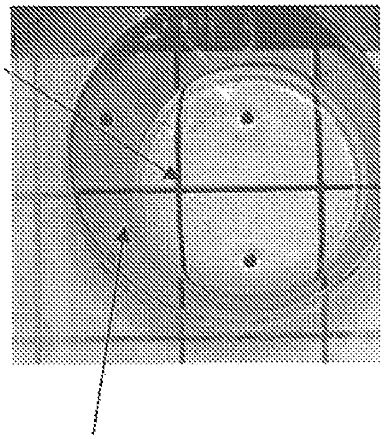
FIGS. 20A-20C show the resistance to evaporation when using a jacketing of nonpolar material (e.g., liquid paraffin) after one hour (FIG. 20B) and two hours (FIG. 20C), showing little or no evaporation.
Figure 20B:
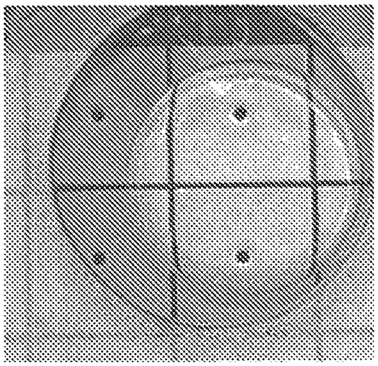
Figure 20C:
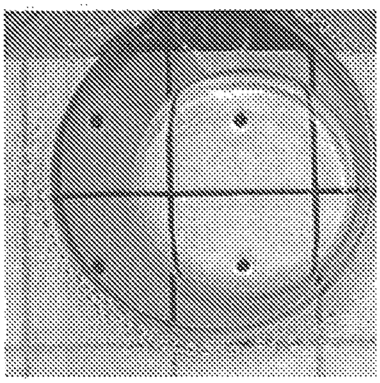

In any of the air-gap apparatuses described herein, evaporation may be controlled or reduced, particularly when heating the droplets within the air gap. FIGS. 19A-19C illustrate the effects of evaporation on a droplet 1903 after only a few minutes. The intact droplet is shown in FIG. 19A. After one minute at 95 degrees C., the droplet volume has noticeably decreased (e.g., losing between 5-15% of the volume of the droplet, as shown in FIG. 19B. After two minutes (FIG. 19C), the droplet is between 20-34% smaller. To prevent this loss due to evaporation, the droplet within the air gap may be sheathed or covered in a nonpolar jacket, as illustrated in FIGS. 20A-20C. For example, a liquid paraffin material (e.g., a nonpolar material that is liquid at the working range described herein, e.g., between 10 degrees C. and 99 degrees C., may be used. In FIG. 20A, a droplet 2003 jacketed in liquid paraffin 2005 is heated (e.g., to 65 degrees C. or above). After one hour (FIG. 20B), the droplet has not appreciably evaporated. Similarly after 2 hours (FIG. 20C), the droplet has remained approximately the same volume.

In use, the nonpolar jacketing material may be added and removed at any point during a DMF procedure, as illustrated in FIGS. 21A-21I. Surprisingly, removal may be accomplished, for example, by drawing the jacketed droplet up out of the air gap, e.g., out of a port entering into a microfluidics channel as described above. The liquid paraffin, for example, may be removed into a waste reservoir by applying a negative pressure to a droplet from a port through the top or side of the air gap. The lower-density liquid paraffin may be the first layer that gets drawn up, leaving the aqueous droplet behind. Previously it was believed to be difficult or impossible to remove the jacket of nonpolar liquid.

Figure 21A:
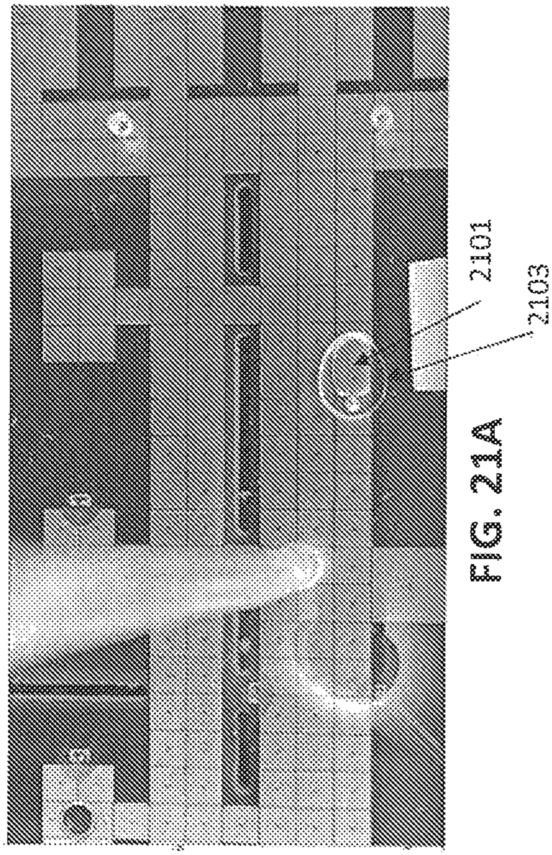
FIGS. 21A-21D illustrate the use of a non-polar jacketing material in an air-matrix DMF apparatus.
Figure 21B:
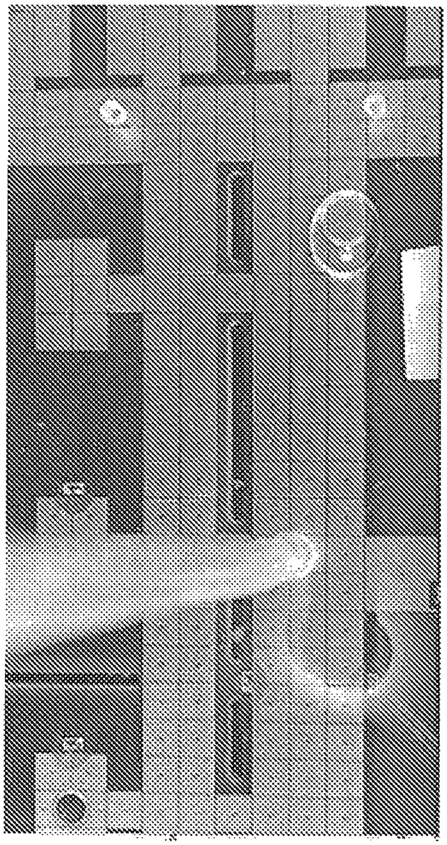
Figure 21C:
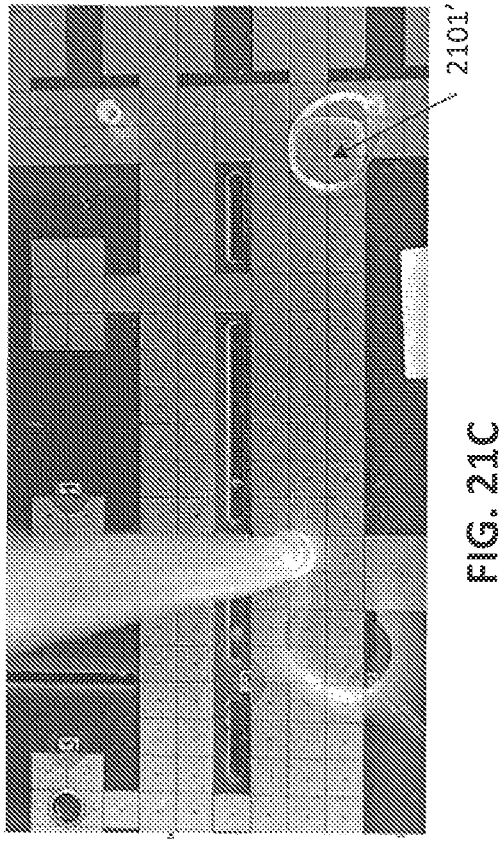
Figure 21D:
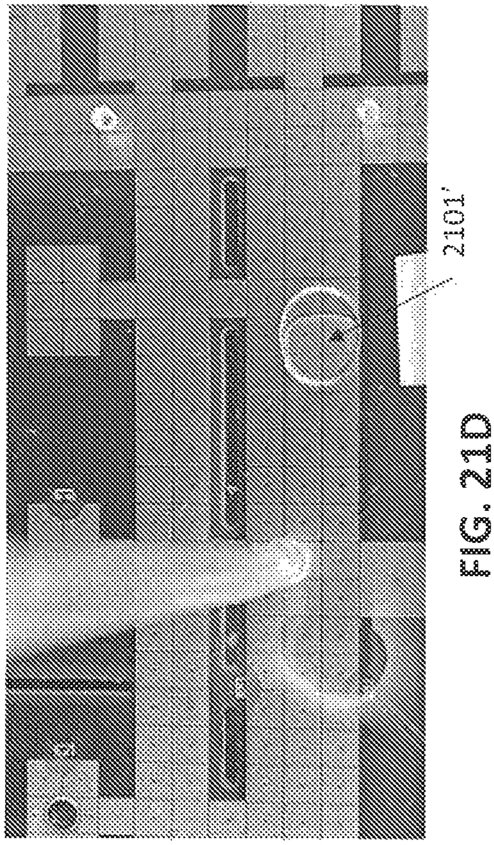

For example, FIG. 21A shows a jacketed droplet in which the aqueous droplet 2101 is surrounded by a nonpolar liquid 2103 (e.g., liquid paraffin). In this example, a small bubble has also been formed in the liquid paraffin. The droplet may be easily moved, as shown in FIG. 21B, showing the droplet moving by the coordinated application of energy to the driving electrodes to alter the electrowetting of the aqueous droplet. In FIG. 21B, the jacketed droplet has been moved to the right. Initially, the aqueous droplet may be combined with the nonpolar liquid by applying the nonpolar liquid into the air gap either directly on the droplet, or in a region of the air gap that the droplet may be moved into. The jacketed droplet may also be combined with one or more additional droplets that may include a nonpolar liquid droplet of their own, or may be unjacketed. In some variations, a jacketing droplet (including a small aqueous droplet and a relatively large volume of nonpolar solution may be combined with the target droplet in order to jacket the target droplet. The small amount of aqueous liquid in the jacketing droplet may be a buffer, diluent, or other solution that allows the jacketing droplet to be moved in the air gap. This technique is particularly helpful when used with DMF cartridges having larger (e.g., 0.5 mm or greater) gap widths. A larger gap width may otherwise make it difficult for the larger droplets to maintain a jacket of typically less dense nonpolar jacketing material. FIGS. 21C and 21D illustrate a droplet 2101 that has been combined with another droplet, forming a larger jacketed droplet 2101'. The larger droplet may also be moved by controlled actuation of the driving electrodes, as shown in FIGS. 21C and 21D.

Figure 21E:
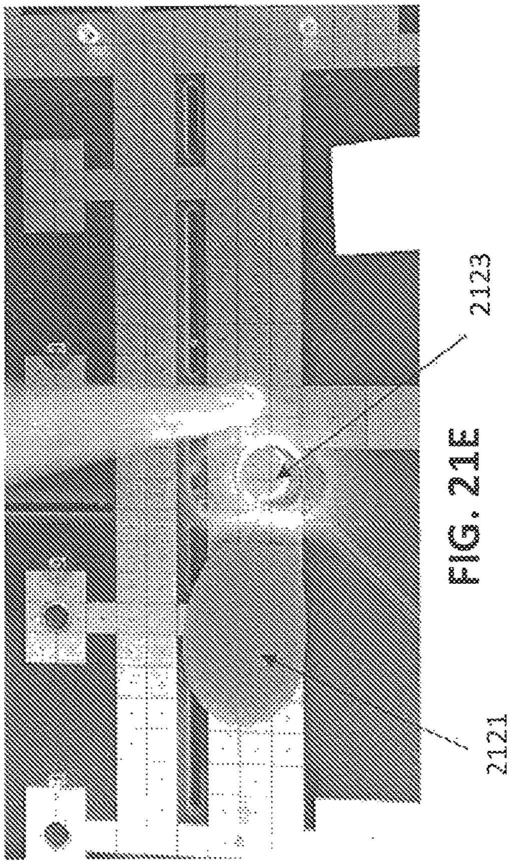
FIG. 21E-21I illustrate adding a large sample to a jacketing material, and mixing the sample.
Figure 21F:
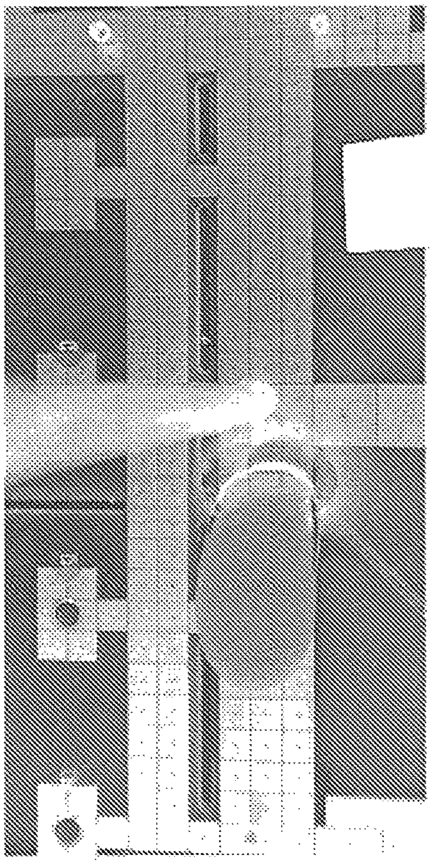
Figure 21G:
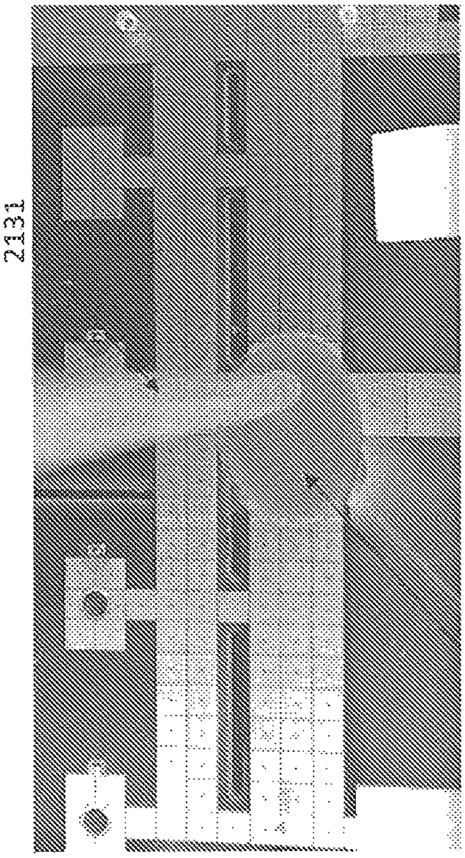

FIGS. 21E to 21I illustrate the use of a nonpolar liquid jacket in a sample including a magnetic bead material. In FIG. 21E, a jacketing droplet includes a small amount of aqueous liquid 2121 and a relatively large amount of nonpolar jacketing material 2123, the two may be combined, for example, by moving the jacketing droplet 2123 into the sample droplet 2121, as shown in FIG. 21F, allowing them to combine so that the jacketing material is now jacketing the sample droplet. In this case, the sample droplet is quite large, and includes a concentration of sample absorption magnetic beads.

Figure 21H:
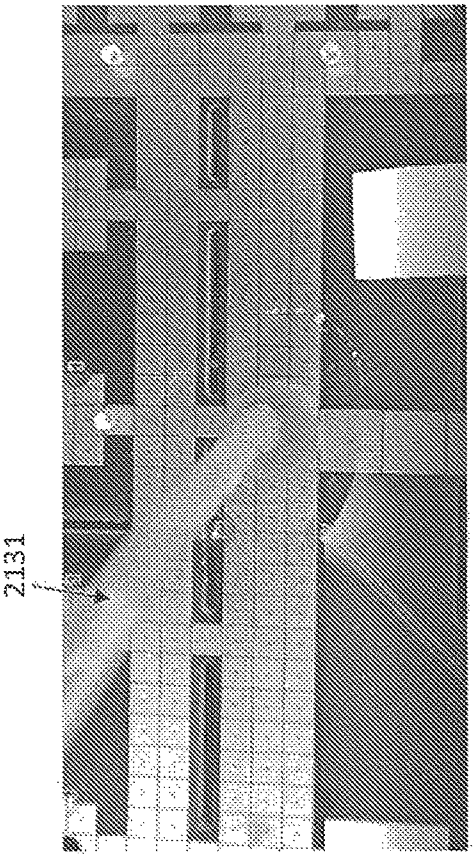
Figure 21I:
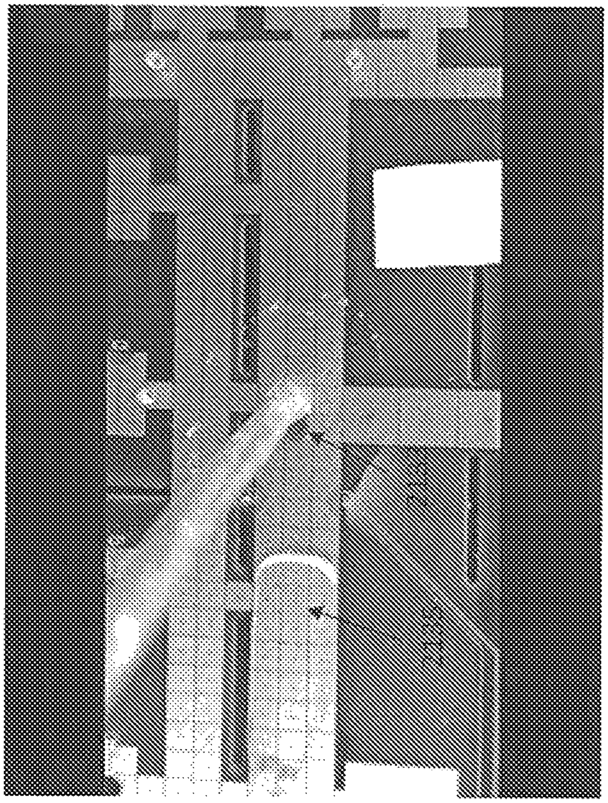

Once combined, the jacketed droplet 2121' may be moved (by DMF) to a port into the air gap from which solution may be extracted, as shown in FIG. 21H. in this example, the solution may be mixed by applying positive and negative pressure to move the solution into and out of the fluid channel 2131. The nonpolar solution jacketing the droplet may be removed by applying negative pressure to pull the solution out of the air gap though the top port; the first solution removed is the jacketing material. Thereafter, as shown in FIG. 21I, the magnetic particles to which a desired analyte has been bound may be held onto the bottom side of the air gap, e.g., by applying a magnetic field, and the droplet solution may be removed, and/or washed, in the absence of nonpolar jacketing solution, which may otherwise interfere with the binding or release of the analyte from the magnetic particles. In FIG. 21I, the magnetic particles 2133 are left in the air gap, and a separate washing buffer may be applied by moving a washing and/or elution droplet 2135 over the magnetic particles.

In addition to the techniques for controlling evaporation discussed above (e.g., using a jacket of nonpolar liquid), any of the methods and apparatuses described herein may also include controlling the partial pressure of water vapor inside the cartridge to create "zero evaporation" conditions, e.g., by balancing the rates of water molecules leaving and entering the water surfaces. The balance does not need to be perfect, but may be adjusted by adjusting the temperature and pressure so as to stay as close as possible to the zero evaporation condition. This may vary with temperature; for example, once relative humidity is controlled, it may be best to adjust the humidity up and down with the temperature, e.g., during hybridization or PCR cycling using the apparatus. Alternatively or additionally, any of these apparatuses may use local replenishment to adjust for evaporation by moving droplets slightly to recapture nearby condensation (see, e.g., FIGS. 19B-19C, showing evaporative droplets surrounding the main droplet). Any of these methods and apparatuses may also or alternatively use walled-in heating zones to reduce the surface area from which evaporation may occur. For example, as mentioned above, in some variations the seating surface of the DMF apparatus may include projections forming local regions within the cartridge, since the vacuum may be precisely applied to control the contact between the flexible dielectric and the electrodes, projection on the seating surface may create chambers or channels within the air gap, including forming partially wall-in heating zones that may reduce evaporative surface area. In some variations, the top plate may be spaced differently across the cartridge; the evaporation rate may be lower for thinner droplets compared to thicker droplets. Thus, any of the heating regions may have a narrower width of the air gap to reduce evaporation.

In any of the large-volume droplet DMF cartridges, e.g., DMF cartridges having a gap separation of 0.5 mm or greater (e.g., 0.6 mm or greater, 0.7 mm or greater, 0.8 mm or greater, 0.9 mm or greater 1 mm or greater, e.g., between 0.4 mm and 2 mm, between 0.5 mm and 2 mm, between 0.5 mm and 1.8 mm, between 0.5 mm and 1.7 mm, etc.), it has proven particularly difficult to dispense droplets having a predictable volume, as the surface tension of the relatively large droplets may require a greater amount of energy to release a smaller droplet from the larger droplet. In general, in digital DMF systems, the ratio between spacer (air gap) thickness and electrode size dictates the volume of droplet dispensing. In the conventional digital microfluidic approach, spacer thickness of less than about 500 micrometers (0.5 mm) allows for electrowetting forces to split a unit liquid droplet from a larger amount of liquid volume; this has not been possible with higher spacer thicknesses (e.g., greater than 500 micrometers). Described herein are methods for splitting unit droplets from larger volumes in air gaps having a width (e.g., spacer thicknesses) of 500 μm or greater. In some variations this may be performed by, e.g., flooding a region of the air gap with a solution to be dispensed from a port (which may be a side port, top port or bottom port), and then selectively activating a cell (corresponding to a driving electrode) in the flooded region, then withdrawing the solution back into the port (or another port) that is offset from the activated electrode so that a droplet remains on the activated electrode as the solution is withdrawn into the port; the droplet on the activated electrode breaks off from the larger flood volume (e.g., by necking off), leaving the dispensed droplet behind, where it may then be driven by the drive electrodes, combined with one or more other droplets, etc.

For example, an integrated companion pump may be used to drive a large volume of aqueous solution into a DMF device (e.g., into an air gap of the DMF cartridge) and over an activated electrode. The aqueous solution may then be withdrawn away from DMF device, dispensing behind a unit droplet over the activated electrode. FIGS. 22A-22D illustrate an example of this method. In FIG. 22A, a port 2201 into the air gap 2205 of the DMF cartridge connects to a fluid channel (e.g., a microfluidics channel as described above), shown in FIG. 22A as a tube 2209, holding an aqueous solution (reagent 2203). In this example, a single drive electrode 2207 has been actuated; alternatively in some variations, the electrode is not activated until after flooding the region of the DMF apparatus. Pre-activating it may help distribute a predefined amount onto the unit cell defined by the drive electrode. In any of these examples more than one contiguous drive electrodes may be activated to dispense larger-volume droplets.

Figure 22A:
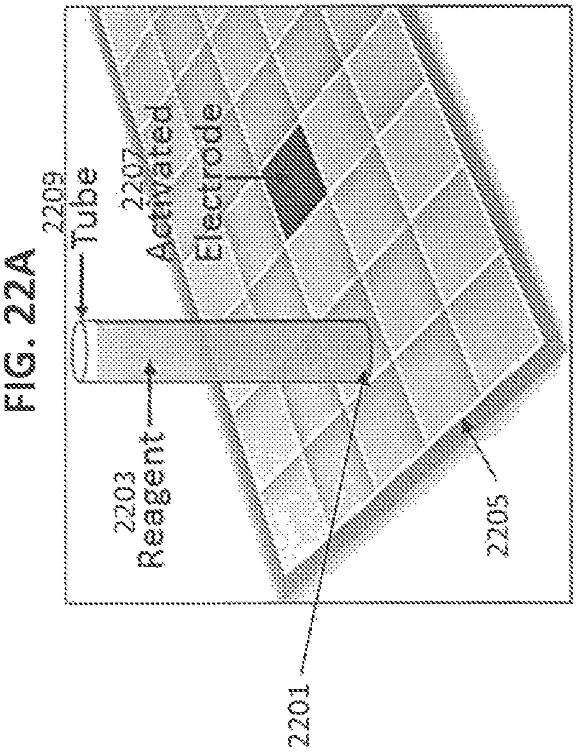
FIGS. 22A-22D illustrate the control of droplet volume when dispensing droplets (e.g., reagents) into an air-gap of a DMF apparatus. In particular, the air-gaps described herein may be large air-gaps (e.g., greater than 280 micrometers, greater than 300 micrometers, >400 micrometers, >500 micrometers, >600 micrometers, etc. separation between the top and bottom dielectrics). In such cases, the electrowetting forces alone may not be sufficient to dispense droplets of a predetermined volume.
Figure 22B:
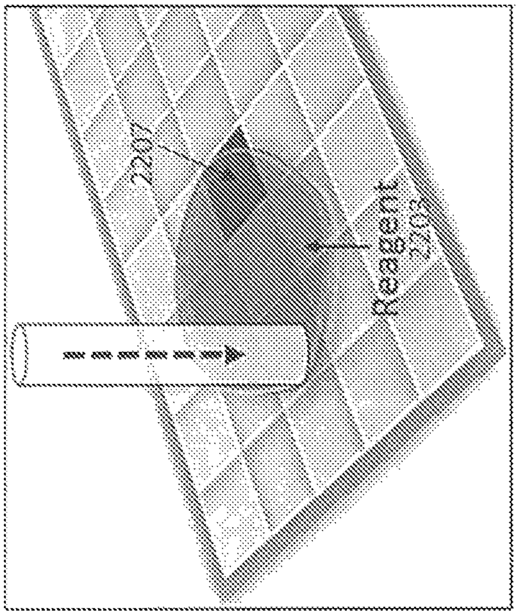

Next, as shown in FIG. 22B, the region of the air gap including the activated drive electrode is flooded with the aqueous solution 2203. FIG. 22A shows the release of a large volume (e.g., 250 μL) from the channel (tube 2209). In some variations, as the reagent nears the distal end channel 2209, a drive electrode 2207 is activated (e.g., AC potential of 390 Vrms, or by otherwise creating an alternating field effect using a DC potential), which may generate an electrowetting force that further encourages transfer of the reagent from tube 2209 to the activated drive electrode 2207; further flow from the channel occurs so that the droplet grows to fully cover the activated drive electrode(s).

Figure 22C:
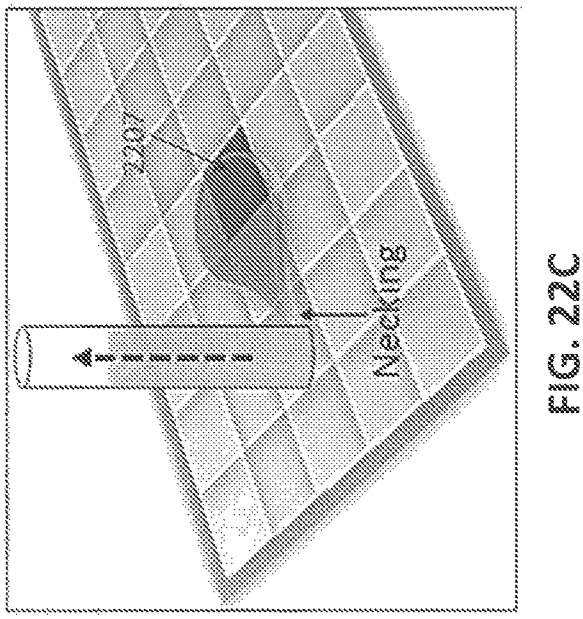
Figure 22D:
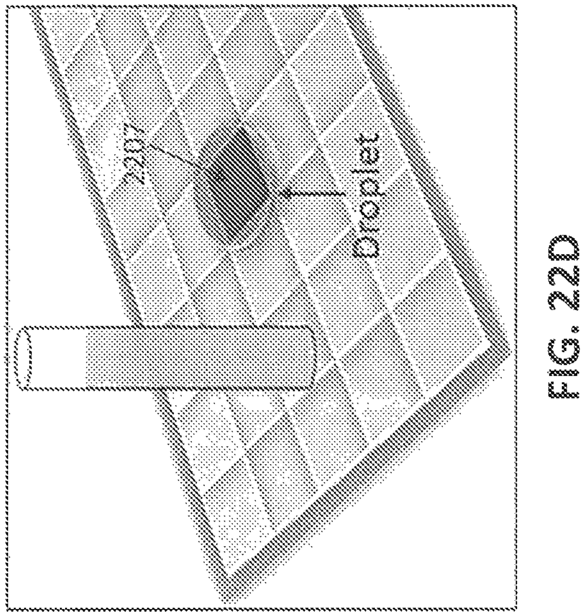

In FIG. 22C, the aqueous solution (reagent 2203) is then withdrawn from the air gap through the same port 2201 or a separate port, where the activated drive electrode(s) is/are separated from the port into which the solution is being drawn by a distance (e.g., the distance may be approximately equivalent to the width of the activated electrode); this distance is sufficient so that the droplet on the activated drive electrode(s) necks off of the liquid being withdrawn back into the channel 2209. For example, aspirating the reagent back into the tube as shown in FIG. 22C may result in necking of the droplet from the rest of the solution; the neck region continuously shrinks until a unit droplet (e.g., 10 μL) is left behind on activated drive electrode, as shown in FIG. 22D. The same process can be repeated with activating two, three and five electrodes to dispense approximate multiples of the unit droplet (e.g., 20, 30 and 50 μL), respectively as shown in FIG. 23A-23E. Multiple droplets may be separately dispensed and combined, or alternatively multiple electrodes may be used to dispense larger volumes at once, as mentioned. The size of the droplet (droplet volume) may be based in part by the size of the driving electrodes and the spacing of the air gap.

Figure 23A:
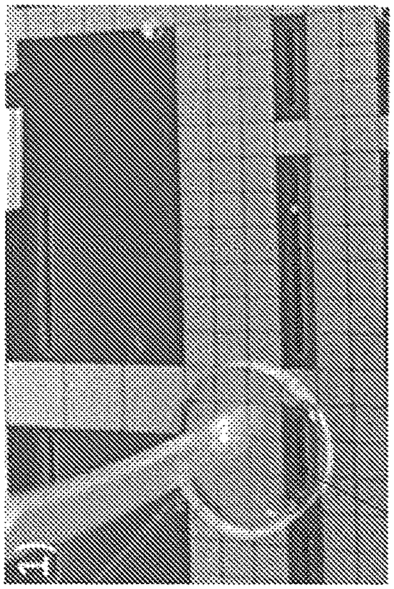
FIGS. 23A-23F illustrate example of dispensing droplets of predefined volumes using the technique described in FIGS. 22A-22D, above.
Figure 23B:
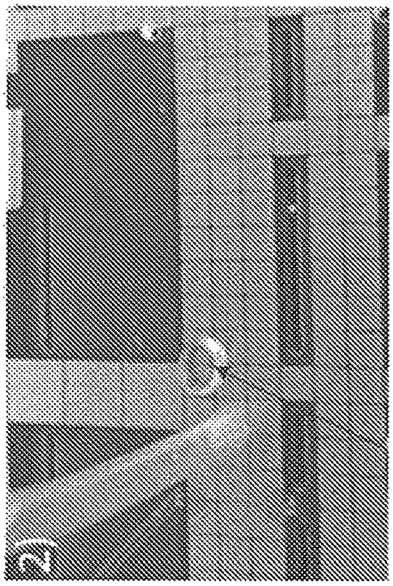
Figure 23C:
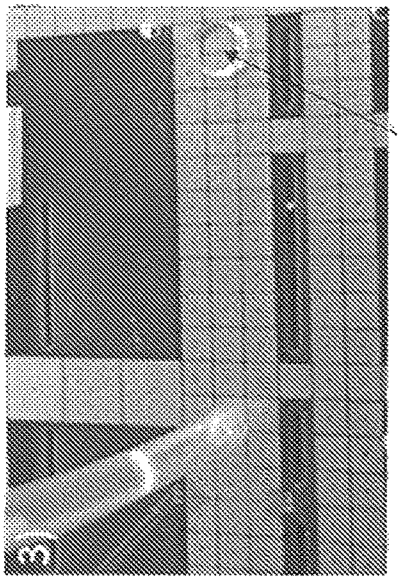
Figure 23D:
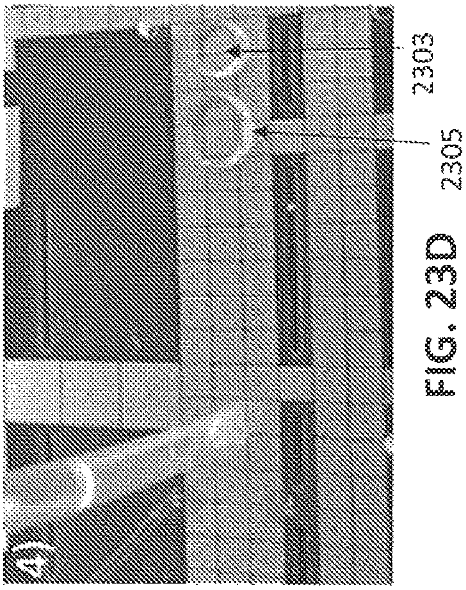
Figure 23E:
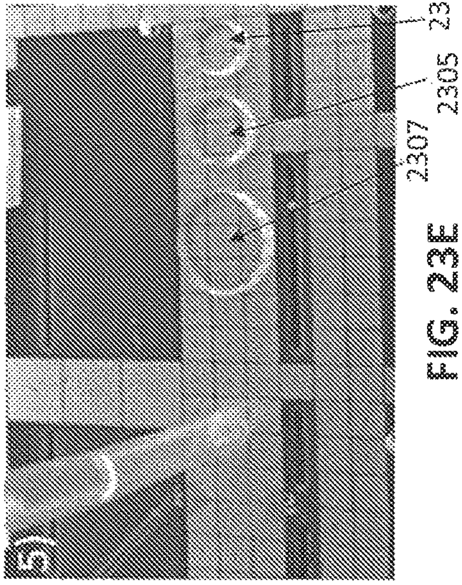
Figure 23F:
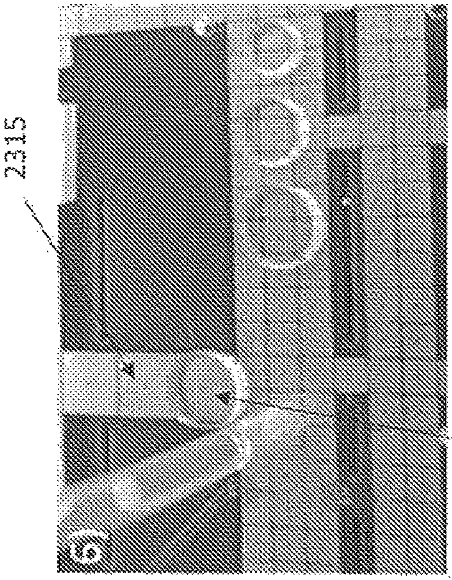

FIGS. 23A-23F illustrate the dispensing of various predefined volumes of solution from a reservoir above the cartridge using the method described above. In FIG. 23A, for example, the region of the air gap including the port connecting to a channel holding solution above the larger air gap (e.g., 0.5 mm width) is flooded with solution 2301, as shown, and a single activated electrode is used to break off a predetermined volume of solution (e.g., 10 microliters), shown in FIG. 23B. This droplet may be moved away from the flooding region, and the process repeated multiple times to produce multiple droplets of approximately uniform volume (e.g., 10 microliters+/−5%, 10%, 15%, 20%, 25%, etc.). In FIG. 23D, a first unit droplet 2303 (e.g., having a 10 microliter volume) is shown adjacent to two combined unit droplets 2305, which form a second droplet having 2× the volume, e.g., 20 microliters. Similarly, FIG. 23E shows a large droplet 2307 (e.g., 50 microliters) formed by combining five unit droplets. FIG. 23F illustrates the use of a larger driving electrode 2315 (e.g., having approximately 4× the surface area) that may be activated when flooding the air gap region to form a larger unit droplet 2311 (e.g., a 40 μL unit droplet).

Thus, by flooding or flushing a dispensing region of the air gap with a large volume of aqueous solution, and activating a drive electrode (or over an already-active drive electrode), then removing the solution (e.g. pumping it out) a relatively precise volume droplet may be left behind. As mentioned, when using large-volume DMF apparatuses (cartridges), e.g. having a spacing of between 0.4 or 0.5 and up to 3 mm, this technique may be used to dispense smaller-volume droplets from larger-volume reservoirs with a reasonable amount of force; unlike air gap DMF apparatuses having smaller air gaps, which may directly dispense smaller volume droplets form a larger volume by applying electrowetting energy, the larger force effectively prevents directly dispensing by DMF in larger air-gap devices. In many of the examples provided herein, the gap spacing of the air gap is between 1 mm and 1.3 mm (e.g., approximately 1.14 mm), though at least up to a 3 mm spacing has been successfully used.

Dispensing of solution as described herein may be particularly important in processing samples (e.g., mixing, etc.) as well as replenishing solution lost due to evaporation in such systems.

Additional examples of cartridges and cartridge features are included, for example, in FIGS. 70A-70C, 71, 72A-72E, 73A-73B, 74A-74C, 75A-75D, 76A-76D, and 77A-77C.

User Control Interface

In any of the apparatuses and methods described herein, a DMF apparatus may be controlled by a user so that the DMF apparatus can execute one or more protocols (e.g., laboratory procedures) on a sample that is inserted into the DMF apparatus (e.g., cartridge). For example, a DMF apparatus may include a user interface that dynamically and flexibly allows the user to control operation of the DMF apparatus to perform a user-selected or user-entered protocol. In general, there are numerous considerations when translating a processing protocol for operation by a DMF apparatus, including preventing contamination during the procedure. Contamination may occur when moving a sample droplet, in which the protocol is being performed, over a path taken by earlier steps in the procedure (or parallel steps). Typically, the one or more reaction droplets that are being processed may need to be moved to different locations within the air gap of the DMF cartridge, and/or temporarily out of the air gap region. It would otherwise be difficult for the user to coordinate these movements both to avoid earlier or future paths (e.g., contamination) and to remember which locations are appropriate for heating, cooling, mixing, adding, removing, thermal cycling, etc.

Described herein are user interfaces for controlling the operation of the DMF apparatus that allow the user to more easily enter protocol information/steps into the DMF. This may be accomplished in part by providing a set of graphical step representations (e.g., showing mixing, adding, heating, cooling, cycling, washing, etc.) of steps that may be performed, and allowing the user to select/enter these steps in a manner that also intuitively provides the duration of the steps, or the degree (e.g., temperature, etc.) to be applied. Once entered, the apparatus may then determine an efficient pathway to perform the entered protocol within the predefined layout constraints of the DMF apparatus and/or cartridge to avoid contamination. For example, any of these apparatuses may determine a pathway (pathfinding) that prevents or reduces path crossing within the air gap where such crossovers may result in contamination.

Figure 24:
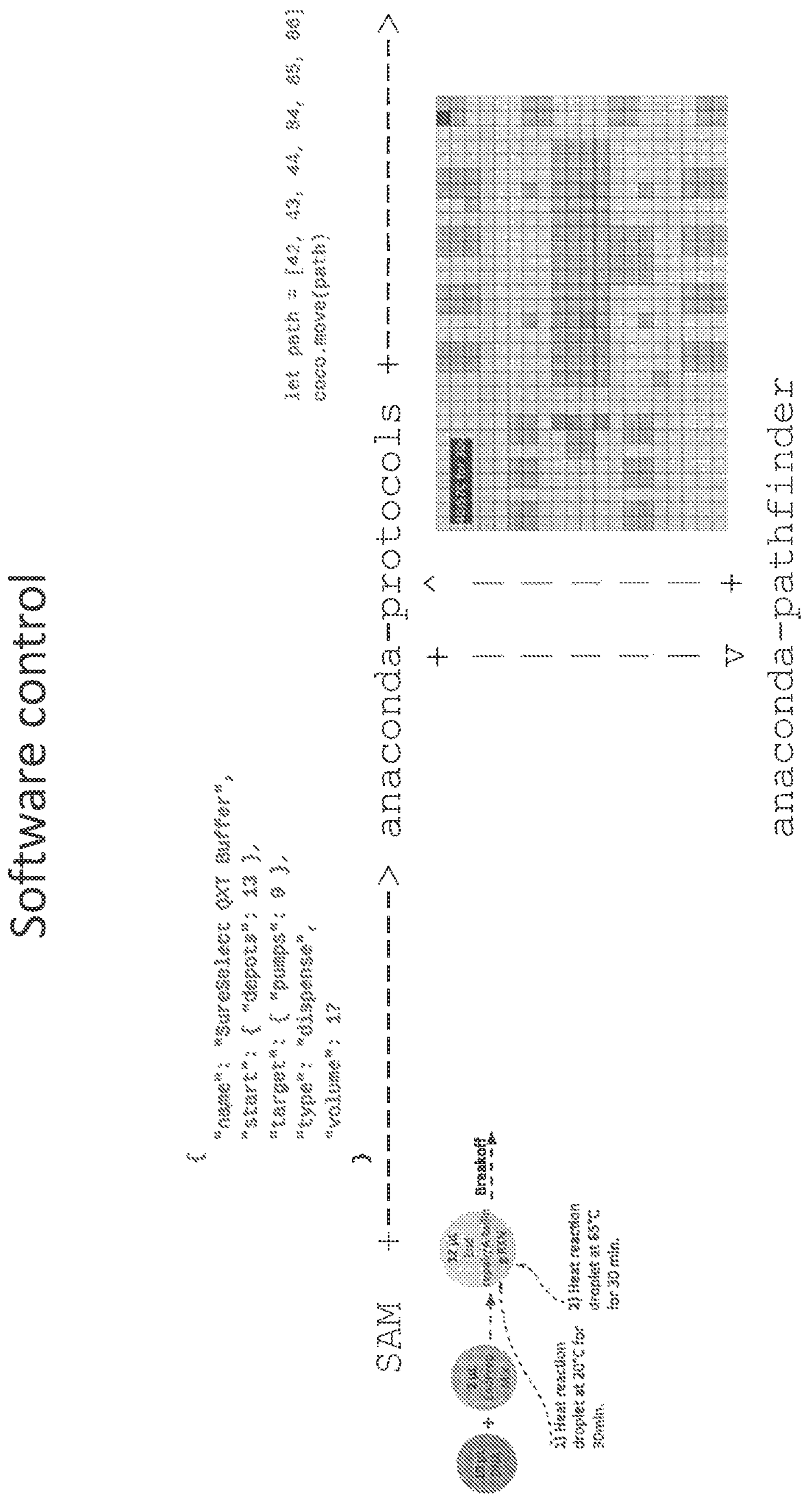
FIG. 24 shows an example of a method of controlling a DMF apparatus as described herein, including programming the apparatus using a graphical user interface.

FIG. 24 is an exemplary schematic, illustrating the steps involved in controlling any of the DMF apparatuses described herein. For example, in FIG. 24, the user may enter the protocol using a graphical/visual user interface (referred to herein as "SAM"). This may be described in greater detail in reference to FIGS. 25A-26B). The graphical protocol may then be translated into a series of target goals and this target protocol may then be used by the apparatus to tailor this protocol to the DMF apparatus. In FIG. 24, the system may determine a path, and derive the control of the drive electrodes, heater, cooling (e.g. Peltier), magnetic(s), microfluidics (pump(s), etc.), etc. in order to accomplish the protocol. The path may be optimized to require the shortest pathways, but constrained by limiting or reducing overlap in the path(s), to prevent contamination, loss of materials (including reagents and/or Teflon), heat dissipation, etc.

Figure 25B:
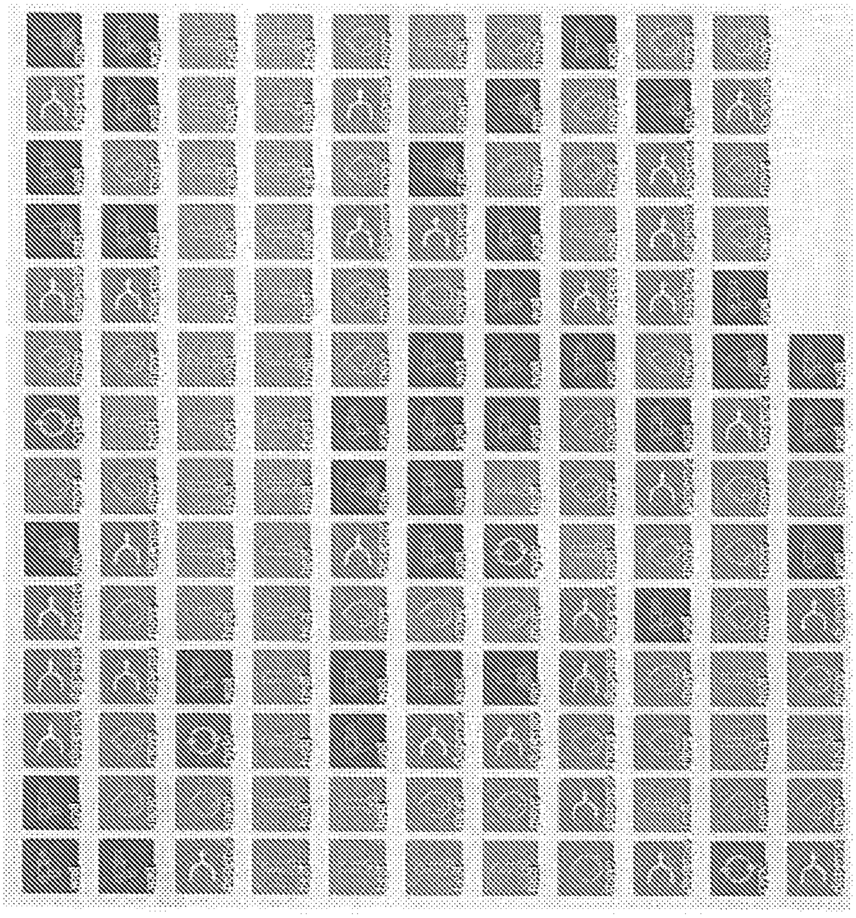
FIG. 25A illustrates an example of visual controls or commands (FIG. 25A) and a protocol describes using these visual controls/commands (FIG. 25B).
Figure 25A:
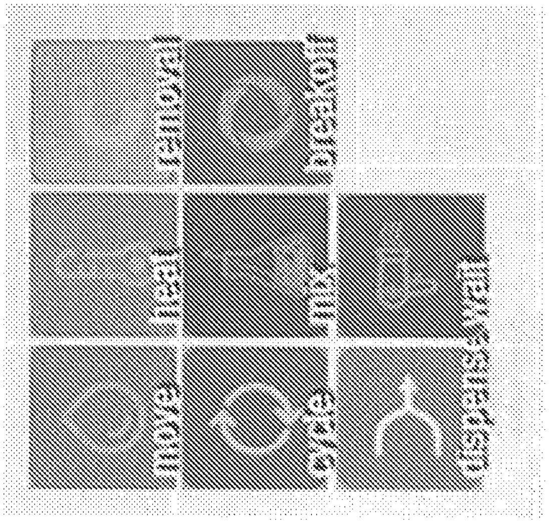

As mentioned, FIGS. 25A and 25B illustrate one example of a visual interface (e.g., graphical user interface) for entering a desired protocol. In FIG. 25A, a set of control icons ("move", "heat", "removal", "cycle", "mix", "breakoff", "dispense", and "wait") are shown. The user may select or arrange these icons in order to provide a graphical representation of a processing protocol, as shown in FIG. 25B. Each of the icons may have an associated duration, and thus, these icons may be used to select processing instructions, or steps, for a sample. In this example, the icons are uniquely identified by one or more of: color, image, and text.

The user may input the protocol directly into the apparatus, or into a computer or other processor in communication with the DMF apparatus.

Once entered, the protocol may be translated into a data structure format (e.g., a JSON format that indicates the name of the protocol and sample, where the sample goes, what volume to use, etc.). This data structure may then be directly used or converted into a format (e.g., java script) so that the apparatus may determine the paths to take in the cartridge in order to achieve the desired protocol. The path finding may be done locally (e.g., in the DMF apparatus) or remotely and communicated to the DMF apparatus. The path finding may be configured to maximize based on the shortest path length that also avoids cross over, or some cross-overs, to prevent contamination. Thus, the apparatus may determine the shortest route that avoids contamination. In general, the user interface can allow the user to easily select the desired actions and elements (e.g., mixing, etc.); the apparatus may already be familiar with the reagents (e.g., elements of the device). The user can then select the actions, durations, temperatures, etc.

Figure 26A:
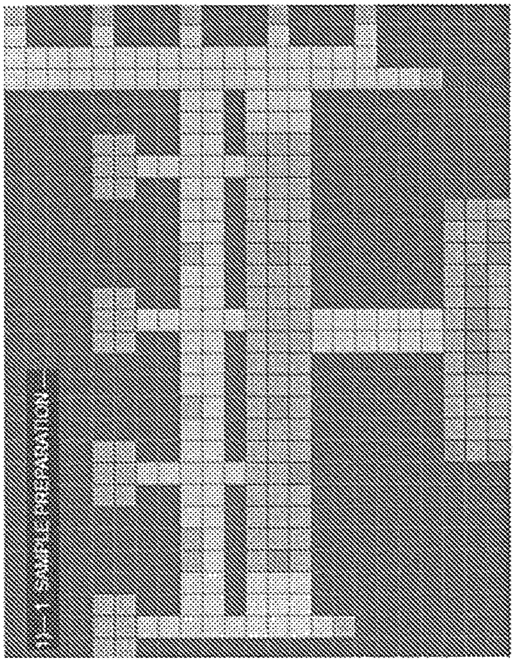
FIGS. 26A-26H illustrate an example of a user interface for controlling a DMF apparatus as described herein.
Figure 26B:
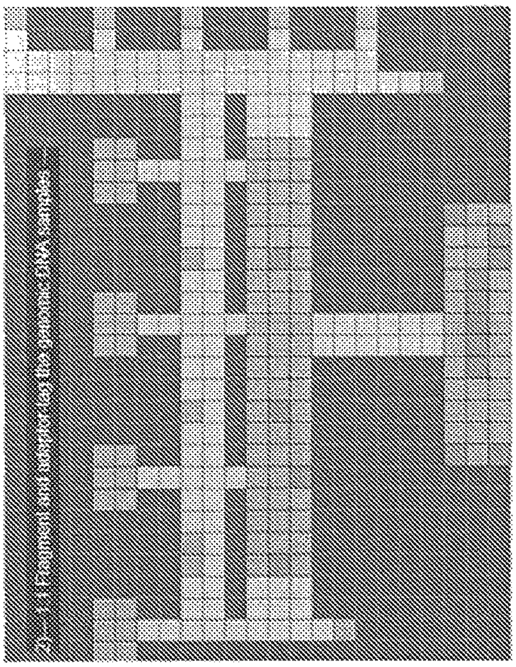
Figure 26C:
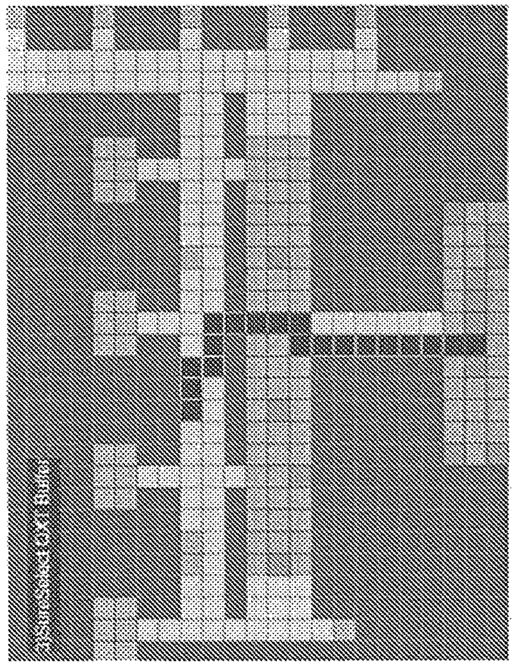
Figure 26D:
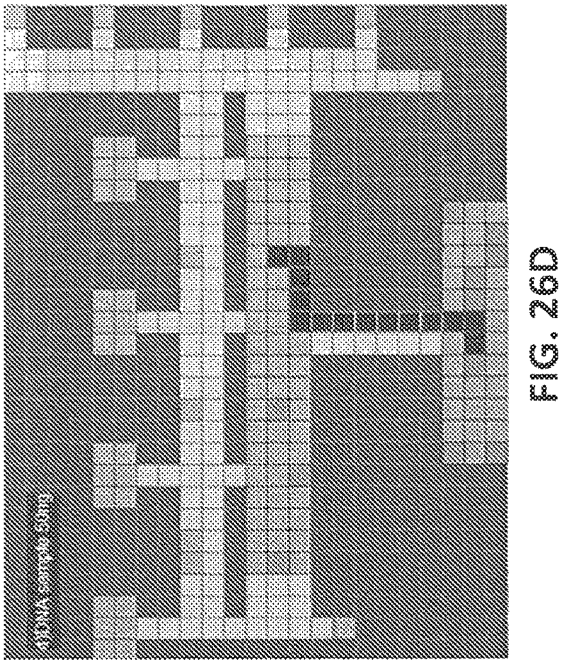
Figure 26E:
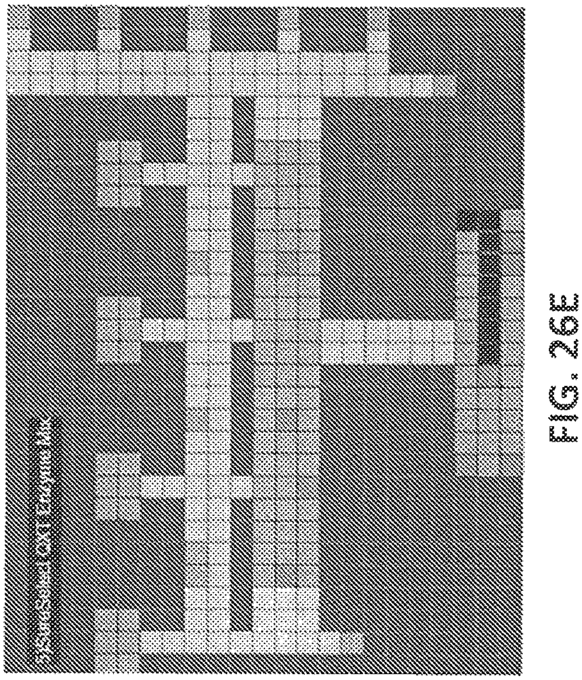
Figure 26F:
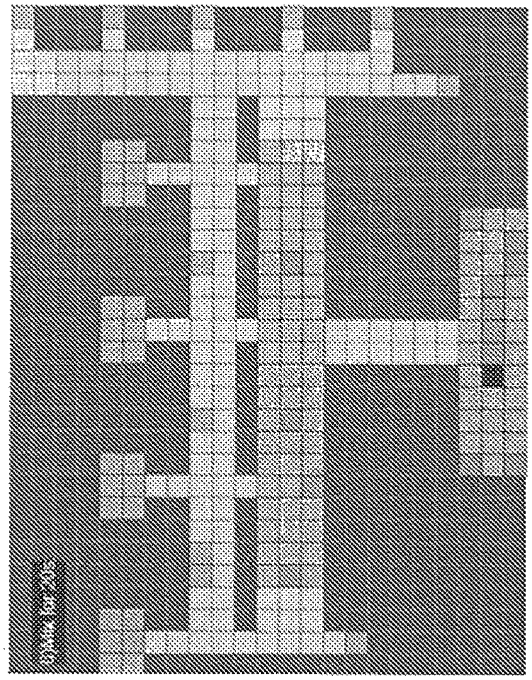
Figure 26G:
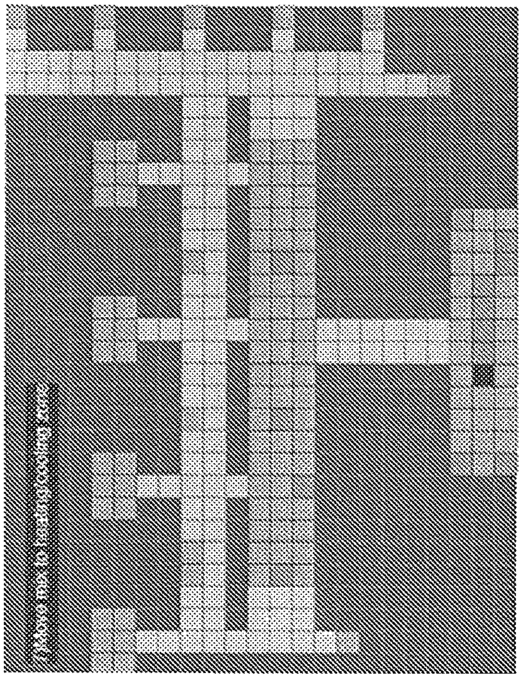
Figure 26H:
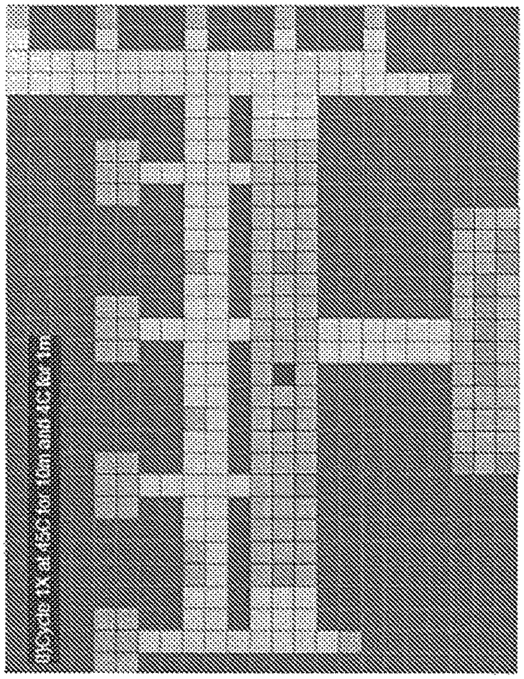

FIGS. 26A-26H illustrate one example of an apparatus determining a pathway from an input protocol. For example, FIG. 26A shows a graphical illustration of a particular configuration of DMF cartridge air-gap planning a first set of steps, e.g., sample preparation. The apparatus may know the distribution of the cells within the air gap, as well as the configuration of the functional zones (heaters, coolers, mixing/microfluidics, waste removal, dispensing, etc.) in the DMF cartridge. FIG. 26B is a graphical illustration of the apparatus determining the path for tagging a sample having genomic DNA (or fragments of DNA) with an adapter tag. In FIG. 26C, a step of moving a first buffer (e.g., SureSelect QXT buffer) to an appropriate location for future processing is performed. The path may be chosen in light of both past movements and future movements and may be recursively modified as the future protocol steps are defined. In FIG. 26D, the path for moving the DNA sample is shown (in black). FIG. 26E shows the movement of an enzyme mix from a cooled region where it is beings stored to combine with the sample; FIG. 26F shows the user of mixing of the sample with the buffer and enzyme mix. The mixed sample may then be moved (FIG. 26G) along a calculated pathway to a heating/cooling zone for cycling (FIG. 26H). Additional steps may then be performed as indicated.

FIGS. 78-101 illustrate examples including user interfaces and method including them for controlling the operation of the systems described herein, as well as selecting, editing, and storing protocols.

Figure 78:
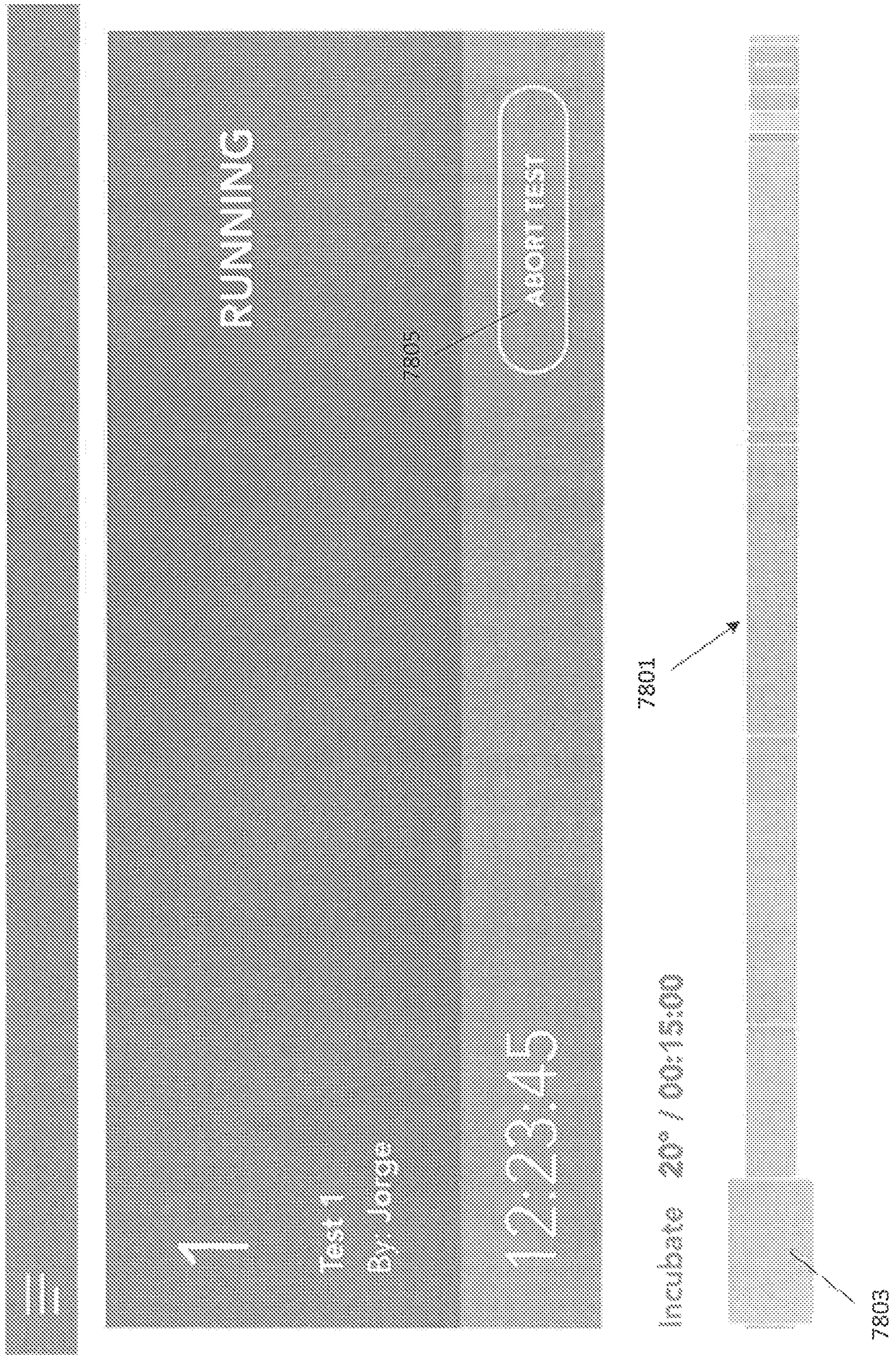
Figure 79:
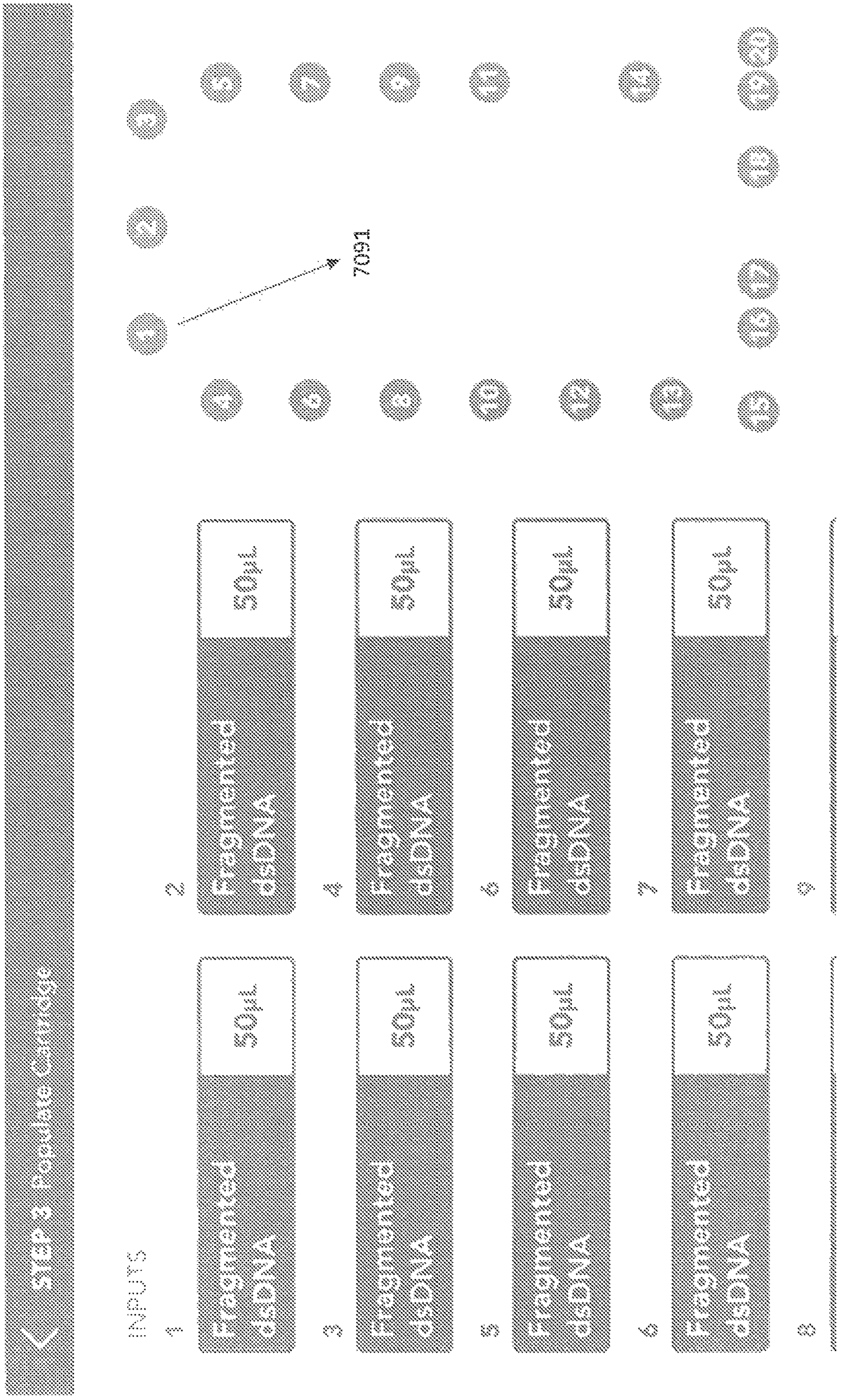
Figure 80:
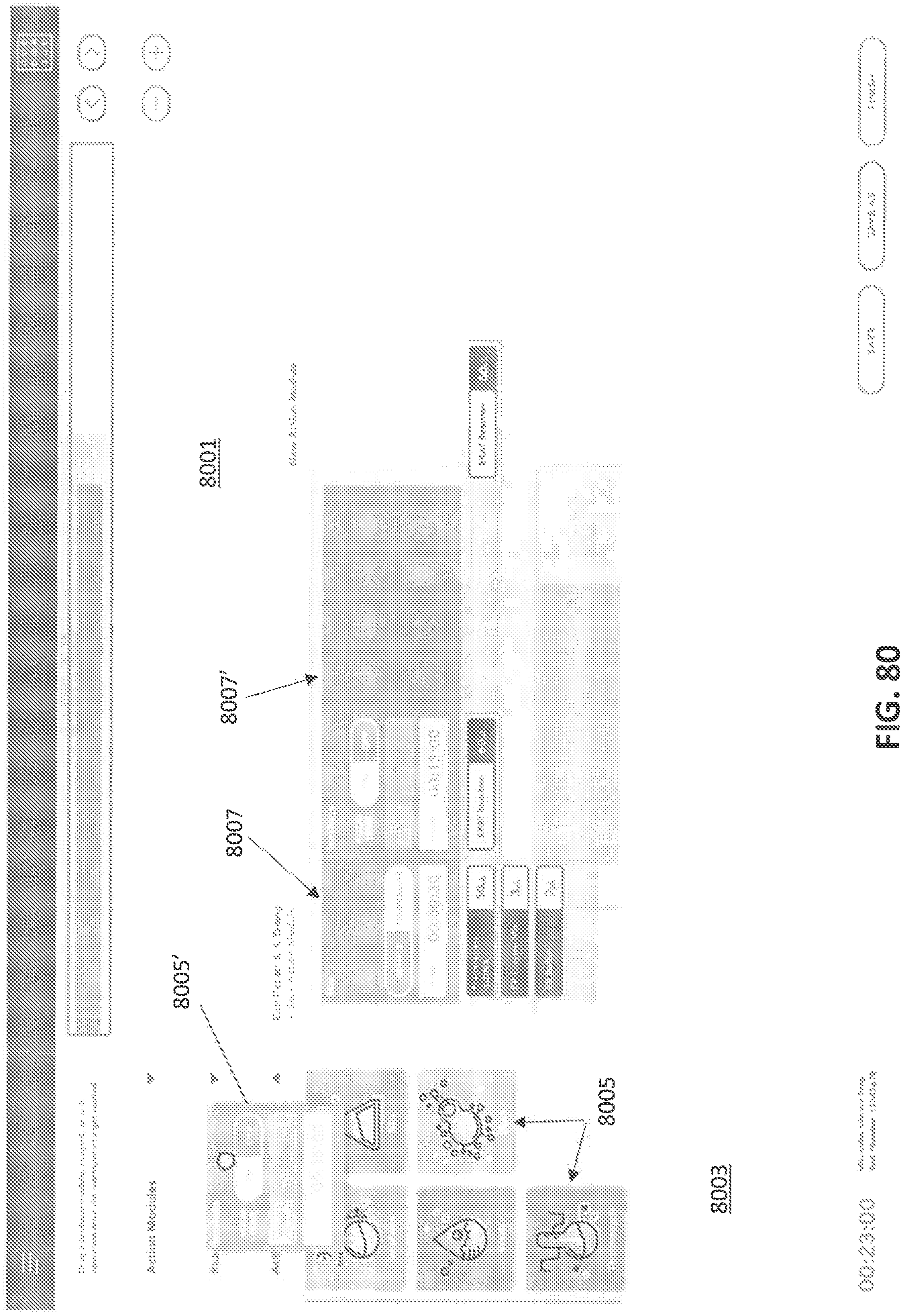

In FIG. 78, the user interface may be shown on the display of the device (e.g., a touchscreen) and/or a remote computer device, such as a smartphone, laptop, desktop, etc. FIG. 79 shows an example of a user interface, instructing the user what to apply to the various cartridge inputs. FIG. 80 is an example of a cloud interface for a selecting, modifying (editing) and/or sharing a protocol, using the visual protocol design language described herein. This user interface is an open canvas interface that allows a user to create, edit, delete and save any protocol in a drag and drop interface. Users can select reagents, sample, unit operations of the system (heat, cool, mix, elute, wash, incubate, thermocycle, heat/cool) and build their own protocols. The pathfinder (translation of the blocks to actions on the device) algorithm may takes the constraints of the sample and reagents (contamination, volume and viscosity), electrode grid and cartridge constraints and find the most optimal paths between two points avoiding all mentioned constraints, as described above. Users can share their constructed protocols made on the open canvas in the protocol store. The open canvas unit operations may automatically be translated into the scripting language for protocol execution by the apparatus.

For example, a user may share protocols from other users or labs. For example, a user from organization A has created protocol X in the cloud interface for x application with their preferred conditions and volumes. A user from organization A can share the protocol X with the community in a market place. A user from organization B can read and download the protocol X, edit it or load it directly in their machine and run it. The protocol can have a cost that user from organization B pays and the machine provider and user from organization A may share revenue. This is illustrated in FIG. 81.

FIG. 82 and FIG. 83 show examples a user interface for selecting a protocol and reviewing the protocol, respectively.

FIGS. 84 to 101 illustrate the user interface for programming and operating the device on both the device and/or on a remote processor (e.g., desktop, laptop, pad, etc.).

Thermal Control

Any of the apparatuses described herein may include features for thermal control (e.g., heating and/or cooling), and/or droplet detection (e.g., tracking and/or identification). For example, the apparatus, including the cartridge and reader, may be configured to quickly and accurately cycle droplet temperatures. Alternatively or additionally, droplet detection may quickly and accurately scan the electrode grid for droplets (including, but not limited to reagents, wax, water, etc.).

As described above, the reader may be configured to include one or more thermal control elements, including cooling and/or heating. For example, the reader may include resistive heating in some of the cells, to heat a droplet within the air gap. For example, in some variations a resistive heater may be included in layer 2 of the printed circuit board (PCB), such as part of a first copper layer under the surface of the PCB. The apparatus may also include a heat sink or cooling element, such as a liquid cooler (chiller) that is in constant thermal connection with the PCB. Any of these variations may also include one or more of thermal mass reduction, which may enhance the rate of temperature change in a cell, and/or thermal conduction through the PCB (e.g., through the electrodes that form part of the PCB in the reader).

Figure 28:
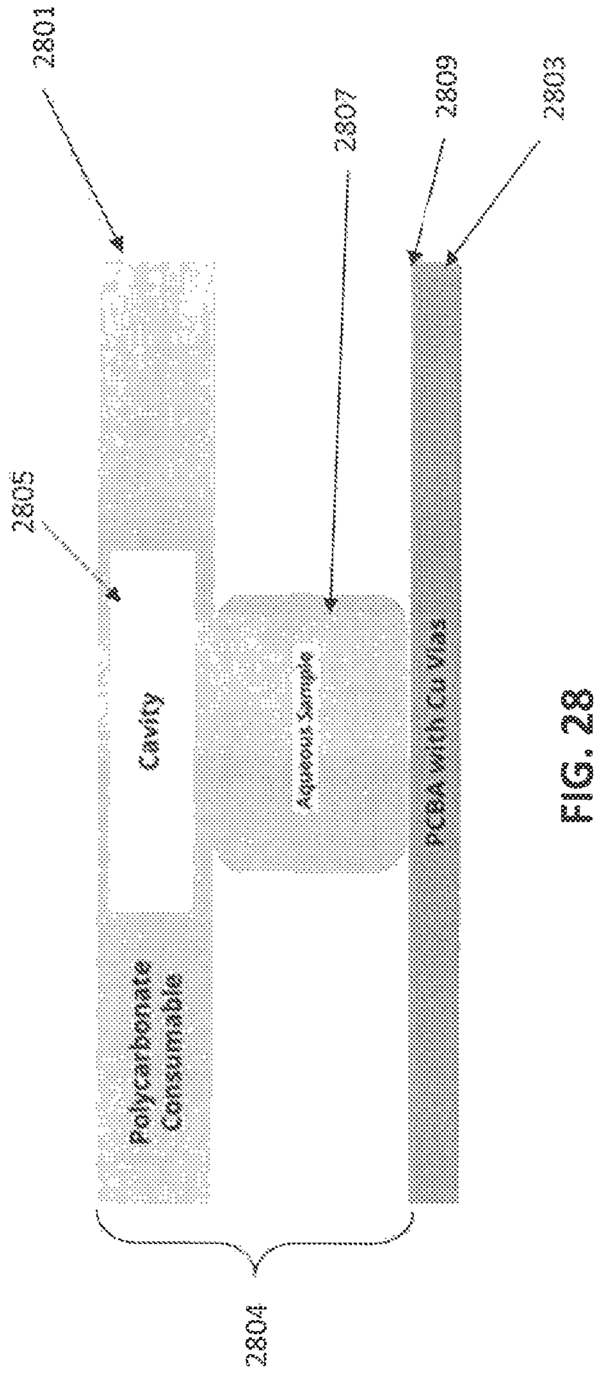
FIG. 28 illustrates an example of a portion of a cartridge showing a thermally controlled region.

Thermal Mass Reduction may refer to the reduction or removal of thermal mass from the apparatus (e.g., system, device, etc.) to reduce the total required amount of energy to reach a temperature or temperature range. Ideally, when there is less thermal mass, less energy needs to be taken out of the system to decrease the sample temperature during thermal cycling, thus enabling faster cycle rates without the need for a very large heating and cooling system (i.e. no more liquid cooling to the stack up). The apparatuses and methods described herein may reduce thermal mass by reducing/removing thermal mass from above a droplet or region holding one or more droplets in the upper (top) plate of the cartridge. For example, when the upper/top plate is formed of an acrylic or polycarbonate material, the thermal mass above the air gap region may be reduced by including one or more cavities in the top plate (e.g., the polycarbonate and/or acrylic structure) and filling the cavity with a thermally insulating material, or a material that has a low thermal conductivity (such as air). The cavities may be positioned in the top plate of the cartridge over a thermally controller region, so that when a droplet of material is below the cavity, the heating/cooling applied by the reader, e.g., from the PCB, may more rapidly change the temperature of the droplet in the air gap region. Removing the thermal mass above the droplet may be incorporated in the design of any of the cartridges described herein. The cavity may be formed near the bottom surface of the top plate (e g , immediately on one side of the air gap); the cavity may be partially through the thickness between the top and bottom surfaces of the top plate. FIG. 28 illustrates an example of a portion of a cartridge showing a thermally controlled region in the top plate 2801 of the cartridge 2804. The cartridge may be positioned onto the reader 2803. A droplet 2807 within the air gap region of the cartridge (e.g., the region bounded by the bottom surface of the upper plate 2801 and the top surface of the lower sheet of dielectric material 2809. Thus, in variations in which the cartridge body, including the top plate is formed of a solid piece of polycarbonate on the top plate, one or more cavities may be created (e.g., FIG. 29) and may be enclosed or filled with an insulating material that has a low thermal mass. This may prevent heat from the sample transferring to storage region above it. The void replacement material can be air or a similar material that has low thermal conductivity and low thermal mass.

Alternatively or additionally, thermal mass may be removed from the PCB by removing material (e.g., with precision milling) and/or using materials having a very low thermal mass. For example, one or more layers of the PCB may be removed in the heater zone (e.g., heating or thermally controlled region) to reduce thermal mass. This may be done from the bottom side of the board as to not disrupt the surface finish of the electrodes.

FIG. 29 is an example of a milled region in a PCB of a reader apparatus that has a lower thermal mass in order to increase the response time for temperature change of a droplet in the air gap of the cartridge. In This schematic example, showing sectional view, the layers of the bottom (e.g., PCB) may include one or more layers, e.g., of copper and dielectric beneath the droplet (in the PCB of the reader) has been milled to create a cavity or void which may be filled with a thermally insulating material, including air. Thus, thermal conduction through the PCB may be reduced. In general, the cavities in the top and/or bottom plate may help thermally isolate the droplet in the air gap between the top and bottom plates.

In addition to speeding temperature changes in the droplet by reducing thermal mass, any of the methods and apparatuses described herein may increase the thermal conductivity between a heater source and an electrode to improve performance. For example, if the heater layer on the PCB is in layer 2, then using a high thermally conductive dielectric layer will increase heat transfer from the heater layer to the electrodes, as illustrated in FIG. 30. FIG. 30 shows a high conductive dielectric 3005 between the heater 3003 and electrode 3001 copper regions.

In some variations, the reader (and in particular the PCB portion of the reader) may alternatively or additionally be configured to increase thermal conductivity by including one or more thermal vias near each active (e.g., driving) electrode/cell. The thermal via may be a channel or passage in thermal contact with the region near the electrode(s), including the region underlying the electrode(s), such as the PCB material, of the thermal control region, and may be filled with any thermally conductive material. For example filling the vias with a thermally conductive material (such as, but not limited to: copper, epoxy, resin, etc.) may further increase the thermal conductivity and may dramatically increase the thermal response time of the droplet or other material in the air gap. Thus heating and/or cooling may be much faster than without the vias. The thermally conductive vias can be implemented with or without a milled region in the PCB (shown in FIGS. 31A, showing a milled region with thermally conductive vias, and 31B, showing thermally conductive vias without a milled region). For example, FIG. 31A illustrates a plurality of thermal conductive vias 3105 in an example of a bottom plate (e.g., PCB) with that has been milled to provide a region of thermal isolation around the thermally controlled active region.

The vias may be filled with any appropriate thermally conducive material. In some variations the vias are filled with a thermally conductive material that is not electrically conductive (e.g., epoxy, resin, etc.).

One end of the vias may be in thermal contact (e.g., may touch) with a region adjacent to the ultimate upper surface (e.g., the cartridge-contacting surface) and/or the electrodes of the reader device. In particular, when the thermal vias are filled with an electrically conductive material (e.g., copper) the thermally conductive vias may contact a region immediately adjacent to the electrodes, but not in electrical contact with the electrodes. Another portion of the thermal via may be in thermal contact with a heat sink beneath the upper surface (e.g., on a side and/or bottom surface). In some variations the opposite end of the vias may be in contact with a temperature controlled surface (e.g., cooled surface, heated surface, etc.). In some variations the vias may be in thermal communication at one end region with a thermal controller (e.g., heater, cooler, heat sink, etc.); the vias may pass through the vacuum chuck on which the PCB sits.

The vias may be any appropriate dimensions. For example, the thermally conductive vias (referred to herein as thermal vias or simply vias) may have a dimeter of between 0.1 mm and 3 mm, 0.1 mm and 2 mm, 0.5 mm and 1.5 mm, about 0.8 mm, about 1 mm, about 1.2 mm, about 1.4 mm, etc. The thermal vias may have a round, oval, rectangular, square, triangular, or any other cross-section and may be cylindrical, extending through the printed circuit board from the thermal control (e.g., one or more of a heater, cooler, heat sink, etc.) to the region immediately beneath the electrode or immediately adjacent to the electrode (in some variations, without contacting the electrode, so that they remain electrically, but not thermally, isolated from the electrodes).

As mentioned, any appropriate number of vias may be formed per each cell (e.g., associated with each electrode driving movement of fluid in the air gap of a cartridge). For example, each cell in the thermally controlled region (which may include multiple thermally controlled cells) may be in contact with 2, 3, 4, 5, 6, 7, 8, 9, 10, 11, 12, etc., or more vias. For example, each thermally controlled cell may be in contact with more than 8 vias.

The use of thermal vias may provide a dramatic improvement over variations in the rate of heating and/or cooling of the thermally controlled regions, compared to systems that do not include thermal vias.

Cartridge Features

Figure 32:
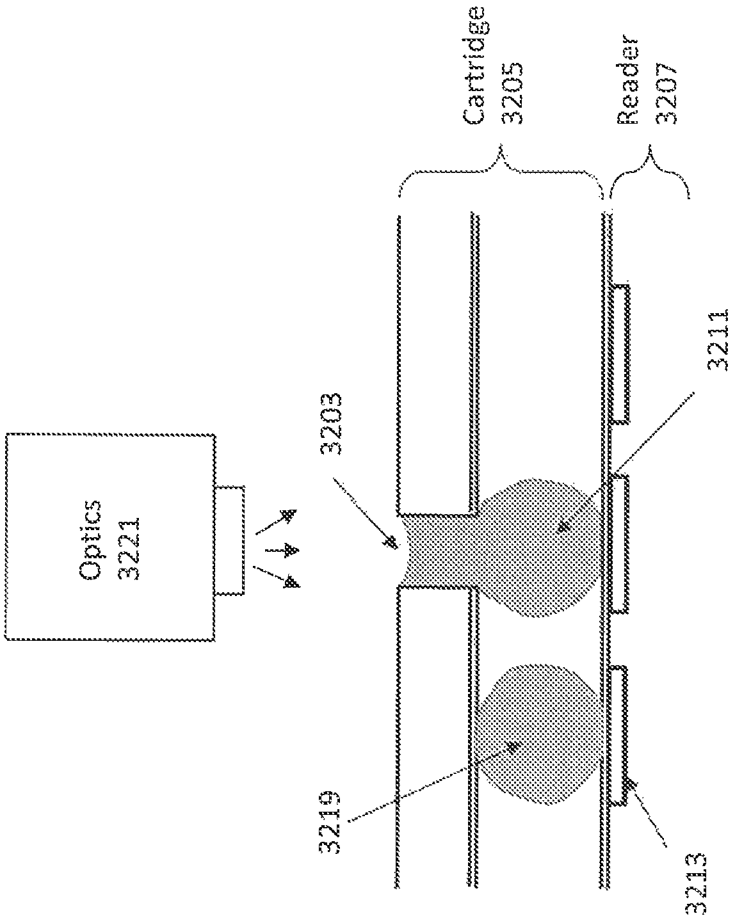
FIG. 32 is an example of a cartridge including an opening in the top plate for sampling or adding fluid to a droplet in the cartridge.

In addition to the features described above, any of the cartridges may alternatively or additionally include one or more openings into or through the top plate over some of the cells (e.g., regions that will correspond to one or more drive electrodes). These openings may be open and may allow direct imaging 3221, as illustrated in FIG. 32. Alternatively or additionally, an opening may be used for passive dispensing of fluid from the air gap. For example, in FIG. 32, an opening 3203 in the top plate of the cartridge 3205 may be used to passively dispense fluid from a droplet 3211 positioned beneath the opening; the drop let may be moved under the opening via DMF as described above. Once positioned a predetermined amount of fluid may be passively dispensed from the droplet into the opening, e.g., via capillary action, and the droplet may be moved away from the opening. The sampled material may then be analyzed or processed using the microfluidics in top of the cartridge and/or may be analyzed in place. Alternatively, the material sampled may be added to another droplet 3219 after the first droplet 3211 has been moved away; positioning the second droplet under the opening through the top plate that includes the sampled material 3203. This sampled material (fluid) from the first droplet may be a metered amount, based on the dimensions of the opening 3203. The top plate may include a hydrophilic surface or surface coating. In some variations, an opening in the top plate may be pre-loaded with a material, such as a liquid wax or other coating material that maybe combined with a droplet when the droplet is moved under the opening (e.g., to dispense a coating material, such as an anti-evaporation coating of liquid paraffin, oil, etc.). An opening in the top plate may also act as a thermal insulator. The opening may extend over a portion of the cell so that the return electrode may be on the edges of the opening. The opening may be any size and dimension (e.g., round, square, etc.). Although the variation shown in FIG. 32A illustrates imaging through the top plate (using optic 3221), in some variations the imaging may be done from the bottom, through the bottom of the cartridge. For example a region of the bottom of the cartridge (e.g., the dielectric film) may be transparent or optically permeable for imaging (e.g., fluorescence).

Figure 27A:
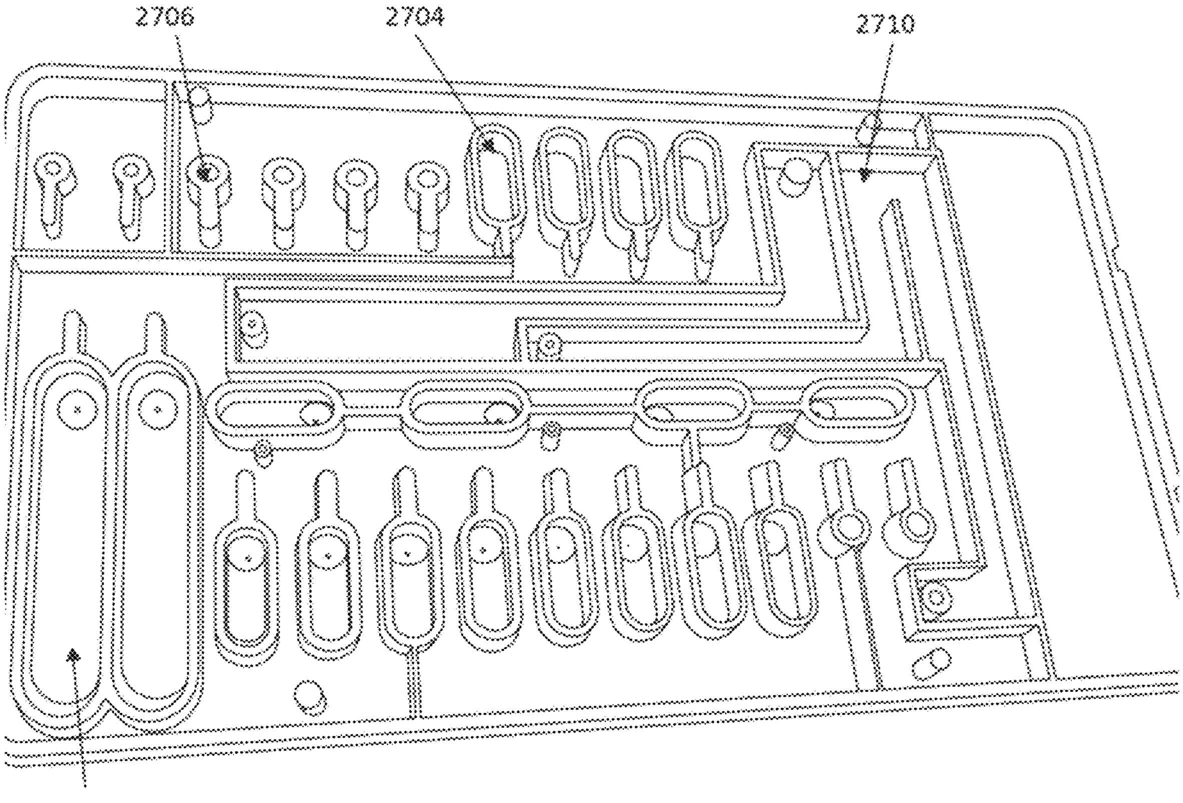
FIGS. 27A and 27B illustrate top and bottom perspective views, respectively of one example of a top portion of digital microfluidics cartridge as described herein.
Figure 27B:
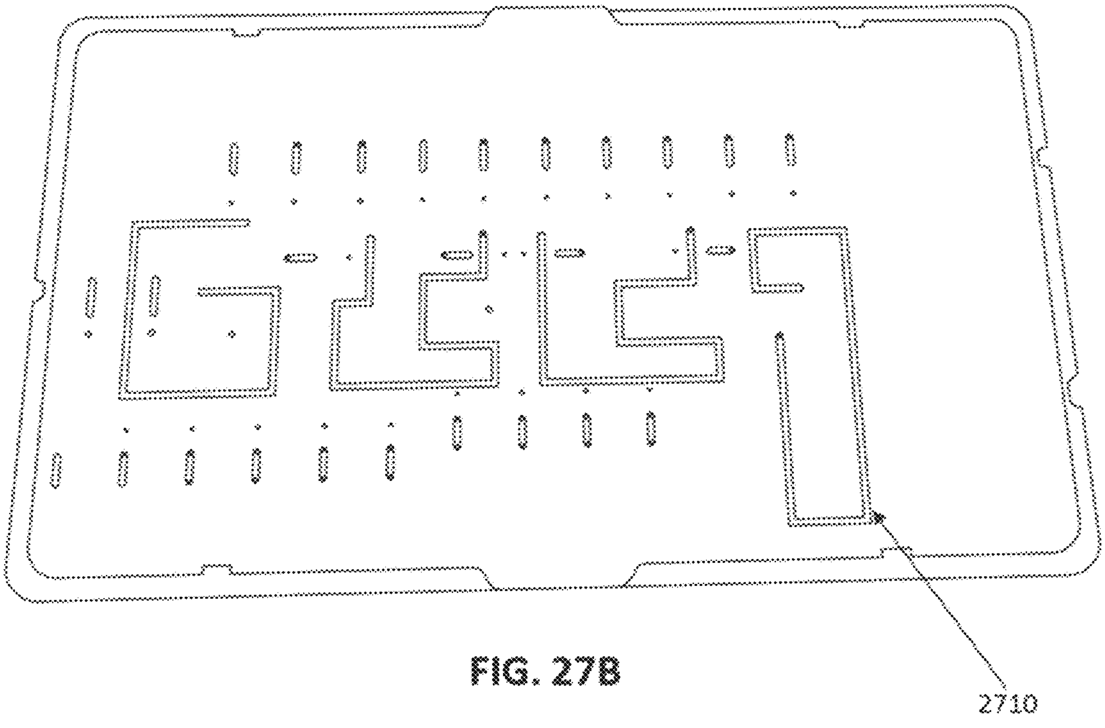

In any of the cartridges described herein, the top plate may include a plurality of manifold for delivery of one or more materials into the air gap. FIGS. 27A and 27B illustrate one example of a top plate, formed of a polymeric material (e.g., acrylic and/or polycarbonate). FIG. 27A shows the upper region of the top plate (which may be covered by one or more covers, not shown. In FIG. 27A, a plurality of dispensing regions 2704, 2706, 2708 of different sizes are included. For example a smaller 2706 (e.g., 2-20 microliter size), medium 2704 (e.g., 100 microliter to 1 mL) and large 2708 (e.g., 1 mL to 5 mL) are shown, as are waste and/or mixing regions 2710. These chambers may be preloaded with fluid, and each may include an opening into air gap region. A pressure control may be used to apply pressure to drive the fluid out of the opening of the dispensing region and into the air gap, which may be controlled by the reader or other device holding the cartridge. Thus, the reader may include one or more pressure interface(s) that may be used to control the release of fluid from and fluid handling in the top pate. FIG. 27B illustrates a bottom side of the top plate portion shown in FIG. 27A. The bottom side may be coated or covered with the electrode and/or a dielectric and/or a hydrophobic coating, a described above. In FIG. 27B, the top plate may also or alternatively include one or more channels 2712 in the surface of the plate that may allow for mixing as described above. The bottom surface of these channels may be formed by the upper dielectric and/or return electrode (which, in some variations, may include a dielectric, hydrophobic film and/or electrode layer).

In any of the cartridges described herein, the bottom surface, which may be configured to contact the seating surface of the reader and in particular the drive electrodes in the reader, is formed of a dielectric material, as described above. The bottom surface may be a sheet of dielectric material having a first side and a second side (the first side forming an exposed bottom surface on the bottom of the cartridge). The second side of the sheet of dielectric material may comprise a hydrophobic surface and may form one side of the air gap. The bottom surface may be, for example, a film that is either itself dielectric, and/or that is coated with a dielectric material. For example, in some variations the film is a dielectric and/or hydrophobic film. It may be beneficial to have this bottom surface be substantially flat.

Any of the cartridges described herein may be configured apply tension to the sheet of dielectric material. For example, any of these cartridges may include a frame to hold the dielectric material in tension. Thus the cartridge may include a tensioning frame holding the bottom sheet of the cartridge.

The dielectric and/or hydrophobic film tensioning design may pretension a sheet (e.g., a dielectric and/or hydrophobic film) such that the surface of the sheet is planar throughout, and remains planar during its interface with the reader seating surface (e.g., the PCB) and during use of the DMF apparatus. The goal of the tensioning frame holding the film (e.g., A dielectric and/or hydrophobic) in the cartridge is to interface with the seating surface (e.g., of the PCB interface) to ensure that the film remains in complete contact with the electrode grid (e.g., driving electrodes) throughout use of the apparatus.

In any of the cartridges described herein the bottom of the cartridge may include a sheet of dielectric material having a first side and a second side, the first side forming an exposed bottom surface on the bottom of the cartridge, as described above. Any of the cartridges described herein may include a tensioning frame to hold the sheet flat by applying tension. The sheet, while exposed as the bottom of the cartridge, may be slightly recessed compared to the outer perimeter of the cartridge bottom, which may fit into a lip or recess on the reader device, as will be described in further detail below. Thus the sheet of dielectric material at the bottom of the cartridge need not be the bottommost surface.

For example, FIGS. 49A-51 illustrate one example of a cartridge assembly that includes a frame to stretch/smooth the bottom (e.g., dielectric sheet) of the cartridge. FIGS. 49A-49D illustrate one example of a tensioning frame. In this example, the cartridge body features a two-part film tensioning mechanism. The two parts, shown in FIGS. 49A-49B (and assembled views in 49C-49D), may include a tensioning frame 4901 and a dielectric and/or hydrophobic film frame 4903. When assembled, the film forming the bottom of the cartridge may be adhered to the dielectric and/or hydrophobic film frame 4903. The film and film frame 4903 assembly may be inserted into a groove in the tensioning frame 4911 employing a connector (e.g., a snap-fit mechanism). Upon snapping into the tensioning frame, the film may be pulled taught in all directions in an X-Y plane. This frame assembly may then be fastened into the cartridge body. The assembled frame may include lower profile (e.g., cut-out) region 4909 that may provide access to electrically connect the return electrode on the upper plate, bypassing the film on the cartridge bottom surface.

Figure 50A:
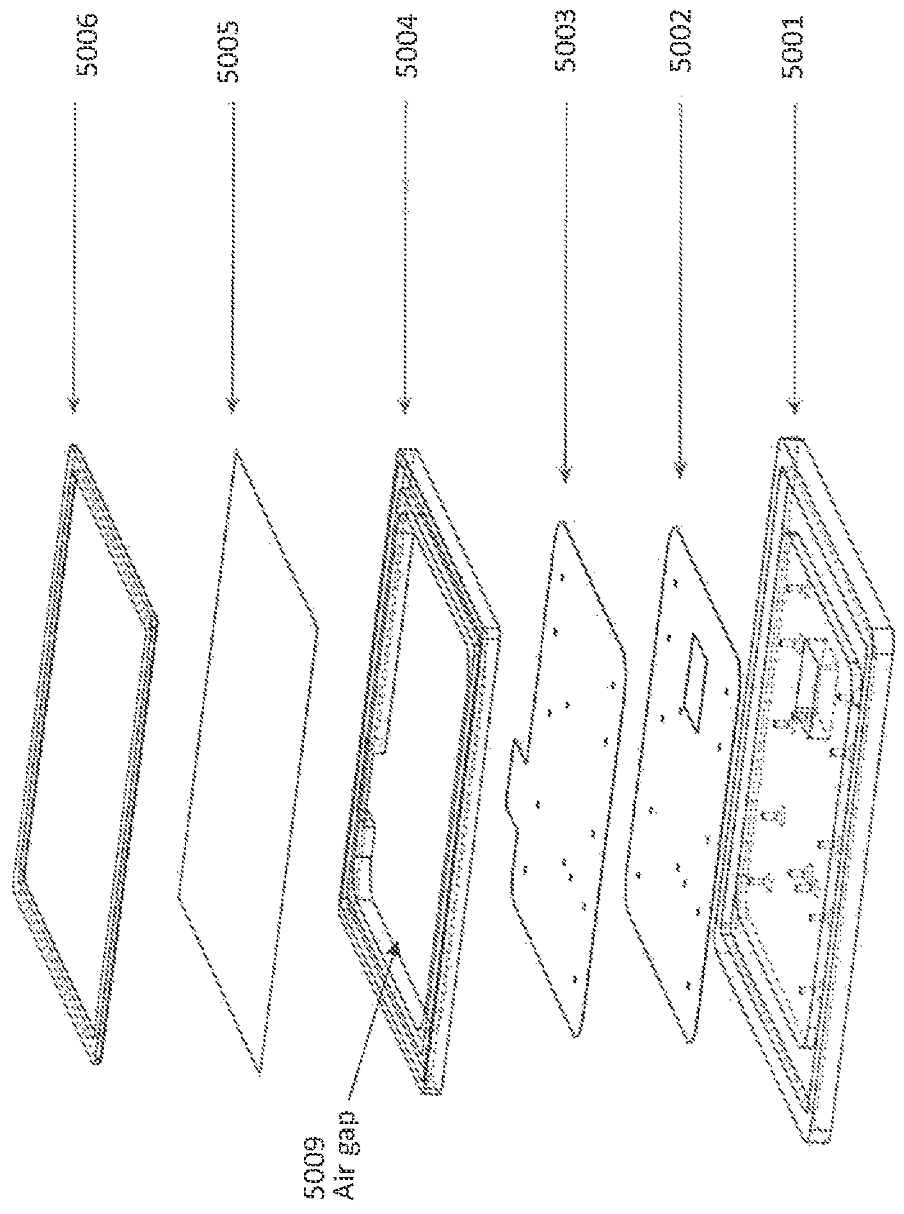
FIG. 50A is an example of an exploded view of a cartridge.

One example of a cartridge including a frame for holding the bottom membrane flat is shown in the exploded view of FIG. 50A. In FIG. 15A, the individual components in the cartridge and film tensioning assembly are shown. This figure also outlines their arrangement during assembly. The first two components to assemble may include, e.g., an optically clear double-sided adhesive 5002, and a sheet of dielectric material 5003 (e.g., coated on conductive material). The frame (e.g., tensioning frame 5004) and the sheet including a dielectric material 5005 may also be included, and the film secured in place by a second portion of the film frame 5006. The air gap 5009 maybe formed between the film 5005 and the bottom surface 5003 of the top piece (which may include the return electrode(s)).

Figure 50B:
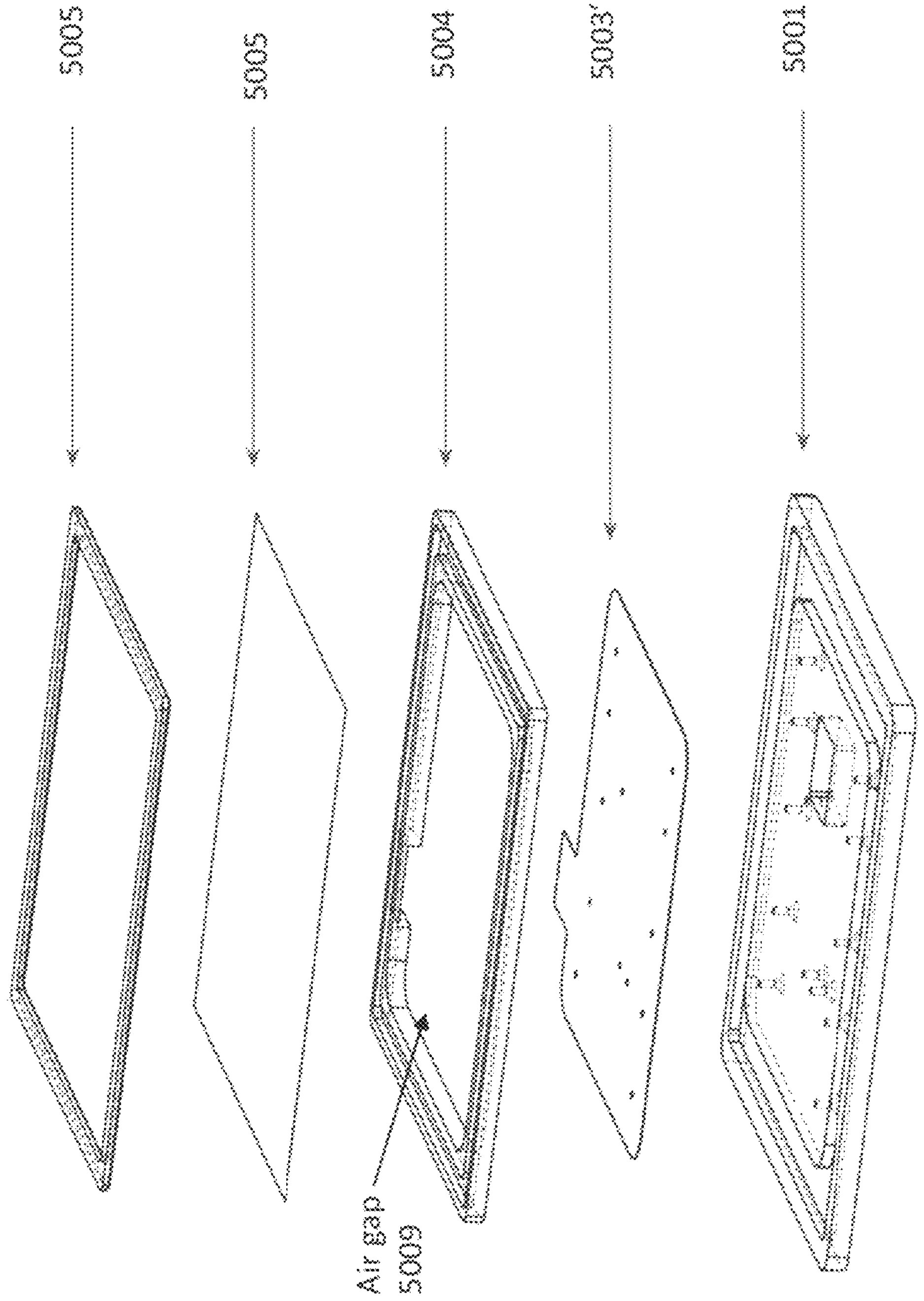
FIG. 50B is another example of an exploded view of a cartridge.

FIG. 50B depicts the individual components in the cartridge and film tensioning assembly after assembling the optically clear double-sided adhesive and the dielectric and/or hydrophobic material coated on conductive material. Conductive material can be any conductive material such as ITO, aluminum film, copper and others.

Figure 51:
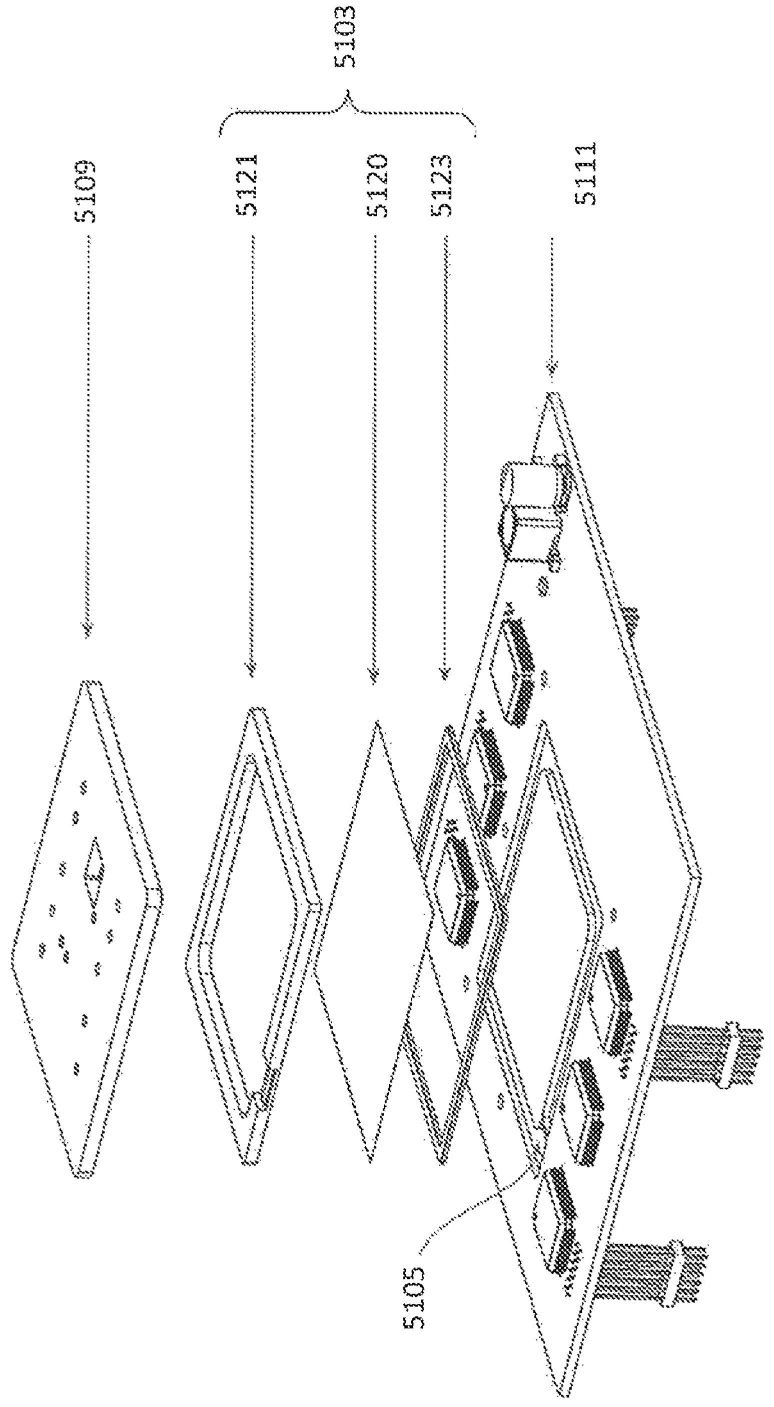
FIG. 51 is an exploded view of an example of a cartridge and a cartridge seating portion of a reader.

The film/cartridge and PCB interface may include a film tensioning frame as described above and a groove drilled out (trough) of the top surface of the PCB may form a boundary around the electrode grid of the reader. FIG. 51 shows an isometric, exploded view of an example of an assembly of a cartridge, including a film 5120 and film tensioning frame (outer frame 5121 and inner frame 5123), and an upper (top) portion of the cartridge 5109; FIG. 51 also shows a portion of a reader, including a PCB 5111 forming a seating surface for the cartridge. The seating surface also includes a trough 5105 to accept the lip around the bottom film of the cartridge (in this example, formed by the tensioning frame 5103). The trough may be a groove that is drilled out around the perimeter of the electrode grid. As the assembly arrangement in this embodiment shows, the film tensioning frame 5103 may slot into this trough 5105 around the electrode grid. Once assembled, the film tensioning frame 5103 may tension the film in X and Y, but also pulled downward in the Z direction at the edges of the film. The film may wrap over filleted edges of the trough, just slightly outside the boundaries of the electrode grid (not shown).

Figure 52B:
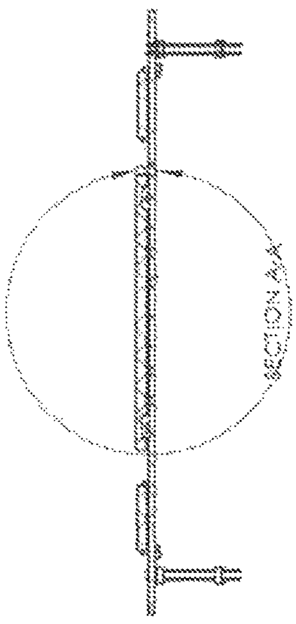
FIG. 52B is a side view of the PCB portion shown in FIG. 52A
Figure 52D:
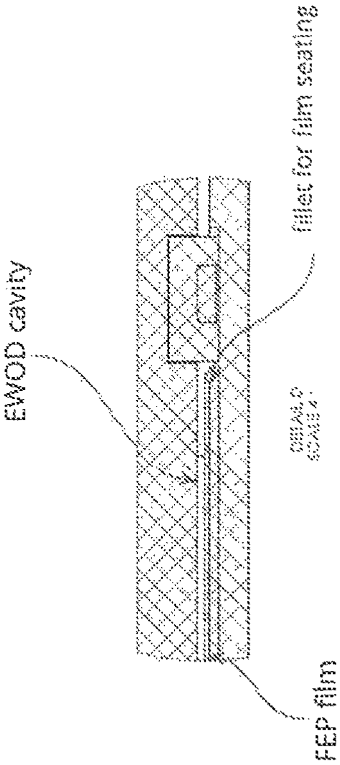
FIG. 52D is an enlarged view from FIG. 52C.
Figure 52A:
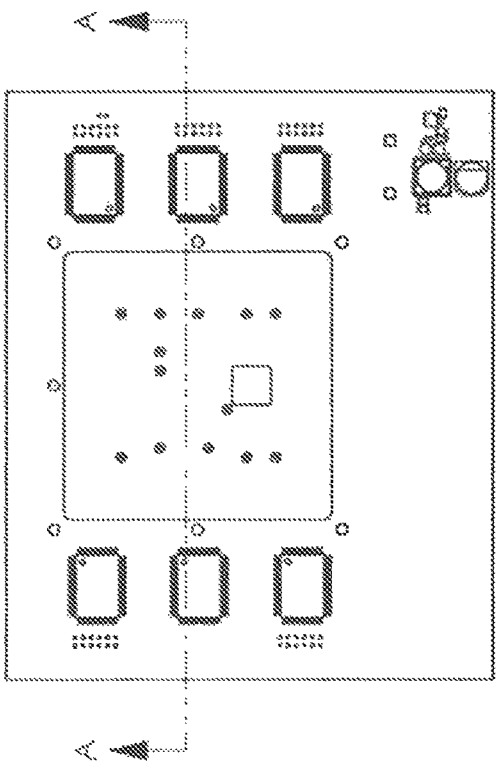
Figure 52C:
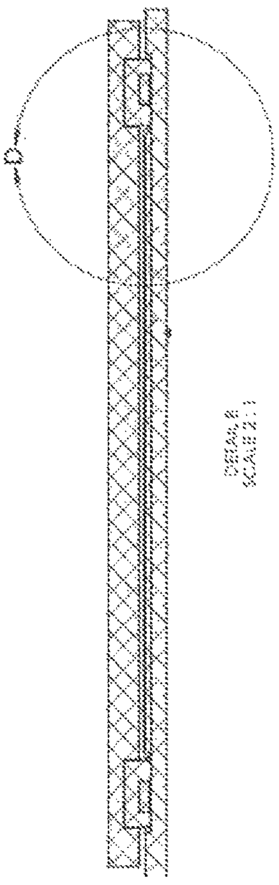
FIG. 52C is an example of a side view of a cartridge shown on a seating surface of a reader.
Figure 53:
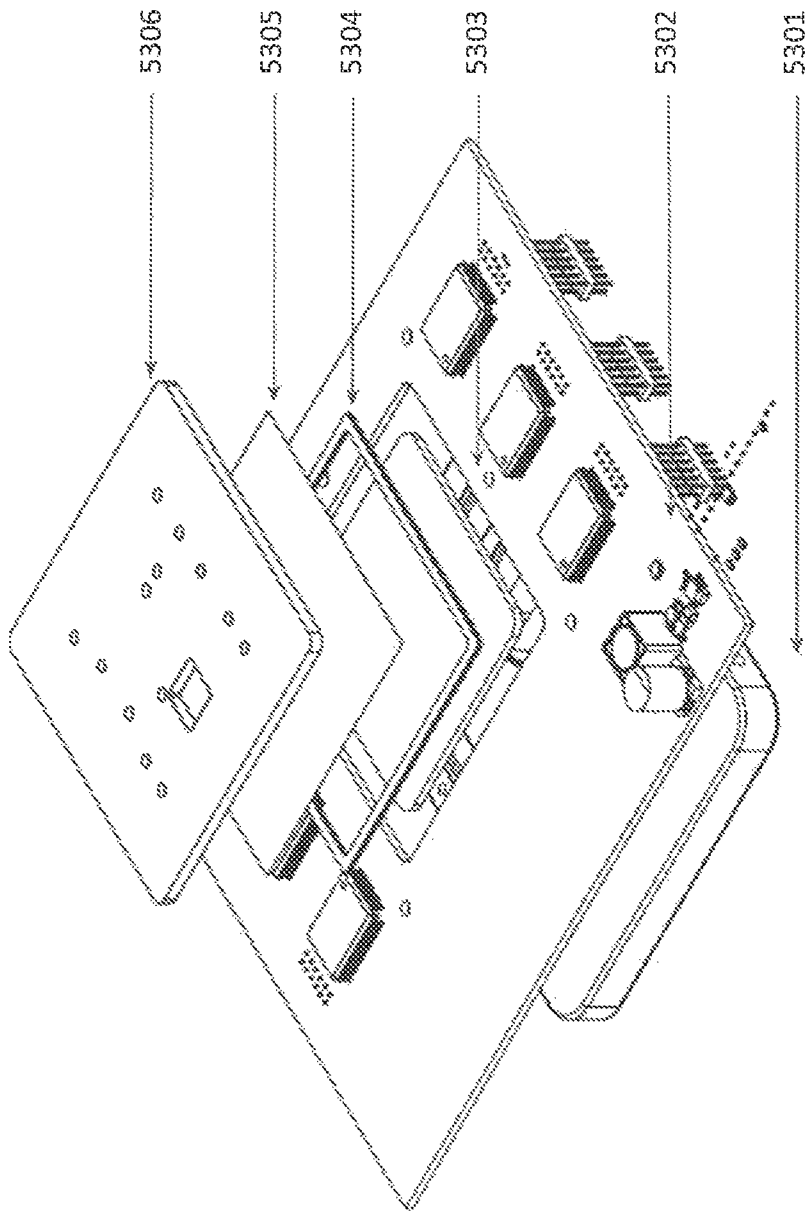
FIG. 53 is an exploded view of a cartridge and seating surface/region of a reader.

FIGS. 52A and 52B show top and cross-section views, respectively, of one example of a cartridge, including a bottom dielectric (and hydrophobic or hydrophobically coated) film, and film tensioning frames seated on a PCB assembly portion of a reader. The cross-section in FIG. 52B highlights how the dielectric and/or hydrophobic film may be pulled taught across the electrodes, and sealed down using the vacuum ports through at least some of the electrodes (drive electrodes) of the PCB, and also illustrates seating of an edge (extending proud of the film) in a trough formed in the PCB seating surface to seat the film. When fully assembled, these components may allow for a secure, fully tensioned, and planar dielectric (and/or hydrophobic) film to be secured to the driving electrode grid on the PCB. FIG. 53 is an exploded view showing individual components and their arrangement in assembly, including a cartridge upper body frame 5306, a dielectric film 5305 held in tension by a tensioning frame 5304, a PCB 5302 forming a seating surface on the reader, a groove or channel on the seating surface around the perimeter of the array of drive electrodes (driving electrodes) on the PCB, and a vacuum chuck 5301.

Figure 54A:
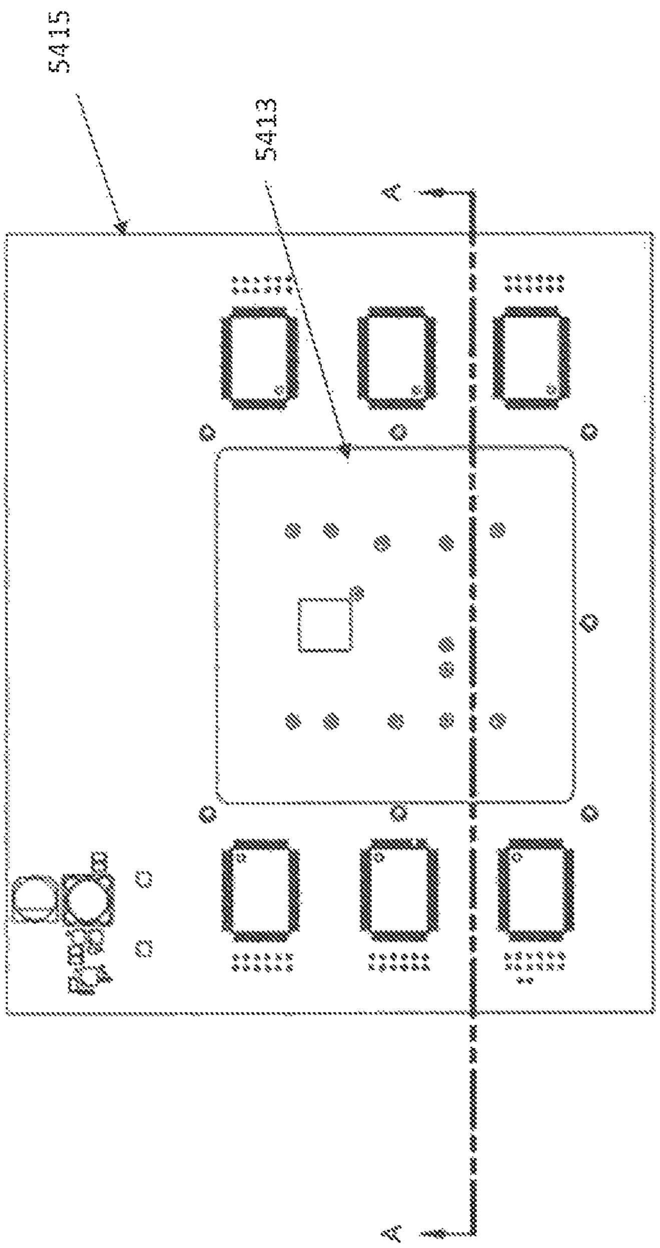
FIG. 54A is a top view of a PCB (that may form the seating surface) of a reader.
Figure 54B:
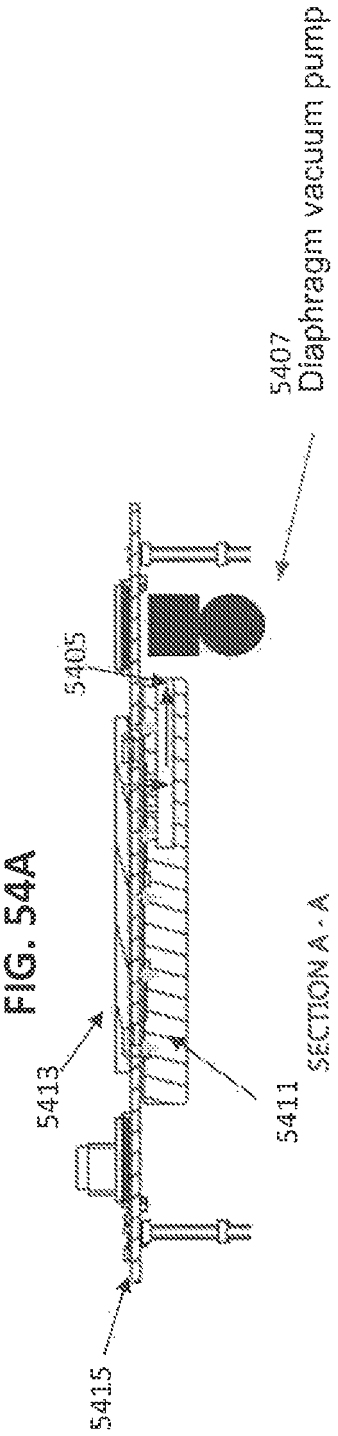
FIG. 54B is a side sectional view through the portion of the reader shown in FIG. 54A.

FIGS. 54A and 54B shows a top view of the assembly and a cross sectional view, respectively. The cross section view highlights the relationship of the vacuum chuck 5411 on the cartridge 5413 and film assembly, as well as on the PCB 5415. The section in FIG. 54B also highlights a few different effects of this system. The arrows 5405 depict the flow path for vacuum originating from a diaphragm vacuum pump 5407 on the outside of the chuck. This may be the same flow path as is described above in FIG. 35B. The arrows outline the force downward being applied to the film by the vacuum through the via holes in the PCB. The vacuum chuck and interface with the PCB securely adhere the film to the electrodes and apply downward force in Z. The film tensioning mechanism and PCB trough ensure the film remains planar by applying force in X and Y, while maintaining contact around the edges due to a fillet along the internal edge of the trough.

Reader Features

In general, any of the readers described herein may include a PCB portion, that may include the electrode array, active thermal control (e.g., heater, cooling, etc.), magnetic field applicator(s), etc., and a chuck (e.g., vacuum chuck) that may be mounted to the PCB. This portion of the reader may form the seating surface for the bottom of the cartridge, so that it may sit on the reader securely and in a predetermined orientation. For example, the cartridge may be keyed to fit onto the seating surface in a predetermined manner (e.g., by including one or more orientation slots, pins, etc.). The reader may also include one or more control units, including one or more processors, that may control the activity of the reader and may be configured to drive droplets and analyze information from the cartridge. The controller may also include memory, one or more datastores.

The seating surface of the reader may be configured both to seat a cartridge, but also to prevent arcing, sparking or shorting between the plurality of electrodes on the seating surface. For example, the seating surface may coated with an additional dielectric (onto which the dielectric bottom surface of the cartridge may sit) such as paralyene and/or alternative or additional materials. The dielectric bottom surface may prevent arcing between the electrodes in the array or electrodes (driving electrodes) on the seating surface. The spacing between the driving electrodes may be between about 50-120 micrometers. This close packing between electrodes on the otherwise flat surface may otherwise be susceptible to arcing/shorting between electrodes, thus the use of an outer dielectric coating (in addition to the dielectric layer of the cartridge) may limit sparking/arcing between electrodes.

As discussed and described above, some or all of the electrodes may include an opening through them which may be connected to a vacuum source for seating the electrodes onto the device. For example, in some variation every electrode in the array includes an opening therethrough; in other variations every other electrode may include an opening (e.g., alternating). In some variations every third electrode, every fourth electrode, etc. In some variations only corner electrodes may include an opening.

Droplet Detection

Figure 33A:
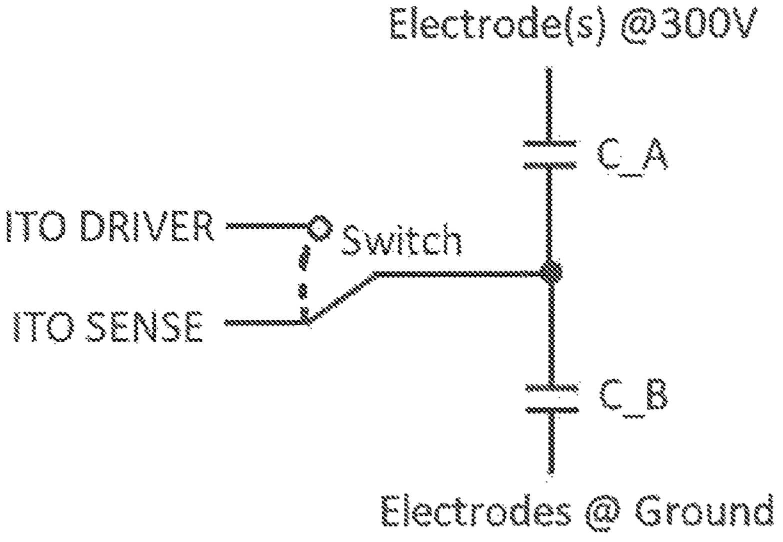
FIG. 33A shows an ITO sensing circuit with a switch.

Any of the apparatuses described herein may include droplet detection. As described above, droplet detection may be performed based on the capacitance of the electrode(s) in the array of driving electrodes by monitoring the current through the electrode(s). Also described herein are apparatuses (e.g., systems or devices, including readers) in which droplet detection is based on a capacitance measurement by creating a capacitor divider. In this example, the top plate may form a reference frame (e.g., reference electrode, such an ITO electrode) and may be usually driven between 0 and 300 V to create the AC signal; during droplet detection the reference electrode (top electrode) may be disconnected from the driving signal and its voltage sensed by the controller (e.g., microprocessor), referred to in FIGS. 33A and 33B as "ITO sense" as it may act as a sensing electrode, and may be electrically coupled to one or more reference capacitors. One or a group of electrodes may be activated at a higher known voltage (e.g., 300V DC), while all other electrodes are grounded. This creates the divider as shown in FIG. 33A. FIG. 33A shows an ITO sensing circuit with a switch to toggle between sensing (e.g., capacitive sensing from the reference/top plate) and driving, e.g., to move one or more droplets.

In FIG. 33A, the voltage at the ITO sense node (the ITO sense electrode) is driven by the ratio of C_A to the total capacitance (C_A+C_B). The capacitance of C_A changes based on the material permittivity in between the plates of the capacitor (electrode to ITO). The capacitance of C_B also changes relative to what is present between the ITO and the remaining electrodes. Air, wax, water and reagents have different permittivity, and thus changing the capacitance and the voltage at ITO sense. This enables this droplet detection method to not only detect droplets (e.g., the presence/absence of a droplet) but also to differentiate between droplets and identify specific reagents within the electrode grid.

Figure 33B:
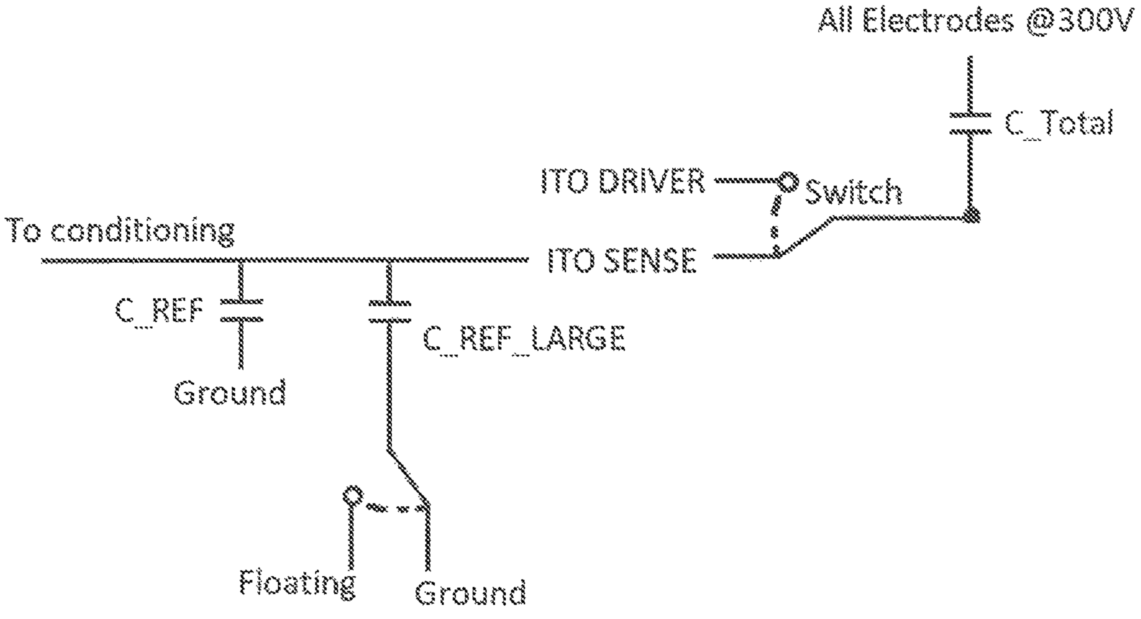
FIG. 33B illustrates another example of a capacitive sensing circuit that includes multiple reference capacitors.

Due to the variability of base capacitance, two calibration capacitors may be included (e.g., in FIG. 33B, C_REF and C_REF_LARGE). FIG. 33B illustrates another example of a capacitive sensing circuit that includes multiple reference capacitors. By driving all electrodes (e.g., all of the drive electrodes) to 300V, the total capacitance C_Total can be calculated by using the reference capacitors. The reference capacitance can be increased if there is a large enough C_Total to saturate the voltage at ITO SENSE. The conditioning circuitry for the ITO SENSE may isolate the voltage from minor leakage currents.

Figure 34A:
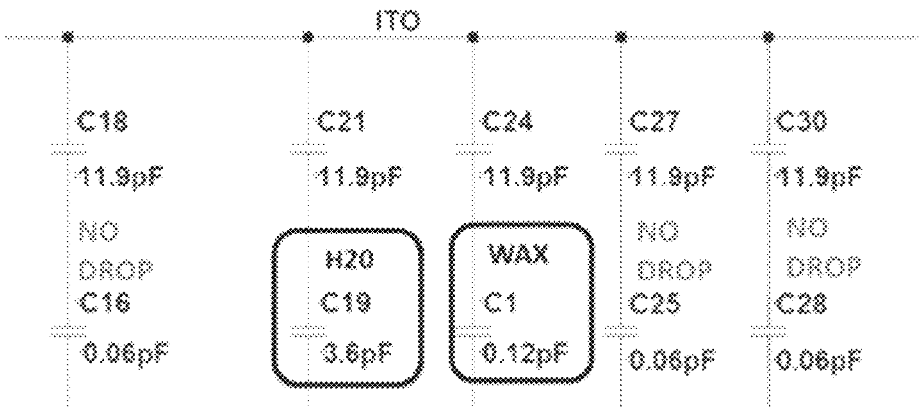
FIGS. 34A-34C illustrate one method of identifying and/or locating a droplet in the air gap as described herein.

FIG. 34A shows exemplary values for capacitance that may indicate the presence or absence (and/or identity of the material) of a droplet in one or more cells within the air gap. As discussed above, a 'cell' in the air gap may correspond to the region above a driving electrode when the cartridge including the air gap is placed into the DMF reader, which may have the array of drive electrodes on the cartridge seating region. In FIG. 34A, the "ITO" corresponds to the upper (e.g., return) electrode on the upper plate of the cartridge. In this example, C18, C21, C24, C27, C30 are the reference capacitor (e.g., 11.9 pF in this case) and C16, C19, C1, C25, C28 is the capacitance measured as described above, corresponding to the capacitance when different drive electrodes are measured (e.g., set to the high voltage, while grounding the other drive electrodes), either with or without a droplet. Water, wax and air (no droplet) have very different capacitances that can be used to identify the presence or absence of a droplet (e.g., capacitance greater than or equal to 0.09 pF, greater than or equal to 0.1 pF, etc.). In this example, a capacitance above this threshold (e.g., above 0.06 pF, 0.07 pF, 0.08 pF, 0.09 pF, 0.1 pF, 0.11 pF, etc.) indicates that the presence of a material in the air gap above the examined (set to high voltage, e.g., 300 V). Further, the range of the measured capacitance above this threshold may indicate the composition of the droplet, e.g., aqueous (water) and/or wax/oil. For example, a capacitance of greater than about 3 pF (e.g., 3 pF, 3.1 pF, 3.2 pF, 3.3 pF, 3.4 pF, 3.5 pF, etc.) may indicate that the droplet is aqueous, while a capacitance of between about 0.09 pF to about 3 pF may indicate that the droplet is wax or oil (e.g., between about 0.07 pF and about 3.3 pF, between about 0.09 pF and about 3.0 pF, etc.).

Figure 34B:
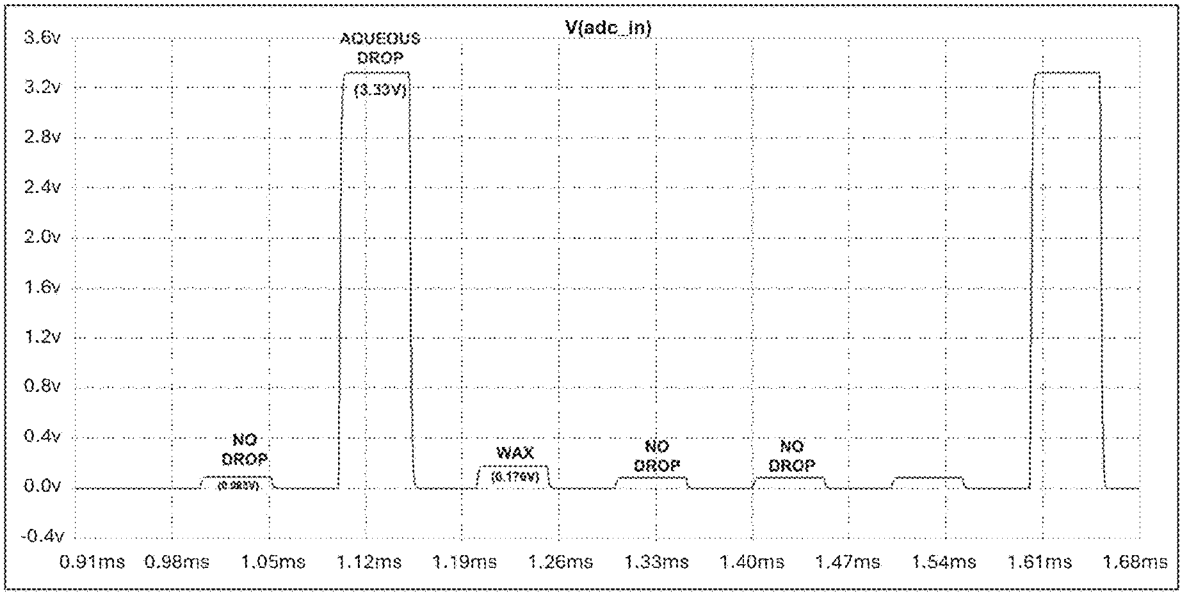
Figure 34C:
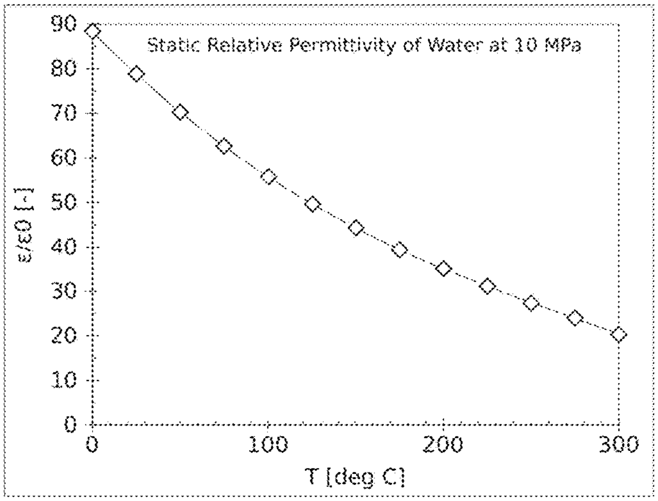

FIG. 34B is a graph showing example of measured voltages using this technique, based, showing the differences between different voltages measured with various droplets (water, wax) versus with no droplet (air) over a single test cell. In FIG. 34, the voltage detected when an aqueous droplet is present is about 3.3V, compared to 0.085V when there is no droplet present and 0.176V when wax is present. The measurement for wax is double that of air (no droplet/material), and water is much higher; in this example the circuit caps the value at 3.3V. Different materials can be detected by their differing permittivities. The permittivity of water may also be a function of temperature. Thus, in some variations, the capacitance may change as a function of temperature when a droplet is present. This property may be further used to identify water, and may also be used to estimate temperature. Thus, in some variations the capacitance measurement of the droplet may be used to estimate their temperature as well. For example, FIG. 34C is a graph showing the static relative permittivity of water, showing a change in relative permittivity with change in temperature (between 0-300 degrees C.).

Chuck Design

Any of the apparatuses described herein, e.g., the readers, may include a chuck (e.g., a vacuum chuck) that may form part of the seating surface, as mentioned above. The vacuum chuck may be attached to the electrode array (e.g., the drive electrodes that may be part of a printed circuit board) and may also be integrated with a magnet and/or heat dissipation features. Any of these elements or portions of these elements may be include or omitted, and may be used in any combination.

The vacuum chuck design may help ensure a reliable and effective vacuum adheres the bottom of the cartridge (e.g., in some variations a Dielectric and/or hydrophobic forming the dielectric layer) to the electrode grid. The vacuum may be applied through one or more (e.g., a manifold) of vias (e.g., copper vias).

In addition, any of the readers described herein may include a magnet that is integrated into the base, including the chuck and/or the seating surface. The integrated magnet(s) may be configured to allow an actuatable magnet to engage with material in the cartridge (e.g., magnetic beads in the liquid droplets in the air gap) through the vacuum chuck. The magnet(s) may rest slightly below the PCB forming the seating surface of the reader, without impacting the vacuum performance or function.

Any of the reads described herein may also or alternatively include one or more thermal regulators, including one or more heat dissipation elements that may quickly and accurately dissipate heat from the heater(s) in the reader that control the temperature of one or more cells in the cartridge when it is seated and retained on the seating surface of the reader. For example, described herein are two designs for heat dissipation elements that may be used separately or tighter. One exemplary thermal dissipation designs is configured to dissipate heat from a thermoelectric heater and another design is configured to dissipate heat from an embedded heater.

FIGS. 35A-48 illustrate a vacuum chuck portion of the reader that may be used with any of the reader apparatuses described herein. In general, the vacuum chuck may be configured such that negative pressure is applied through the chuck (e.g., from a vacuum pump), and is directed underneath the seating surface (e.g., the PCB forming part of the seating surface) in an area that is pneumatically isolated, e.g., by an O-ring or gasket (e.g., water jet gasket, Teflon spring seal, etc.). The seating surface may have via holes (e.g., in the PCB) that allow for the negative pressure to act directly on the bottom of the cartridge (e.g., a dielectric and/or hydrophobic film) that is seated on the topside of the seating surface (e.g., the PCB forming the seating surface), pulling the cartridge bottom down in the Z direction, and adhering it onto the electrode grid.

Figure 35A:
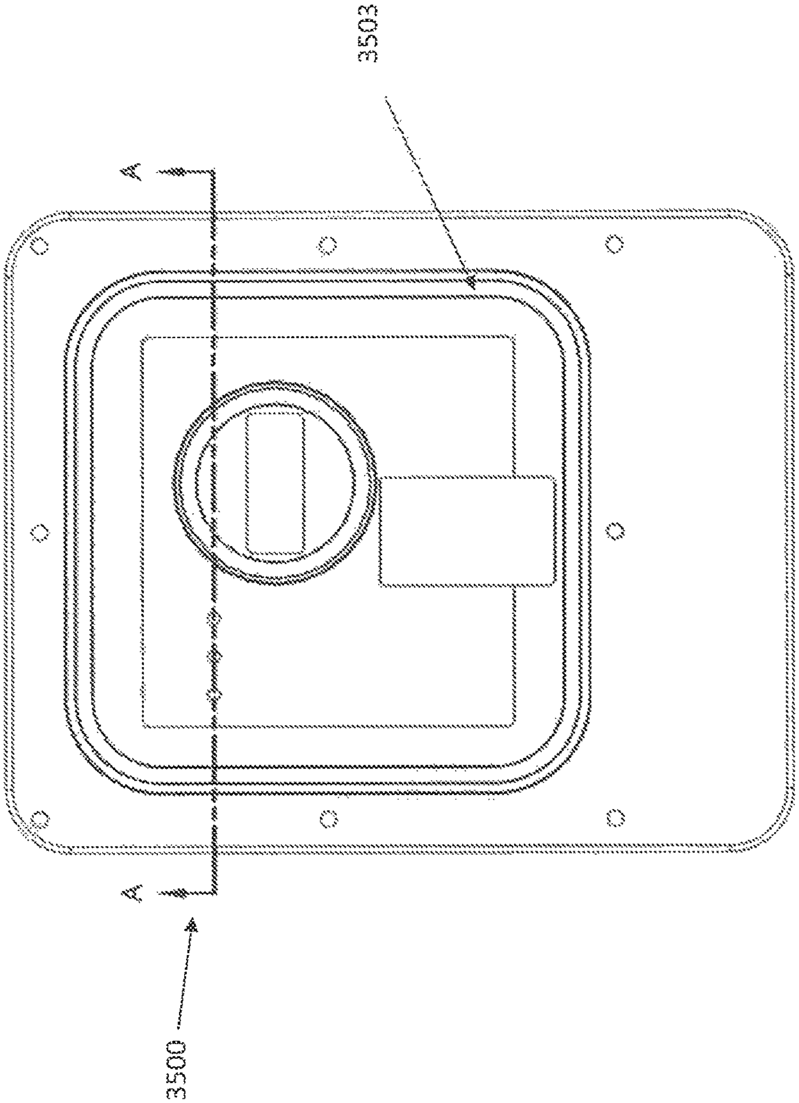
FIG. 35A is a top view of one example of a vacuum chuck.
Figure 35B:
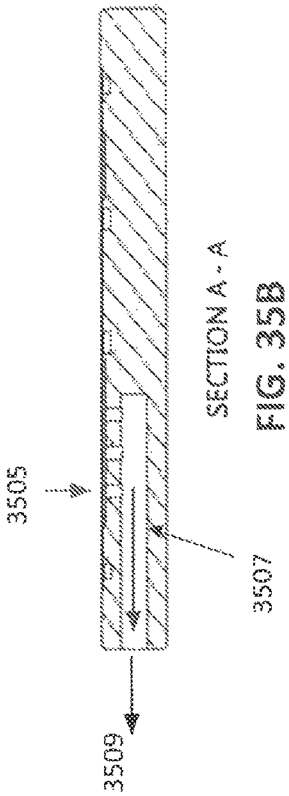
FIG. 35B is a cross sectional view of the vacuum chuck of FIG. 35A.

The vacuum chuck may include one or more of: a vacuum channel with ports on either end, a groove for an O-ring or gasket (e.g., water jet gasket), threaded holes to attach the PCB, and a recess under the electrode grid. For example, FIG. 35A is a top view and FIG. 35B is a cross sectional view of one example of a vacuum chuck 3500. Section A-A highlights the vacuum channel and its accompanying ports. The pneumatic flow 3505 follows the path of the arrows shown in FIG. 35B: first pulling through at least one inlet port, then flowing through the channel 3507, and finally flowing out of the side port 3509. A portion of the chuck (over which the seating surface formed by the PCB will be placed) is surrounded by an O-ring 3503.

Figure 37:
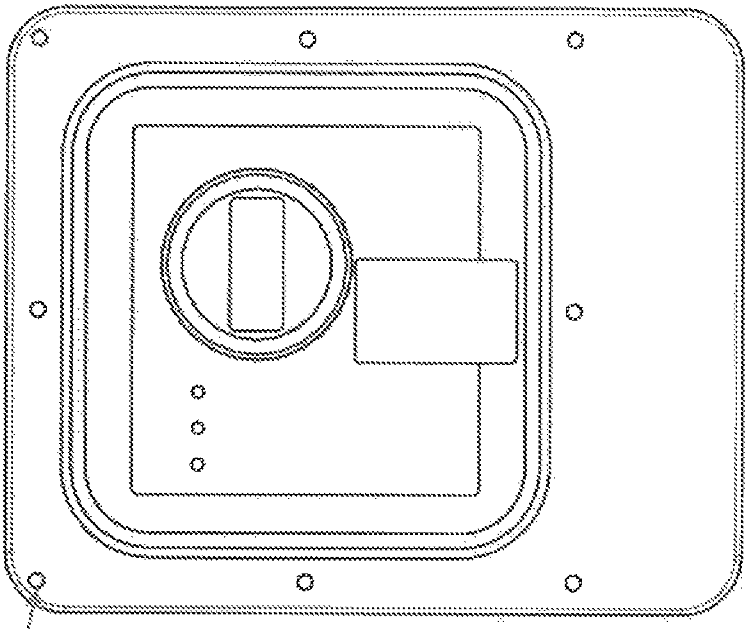
FIG. 37 shows a top view of a chuck similar to the one shown in FIGS. 35A-35B.
Figure 36:
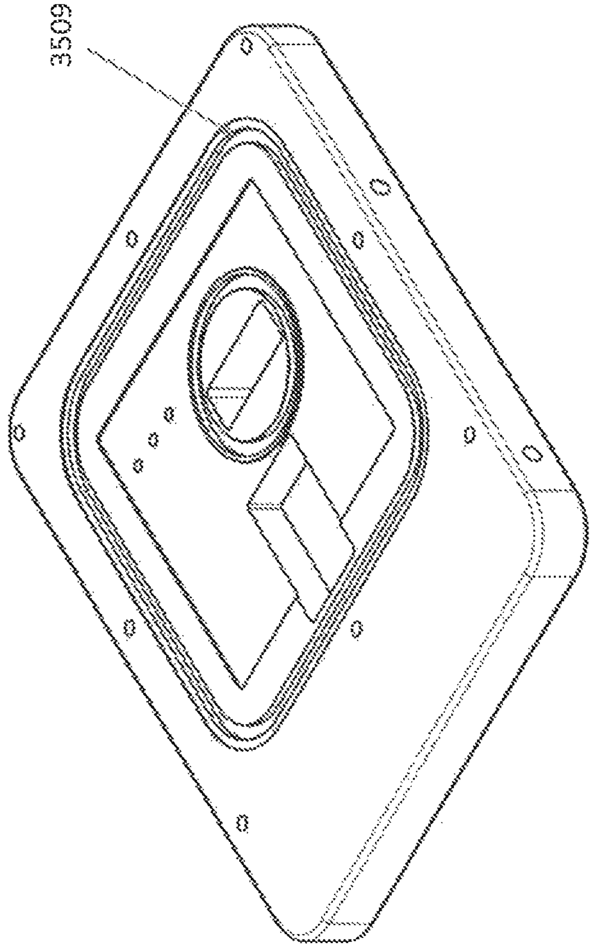
FIG. 36 shows an isometric view of the chuck shown in FIGS. 35A-35B.

For example, FIG. 36 shows an isometric view of the chuck shown in FIGS. 35A-35B. The groove 3509 (that may be designed using, e.g., a Parker O-Ring design standard) is configured to fit an O-ring or gasket (e.g., water jet gasket). Once in place, and with the chuck fastened to the PCB, the O-ring or gasket may pneumatically isolate the vacuum directly under the electrode grid. The seating surface may be formed by securing a PCB having the electrodes (not shown) to the chuck. For example, as shown in FIG. 37, the chuck may include multiple threaded holes 3701 for attaching the seating surface (e.g., PCB). FIG. 37 shows a top view of a chuck similar to the one shown in FIGS. 35A-35B. In some variations the chuck includes a minimum of four threaded holes (eight shown in FIG. 37), each equidistant apart in at least the X or Y directions, and centered about the origin of the chuck. The screw holes may serve a dual-purpose: first to fasten the PCB to the chuck such that the interface of the two components is planar, second to apply a downward force in the Z direction about the perimeter of the O-ring, effectively creating a pneumatic seal.

Figure 38A:
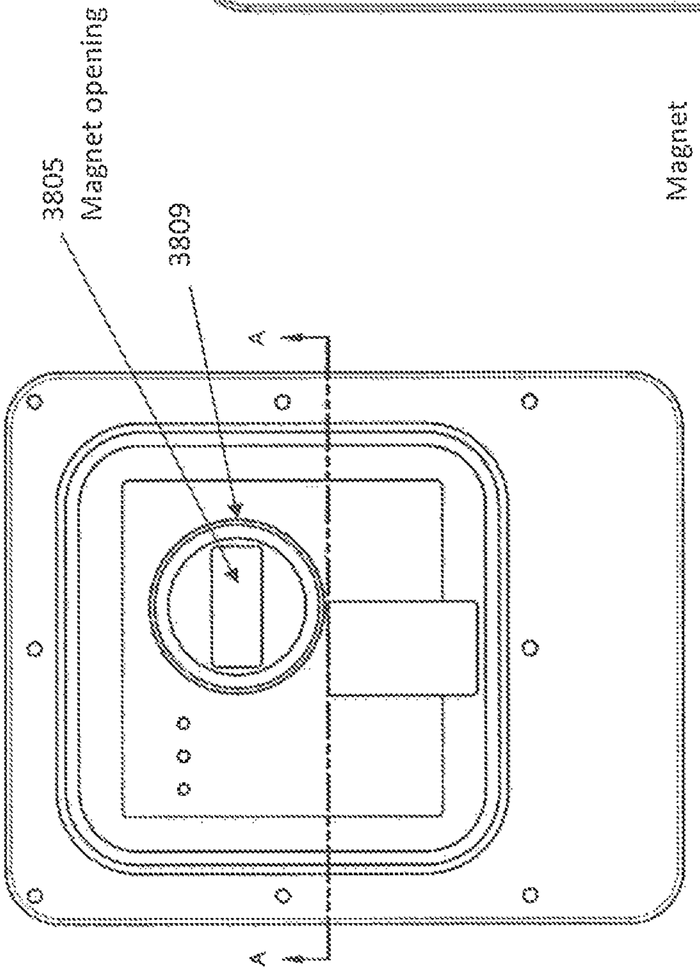
FIG. 38A shows another example of a vacuum chuck.
Figure 38B:
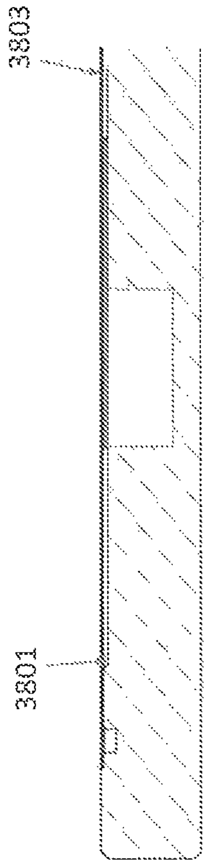
FIG. 38B shows a cross sectional and zoomed-in view of this chuck.

FIG. 38A shows a top view of a chuck similar to the one shown in FIGS. 35A-35B and FIG. 38B shows a cross sectional and zoomed-in view of this chuck. FIG. 35B shows an enlarged image of section A-A, showing the boundaries of the recess 3801, 3803 (along the X axis) that may create space between the PCB and the surface of the chuck, but only in the isolated area where the vacuum is active. This space may optimize the pneumatic flow of the vacuum as described in the herein. In FIG. 38, an opening 3805 for a magnet is present on the upper region and may include sufficient space for the magnet to be moved to/from the cartridge (e.g., by moving up/down within the space, or in some variations laterally). The region around the magnet opening may include a gasket or sealing ring (e.g., O-ring, gasket, etc.) 3809 for isolating the magnet region from the vacuum region, similar to the outer O-ring or gasket.

As mentioned, any of the apparatuses described herein may include an integrated magnet. In FIGS. 35A-39, a recessed region 3905 may be used to hold an integrated magnet that may be moved up/down by the system to engage/disengage a magnetic field. Alternatively in some variations the magnet may be stationary, but may be toggled (on/off, and/or changing the intensity) by the reader's controller.

Figure 39:
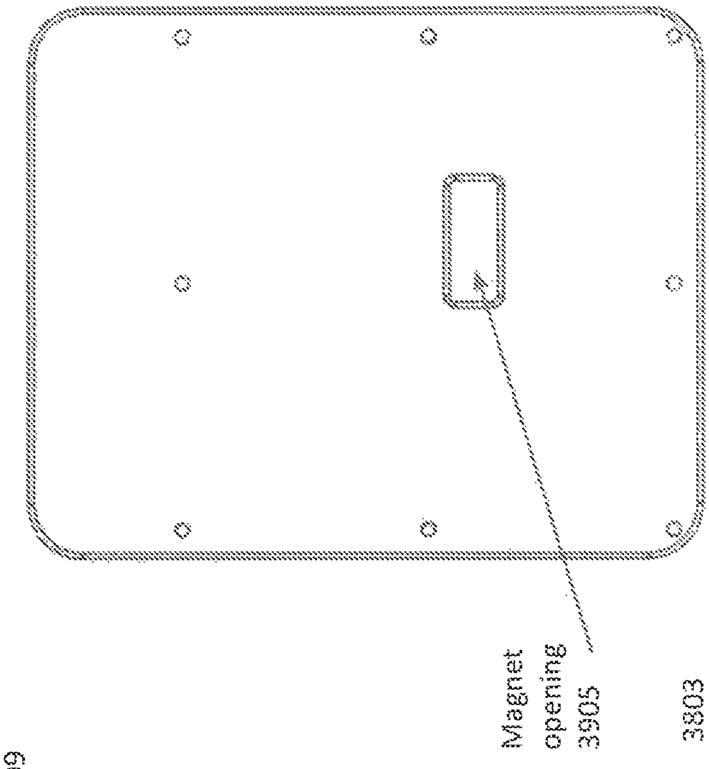
FIG. 39 shows a bottom view of a chuck similar to that shown in FIGS. 35A-35B.

Thus, the vacuum chuck may include an integrated magnet and may therefore include one or both of: a cut-out that allows a magnet to travel through the chuck, and second an O-ring groove that isolates the magnet zone from the pneumatic flow of the vacuum. FIG. 39 shows a bottom view of a chuck similar to that shown in FIGS. 35A-35B. A through-cut region 3905 is shown, and can be sized to fit the desired magnet, and allows for uninterrupted travel of an actuatable magnet. A magnet can pass through the cut-out, landing directly below the PCB when engaged, or can be disengaged through the cut-out when not in use.

Figure 40:
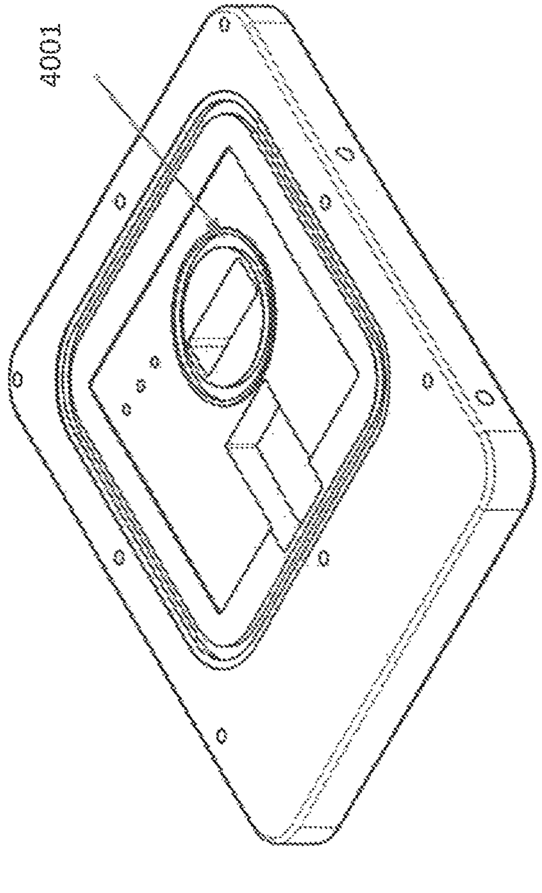
FIG. 40 shows an isometric view of a chuck similar to that shown in FIG. 35A.

FIG. 40 shows an isometric view of a chuck similar to that shown in FIG. 35A. A groove 4001 may fit an O-ring or gasket. Once in place, and with the chuck fastened to the PCB, the O-ring or gasket may pneumatically isolate the magnet cut-out zone from the rest of the vacuum chuck, specifically ensuring the vacuum is not compromised by the magnet cut-out.

Figure 41A:
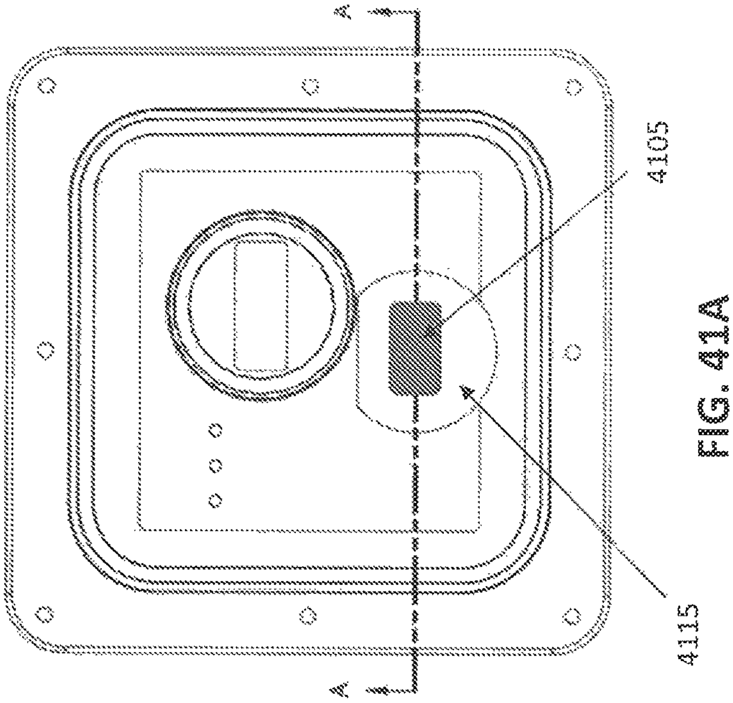
FIG. 41A shows one example of a heat dissipation system that may be included in any of the reader devices described herein.
Figure 41B:
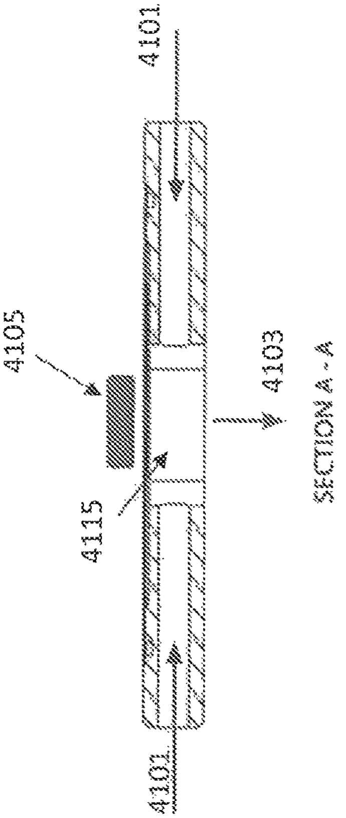
FIG. 41B is a sectional view through the chuck of FIG. 41A.

FIGS. 41A and 41B illustrate top and side sectional views, respectively, of a chuck similar to that shown in FIGS. 35A and 35B, but including a gap 4115 for thermally accessing a heating component, such as a heater (e.g., resistive heater) 4105. The heater 4105 is shown above the cavity 4115 in the chuck so that it may be easily thermally regulated (e.g., cooled). The resistive heater may be in the PCB (not shown in FIGS. 41A and 41B).

For example, FIG. 41A shows one example of a heat dissipation system that may be included in any of the reader devices described herein. This heat dissipation system may be built such that any thermal load created by a heater 4105 in the reader (e.g., in the PCB) may be dissipated properly and effectively. A first heat dissipation configuration may be built to dissipate heat generated by a heater embedded in the PCB and is described below as a heat dissipation of an embedded heater. The second heat dissipation design may be built to dissipate heat generated by a thermoelectric cooler embedded in the vacuum chuck and describe below as Heat Dissipation of Thermoelectric cooler. Both heat dissipation designs may employ unique features in the vacuum chuck, as well as accompanying components to dissipate the heat. Both designs can be used together or in the assembly, or independently.

For example, the heat dissipation of the embedded heater in the vacuum chuck may be configured as a vented chamber. In FIG. 41A, the top view of the chuck shows the heat dissipation aspects of the chuck; FIG. 41B shows a pair of air channels 4101 that feed into a cooling chamber 4103 that may be part of or below (or otherwise connected to) the region where the heater is positioned. In FIG. 41B, the flow path of the multiple air elements (channels 4101, 4101') acting in this system are shown. The air drawn in 4101 may be warmed by the heat, including residual heat, from the heater in the PCB (e.g., seating region, not shown), and may flow over the through-cut 4115 region in the vacuum chuck, which may be covered or partially covered, or open to the heater in the PCB (or to one or more thermal vias in thermal communication with the heater). Section A-A (shown in FIG. 41B) shows a pneumatic flow of two air elements, warm air 4105 and ambient air when a fan, fastened flush against the chuck and centered about the through-cut 4115, is turned on. The fan (not shown) may push the warm air generated by the heater out of the through-cut of the vacuum chuck. Simultaneously, the fan may pull ambient air into the chuck and through-cut via two channels in the chuck 4101, 4101'. The system can continuously or intermittently cycle ambient air into and warm air out of the chuck, effectively dissipating any heat generated by the PCB heater.

Figure 43:
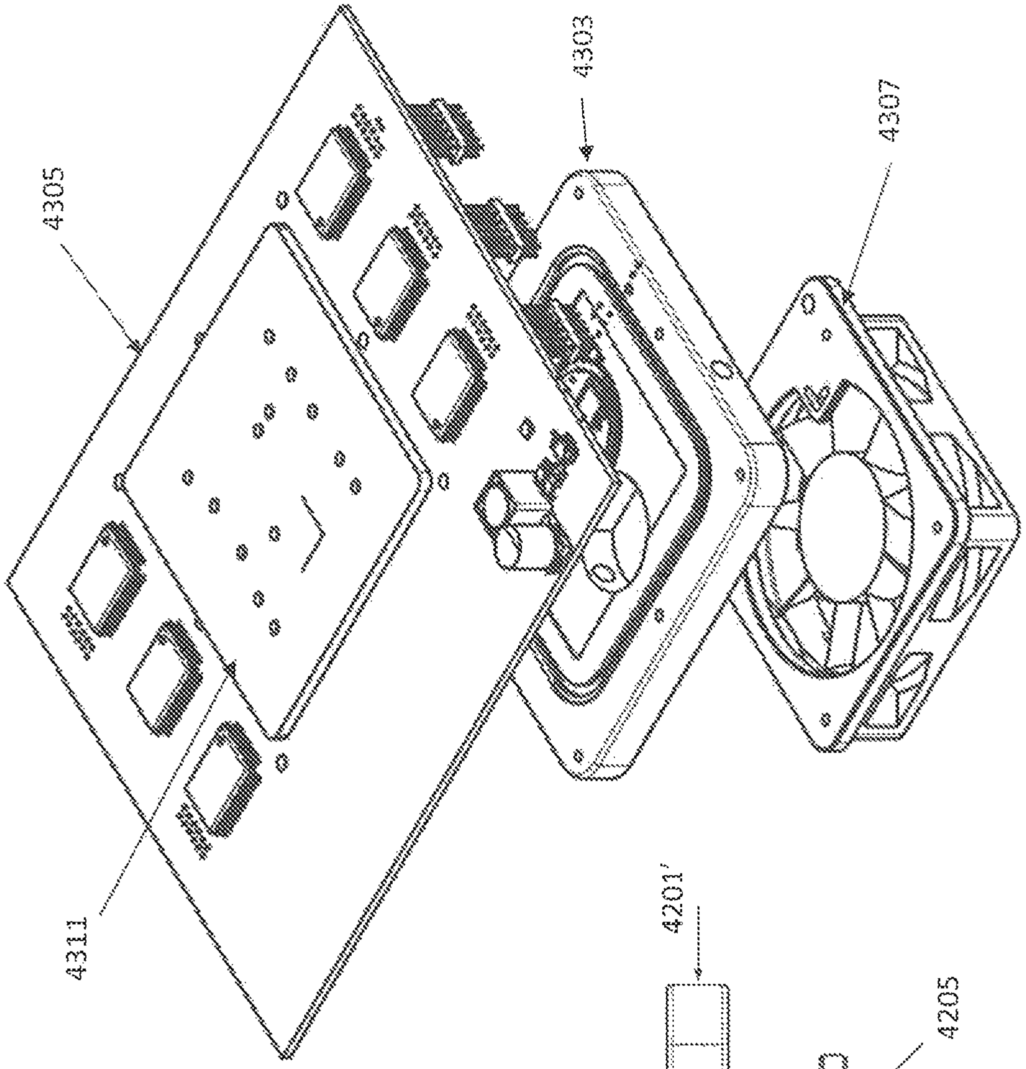
FIG. 43 shows an example of an arrangement of a chuck, a fan and a PCB (part of a seating surface).
Figure 42:
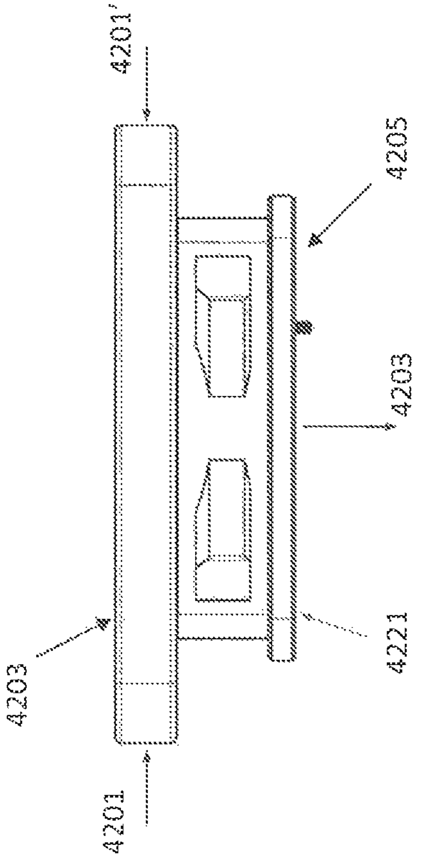
FIG. 42 shows a front view of a chuck and a fan.

Also described herein are systems for heat dissipation of an embedded heater. For example, the assembly shown in FIG. 42 may be configured to include both the chuck 4203 and a fan 4205. The pneumatic flow described in the previous above may be controlled by a fan 4205 fastened to the bottom of the chuck 42031. FIG. 42 shows a front view of the chuck 4203 and the fan 4205. The first arrow 4221 points to the vacuum chuck (top structure) and the second set of arrows 4201, 4201' depict the airflow path. FIG. 43 shows an example of an arrangement of the chuck 4303, a fan 4307, a PCB 4305 forming a seating surface (e.g., including the array of electrodes, not shown) and a cartridge 4311. The cartridge may be held down by the vacuum through the openings (e.g., in some of the electrodes).

Figure 44:
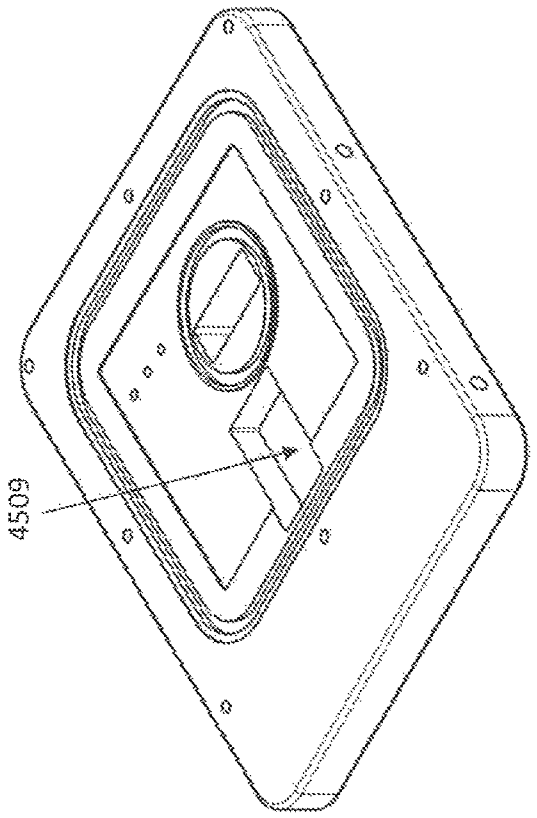
FIG. 44 is a perspective view of a chuck that may include a thermal (e.g., heat) dissipation system for regulating temperature of a cartridge.

FIG. 44 shows an example of a heat dissipation system for regulating the temperature of a thermoelectric cooler through a vacuum chuck. In FIG. 45, an isometric view of a chuck (similar to that shown in FIG. 35A) is shown in FIG. 45B. The chuck shown includes a recess 4509 designed such that a thermoelectric cooler (TEC) can slot into it.

Figure 45A:
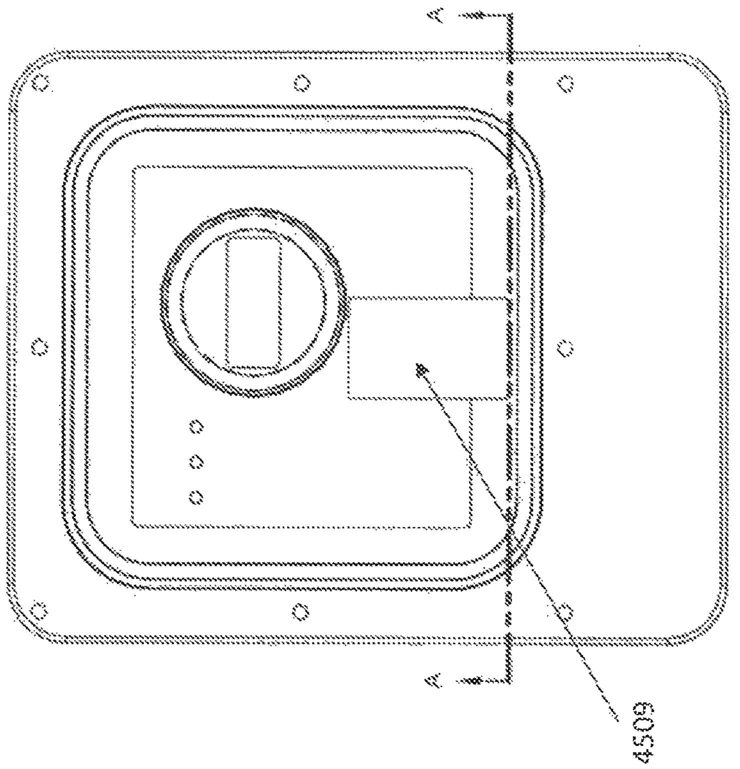
FIG. 45A is a top view of the chuck of FIG. 44.
Figure 45B:
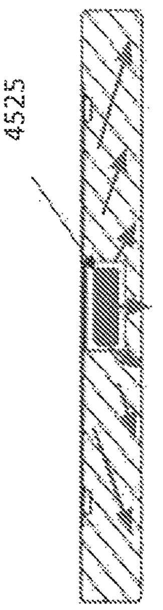
FIG. 45B is a sectional view through the chuck of FIG. 45A.

FIGS. 45A-45B show top and sectional views, respectively, of a chuck similar to that shown in FIG. 35A. The section (though A-A) shown in FIG. 45B highlights the thermal path of the heat generated by a thermoelectric cooling element 4525. The rectangle 4525 represents the TEC, and the arrows within the chuck depict the heat spreading throughout the chuck. The apparatus may include one or more heat sink of a desired size that may be fastened to the bottom of the chuck and below the TEC, then absorbs the heat. Lastly, two fans, fastened to either side of the heat sink (shown in FIG. 46), may act in unison to push the hot air away from the entire system and funnel ambient air into the system.

Figure 46:
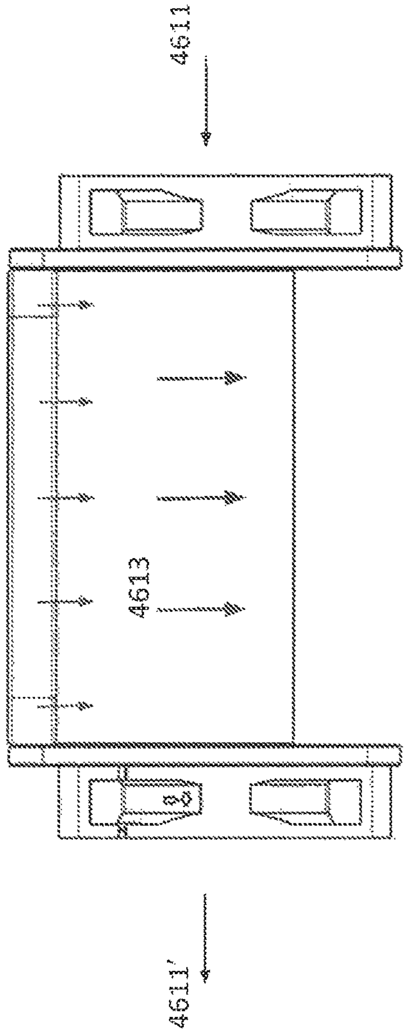
FIG. 46 shows a side view of an assembly of a chuck, a heat sink and a pair of cooling fans, with arrows indicating the flow of temperature (cooling the chuck and therefore the cartridge when loaded onto the apparatus).
Figure 47A:
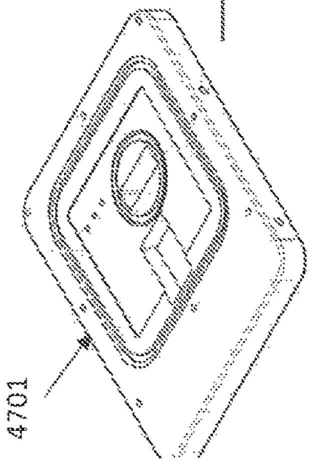
FIGS. 47A-47C illustrate the assembly of a vacuum chuck and cooling sub-system (e.g., heat sink block and cooling fans).
Figure 47B:
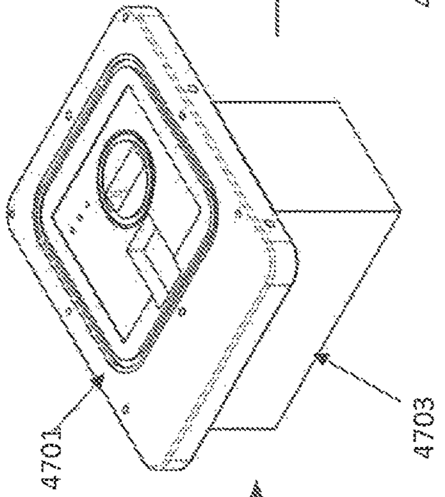
Figure 47C:
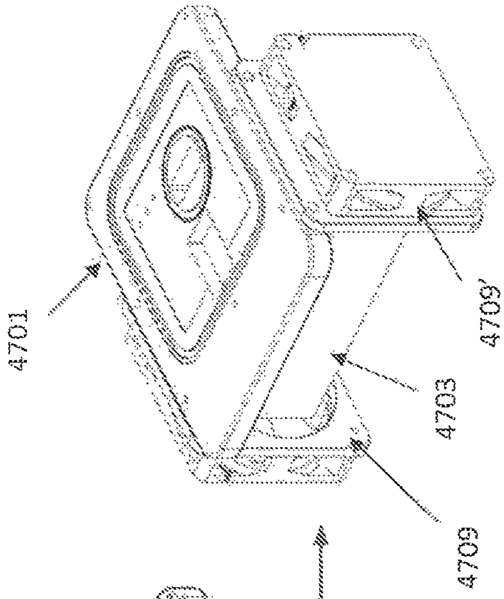
Figure 48:
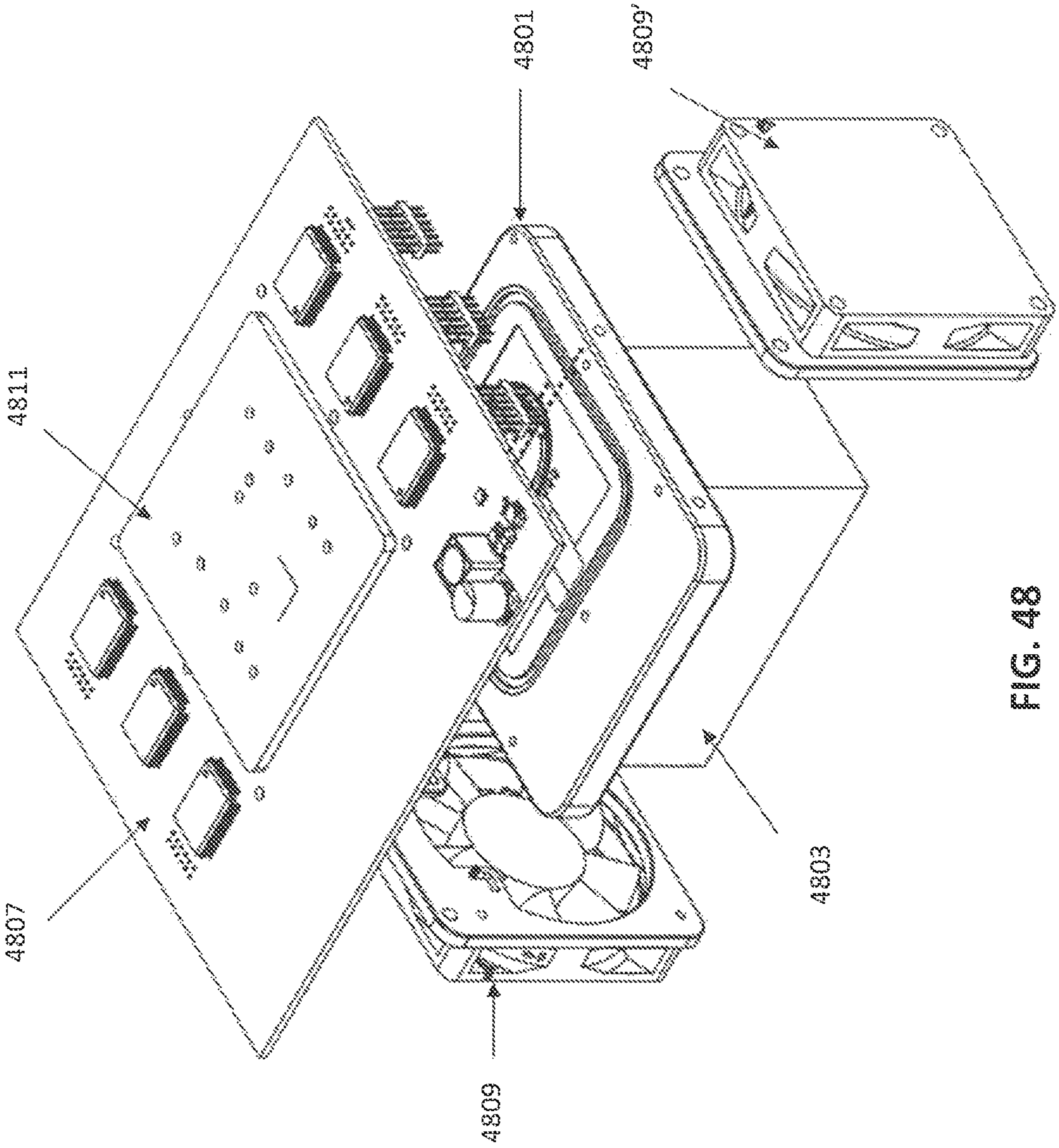
FIG. 48 illustrates one example of an assembly for a reader including a PCB with an array of electrodes for applying DMF to a cartridge (not shown), a vacuum block for holding the cartridge bottom onto the PCB and a thermal regulator sub-system including a heat sink/heat block and a pair of cooling fans.
Figure 49B:
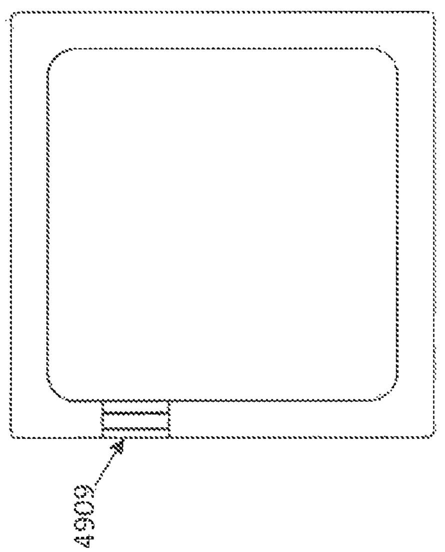
FIGS. 49A and 49B illustrate a tensioning frame and a film frame, respectively, for securing and holding smooth a film (e.g., dielectric film) that may form the bottom of a cartridge.
Figure 49A:
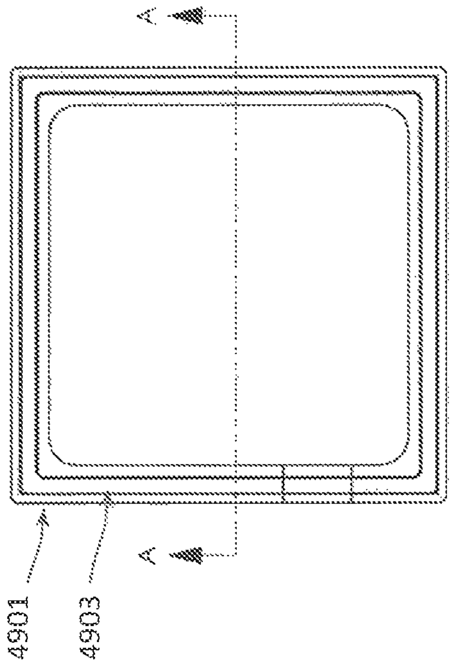
Figure 49C:
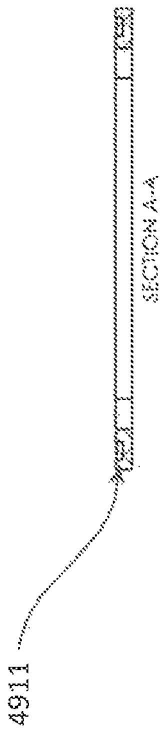
FIG. 49C is a side view of an assembled tensioning frame.
Figure 49D:
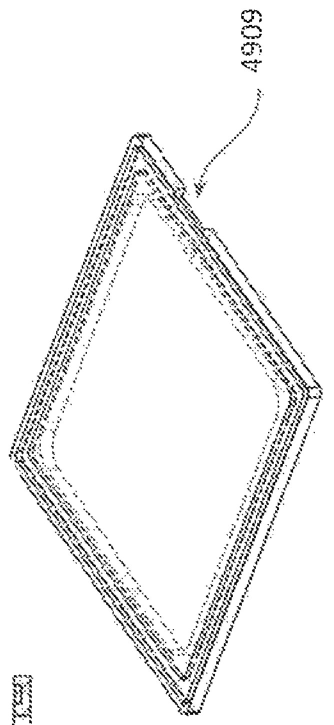
FIG. 49D is a perspective view of an assembled tensioning frame.

FIGS. 47A-47C illustrate assembly of one or more devices configured for heat dissipation of a thermoelectric cooler. For example, FIG. 46 shows the front view of a chuck. The arrows 4613 in FIG. 46 directed downwards show a thermal path of the heat in the chuck as described in FIG. 45. The arrows 4611, 4611' depict the flow path of air being pushed into the heatsink by a fan as well as the path of air being pulled out of the heatsink by a fan. The fans act in the same direction, simultaneously. FIGS. 47A-47C show an assembly process as well as multiple components that may be included in this apparatus and method of using it. For example, FIG. 47A shows a chuck 4701, FIG. 47B shows a chuck 4701 plus a heatsink 4703, and FIG. 47C shows the chuck 4701, plus the heatsink 4703, plus two fans 4709, 4709'. FIG. 48 depicts an exploded view of a partial arrangement of a reader assembly, including the assembly in FIG. 47 (e.g., chuck 4801, heat sink 4803, optional fans 4809, 4809') as well as the PCB 4807 including the driving electrodes and a heater (not visible); in addition a cartridge 4811 is attached via vacuum to the seating surface of the PCB.

Figure 69A:
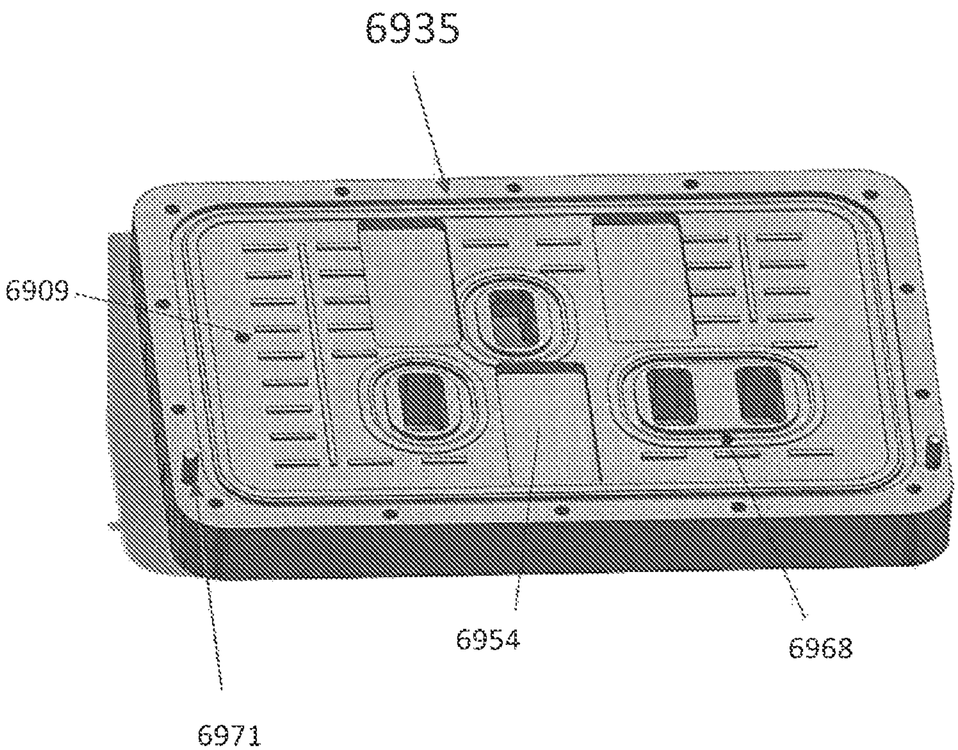
FIGS. 69A-69B illustrate an example of a vacuum chuck for a reader device as descried herein.
Figure 69B:
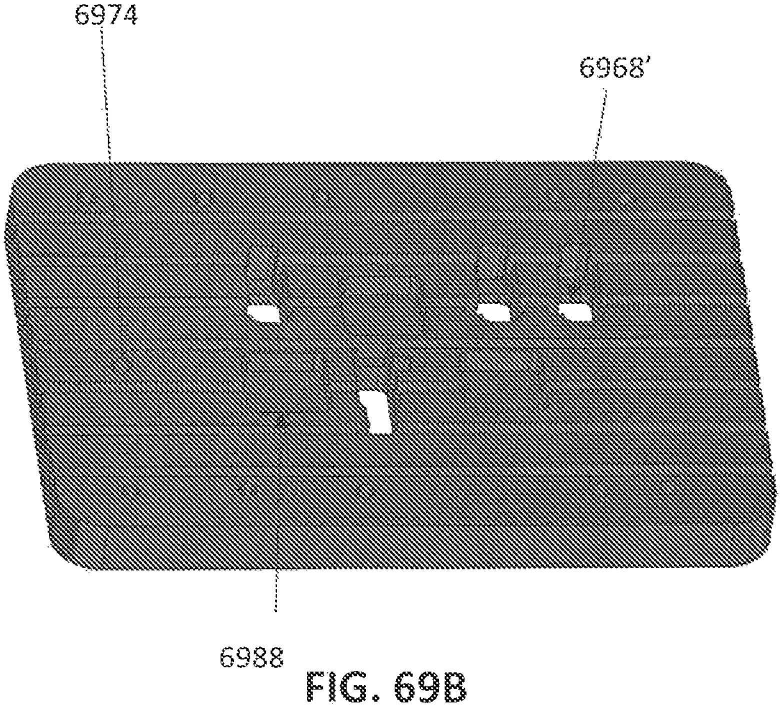

FIGS. 69A-69B, described in greater detail below, illustrate another example of a chuck.

Action Zones

Any of the apparatuses described herein may include one or more action zones that strategically position the different possible actions that a droplet can be subjected to for protocol execution. The goal of the plexing strategy is to adapt to different laboratory requirements in a more flexible, modular way. Different stages of the protocol to be executed may be grouped strategically into action zones to allow the protocol designer define abstract targets on the board. The action zones may be fixed regions under or over the electrode board used for reactions (i.e. mixing, merging, heating, cooling, thermocycling, magnet capture, waste, optical detection, etc.).

Figure 55A:
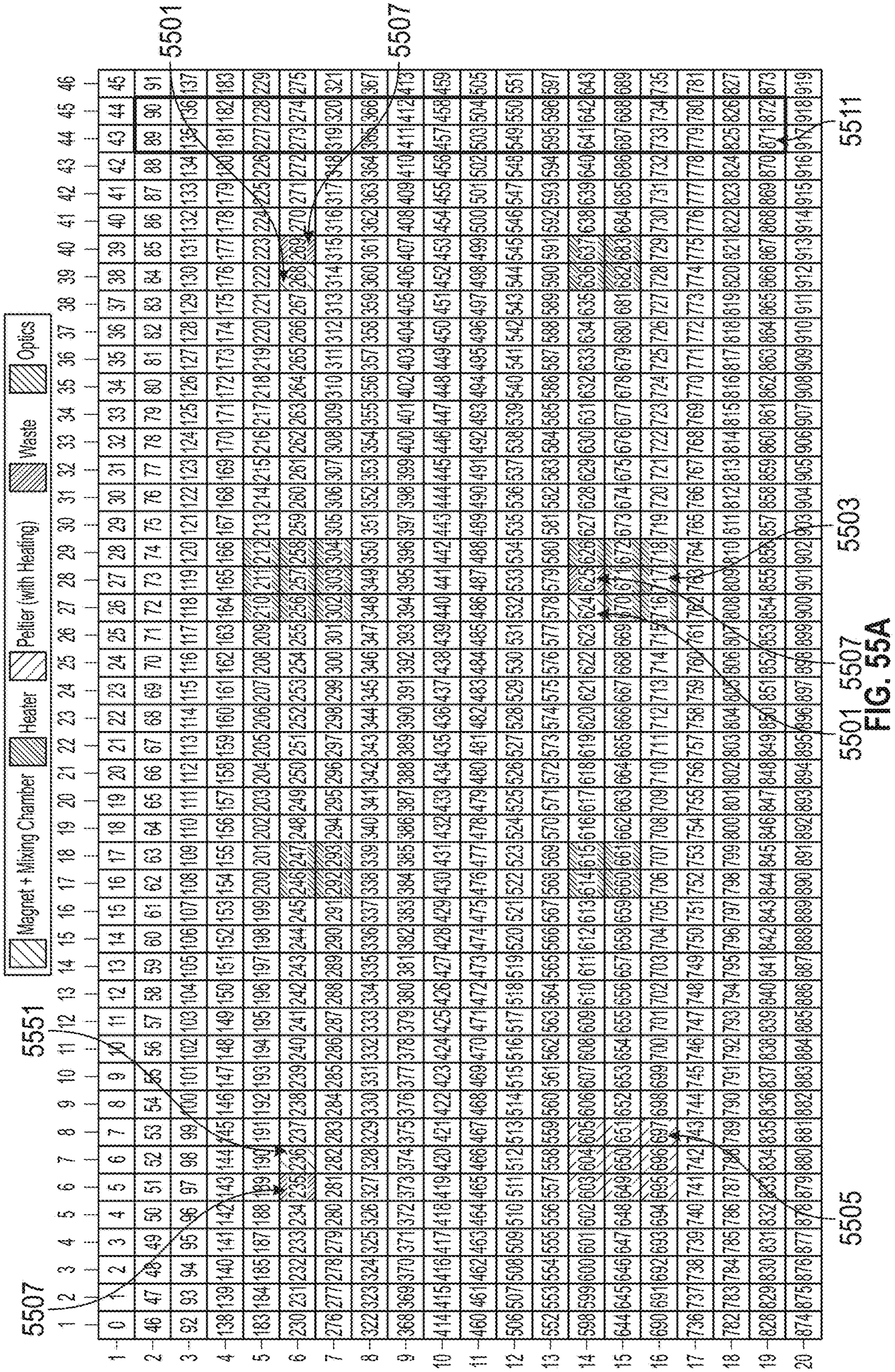
FIG. 55A shows an example of an electrode grid setup with independent action zones.

FIG. 55A shows an example of an electrode grid setup with independent action zones for either magnetic capture 5501 (three magnetic control zones, which may be used as mixing chambers, are shown), a heater (five heating zones 5503 are shown) which can be isothermal or thermocycler, a Peltier 5505 which is an active cooling zone down to 4° C. and may also heat, and a waste connection to the top plate through a channel and into a waste chamber (three waste zones 5507 are shown, which may connect to separate or the same waste chambers). The cartridge setup may also include a mixing connection to the top plate through a channel (e.g., one or more of the waste regions/zones 5507 may be used for mixing, as described herein) and one or more optical detection regions 5511. Thus, FIG. 55A shows an electrode grid with distinct action zones. These zones may be determined by the cartridge and the reader device. For example, the cartridge may determine the waste zones, and the unit cells corresponding to the heating and/or cooling (e.g., thermal control), optics, and magnet(s) may correspond to regions of the reader apparatus, as described above.

Figure 55B:
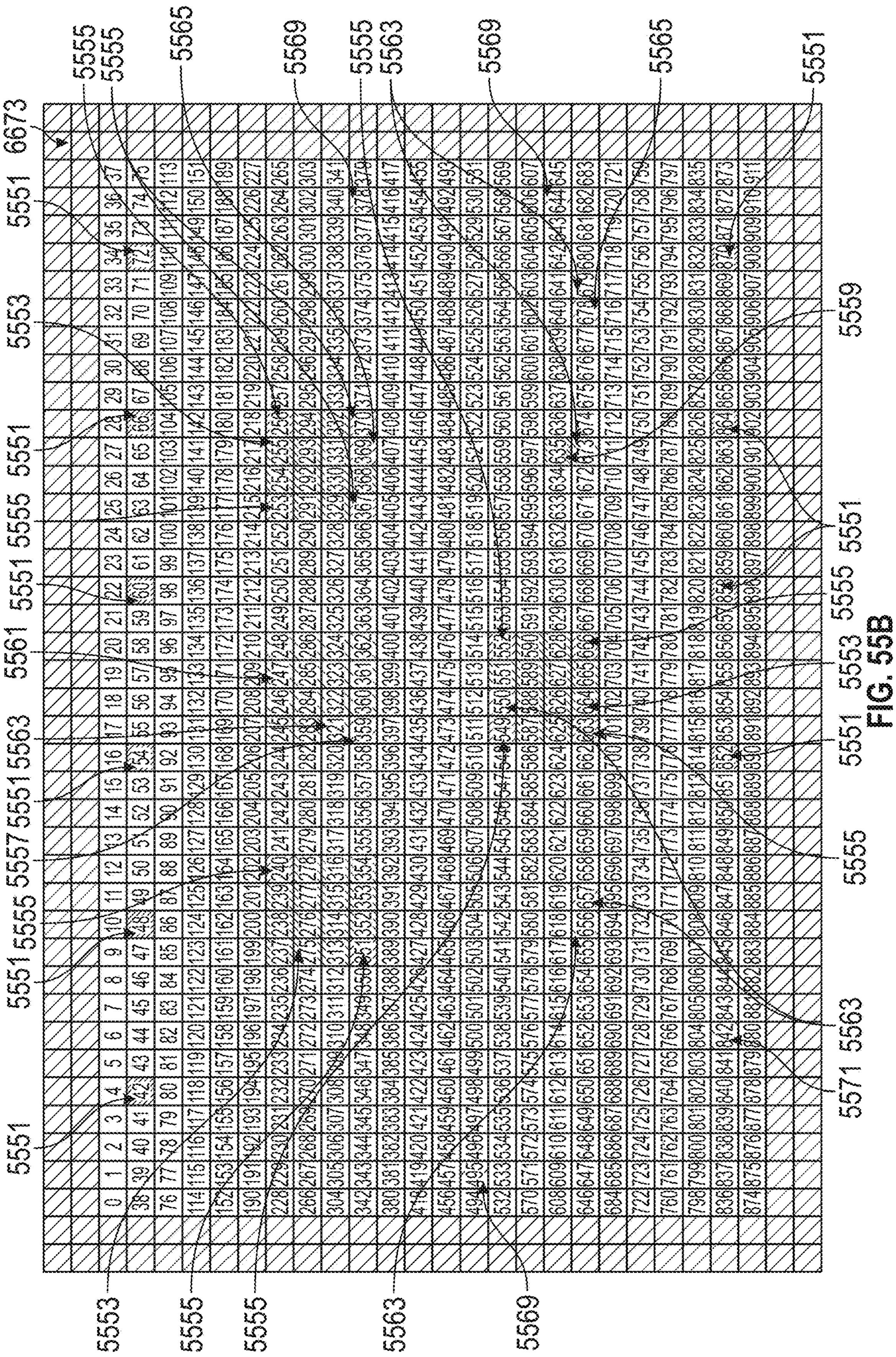
FIG. 55B shows another example of an electrode grid setup with independent action zones.

FIG. 55B illustrates another example of a system (cartridge and reader) having a variety of action zones that are defined by either or both the cartridge and the reader. In FIG. 55B, the system includes 912 driving electrodes, corresponding to the 912 (0-911, e.g., a 38×24 grid) unit cells. Some of these cells within the air-gap of the cartridge may be action zone for loading, mixing, rinsing, imaging, etc. In general, these systems may include one or more loading inlets 5551 (in FIG. 55A, 10 loading inlets are shown, each corresponding to a single driving electrode unit cell; more than one unit cell may be used). Three thermocycling zones 5553 are shown in this example. One or more pinning features (e.g., protrusions, walls, barriers, etc.) may extend at least partially in to the air gap to pin or hold a droplet, and particularly the outer hydrophobic (e.g., liquid wax) material to maintain the position and droplet. In FIG. 55B, 10 pinning fixtures 5555 are shown. These pinning features may be a barrier (e.g., a fence, wall, stop, etc.). In general, the pinning features may be formed of a hydrophobic, olelophilic, hydrophilic, etc., material that may hold the coating material (e.g., the hydrophobic, liquid wax material) at least partially surrounding an encapsulated (e.g., coated) reaction droplet. The barrier may form a chamber that is open on one or more sides, as shown in FIG. 55B in which two or four pinning fixtures are used at the corners of the three thermocycling zones 5553. The barrier may extend from the top to the bottom of the air gap, or partially into the air gap. For example, the barrier may be formed of a material including a wax (e.g. paraffin) such a polymeric material mixed with a paraffin. In FIG. 55B, the pinning features are shown as PTFE posts that may be inserted into the main cartridge body (e.g., the top plate) and are hydrophobic but oleophilic and thus attracting the paraffin wax when a droplet is within the thermocycyling zone, which may keep the droplet centered to the thermocycler zone when in use. In some variations the pinning feature may be formed of a material such as an acrylic, polycarbonate, Parafilm®, DuraSeal™, high melting temperature fluorowaxes/solid ski waxes, etc. The pinning feature may be formed as part of the top or bottom plate and/or may connect to both. In use, the barrier may pin the wax droplet around the reaction droplet. For example, a wax droplet may surround the aqueous reaction droplet 1501 and be held within the open chamber in the air gap formed by the barrier.

The systems described herein may also include one or more waste zones 5557 (in FIG. 55B, two zones are shown) that may be connected to a vacuum region for drawing, by suction, all or part of a droplet from the air gap. In FIG. 55B, one of the waste zones is a lower capacity (e.g., 1 mL) waste zone 5559 and the other may be higher capacity (e.g., 2 mL, 3 mL, 5 mL, etc.) waste zone 5557.

Any of the systems described herein may also include one or more magnetic regions 5563. In FIG. 55A, the system includes four magnetic unit cells distributed in the air gap, in some cases, overlapping with other regions, such as thermal control and/or isothermal regions. Generally, any of the zones described herein may overlap (e.g., magnetic, thermally regulated inlets, mixing channels, waste channels, etc. may overlap with each other).

The system may also include one or more isothermal regions 5561 (in FIG. 55B, a single isothermal region is shown, having 16 unit cells, 4×4, in which two of these unit cells are configured as magnetic control 5563 and waste 5557 zones.

Any of these systems may also include one or more mixing channels 5565. Four mixing channels are shown in the example of FIG. 55B. This example also shows a plurality of reservoir outlet holes 5569, from which fluid held in the cartridge's one or more reservoirs may be added to the air gap. Any of these systems may also include one or more recovery holes 5571 (one is shown in FIG. 55B). In general, the cartridge may include a smaller region than the number of possible active electrodes. For example, in FIG. 55B, the working region includes 912 active unit cells, as mentioned above, however they are surrounded by non-working (inactive) unit cells/electrodes 6673 that may be part of the reader apparatus. In FIG. 55B, approximate dimensions (e.g., 3.17 by 4.75 inches) of the cartridge base portion (forming the air gap dimensions) are shown, as examples only. As in any of the figures shown herein, these dimensions may be approximate only, and may be +/−1%, 5%, 10%, 15%, 20%, 25%, 30%, 40%, 50%, 75%, 100%, etc.

Figure 56:
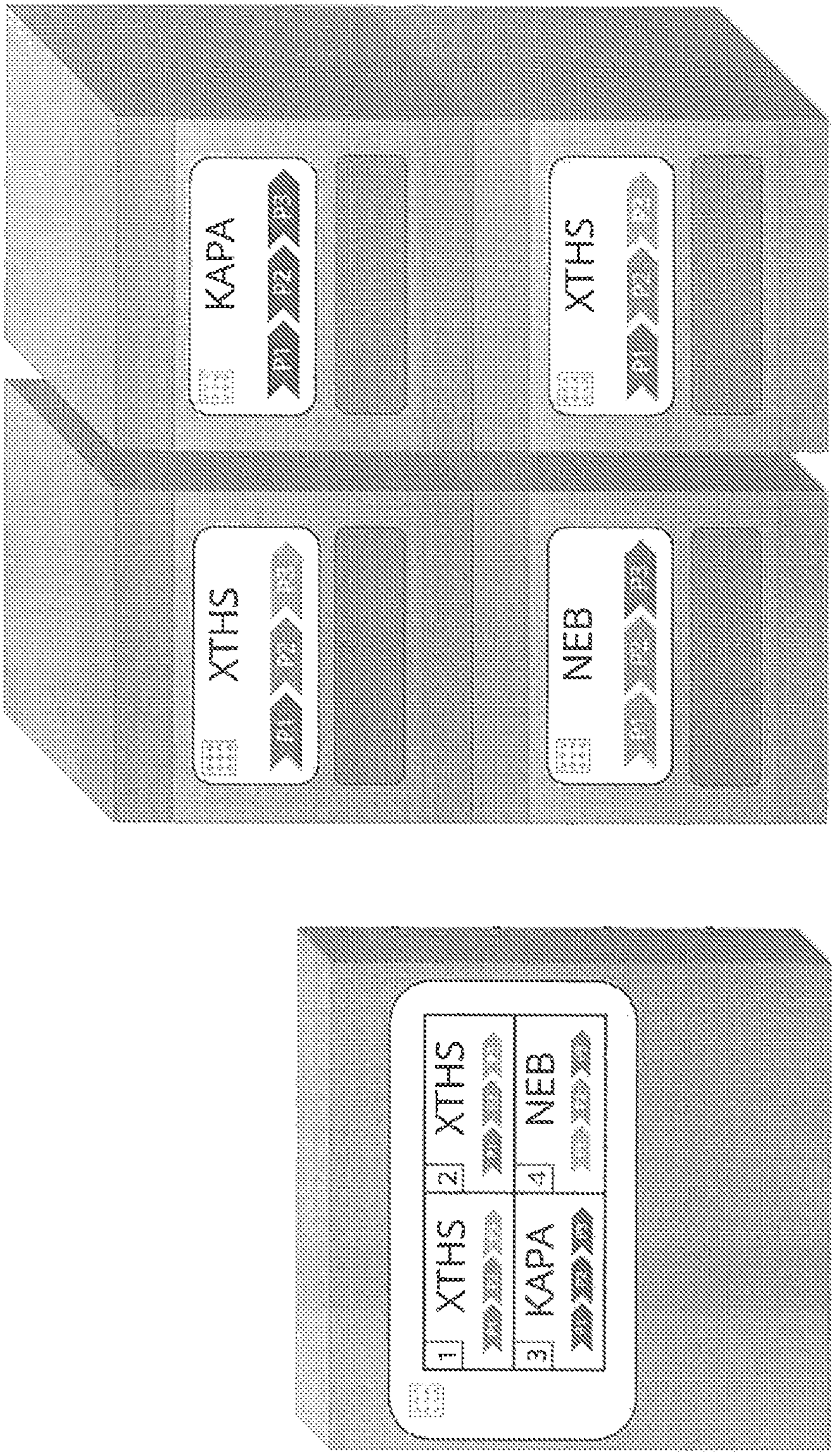
FIG. 56 schematically shows four independently controlled 1-plex modules with a console unit that may operate all of them.

In order to better adapt to different user needs and laboratory space, independent single modules, each with its own power, environmental, internal computer and connection to console unit for user interface may be multiplexed together. Additionally, a console unit for user interface can be integrated to control the different modules as well as other laboratory required functions such as scan the sample ID as well as the cartridge ID and integrate that information to the local laboratory or sample management system. Connection to console unit can be wireless or by cable. FIG. 56 schematically shows four independently controlled 1-plex modules with a console unit.

EXAMPLES

Figure 57:
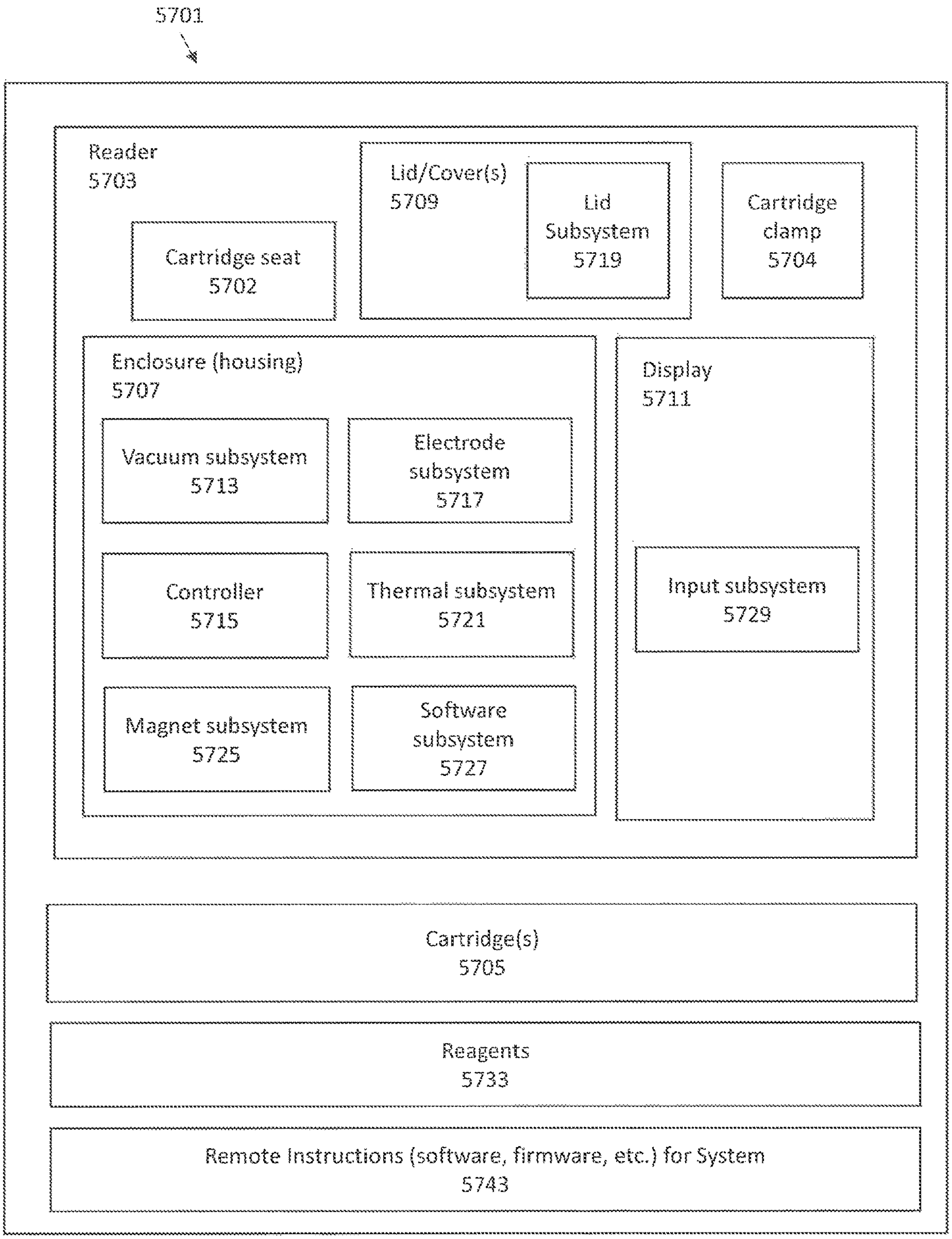
FIG. 57 schematically illustrates an example of a system as described herein.

FIG. 57 schematically illustrates one example of an apparatus (e.g., a system 5701) include a DMF reader 5703, one or more cartridges 5705, one or more reagents 5733, and in some variations software, firmware or the like 5743 that may be run remotely (e.g., desktop, laptop, mobile device, pad, etc.) for communication with, controlling, and/or creating, transmitting or modifying protocols and other operational parameters of the system, including the reader. In this example, the reader 5703 is adapted to receive the cartridge(s) into a seat 5702 and secure the cartridge as described herein, e.g., using one or more keyed regions and/or a vacuum attachment to both orienting and secure the cartridge. The reader may include a lid or cover 5709 that may include and/or enclose a lid subsystem 5719. The reader may also include a cartridge clamp 5704 that, as described in greater detail below, may act as a safety lock or interlock when a cartridge is held within the cartridge seat. The cartridge clamp may be part of the lid or lid system, or it may be separate. The reader in FIG. 57 also includes a housing or enclosure 5707 that may fully or partially cover a controller 5715 (including one or more processors, circuitry, clock, power regulators, wireless communication circuitry, memory, etc.), and the one or more subsystems controlling operation of the DMF and microfluidics on the cartridge. The controller may include a microcontroller, input interface (e.g., touchscreen, button, knob, etc.) circuitry, output interface (e.g., Ethernet, WiFi, etc.), etc. The reader may also include, e.g. within the housing, a vacuum sub-system 5713, an electrode sub-system 5717, a thermal control sub-system 5721, a magnet control sub-system 5725 and/or a software sub-system 5727; any or all of these sub-systems may communicate and/or be coordinated by the controller.

For example, the vacuum sub-system may include a vacuum chuck, a vacuum pump, and one or more pressure sensors for detecting (and/or providing feedback to control the vacuum) pressure. The software subsystem may include software, hardware or firmware, such as a non-transitory computer-readable storage medium storing a set of instructions capable of being executed by the one or more processors of the controller to coordinate operation of the systems, including any of the sub-systems. The thermal subsystem may include the TECs, heat sinks/fans, and one or more thermal sensors (including thermal sensors configured to monitor temperature of the cartridge, e.g., the air gap region and/or one or more thermal sensors configured to monitor the temperature of/within the housing, of the TECs, etc.). The magnetic subsystem may include, for example, one or more magnets (such as one or more Halbach array magnets), one or more actuators for all or some of the magnets and one or more position sensors for monitoring/detecting the position of a magnet (e.g., a home sensor).

The housing may be connected to, and/or may partially enclose one or more inputs and/or outputs 5711, such as a display and input subsystem 5729. The display may be a touchscreen and/or one or more buttons, dials, etc.

An electrode sub-system may include the array of drive electrodes (e.g. an electrode array) underlying the cartridge seat, one or more high-voltage drivers, one or more TEC driver, a safety interlock, one or more resistive heaters, etc.

The lid may couple to the housing and may at least partially enclose the lid subsystem, as mentioned above. The lid sub-system may include, for example, one or more pipette pumps, a vacuum manifold, one or more solenoid valves, one or more pressure sensors, one or more positional sensors, and one or more indicators (e.g., LEDs, etc.). The lid may be hinged to close over the cartridge and against the housing; this lid (and the cartridge clamp) may, separately, lock over the cartridge when it is loaded into the reader, and may be hinged to the housing. As mentioned, the cartridge clamp may be coupled to the housing and may be covered by the lid.

Any of the system components described above may include or be part of safety features. For example, the system may include one or more subsystem interlocks, such as but not limited to the cartridge clamp (e.g., clamp locking mechanism, clamp sensor, etc.), the lid locking mechanism, and/or EMI shielding.

In some variations the clamp is configured to accommodate a variety of different sizes (e.g., thicknesses) of cartridges. For example, in FIGS. 102A-102D, the clamp 1021 includes a spring array 1023 on the underside of the clamp. The spring clamp assembly may allow for the simple installation and replacement on the clamping mechanism. These spring clamp assemblies may provide the clamp with the ability to change the configuration of the springs by changing quantity or combination of different springs. FIG. 102C shows one example of a spring that may be used, including a post region, a head 1025 and a base 1029, where the head 1025 is biased against the base (e.g., by a spring 1027 on the post region). FIG. 102D shows a bottom view of the clamp 1021 shown in FIG. 101A, showing corner spring assemblies 1028 and side spring assemblies 1026.

As mentioned above, any of these systems may be used with and/or may include one or more reagents. Reagents may generally include buffers (e.g., PBS, etc., including those with one or more anti-fouling agents) but may also include a jacketing material (such as, e.g., a liquid paraffin material or other hydrophobic material).

In general, the systems described herein may be configured to thermocycle in one or more regions (e.g., one or a plurality of separate or adjacent unit cells) between about 15-99 degrees C. (e.g., –/+0.5° C.). These systems may be configured to manipulate reagent volumes between about 10-350 μL by EWOD (e.g., by DMF). As will be described in more detail below, these apparatuses may be customized, allowing a user to create, modify, save, load and transmit one or more protocols for operating the system (e.g. performing operations on the cartridge(s).

In the example system shown, the reader apparatus may include more than 900 independent electrodes (drive electrodes), and may include one or more thermoelectric coolers (TECs) for better thermal control, uniformity and reduced footprint. In this example, the reader and cartridge forms three independent thermocycling zones (controlled by the TECs in the reader), and one isothermal zone (e.g., controlled by one or more resistive heater). The reader also includes four magnet independently controlled zones. Example cartridges described herein (and in greater detail below) may include multiple integrated channels, e.g., six integrated channels, and multiple (e.g., 2 or more) reservoir chamber for use with higher volumes of fluid. These systems may be used for running multiple library prep kits and workflows (e.g., Kapa HyperPrep PCR Free, SureSelect XTHS Sample Prep, SureSelect XTHS Hyb+Capture, etc., including custom workflows).

The one or more cartridges may be any of the cartridges described herein, and may generally be configured for reagent loading and storage, including one or more mixing channels, an air gap (e.g., EWOD chamber), may be configured to tension the bottom film (forming the bottom of the air gap), and may include a readable identification, including, but not limited to a near-field communication (NFC identification, e.g., chip, circuit, etc.). Other readable identification may include an RFID circuit, bar code, etc.

Figure 58A:
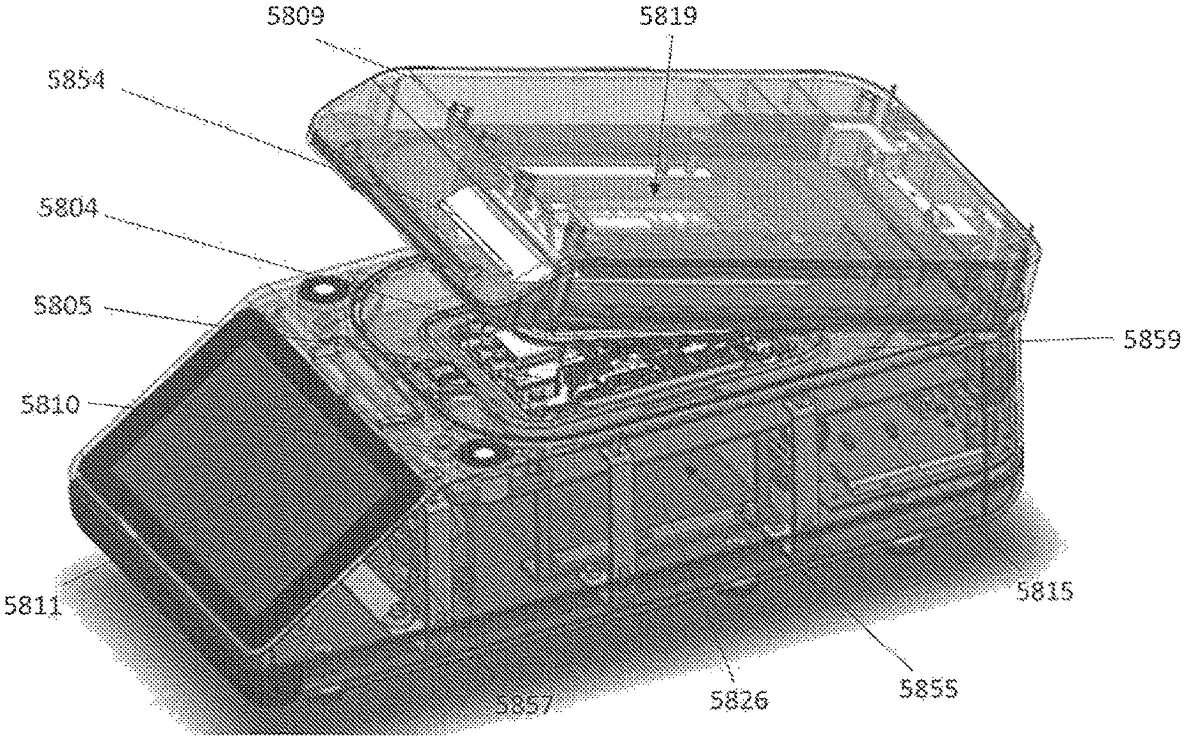
FIGS. 58A-58B illustrates one example of a reader device, from a left front (partially transparent) perspective view and a right front perspective view, respectively.
Figure 58B:
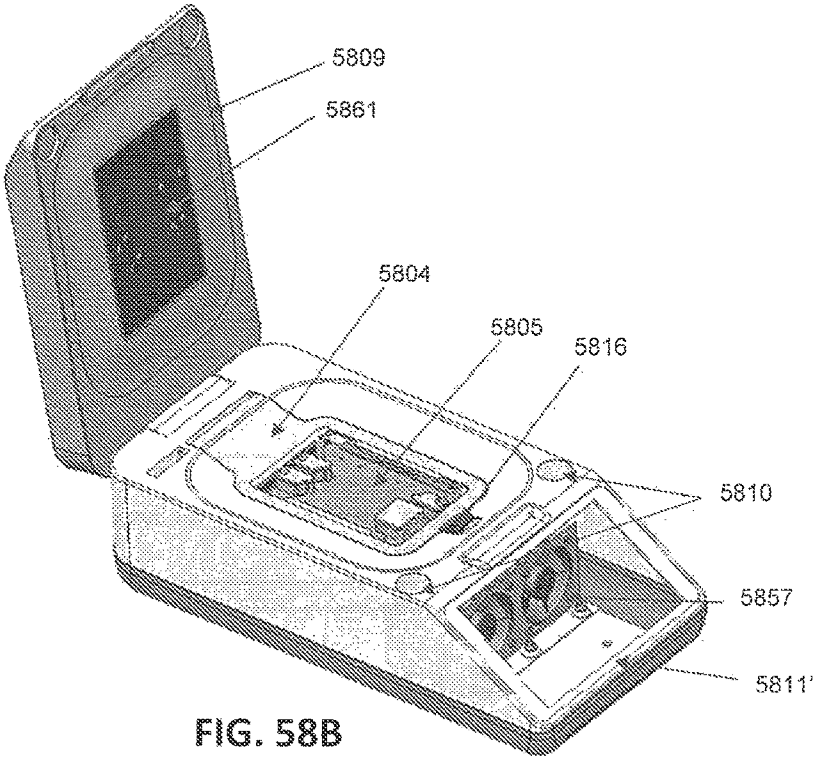

FIGS. 58A and 58B illustrate one example of a reader device that may be part of any of the systems described herein. In FIG. 58A, a side perspective view of the reader is shown, with the lid 5809 and safety clamp 5804 shown partially closed over a cartridge 5805. The clamp may latch to the housing via a clamp latch 5816 (shown in FIG. 58B). The lid encloses the lid subsystems 5819 (e.g., syringe pump, solenoid valves, etc.). The lid also includes an indicator 5854 (e.g., showing the status of the reader, such as on/off, drive electrodes on/off, etc.). The lid may include a manifold 5861 (shown in FIG. 58B) coupled to the pressure components, such as the syringe pump, solenoid valves, etc. The lid and housing 5803 of the reader device are shown partially transparent. One or more lid locks (e.g., magnetic locks, such as electromagnets) 5810 may be used to controllably secure, lock and/or sense closing of the lid. The electromagnets may be controlled by the controller, and/or may provide input to the controller that the lid is closed. For example, FIG. 102 illustrates one example of a lid 10201 including a pair of magnetic locks 10203, 10203' that may engage with a complementary magnet or ferromagnetic material when closing the lid to lock the lid. In some variations the apparatus may include one or more magnetic sensors that detect when the magnets are engaged and the lid is closed.

For example the lid may include one or more electromagnets and electromagnetic engagement/impedance detection. This detection may provide passive detection of the lid being closed. Electromagnets not only apply the force to pull the lid closed, but the electrical impedance of the driving coil may be used to detect the presence of the permanent magnet. This may eliminate the need for additional cables and sensors to detect the lid being successfully closed.

In any of the variations described herein, the clamp latching may be detected by a clamp latch sensor. As with any of the sensors described herein (unless the context indicates otherwise), any appropriate sensor may be used, including a magnetic sensor, and mechanical sensor, an optical sensor, an electrical sensor, etc. For example, a clamp latch sensor may be a mechanical or electrical sensors that detects the clamp frame engaged (held by) the latch.

The controller 5815 is enclosed within the housing (e.g., a control board is shown). The housing may also enclose the magnetic subsystem (e.g., including one or more magnets 5826 that may be moved up/down, e.g., to/from, relative to the cartridge to engage or disengage a magnetic field). The housing may also enclose the thermal control elements, such as one or more TECs 5855 for heating/cooling and thermocycling specific zones of the air gap within the cartridge, as described. One or more resistive heaters (not shown) may also be included. Within the housing cooling vents and/or fans 5857 may be included to regulate the temperature therein. A display 5811 (shown as a touchscreen) is at least partially included in the housing.

The housing may also at least partially form the seat for the cartridge in the exemplary reader of FIG. 58A. An electrode board 5859, defining the array of drive electrodes, may be within the housing, under the cartridge seat.

FIG. 58B shows a side perspective view of the reader of FIG. 58A with the lid 5809 open and the clamp 5804 closed and latched over a cartridge 5805. The screen has been removed 5811', showing the cooling fans 5857 in the front region.

A reader such as the one shown in FIG. 58A-58B may be used to control and coordinate the microfluidics and DMF operations in the removable cartridge. For example, a user may select, e.g., on the touchscreen of the instrument, a protocol to run. Alternatively, the user may create, modify, or download a protocol. If there is no assay running, the electromagnets locking the lid closed may be disabled and the screen may alert the user that he/she can open the lid to insert a new cartridge. The user may then remove the clamp, e.g., by pressing the clamp to open the clamp latch. The clamp may be hinged to open, exposing the cartridge seat. Neither the clamp nor the lid applies force against the cartridge; instead, as described above, the cartridge is retained on the drive electrode surface of the reader by the vacuum.

With the latch opened, the user may insert a cartridge in the required orientation (which may be required by the keying of the seat relative to the cartridge. Thus, there may be keyed regions in the cartridge that correspond to the seat region to prevent miss-orientation of the cartridge. Once a cartridge is seated, the user may close the clamp (manually or automatically) to engage the clamp latch. The reader may identify that a cartridge is in place and may turn on the vacuum for tensioning the film. With the clamp latch engaged, the reader may then allow the application of voltage (e.g., high-voltage) to the drive electrodes, allowing control of droplets even while the lid is open, so that material can be pipetted into the air gap, e.g., through the cartridge. Risk from the high-voltage may be mitigated by one or more safety features descried herein, including the safety interlock of the clamp and clamp latch. While the voltage is enabled, the device may alert the user and may guide the user to start pipetting the reagents into the cartridge. When the user finishes pipetting, they may close the lid. The system may identify that the lid is closed, enable the electromagnets for securing the lid closed, and may begin the processing of the cartridge per a user-specified protocol.

Figure 59A:
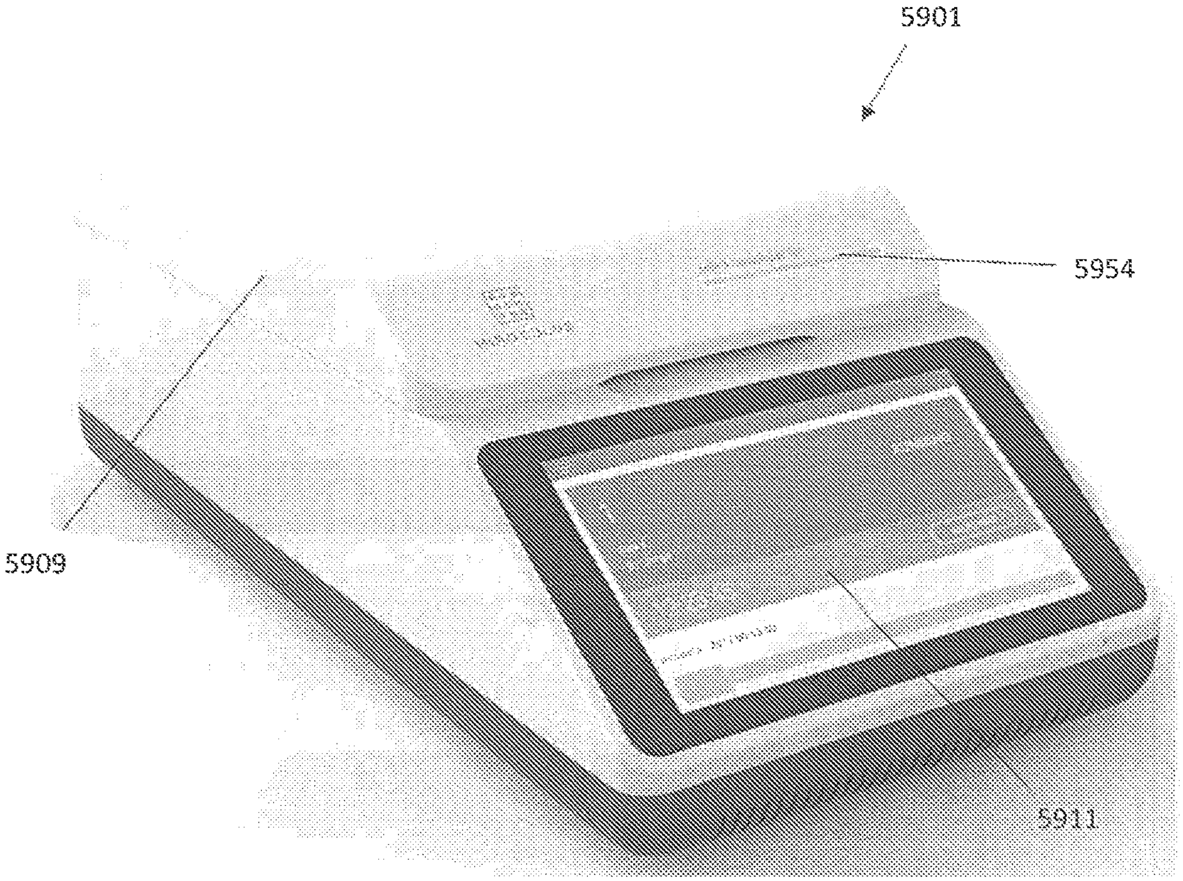
FIGS. 59A-59F show a prototype reader device as described herein.
Figure 59B:
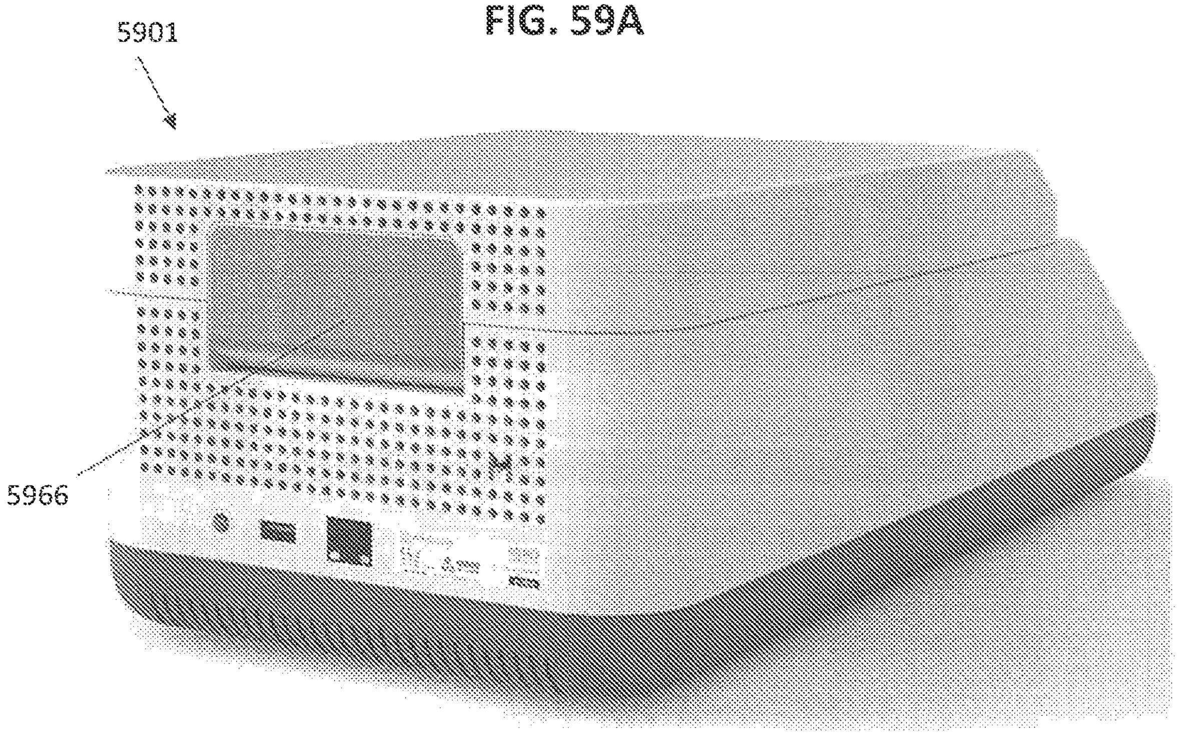
Figure 59C:
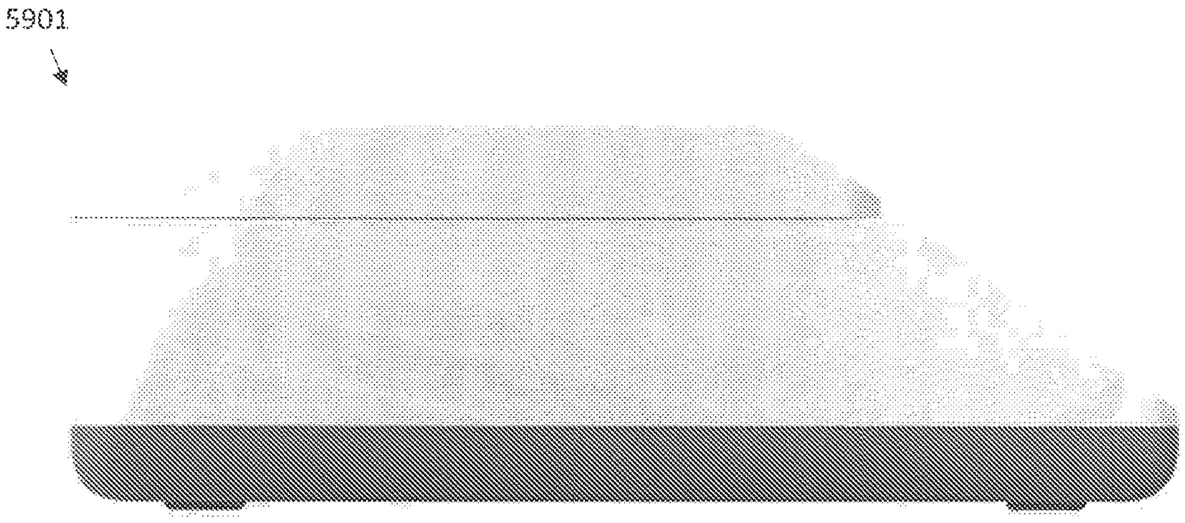
Figure 59D:
Figure 59E:
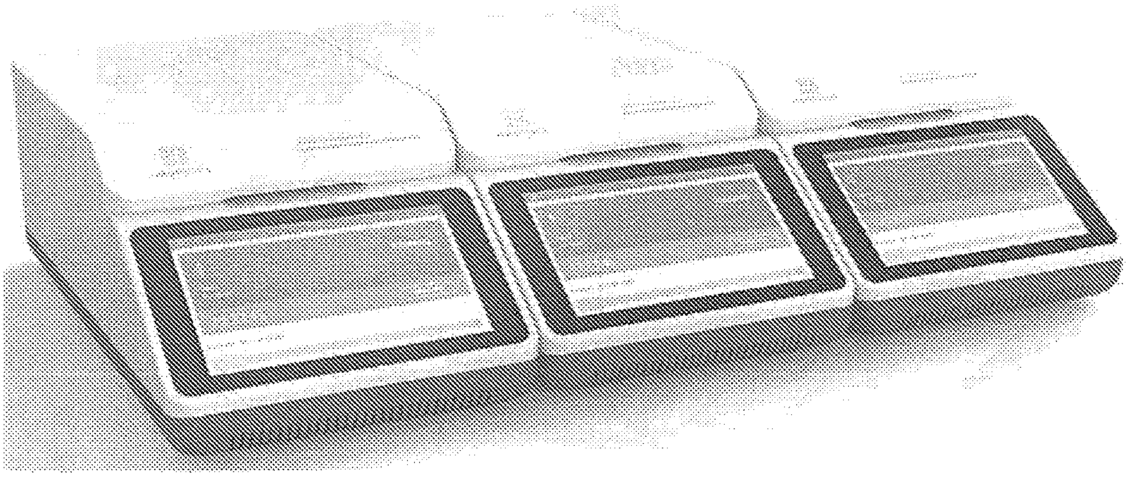
Figure 59F:
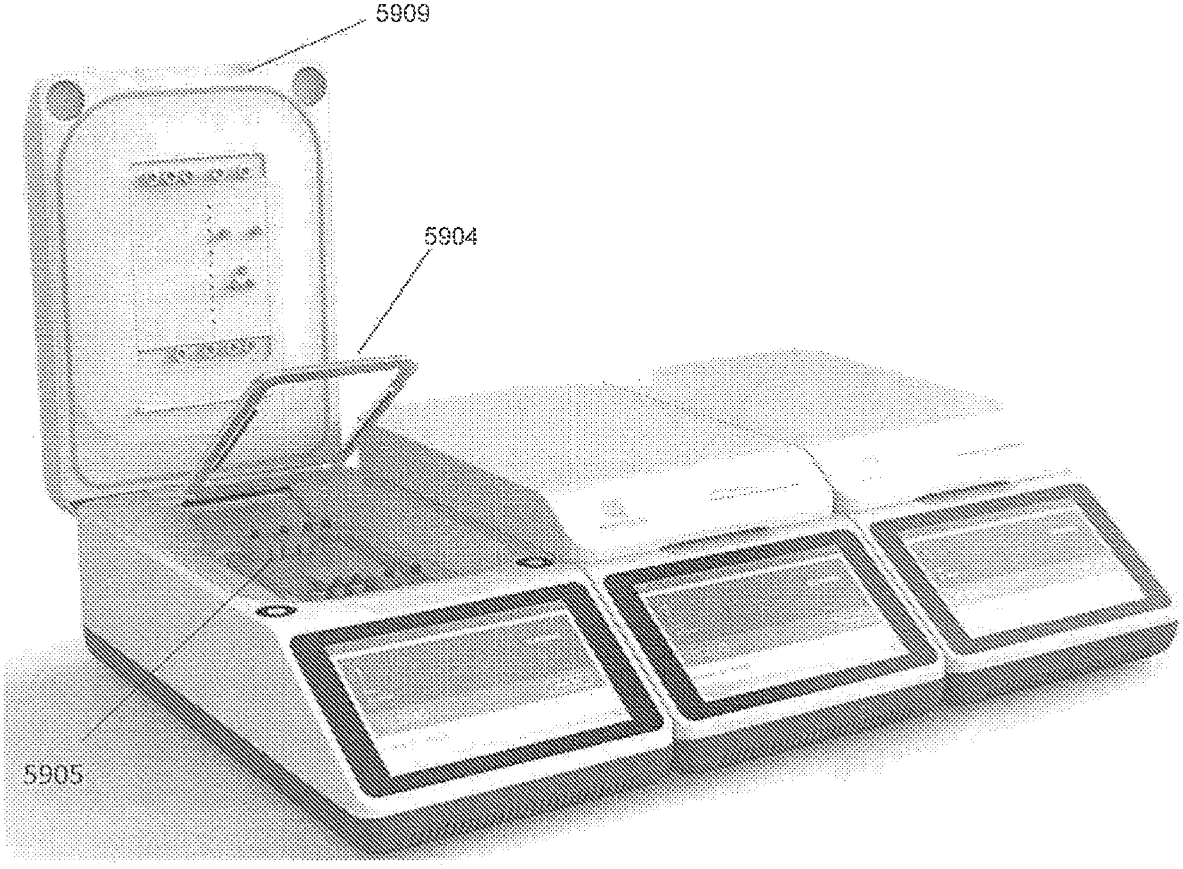

FIGS. 59A-59F illustrate an example of a prototype device similar to that shown in FIG. 58A-58B. In FIG. 59A, reader device 5901 is shown in with the lid 5909 closed, and locked, and the high-voltage engaged, as shown by the indicator 5954 on the lid. A cartridge is inserted, and the touchscreen 5911 on the front of the device indicates the status of the reader and cartridge. FIG. 59B shows the back perspective view of the reader 5901, showing venting as well as USB and/or electrical connectors. The hinge 5966 region for the lid is also shown. FIG. 59C shows a side profile of the reader, and FIG. 59D show a front view. In general, the readers described herein may be surprisingly compact, given the complexity of the number of processes that they may perform. Multiple readers may be ganged together, as described above in reference to FIGS. 56, as shown in FIGS. 59E and 59F. These readers may communicate with each other so that operation of the multiple readers may be coordinated, e.g., by a single controller. Each may be separately loaded with a cartridge and the same or different protocols run on the different cartridges. FIG. 59F shows the multiple readers of FIG. 59E with the lid 5909 and clamp 5904 open to allow insertion/removal of a cartridge 5905. Remove and insertion of an exemplary cartridge into a similar reader device is illustrated in FIGS. 60A-60D.

Figure 60A:
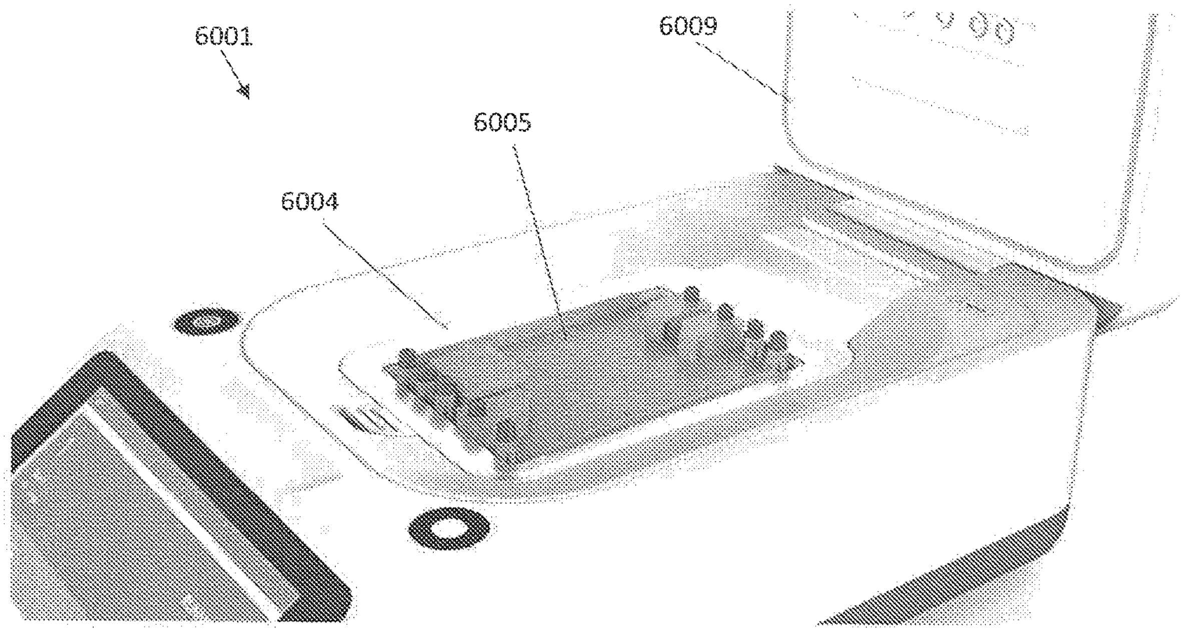
FIGS. 60A-60D illustrate a method of removing (or inserting) a cartridge into the prototype device of FIG. 59A.

FIG. 60A shows a reader 6001 similar to that shown above in FIGS. 59A-59F with the lid 6009 open but the clamp 6004 latched closed. A cartridge 6005 is held within the seating region of the housing of the reader. In this state, as described above, the high-voltage power to the drive electrodes may be 'on' and droplets may be moved or held in position using the drive electrodes (e.g., via electrowetting). This may prevent undesired movement of droplets or fluid in the cartridge when loading/unloading fluid. Safety interlocks may mitigate the risk of electrical shocks to a user applying liquid to the cartridge. For example, the clamp may cover the edges of the cartridge, so that only the upper surface (electrically isolated from the high-voltage drive electrodes) is exposed. The clamp latch may detect engagement and locking of the latch; the system may be configured to prevent voltage until and unless the clamp is latched. Other safety interlocks, described in greater detail below, may also or alternatively be used.

Figure 60B:
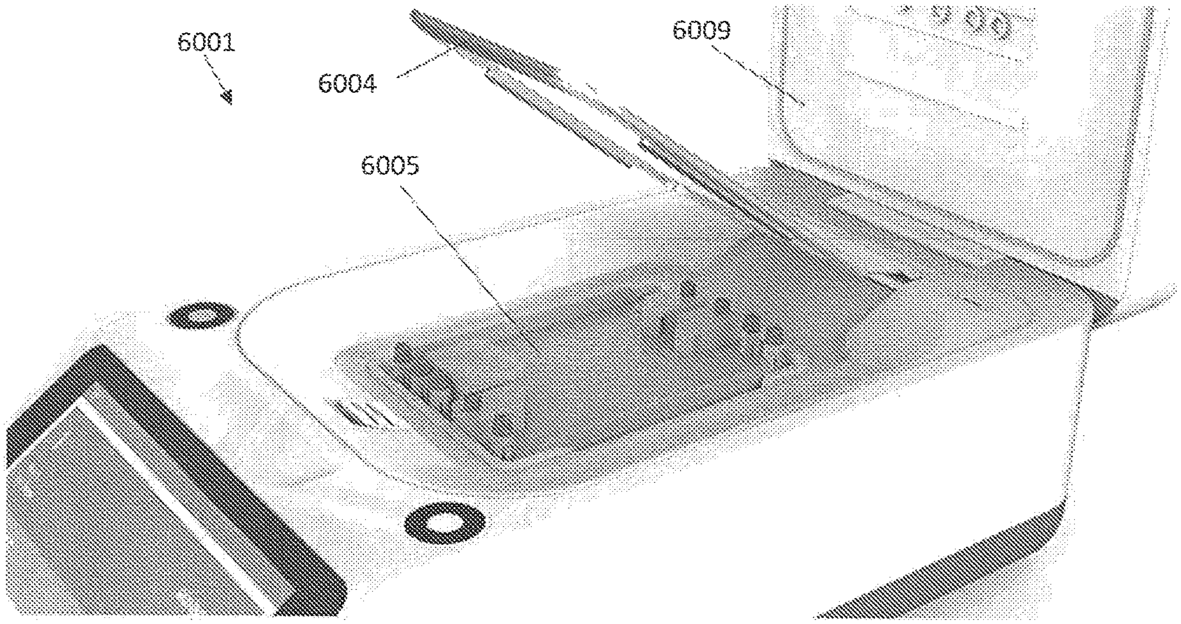
Figure 60C:
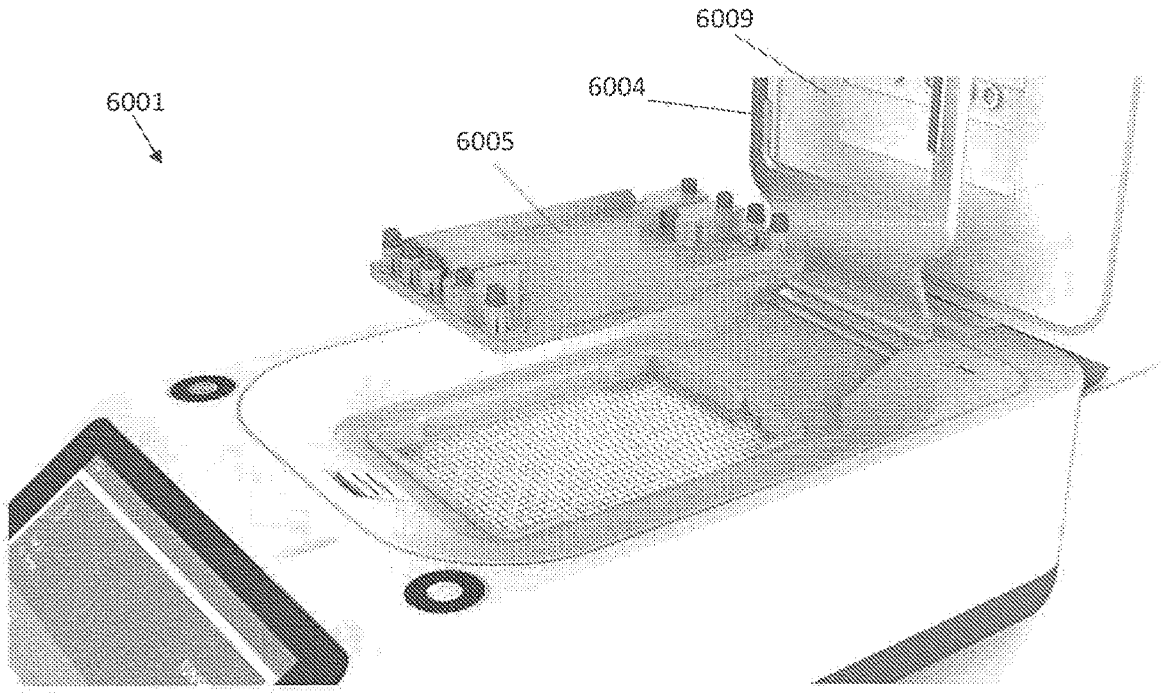
Figure 60D:
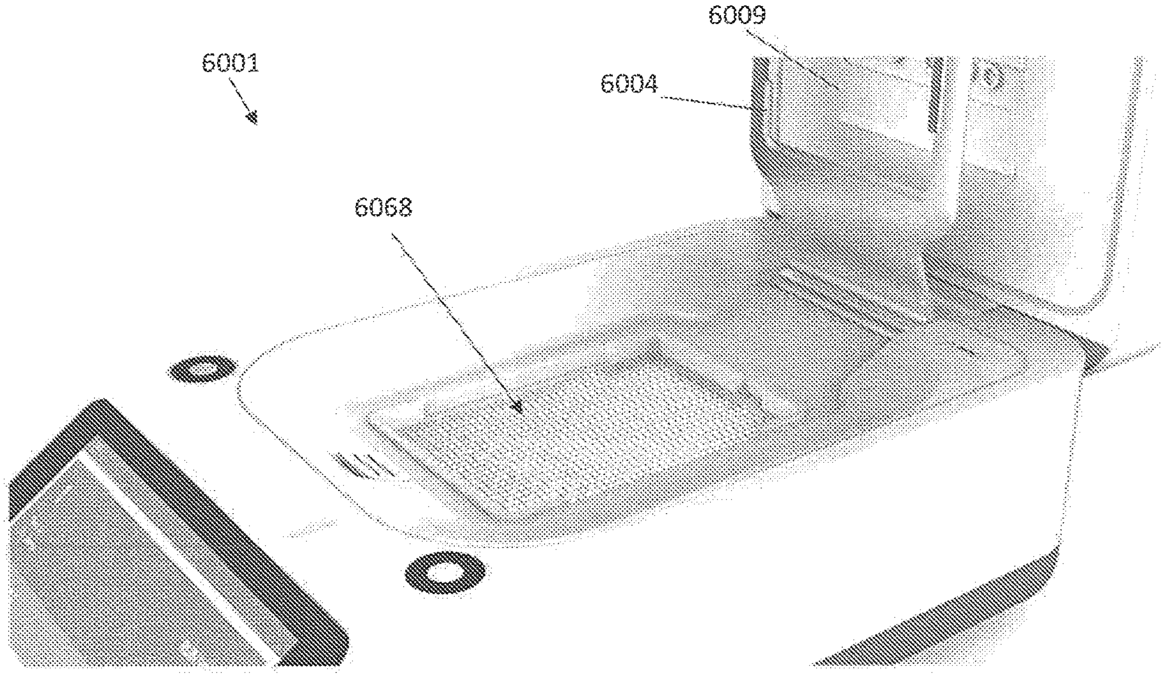

In FIG. 60B, the clamp latch is disengaged, and the clamp raised to allow removal of the cartridge, as shown in FIG. 60C. Removal of the cartridge exposed the drive electrodes 6068, as shown in FIG. 60D, which may be covered with a protective dielectric material, or may be exposed.

Figure 61A:
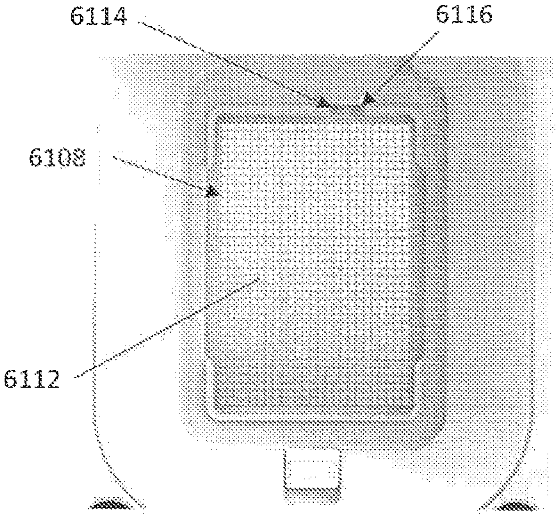
FIGS. 61A-61C illustrate a method of inserting a cartridge into a prototype device such as that shown in FIG. 59A.

FIG. 61A shows a cartridge seat 6108 region of a reader device as described herein. In this example, the cartridge seat is a recess formed in the housing of the reader. The bottom of the seat region includes the contact surface in which an array of drive electrodes 6112 are shown. As mentioned, the drive electrodes may be coated or covered with a protective material, such as a dielectric material, allowing them to make electrical contact with the bottom (dielectric) layer of the cartridge. This seating region may also include one or more vacuum openings (including a plurality of vacuum openings formed through all or some of the drive electrodes, as described above. The seating region may be keyed so that the cartridge must be inserted in a predetermined orientation. The seating region also include one or more reference electrode connectors 6114 (e.g., pins, contacts, pads, plugs, etc.) for connecting to the reference electrode(s) on the cartridge. The seating region may also include one or more cartridge detection sensors, such as a cartridge detection contacts 6116 (e.g., pins, plugs, buttons, etc.), optical sensor, etc., that may detect when the cartridge is seated in the device.

Figure 61B:
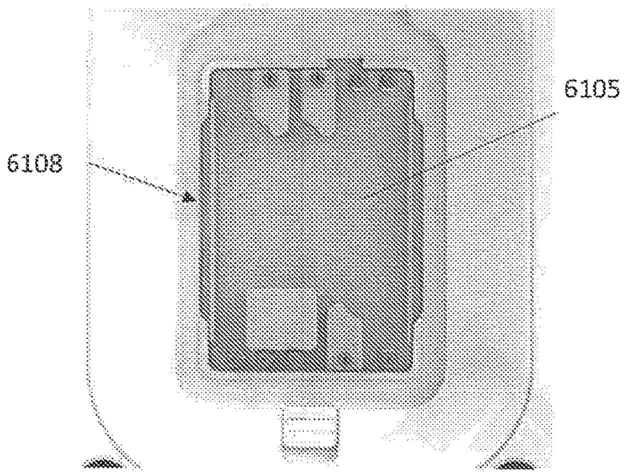
Figure 61C:
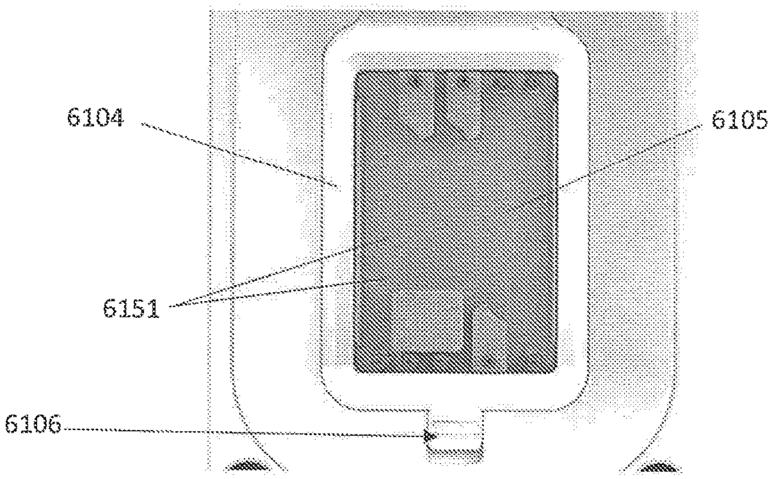

For example, FIG. 61B shows a cartridge 6105 seated in the reader, engaging both the cartridge detection sensor(s) (e.g., cartridge detection pins) and the reference electrode connectors. Power (e.g., high voltage) is not applied to the drive electrodes at this stage until the safety interlocks are fully engaged. For example, FIG. 61C shows the cartridge seated in the reader with the latching clamp closed and the latch 6106 engaged, holding the clamp closed over the cartridge. With the clamp shut over the cartridge, but the cover (not shown) open, the user may access the top of the cartridge to apply fluid via the one or more access ports, e.g., to apply fluid, including sample fluid, buffer, coating (e.g., liquid paraffin, etc.), and/or antifouling (e.g., detergent) to the cartridge, in any of the open ports 6151. In some variations, the reader is configured so that when the cartridge is detected (e.g., by the cartridge detection sensor) the reader may apply a vacuum (seating vacuum) to secure the cartridge dielectric bottom surface to the cartridge seat and against the array of drive electrodes. In some variations the seating vacuum is engaged only after the clamp is latched, as shown in FIG. 61C. Once the seating vacuum is applied, the clamp is latched and the cartridge detection sensor indicates a cartridge is seated, the reader may provide power to the drive electrodes. This may allow the reader to control droplets applied by the user through the cartridge even with the lid open, preventing unintended movement of fluid in the cartridge by electrowetting. With the high voltage activated, an indicator (e.g., LED) may be illuminated; e.g., the indicator may be always and only on when the high voltage is activated. In operation, the user may load reagents and sample(s) according to instructions on the Touchscreen.

As shown in FIG. 61C, when the clamp is closed and latched, the user may access the top of the cartridge, but is prevented by the rim of the clamp from contacting, even accidentally, the seating surface. In general, the clamp includes a frame; the frame may fit around and partially over the edge of the cartridge, while having an opening allowing access to the cartridge (e.g., about 75% or more of the top surface, about 80% or more of the top surface, about 85% or more or the top surface, etc.). Thus, the clamp may be referred to as a clamp frame that include an opening or window allowing access to the cartridge while covering the edge region of the cartridge. The clamp may be hinged to the housing of the reader, as shown. The opening in the clamp may be a window, pass-through, or the like. The clamp may lock around the top edges of the cartridge, securing it against the cartridge seating region of the reader housing, and engaging with a latch 6106. The user may access the top surface, and after closing the lid (e.g., and engaging the lid lock, such as the electromagnetic locks), the pressure manifold on the lid may access the top surface of the cartridge to apply positive and/or negative pressure to drive fluid through the microfluidics portion of the cartridge, as described in greater detail below.

Figure 62A:
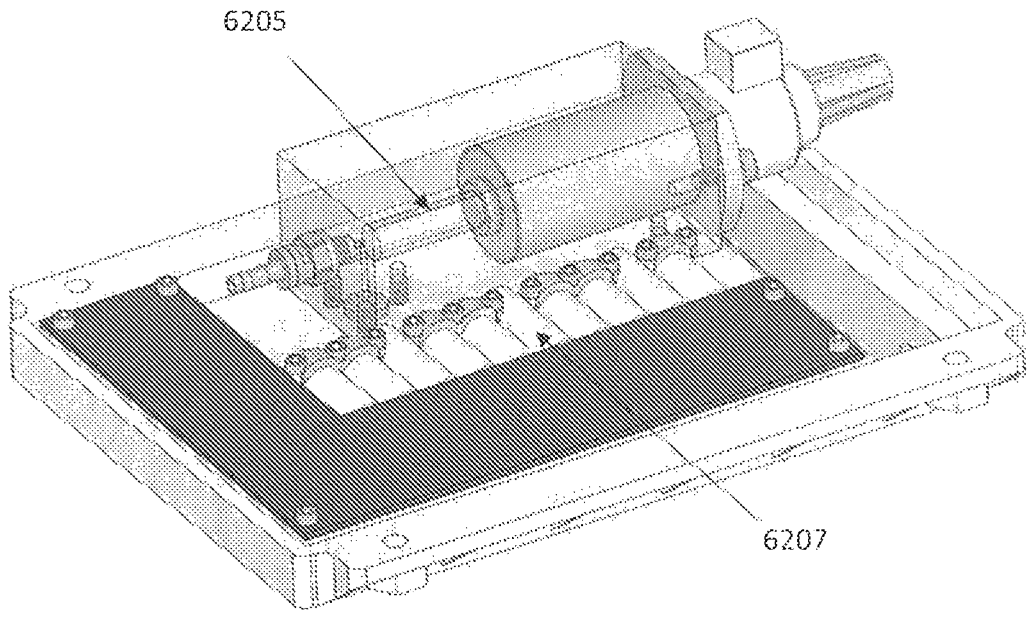
FIGS. 62A-62G illustrate examples of a lid subassembly of a reader device as described herein.
Figure 62B:
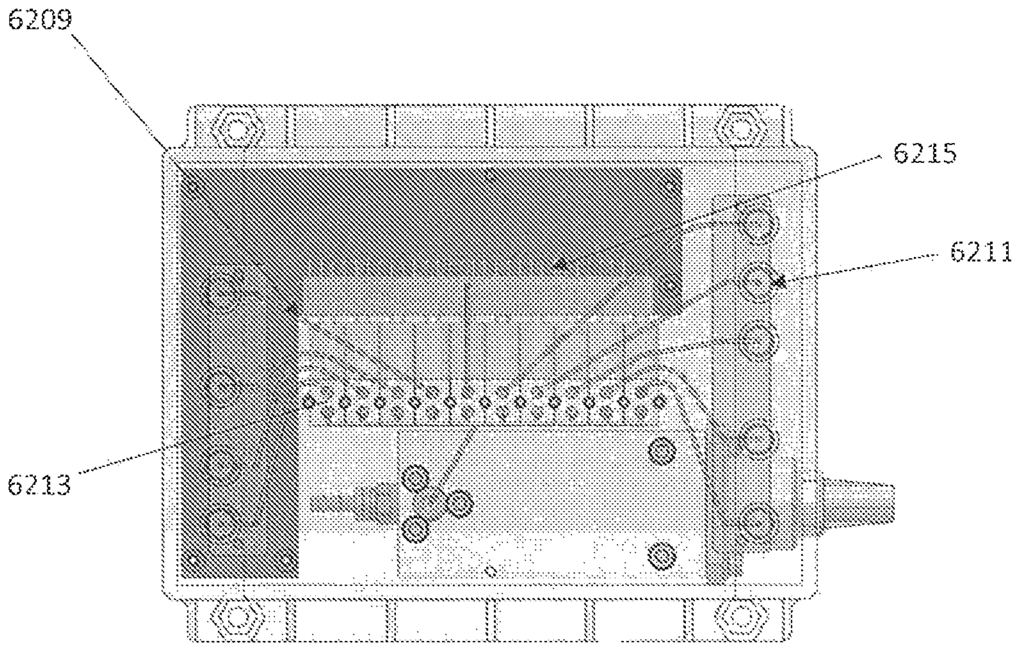

As described above, any of the reader devices ("readers") described herein may include a cover that is applied over the cartridge (e.g., after closing and latching the clamp). For example, FIG. 58A shows a transparent lid that may be closed over a seated cartridge that is latched in the cartridge seat by a clamp frame. Any of these covers may include lid having a lid subsystem coupled to and/or at least partially within the lid, as described above. The lid subsystem may include, for example, any or all of: one or more pumps (e.g., pipette pumps), a vacuum manifold (e.g., pressure manifold), one or more valves (e.g., solenoid valves, etc.), one or more pressure sensors, one or more positional sensors, and one or more indicators (e.g., LEDs, etc.). FIGS. 62A and 62B show examples of a portion of the lid subsystem that may be included within or partially within the lid (lid housing). In FIG. 62A, showing a top perspective view of a portion of a lid sub-system that may be within the lid, a pump (pipette pump 6205) is shown coupled to a plurality of solenoid valves 6207. The pipette pump may be activated to apply positive and negative pressure to pressure lines connected to the plurality of valves, and from the valves into the cartridge to controllably drive fluid within the top of the cartridge.

FIG. 62B shows a bottom view of the lid subsystem, showing a valve manifold that is connected to the pump and controlled by the solenoid valves, as well as a plurality of pressure (air) channels 6209 that are connected from the valve manifold 6213 to pneumatic connectors on the bottom (cartridge-facing) side of the lid, so that when the lid is closed, the pneumatic connectors 6211 (e.g. pneumatic bores) may couple to the cartridge. The lid subsystem shown includes circuitry (e.g., on a PCB 6215) for powering and controlling the valves based on commands received from the controller (e.g., in the housing). The lid subsystem may be mounded in the lid.

Figure 62C:
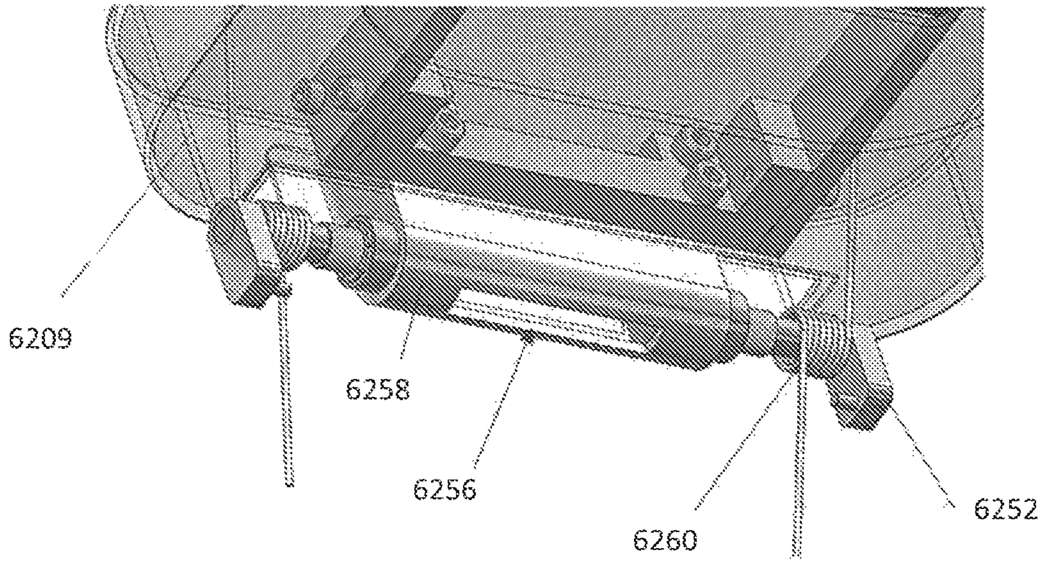
Figure 62D:
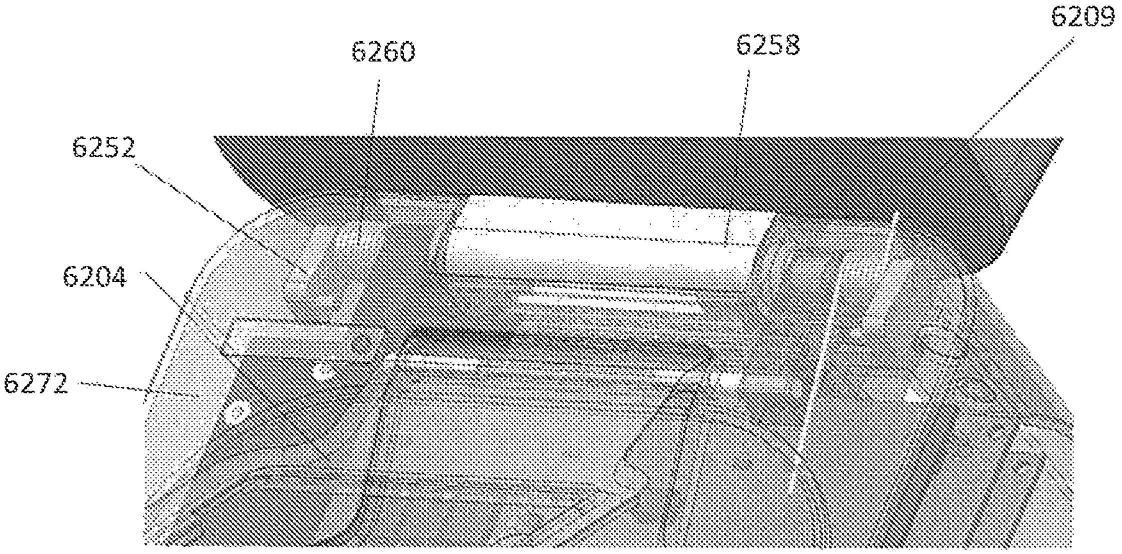

FIGS. 62C and 62D illustrate example of the lid hinge that may be used in any of the readers described herein. For example, the hinge may generally be configured to support the weight of the lid, including the lid assembly (vacuum pump, manifold, etc.) and be reliably and reproducibly applied to the positioned cartridge so that the pneumatic connectors 6211 may contact and seal against the ports in the cartridge. For example, in FIG. 62C, the hinge may be configured to support a max torque of the lid 6209 of at least about 15 in-lb, and have a spring max torque of about 4.2 in-lb (e.g., 8.4 in-lb total). FIG. 62C show a hinge having a hinge base 6258 with a cable pass-through 6256 (where the cable may transmit power and/or data, including data to/from the controller in the base housing). The hinge may include one or more torsion springs 6260 and one or more spring actuators 6252. FIG. 62D shows the attachment of the lid 6209 to the base housing 6272 of the reader. As shown in the semi-transparent view of the housing base, the clamp (clamp frame may also be hinged to the housing under the lid (proximal to the lid hinge).

Figure 62E:
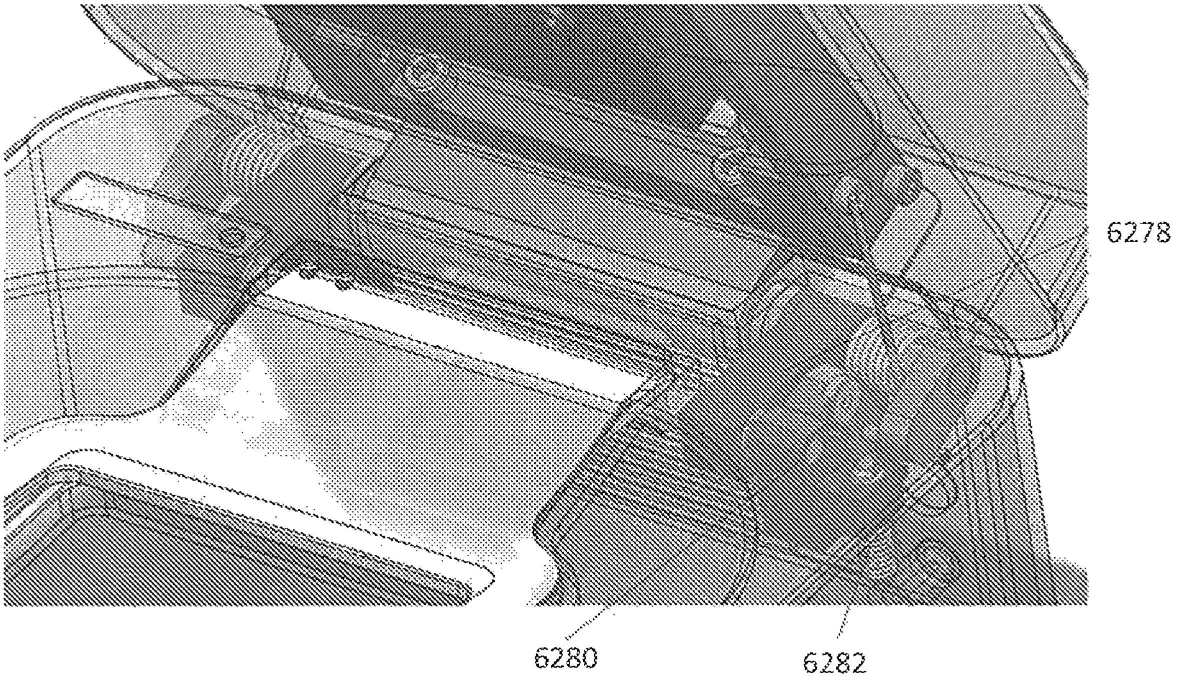
Figure 62F:
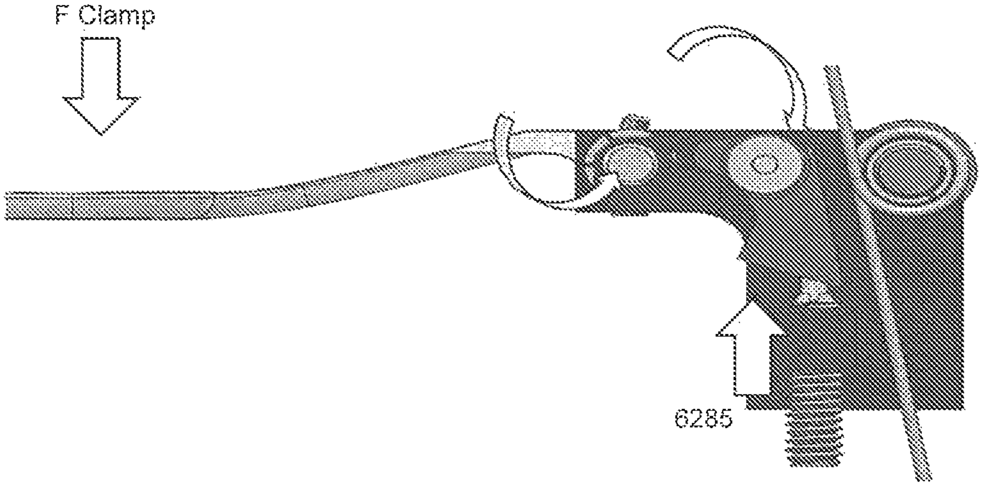

FIG. 62E shows another view of the lid hinge, showing the slightly recessed clamp hinge with a pair of clamp hinge mounts 6278, hinge pin 6280 and plunger 6282. FIG. 62F illustrates the operation of these components in opening and closing the clamp hinge. The clamp hinge may therefore be configured to coordinate operation with the lid. The clamp (clamp frame) may create, for example, 0.88 in-lbs torque at the hinge, and the force at the plunger 6285 may be about 2.7 lb; the plunder with 3 lb extended and 13 lb retracted.

In general, the pump (e.g., pipette pump) may deliver controlled positive and negative pressure to all mixing channels, waste reservoirs, and storage reservoirs in the cartridge through the pneumatic connectors. The pump is configured to allow for chaotic mixing. The valves (e.g., valve manifold or solenoid valve system) may regulate the passage of air into target air pathways, and may allow for single channels (single pneumatic connectors) to be selected. The air channels typically allow for pressure to be delivered to all of the channels corresponding to the pneumatic connectors (nine are shown in FIG. 62B) and may including one pressure vent line. The pneumatic connectors (e.g., pneumatic bores) may interface with connectors (e.g., connectors including thermoplastic, TPE, connectors) on cartridge to make a pneumatic seal with the cartridge. As mentioned, the device may be attached securely in the lid. For example, the lid may also include a hinge system that fixes the entire manifold assembly to a hinged chassis that can be opened and closed. This may allow for easy loading and extraction of cartridge. In some variations, all or a portion of the lid subassembly, and particularly the pneumatic connectors, may be positionally adjustable (e.g., in x and/or y, and/or in rotation in the xy plane) to mate more precisely with the cartridge, even when the cartridge is slightly misaligned relative to the lid. For example, the lid may include a manifold locating system that allows for the manifold to level to the cartridge and correct itself if there are any user positioning errors. The manifold locating system may include one or more actuators for moving the pneumatic connectors and/or the frame to which the pneumatic connectors are attached (which may include any of the valve manifold, circuitry, pump, connectors, etc.). Any of these apparatuses may also include heat dissipation elements within the lid, such as a fan (e g , manifold fan) to provide airflow within the manifold lid to dissipate heat produced from the lid components (e.g., pump).

Figure 62G:
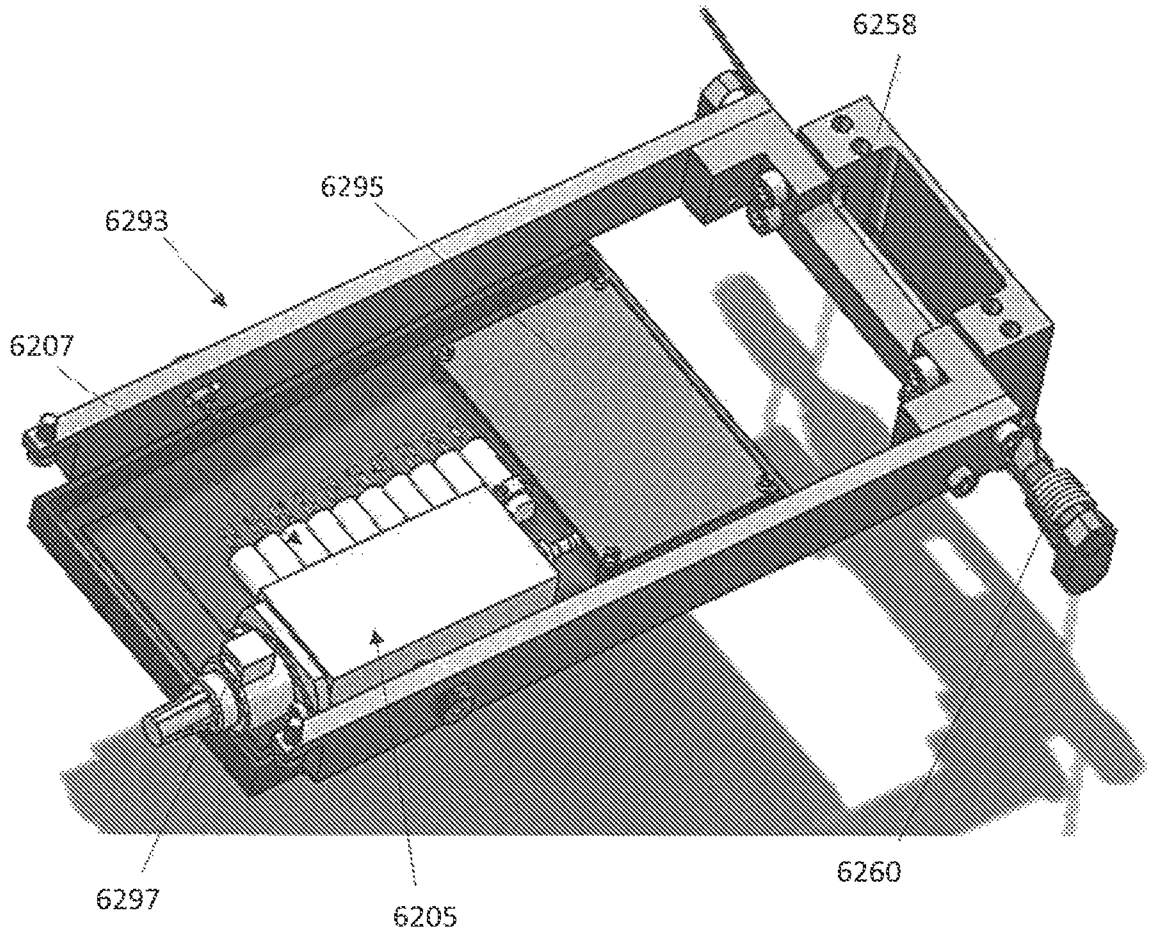

FIG. 62G illustrate another example of a lid subsystem that may be included within or partially within the lid (lid housing). In FIG. 62G, similar to FIG. 62A, the top perspective view of a portion of a lid sub-system that may be within the lid includes a manifold control board (circuitry) 6295, and the manifold 6293 connected to the plurality of valves 6207 (e.g., solenoid valves) and the pump (e.g., syringe pump 6205). The syringe pump in this example is connected to a stepper motor 6297.

As mentioned above, any of the apparatuses (e.g., readers, including systems with one or more readers) may include safety features for preventing exposing a user to the relatively high voltage of the EWOD (e.g., the digital microfluidics). FIGS. 63A-63D illustrate the safety features associated with the operation of a prototype reader and cartridge as described herein. These safety features may enable the user to load and/or unload reagents while gaining and maintaining control of the reagents in the EWOD space, e.g., the air gap. In any of the apparatuses and methods described herein, the workflow may be governed by hardware safety interlocks which enables high-voltage to control the droplets during reagent loading, but provides for user safety.

Figure 63A:
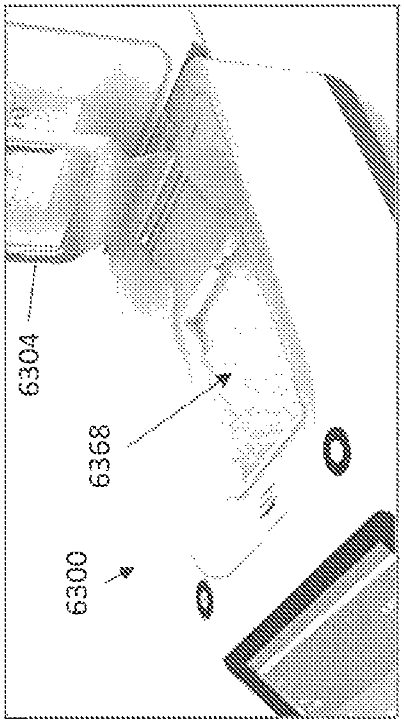
FIGS. 63A-63D illustrate a method of safely operating a reader device as described herein.
Figure 63B:
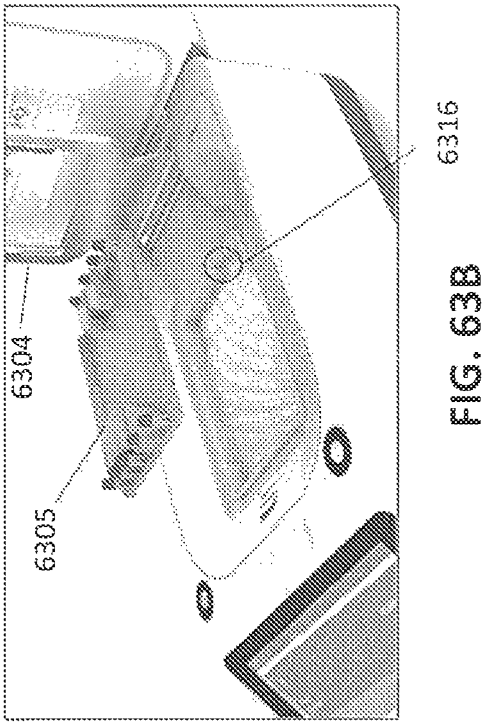
Figure 63C:
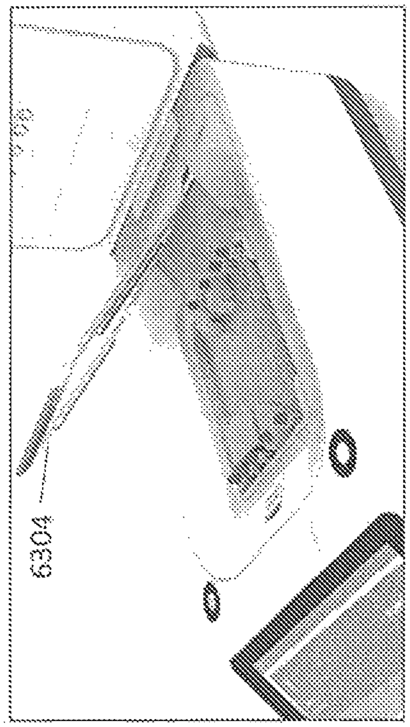
Figure 63D:
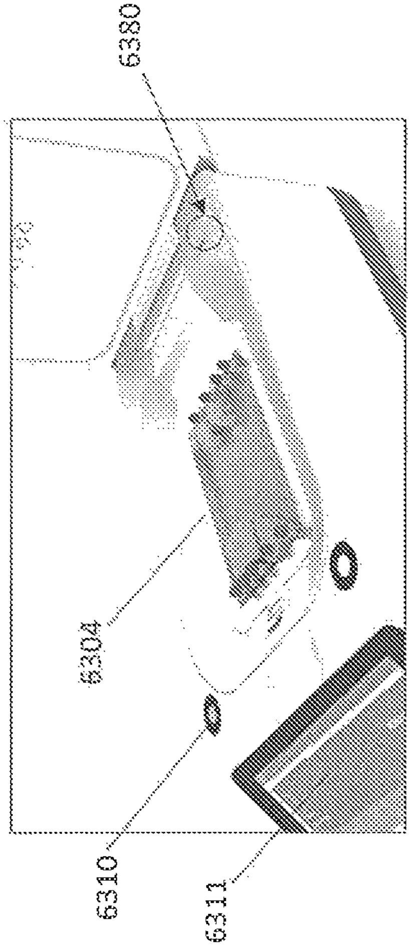

For example, a method of operating a DMF system safely is illustrated in FIGS. 63A-63D. In this example, the reader device 6300 is similar that described above. Initially, with no cartridge loaded, as shown in FIG. 63A, the high-voltage power to the drive electrodes 6368 is disabled. A user may load a cartridge 6305 into the cartridge seat of the reader, as shown in FIG. 63B. Loading the cartridge in the proper orientation may make electrical contact between the reference electrode in the cartridge and may also be detected (e.g., by making contact with one or more cartridge detection pins 6316, shown near the clamp hinge in FIG. 63B. The user may then close the latching clamp 6304 over the cartridge, as shown in FIG. 63C. Upon sensing the presence of the cartridge 6305 and the closure and latching of the clamp 6304, vacuum may be applied (in some variations vacuum may be applied before latching the clamp) from the vacuum chuck interface with the bottom of the cartridge, and the voltage (e.g., high voltage) to the drive electrodes may be activated. The vacuum pressure may be monitored by the controller to confirm that the cartridge is anchored to the reader, and/or to prevent overpressure which may deform the bottom of the air gap (e.g., the dielectric layer). When the high voltage is activated the user may be alerted by the presence of an LED 6380 that is always and only on when the high voltage is activated. The user may then load the reagents and sample according to instructions on the display 6311. Upon completing the loading, the user may close the lid (e g , manifold/lid) which may latch via electromagnets 6310, and the run can commence (performing the chosen sequence of procedures on the DMF apparatus, as described).

In any of the methods and apparatuses described herein, the user may be further protected from some malfunction of cartridge or instrument during the loading process by galvanic isolation in the electrode board which may reduce the risk of any electrical shock Any of the apparatuses described herein may also include over-temperature protection in the thermocycling zones which may reduce the risk of burns. For example, in some variations, with the lid of the reader open, the temperature of any region of the cartridge may be limited to below a threshold value (e.g., about 80 degrees C. or less, about 75 degrees C. or less, about 70 degrees C. or less, about 65 degrees C. or less, about 60 degrees C. or less, about 50 degrees C. or less, about 75 degrees C. or less, etc.).

Figure 64A:
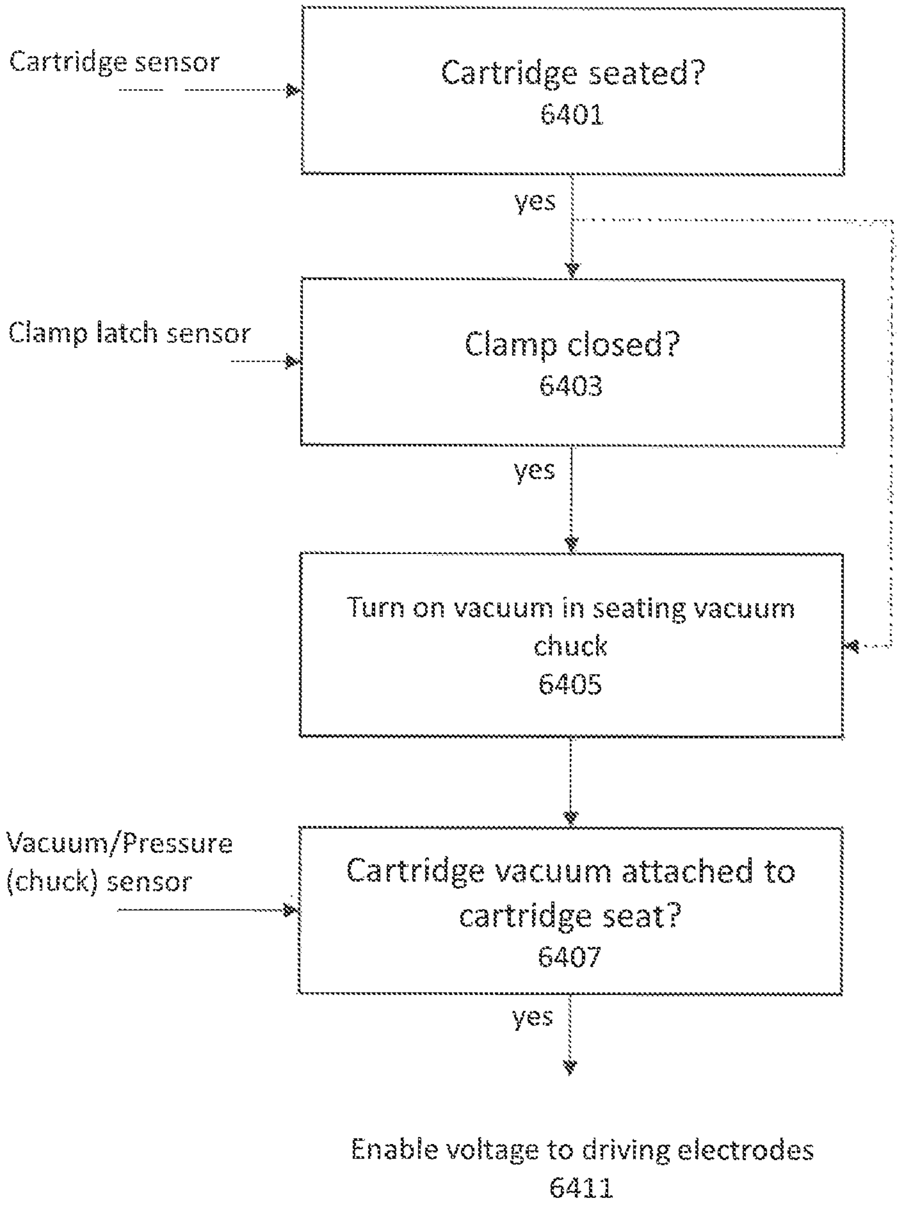
FIG. 64A schematically illustrates a method of operating a device having a plurality of safety interlocks.
Figure 64B:
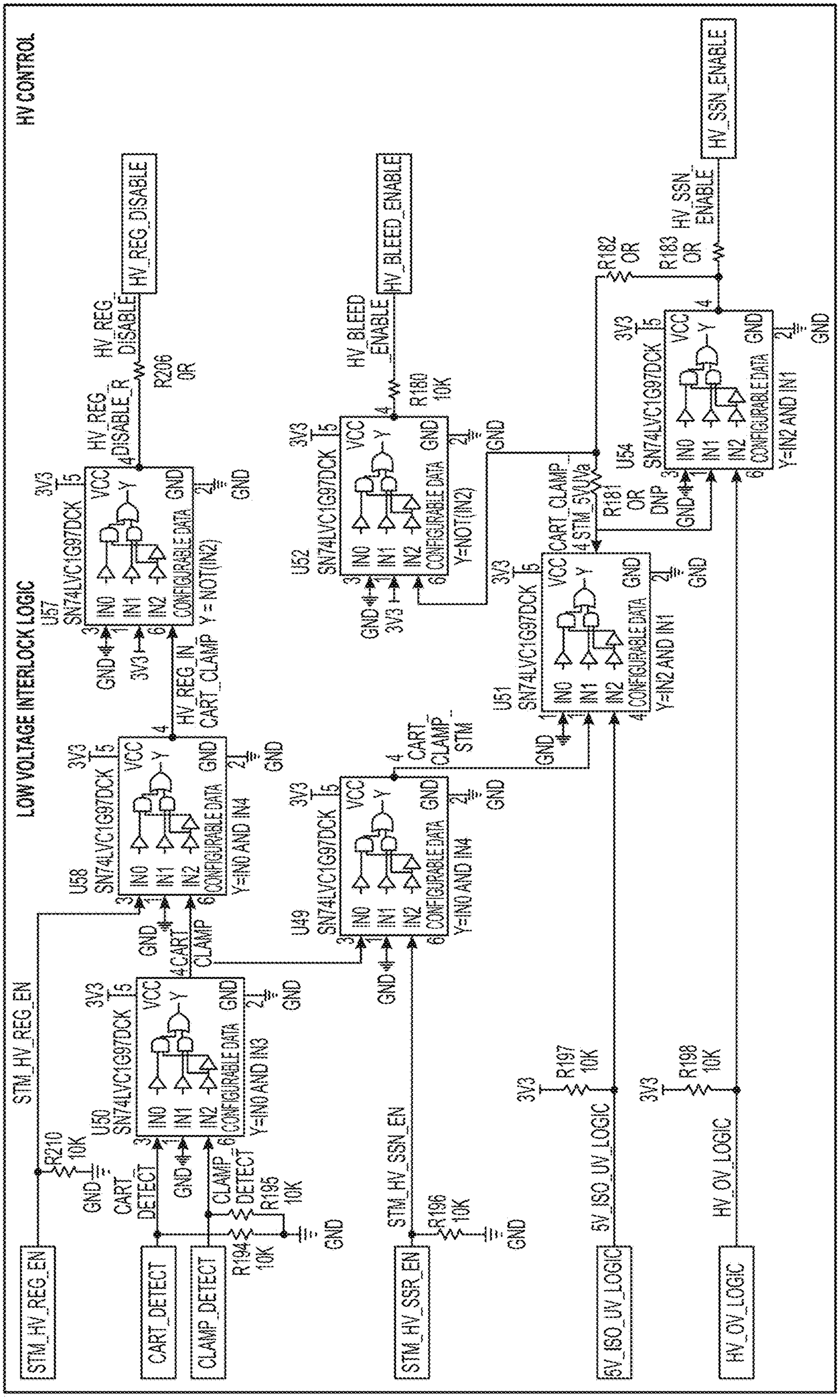
FIG. 64B is a logic diagram of a safety interlock for a reader device.

The apparatuses and methods described herein may also include interlocks as part of the voltage control in the reader. For example, FIG. 64A is an example of chart illustrating at least some of the interlocks that may be used. Similarly, FIG. 64B is a circuit diagram showing low-voltage interlock logic for a voltage control of the reader. In this example, to protect the user, high voltage output may only be enabled when a series of interlocks are enabled. The interlocks may include both hardware and software components, in order to guard against the scenario that the firmware is corrupt. The hardware interlocks were described above, and may include the cartridge detection (sensing that the cartridge is seated), clamp detection (e.g., detection that the clamp is latched), etc. Other hardware interlocks may include high voltage over-voltage detection and/or 5V supply under-voltage.

One or more software interlocks may be used as well, including, but not limited to a high-voltage power supply enabling control algorithm. Another software interlock may include solid state output control enabling solid state output. The software interlocks may be driven by digital detection of the cartridge and detection of the clamp latching, and/or by user input from the input (e.g., touch screen). In some variations, all of the interlocks must be passed in order to enable voltage (high-voltage) to the drive electrodes. As a backup, the surface of the drive electrodes may be coated with a material, such as parylene, to prevent or limit shocks. Alternatively or additionally, the board including the drive electrodes may be galvanically isolated, requiring two or more points of contact.

For example, as shown in FIG. 64A, the method of activating a reader device to perform a microfluidics protocol on a removable cartridge may include seating the cartridge into the reader, as described above, and confirming that the cartridge is seated using one or more cartridge sensors 6401. If the cartridge is detected, the reader device may then determine if the clamp frame is closed 6403, e.g., based on the input of one or more clamp latch sensors. Either after seating the cartridge (and/or confirming the cartridge is seated) or after latching the clamp (and/or confirming that the clamp is latched) the reader may apply a vacuum 6405 to secure the cartridge on the vacuum chuck (in some variations, at a negative pressure that is sufficiently low to prevent deformation of the dielectric layer of the cartridge). The device may then confirm that cartridge is attached via a vacuum to the cartridge seat, e.g., using one or more vacuum/pressure sensors (to detect the negative pressure of the vacuum chuck). Finally, if the cartridge is seated, and if the clamp is closed, and if the cartridge is secured in the cartridge seat by the vacuum, then the controller may enable the voltage (e.g., high voltage) to the driving electrode. The logic diagram shown in FIG. 64B illustrates one example of a safety interlock similar to that shown schematically in FIG. 64A. This safety interlock may be ongoing; meaning that if any of these conditions change (e.g., unlatching of frame, loss of the vacuum, etc.) then the high voltage to the driving electrodes may be disabled.

As mentioned, another safety interlock may include the thermal regulation of the thermal subsystem in the reader, preventing the reader from heating the cartridge or a region of the cartridge (the thermally regulated zones, as described above) to a temperature in excess of a temperature limit (an “overtemp” limit). For example, a reader may be configured to prevent the thermal subsystem from increasing the temperature when the cartridge is not engaged and/or when the frame is not latched and/or the vacuum is not securing the cartridge to the seat, similar to FIG. 64A. Alternatively or additionally, the temperature may be limited when the cover is open; for example, the temperature may be raised to a first (lower) limit (open cover over temperature limit, e.g., 80° C. or less, 75° C. or less, 70° C. or less, 65° C. or less, 60° C. or less, 55° C. or less, 50° C. or less, 45° C. or less, 40° C. or less, etc.). Once the cover is closed, the temperature subsystem may be permitted to be increased above this limit (as determined by a cover latch sensor).

Figure 65A:
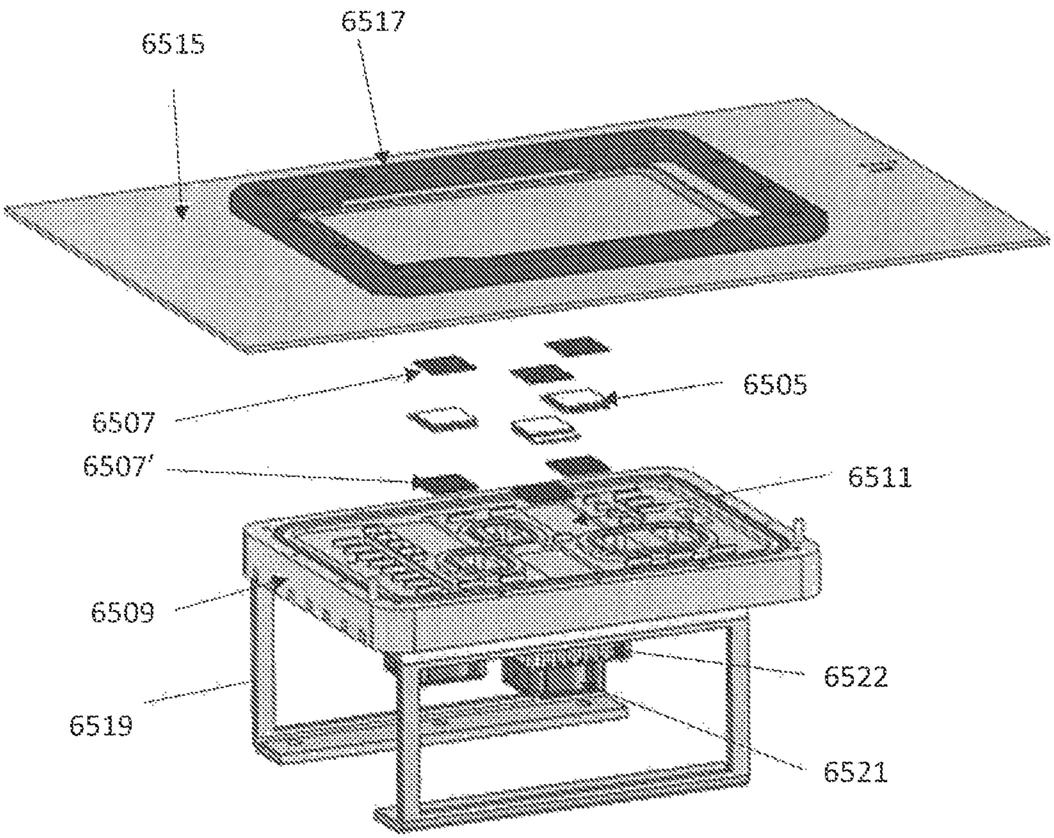
FIGS. 65A-65D illustrate examples of a thermal regulation subsystem of a reader device as described herein.
Figure 65B:
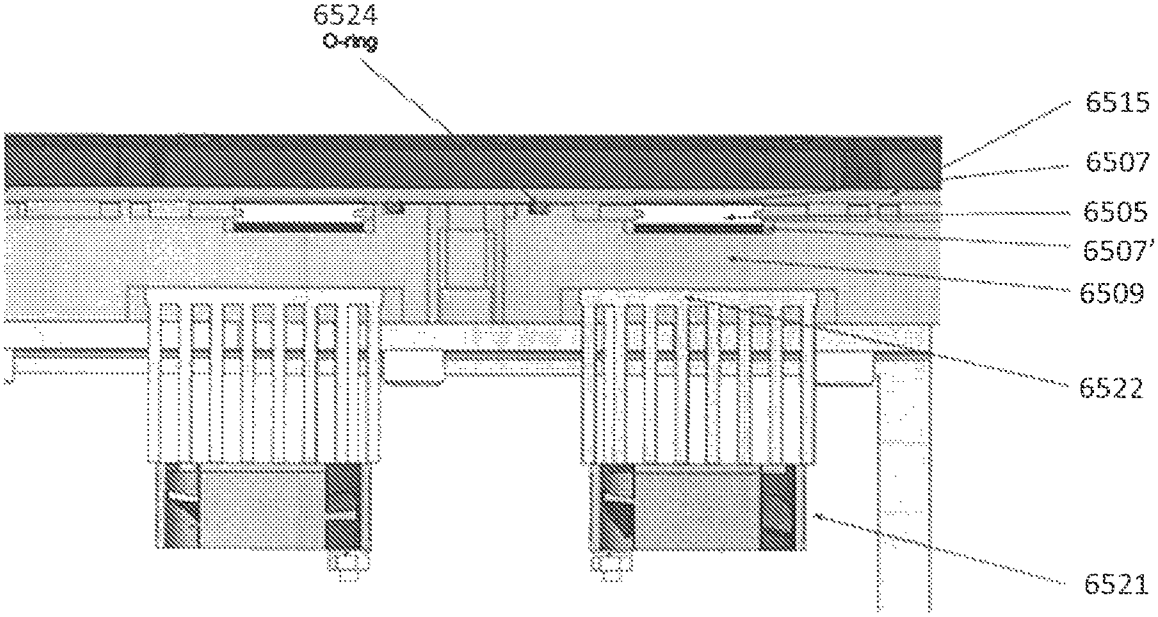

FIGS. 65A-65B illustrate another example of a portion of the thermal subsystem, similar to that described above in FIGS. 42, 43, 46 and 47, above. In FIG. 65A, the thermal subsystem includes one or more TECs 6505 that may be sandwiched between a pair of thermal conductors (graphite pads 6507, 6507') and secured on the vacuum chuck 6509 in TEC slots 6511. The chuck may then be positioned beneath the electrode board 6515 that underlies the cartridge seat (including cartridge rim 6517 which is keyed to accept the cartridge and may seal with the clamp frame as described above). The chuck may be coupled to a frame 6519 within the housing (e.g., a housing frame), and may be positioned beneath one or more fans 6521 and one or more heat sinks 6522, as shown. In some variations the fans are optional and may be omitted. FIG. 65B shows a cross-section through a side view of the thermal subsystem shown in FIG. 65A. The PCB of the electrode board 6515 is placed on top of the chuck 6509 holding the TECs. The chuck may be thermally conductive (e.g., formed of a thermally conductive metal and/or polymer) and one or more heat sinks 6522 and cooling fans 6521 may underlie each of the TECs.

Figure 65C:
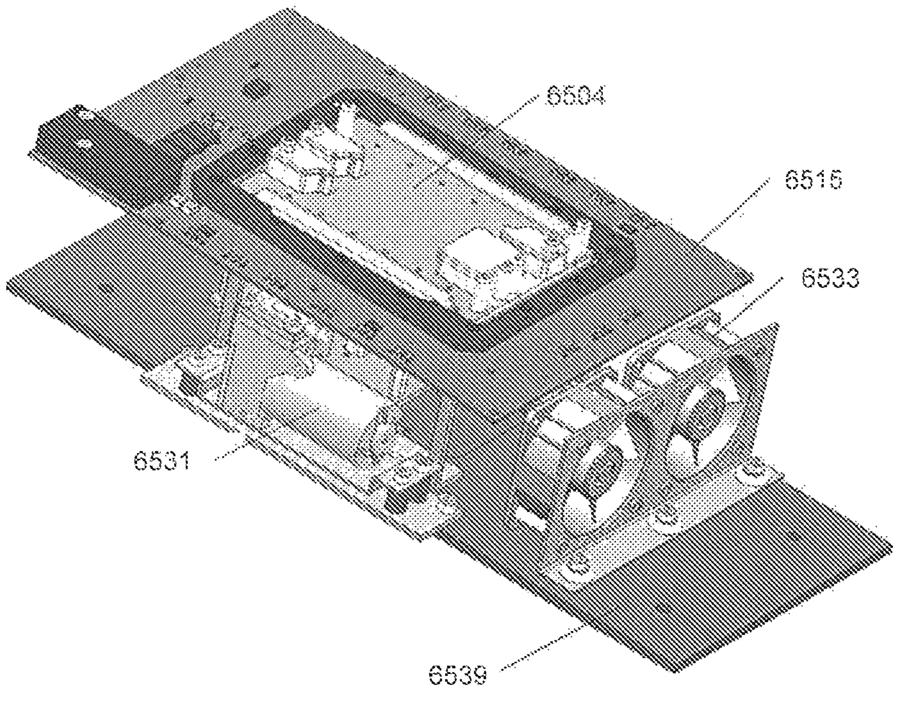
Figure 65D:
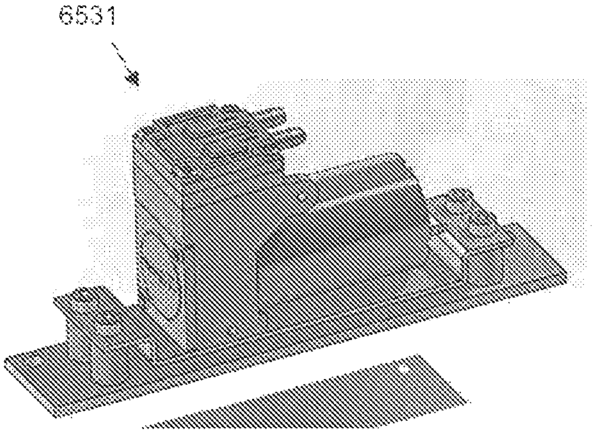

FIG. 65C shows a top perspective view of a portion of the reader including the thermal subsystem. In FIG. 65C the cartridge 6504 is shown housed within the cartridge seat on the electrode board 6515. A pump 6531 and additional front cooling fans 6533 (fan assembly) are mounted within the housing as part of the thermal control subsystem. The fan assembly, pump and housing frame are all mounted on a base plate 6539, which may be part of the housing or coupled to the housing. FIG. 65D shows an enlarged view of the pump 6531.

As mentioned above, any of the thermal control subsystems described herein may also include one or more resistive heater traces, drive circuitry and thermal protection (e.g., insulation); the resistive heater(s) may provide isothermal heating up to about 75 degrees C. in an action zone, as described above in reference to FIG. 55B (and may also include a magnet).

A resistive heater may include active cooling or passive (e.g., air) cooling, and the resistive heater may be in the electrode board, integral to, e.g., a second layer side.

The TEC thermal transfer regions may include the TEC, drive circuitry and protection (e.g., insulation), and may be configured to transfer energy from a TEC to the EWOD, including thermocycling with temperatures between about 4 degrees C. and 98 degrees C. Any of the apparatuses described herein may also include custom TECs and mountings, which may be used to provide a robust TEC that achieves ramp rates of up to 10 degrees C./sec and may have a high degree of temperature measurement accuracy.

In any of the apparatuses described herein, the TEC may be a high power thermocycling TEC (e.g., 30 W) soldered to the bottom of the electrode board directly. In some variations, the ramp rate may be 3 degrees C./sec or higher, and can be controlled by controlling the current applied to the TEC. For some variations of a control system, a closed feedback loop system may be used both in ramp rate and steady state with precision temperature control to at least 0.5 degrees C. accuracy. For example, the heaters (and ramp rates) may be configured to be in a 4×4 electrode grid array (heater zone), fitting approximately 200 μl droplets per heater zone.

Figure 66A:
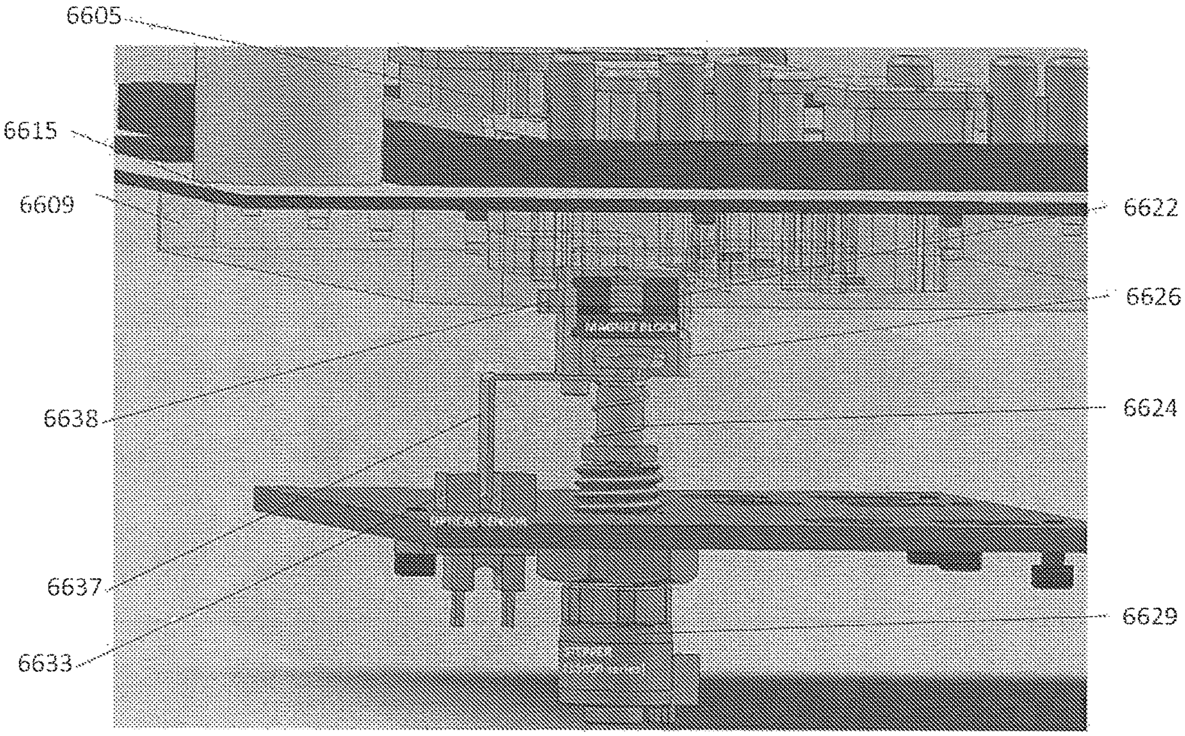
FIGS. 66A-66B illustrate examples of a magnetic subsystem of a reader device as described herein.
Figure 66B:
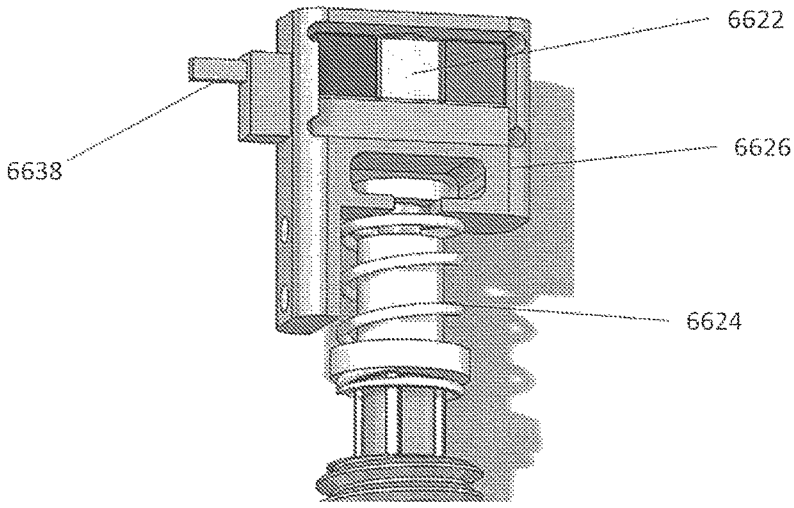

As mentioned above, the reader may also include a magnet control system (magnet control) within the housing, and may coordinate (via the controller) one or more magnets to apply a local magnetic field to one or more zones of the cartridge. This is described briefly above in relation to FIGS. 38A, 39, 40, and 41A-41B. FIGS. 66A-66B also illustrate example of magnetic subsystems that may be included as part of a reader to apply and/or remove a local magnetic field to a region (zone) of a cartridge. For example, in FIG. 66A, the cartridge 6605 is seated in a cartridge seat in communication with the array of drive electrodes (on the electrode board 6615), beneath the vacuum chuck 6609. In this example, a magnet is shown as a Haibach array of magnets 6622 (an arrangement of permanent magnets that augments the magnetic field on one side of the array while canceling the field to near zero or near-zero on the other side), and a magnetic jacket 6626 around the lower-filed side of the array; the jacket may be connected to a post that includes a bias (e.g., spring) 6624. The magnet (e.g., jacket) on the post may also be connected to a motor (e.g., a stepper motor 6629) that can move the magnet up and down (e.g., in the z-axis, to/from the cartridge). A sensor, such as an optical sensor 6633 may determine the position of the magnet and this position may be used for feedback to help regulate the position of the magnet relative to the cartridge. For example, a flag 6637 or marker may be coupled to the magnet (e.g., through the post or jacket) and may be tracked by an optical sensor. The magnet may also be limited in movement to prevent it from crashing into the cartridge; for example, a hard stop 6638 (lip, rim, etc.) may be connected to the jacket or post to engage with a corresponding limit (rim, edge, etc.) on the chuck. The bias may help return the magnet back to a retracted position, away from the cartridge. FIG. 66B illustrates an enlarged view of the magnet assembly show in FIG. 66A. In this example, the spring compliance of the magnet head has a tolerance of about 1.5 mm, and the motor resolution is about 18°/step for about 80 steps/mm. As mentioned, the Halbach magnet array focalizes the magnetic field and amplifies the magnetic flux (in this example, of three neodymium magnets) at one point that is approximately 3.0 mm in diameter (roughly the dimensions of one unit cell, e.g., one electrode) and may generate enough force to achieve successful captures of magnetic beads in the cartridge. The magnet array housing ("magnet jacket") may secure the Halbach magnet array. The magnet actuator (e.g., a captive linear actuator, or stepper motor) may vertically actuate the magnet housings and magnet arrays to move it into both an engaged position and a disengaged position. The magnet assembly may also include an optical home sensor that detects the "home" position (e.g., disengaged position) of the stepper motor.

Figure 67A:
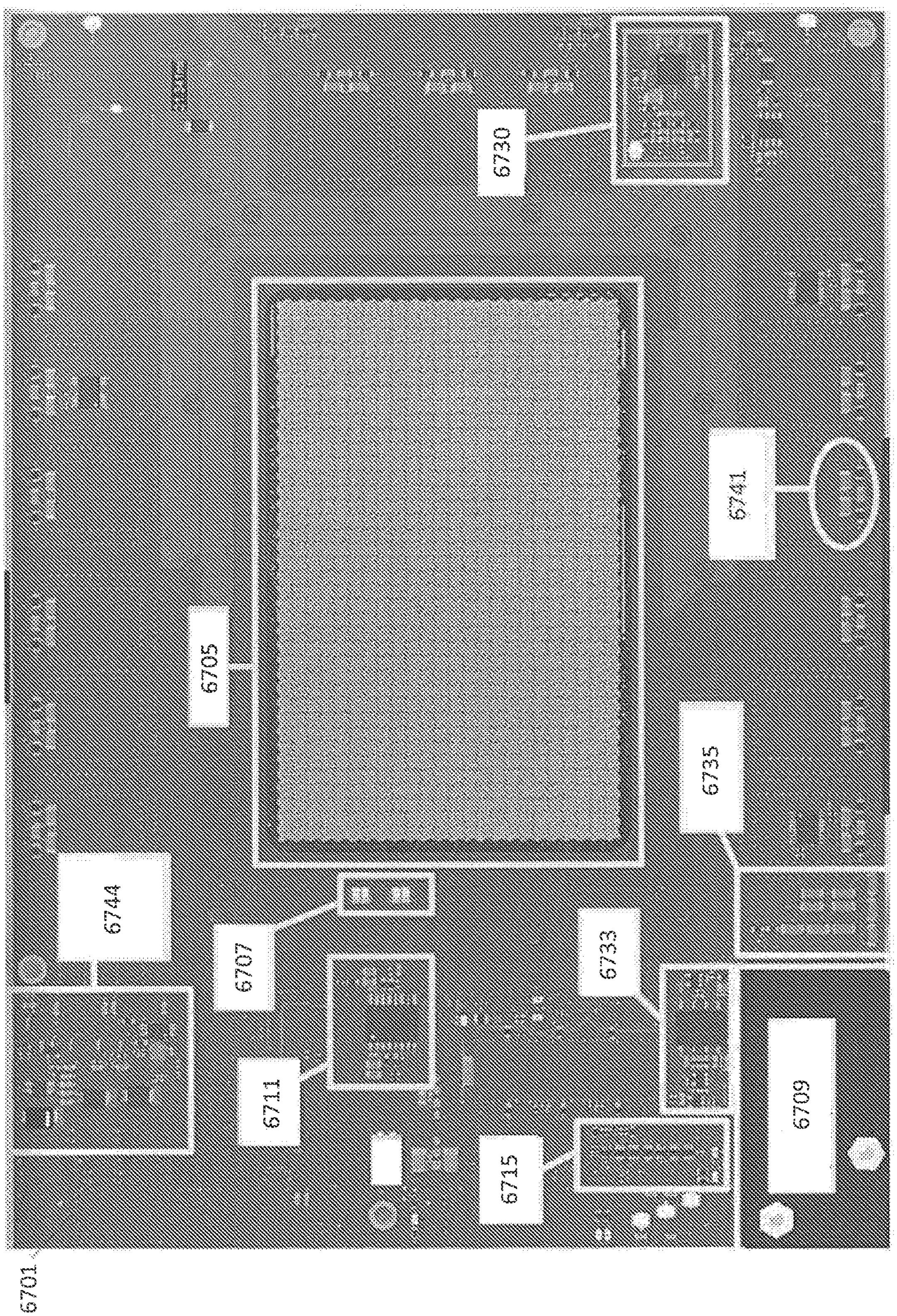
FIGS. 67A-67B illustrate an example of an electrode subsystem of a reader device as described herein.

As mentioned above, the reader devices described herein generally include an electrode subsystem including the array of drive electrodes and the return electrode connection, as well as the control circuitry for controlling actuation of the EWOD to move droplets on the device. FIG. 67A is an example of the top of an electrode subsystem that may be included in a reader as described. In FIG. 67A, the electrode subsystem includes an electrode array 6705 (as mentioned, above, all or some, of the electrodes in the array, e.g., the peripheral rows of electrodes, may include a vacuum opening formed through the electrode), and one or more return (e.g., ground) contacts 6707 for connecting to the return electrode in the cartridge. The electrode array and return contacts may be mounted or formed on a circuit board (e.g., a PCB) 6701, which may be referred to as the electrode board. The electrode board may include a high voltage power supply 6709 for providing high voltage for the EWOD (e.g., the drive electrodes). The electrode board may also include the cartridge detection subsystem 6711 mentioned above, e.g., one or more sensors for detecting the presence of the cartridge in desired location, and/or the clamp detection sub-system 6715, including the one or more clamp latching sensors, and/or the lid detection sub-system, including one or more lid sensors for detecting when the lid has been closed.

The electrode board may also include an identification marker reader (e.g., optical reader, RFID reader) and/or a near-field communications reader (NFC reader) 6730 for reading an identifying marker from a cartridge seated in the reader. The electrode board may also include the high-voltage regulating circuitry 6733, and/or high-voltage measurement resistor strings 6735, as well as decoupling capacitors 6741, which may prevent electrical shock. Any of these boards may also include the circuitry including one or more thermistor amplifiers, TEC interlocks and optionally and accelerometer 6744.

Figure 67B:
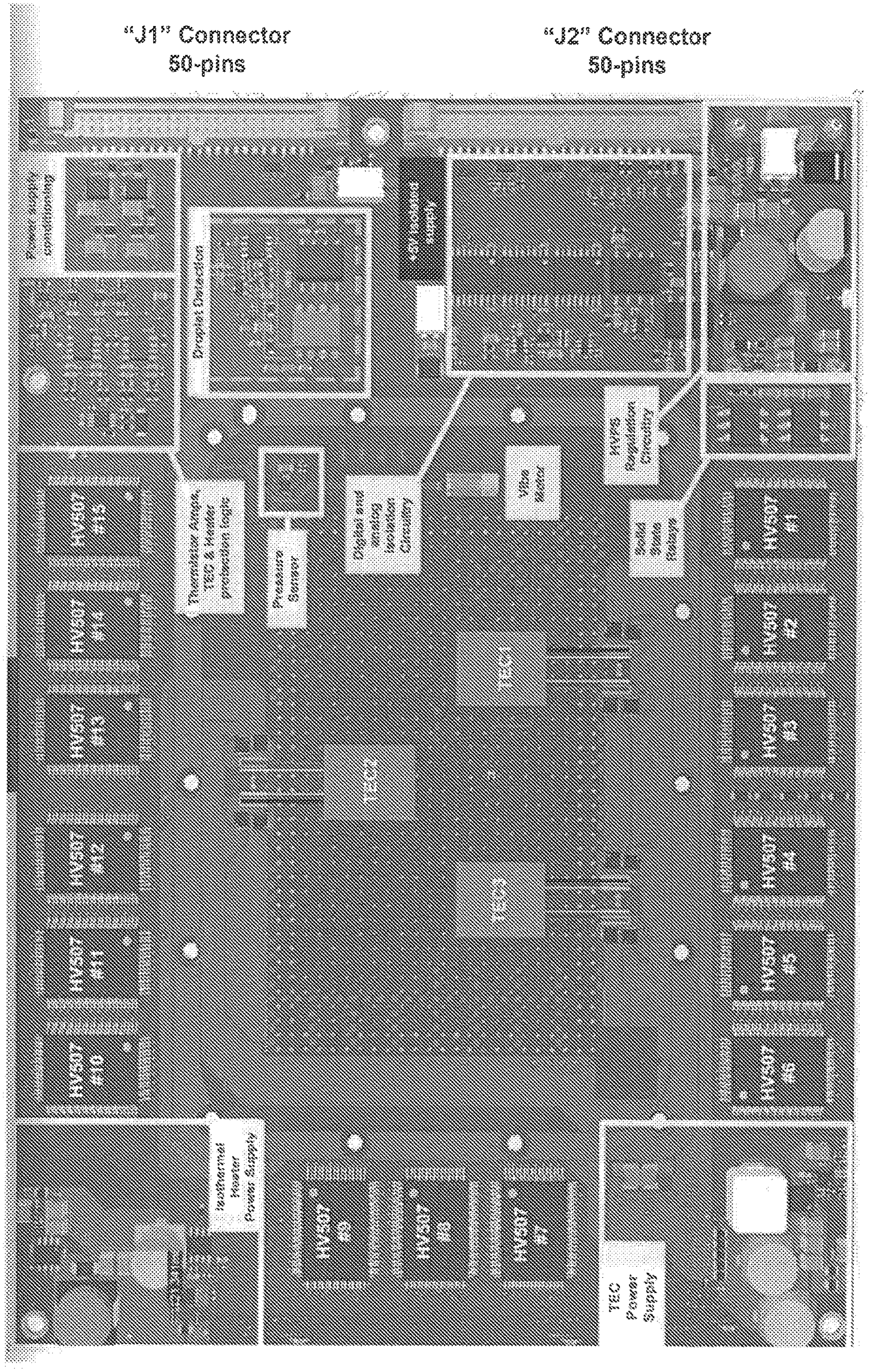

FIG. 67B shows the bottom side of the electrode board, including the TECs (TEC1, TEC2, TEC3) as described above, as well as the isothermal heater power supply, the TEC power supply, the high voltage power supply regulation circuitry, and circuitry for power supply conditioning, droplet detection, digital and analog isolation circuitry, solid state relays, thermistor amplifiers, TEC and heater protection logic, and one or more pressure sensors.

Any of the reader devices described herein may also include one or more vibration motors for mechanically vibrating all or some of the electrodes (e.g., in a vibration zone, which may be separate or overlapping, e.g., with a thermal control zone), as will be described in greater detail, below.

In general, the electrode board forming at least part of the electrode sub-assembly may include a paralyne coating, as mentioned. The electrode board may also include the controller (e.g., one or more processors) of the control may be part of a separate board. The electrode board may also include the fan and/or vacuum pump drivers, for during the proper voltage to the fan and vacuum pump within the reader housing. As mentioned above, the electrode board may include the NFC electronics and/or antenna, for reading and writing to a NFC tag in the cartridge.

As mentioned above, and illustrated in FIG. 67B, any of the reader devices described herein may include a mechanical vibration (e.g., vortexer), e.g., on the electrode board, configured to apply mechanical vibration to one or more regions of the DMF apparatus, including any sub-region or zone. The dynamics of vortexing liquids are key to implementing many standard molecular biology protocols steps including thorough mixing, dissolving compounds into solution, emulsion formation, cells and tissue dissociation and or disaggregation. Conventionally, many of these processes are carried using vortexer devices onto which small vials of liquid are placed on their base, pressed and in consequence vials rapidly oscillate in a circular motion creating a vortex inside the liquid. A standard vortexer can have variable speed control ranging from 100 to 3200 rpm.

The readers described herein may mimic this process on DMF. Although the DMF chamber is stationary and circular motion cannot take place, the dynamics of vortices in droplets may be achieved by coupling a vibrational motor to the bottom of DMF PCB board. The vibrational motor speed may control ranges from 0 to 10,000 RPMs and a force of minimum 50 Newtons (11.24 lbf).

Figure 68:
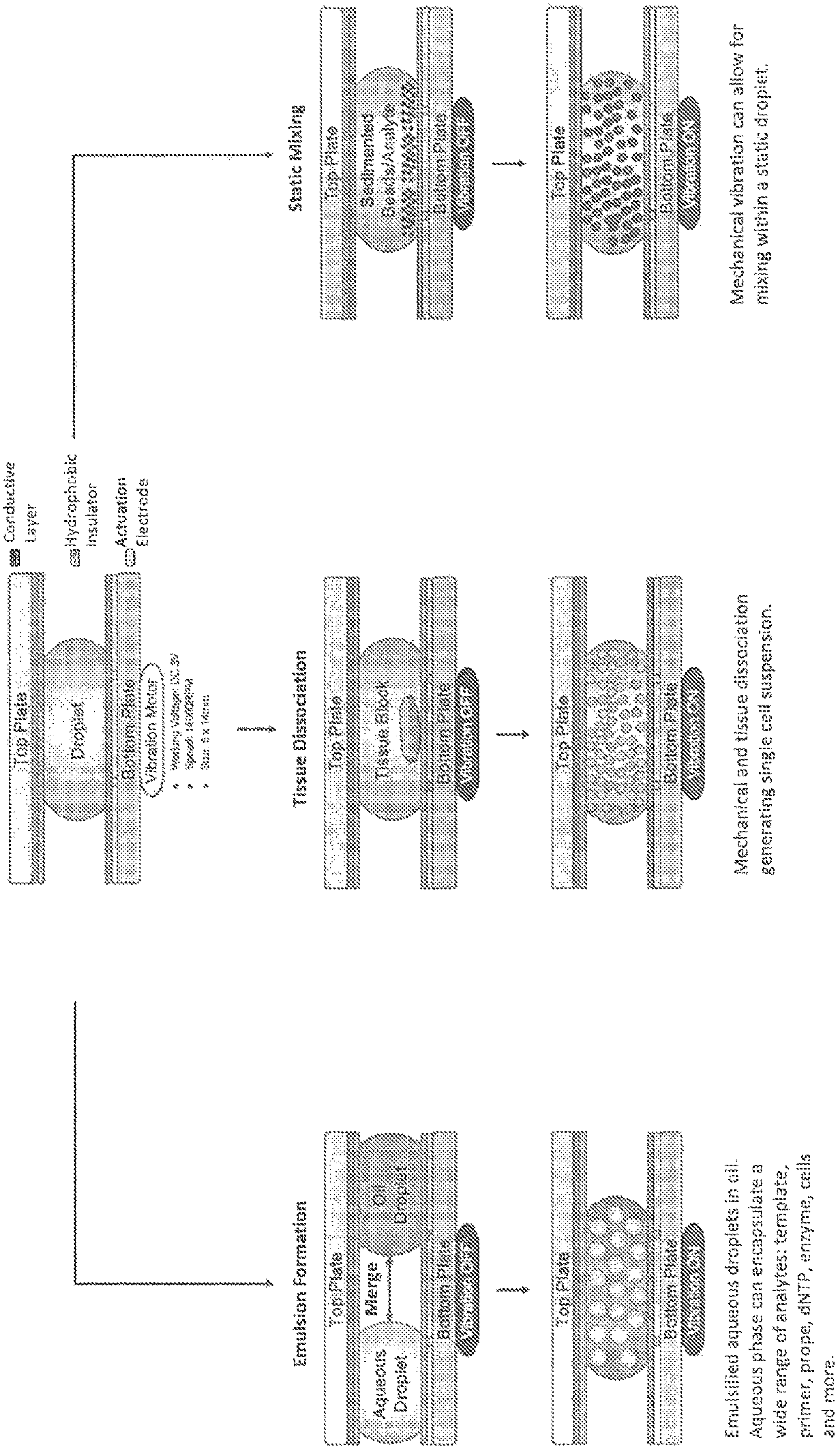
FIG. 68 illustrates, schematically, an example of a reader device including a vortex (mechanical vibration) subassembly.

As shown in FIG. 68, vortexing on DMF can enable compartmentalized reactions which are useful in a wide range of protocols and applications such as single cell biology, single cell RNA-seq, droplet digital PCR, droplet barcode and single molecule sequencing, all of which may be performed in the systems described herein. For example, a mechanical vibrator motor (shown in FIG. 67B) may be mounted to the electrode board under or adjacent to the electrode array (drive electrode array). In FIG. 68, a schematic showing a vibration motor underlying the drive electrodes ("actuation electrodes") is shown, with a droplet held in an air gap formed between the upper (top plate) and lower (bottom plate); the bottom plate may be the dielectric film of the cartridge vacuum attached to the drive electrodes in the reader). Examples of different procedures using this vibration motor are shown. The vibration motor operates at, e.g., a voltage of 3 V DC, at a speed of approximately 14,000 RPM (and is approximately 6×14 mm). In FIG. 68, the vortex is applied through vibrational forces generated from digital microfluidic PCB board. On the left side, an emulsion formation by vortexing two droplets that merged using electrowetting forces to form a mixture of aqueous/oil is shown schematically. It is possible for hydrogel particles and sample solution or single cells to be contained in monodispersed oil emulsions upon vortexing on DMF. Using DMF, heterogeneous mixtures such as slurries and solid tissue blocks can be mobilized and manipulated in protocol steps. Tissue dissociation on DMF can be enabled mechanically through vortexing. Combining a set of DMF features can enhance the ability to dissociate otherwise difficult tissues through parallel on-chip vortexing (mechanical feature) and incubation with dissociative enzymes (enzymatic incubation at set temperatures) such as trypsin, papain, collagenase. Dissociation of tissues/organs/organisms on DMF can be followed by single cell partitioning by applying vortex forces to partition cells in emulsion as described above and the use of mixing/heating/cooling/magnetic actuation DMF features can allow to continue with downstream single cell protocol steps followed by library preparation steps to yield a sequence ready single cell library. Vortexing on DMF can help resuspend slurries or heterogeneous mixtures such as magnetic or paramagnetic bead particles in suspension after they sediment during prolonged storage/incubation steps.

FIGS. 69A-69D illustrate another example of a vacuum chuck that may be used with any of the readers described herein, e.g., beneath and coupled with the electrode board, as illustrated above. In FIG. 69A, the upper surface of the vacuum chuck is shown and includes an O-ring 6935 channel for holding an O-ring (or seal, such as a Teflon spring seal or gasket) 6524 surrounding (sealing) the chuck the board (as shown in FIG. 65B. The chuck includes one or more vacuum holes 6909, and placement sits for TECs 6954, as well as magnet pass-through regions 6968. The chuck shown in FIG. 69A also includes a plurality of alignment pins 6971. FIG. 69B shows the bottom of the chuck of FIG. 69A, and includes a vacuum pump connection 6974, heat-sink connection location 6988 and magnet pass-through 6968'.

Cartridges

Figure 70A:
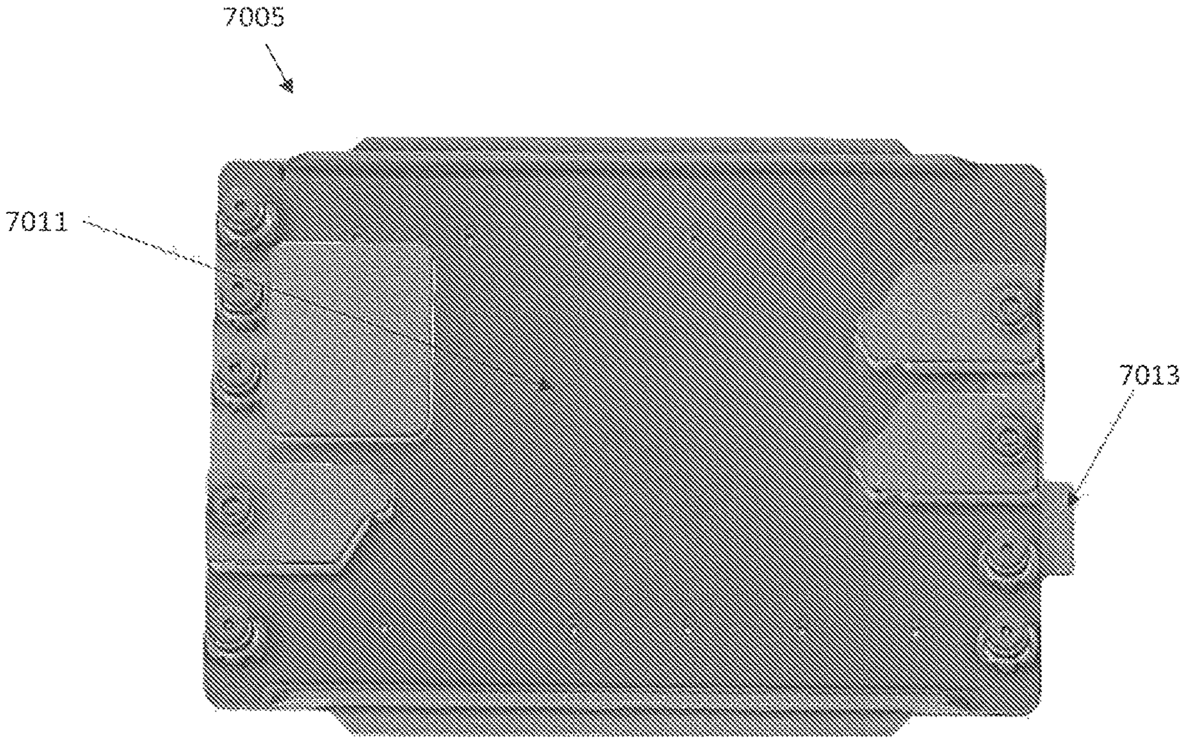
FIGS. 70A-70C illustrate an example of a cartridge as described herein.
Figure 70B:
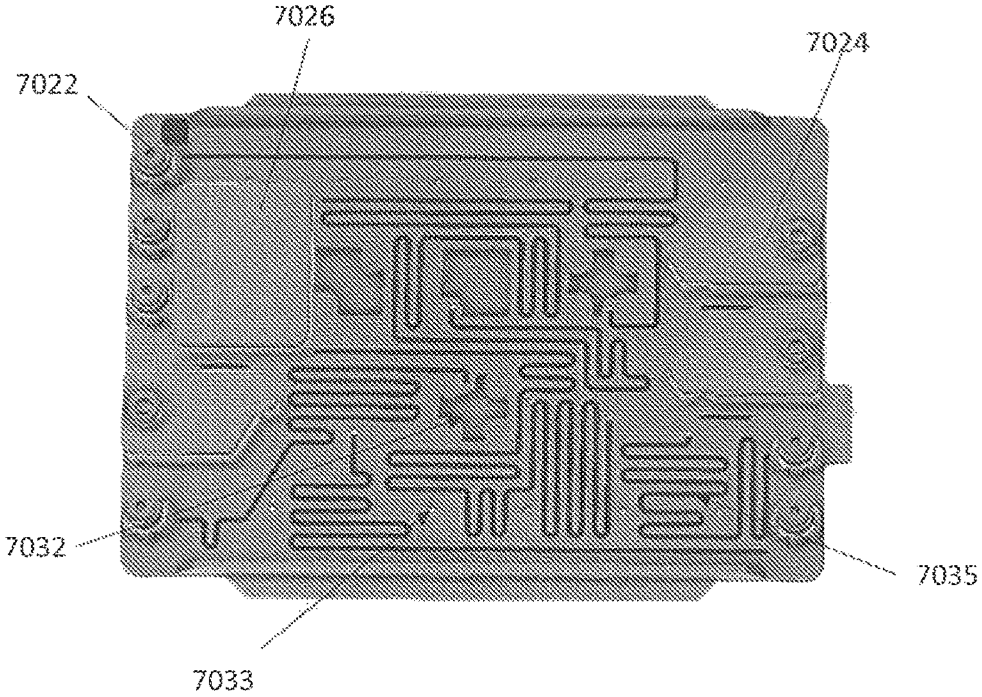

FIGS. 70A and 70B show top views of an example of a cartridge as described herein. This cartridge has standard SBS dimensions, and includes keying features shown at the bottom right side 7013 for alignment, cartridge detection and reference electrode connection. In FIG. 70A, the top side of the cartridge is shown covered with a heat sealed film 7011 to seal the channels build into the top surface, as described and illustrated above. The cartridge in this example includes 2 waste chambers, 6 mixing channels, and 3 reservoirs for multi-dispensing onto EWOD zone (the air gap). FIG. 70B shows the device without a film covering the channels.

The cartridge may include a plurality of vacuum connectors 7022 for connecting to the pneumatic connectors in the lid. In FIG. 70B, 9 connectors are shown. The connectors may include TPE overmolded connections to the manifold (lid subsystem). These overmolded connections may be optional and may be omitted. A reservoir 7024 and waste 7026 are also included. Windows 7032 in the upper surface of the cartridge may be formed over regions above thermal control zones to reduce thermal mass, as descried above. The user may pipette directly into one or more holes 7033 in the upper surface to apply droplets into the cartridge, including in some variations directly into the air gap for DMF control. The cartridge also includes one or more mixing channels 7035.

Figure 70C:
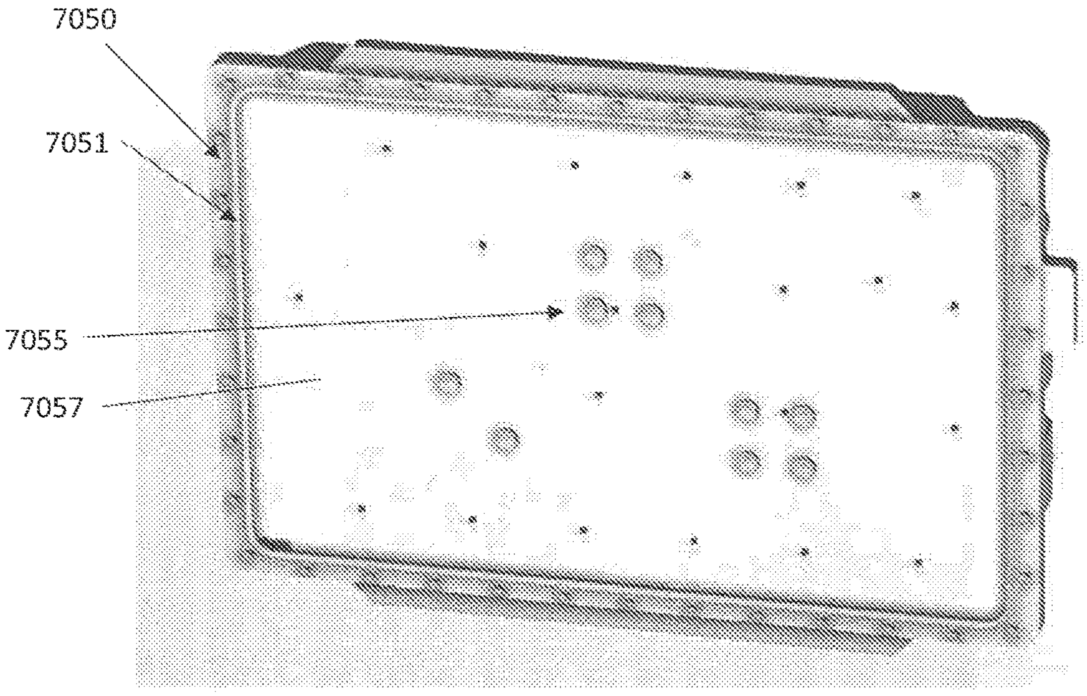

FIG. 70C shows the same cartridge from the bottom side with the bottom dielectric layer removed to show the air gap. In this example, the cartridge includes a film tensioning mechanism 7050 (e.g., film tensioning frame) around the peripheral bottom edge. The cartridge also includes a single gasket-like spacer around the periphery for maintaining the spacing of the gap (e.g., air gap) region of the cartridge once the bottom dielectric layer is attached. In the example shown in FIG. 70C, the air gap region also includes a plurality of pinning elements 7055 (shown as posts) for holding (pinning) a droplet, or at least the outer protective (e.g., hydrophobic, oliphilic, etc., such as liquid paraffin) in position, including in particular when operating on the droplet to vortex, thermocycle, etc. These pinning elements may be configured to extend from the upper surface at least partway (but in some variations, not all of the way) down into the air gap region. The upper surface 7057 of the air gap region may be hydrophobic (or may include a hydrophobic coating) and may include the reference electrode(s) as described above. For example, in FIG. 70C, the upper surface comprises a heat sealed film for reference electrode and hydrophobicity.

Figure 71:
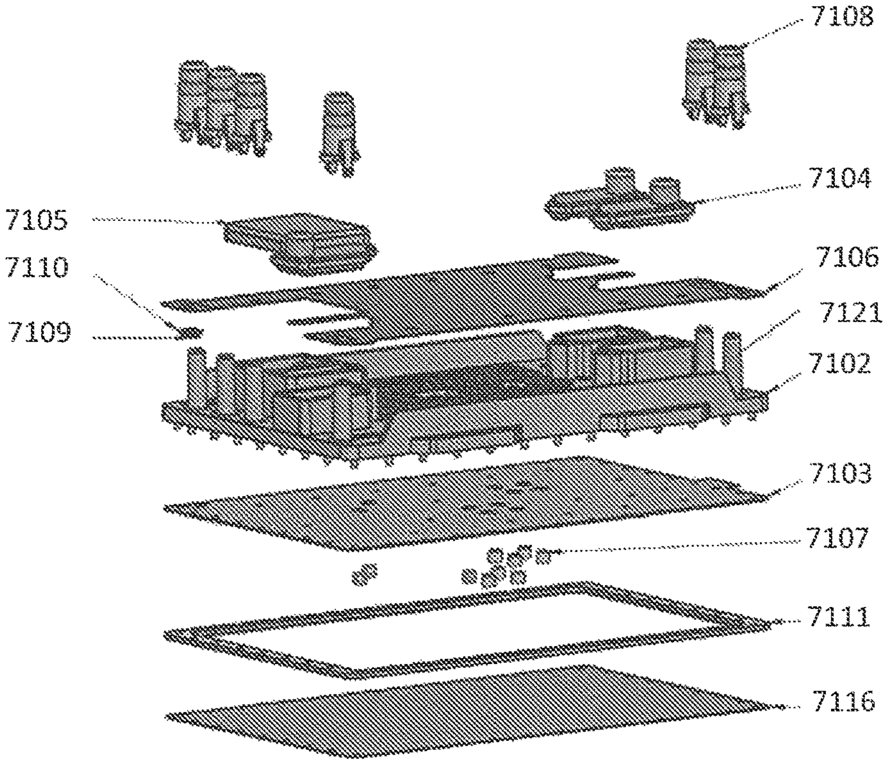
FIG. 71 is an exploded view of a cartridge as described herein.

FIG. 71 shows an exploded view of an example of a cartridge, showing the connectors 7121 the outer tips of which are covered in a polymeric (e.g., TPE) sleeve 7106 for mating with the pneumatic connector in the lid. The connectors may extend from the cartridge body region 7102 forming the top layer of the DMF air gap and the microfluidics channels. In some variations this body may be formed of a COC plastic (or alternatively COP plastic) with features for channels, chambers. The body may include or may be coupled to one or more reservoirs 7104 and one or more waste containers 7105. A marker or tag, such as a near field tag 7109, 7110; the identifier tag many be a unique identifier of the cartridge. It may be used to both detect the type of cartridge and if it is new, or has been used.

The top of the cartridge may be covered by a protective film 7106, such as the 200 μm thick top cover file shown. The bottom surface of the cartridge body, forming the top surface of the air gap, may be covered in a conductive substrate material 7106 that may be hydrophobic or may include a hydrophobic coating. For example, the film may be a COC film sputtered with ITO (conductive material) and cytop (omniphobic substrate) to seal the channels on the bottom side of the main cartridge body; in some variations, the film may include an adhesive, e.g., on a PET/ITO film.

A gap height spacer (ring) 7107 may be used, as described above, and one or more pinning elements (e.g., PTFE dowels, in some variations having a ⅛" diameter. The pinning elements (e.g., PTFE posts, silicone posts, etc.) may be inserted into the main cartridge body designed to be hydrophobic but oleophilic and thus attracting the paraffin wax when thermocycling. This may keep the droplet centered to the thermocycler when in use.

The bottom layer may be a dielectric material 7116, such as a Teflon FEP film, e.g., 12.4 μm. For example, a Teflon FEP film (dielectric barrier) may be used and tension may be applied to the film by the cartridge. For example, tension may be provided by the cartridge to the FEP film attached to the cartridge to mitigate any wrinkling during thermocycling. The bottom dielectric film may be a conductive omniphobic cartridge substrate, which may provide electrical contact to electrode board to enable electrowetting. An omniphobic substrate typically creates a low friction/non-stick surface to increase droplet mobility.

In any of the apparatuses described herein, the cartridge material may allow for dimensional accuracy, hydrophobicity of channel surfaces, & bio-compatibility. As mentioned above, the use of one or more thermal windows above a region of a thermally controlled zone may be useful. Typically, the reduction of material in thermal heating zone may decrease thermal mass and increase PCR ramp rates, when the system is used to perform PCR on the apparatus.

In general, the sleeves over the pneumatic connectors on the cartridge may be TPE pneumatic posts; soft TPE overmolds may create a bore seal with manifold to provide an airtight seal for fluidic mixing channel actuation. In some variations, the storage reservoirs will accommodate up to about 1.2 mL of material (e.g., wax, ethanol, and water for multi-dispense); in some variations, up to 2 mL, up to 2.5 mL, up to 3 mL, up to 3.5 mL, up to 4 mL, greater than 4 mL, etc.). Waste reservoirs hold waste after mixing is completed The storage and waste caps may be configured to be, e.g., ultrasonically welded, laser welded, etc. Ultrasonically or laser welded COP molded caps may seal off storage and waste reservoirs to provide an airtight seal to move fluid in & out of EWOD zone.

In general, the cartridges described herein may include one or more serpentine mixing channels, which may provide a fluidic pathway for entire volumes of liquids so they can be chaotically mixed on the EWOD zone.

Figure 72A:
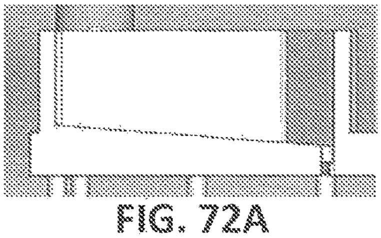
FIGS. 72A-72E illustrate examples of cartridge reservoir chambers.
Figure 72B:
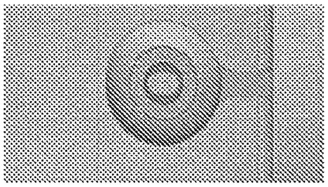
Figure 72C:
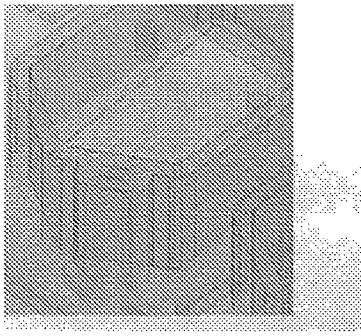
Figure 72D:
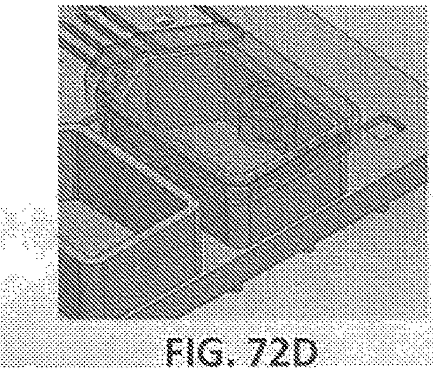
Figure 72E:
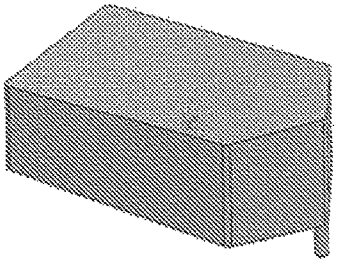
Figure 73A:
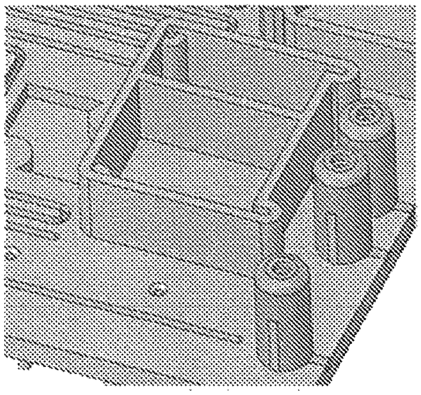
FIGS. 73A-73B illustrate waste chambers features.
Figure 73B:
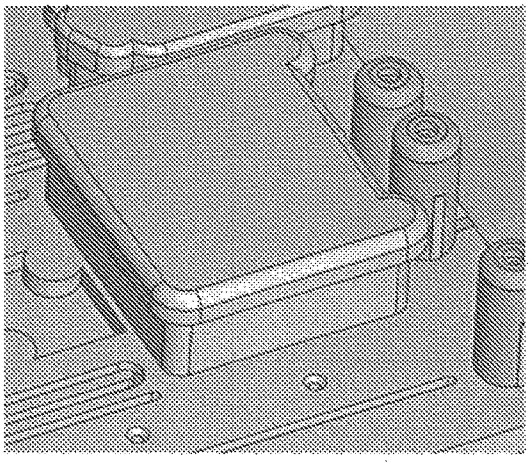
Figure 75B:
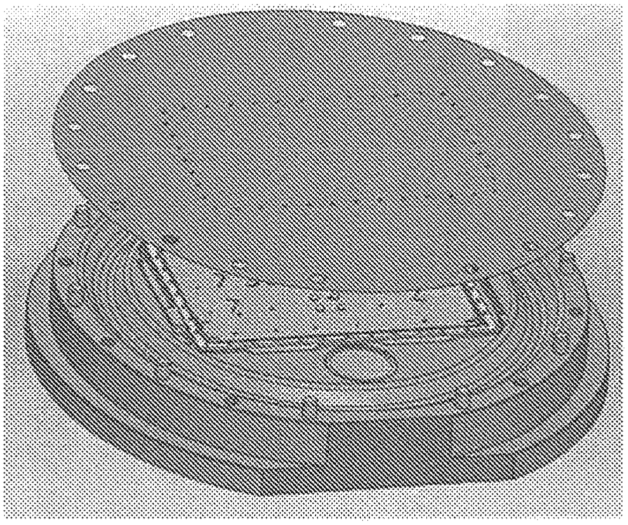
Figure 75C:
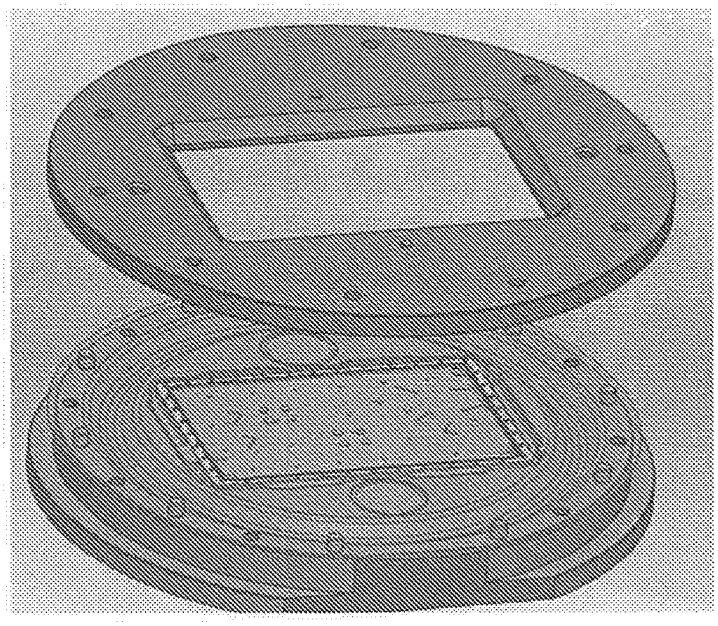
Figure 75D:
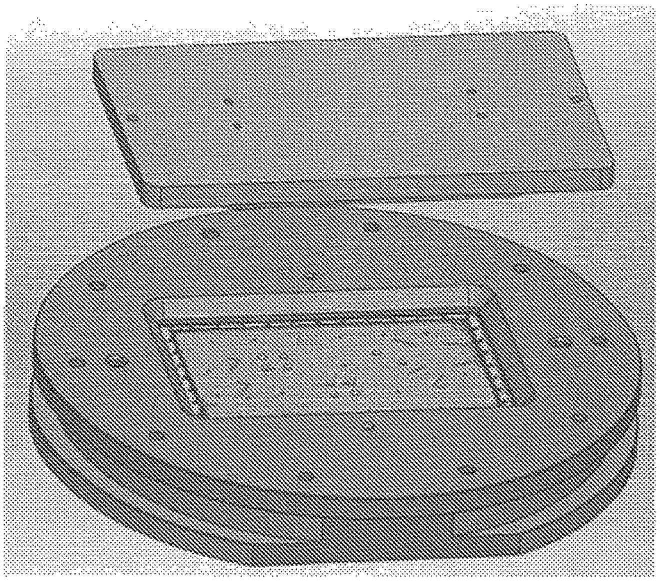
Figure 76A:
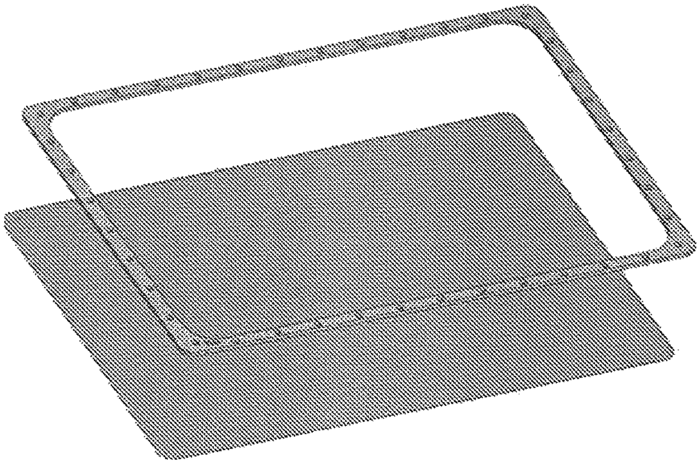
Figure 76B:
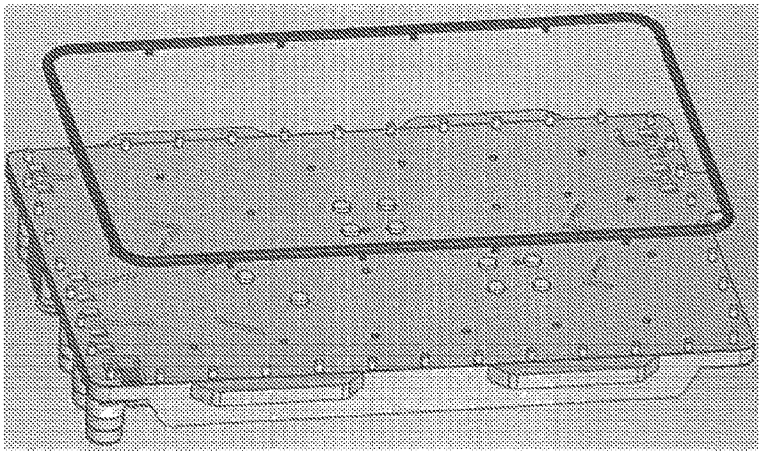
Figure 76C:
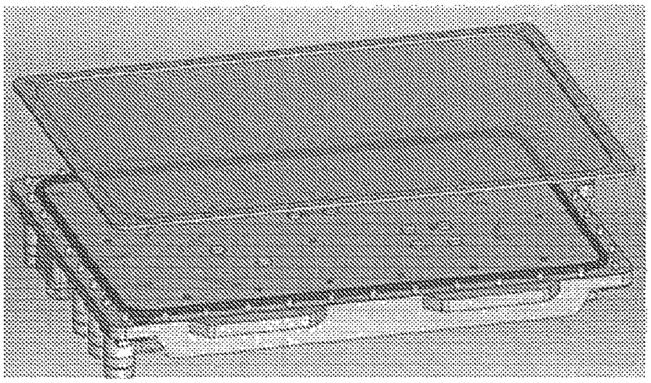
Figure 76D:
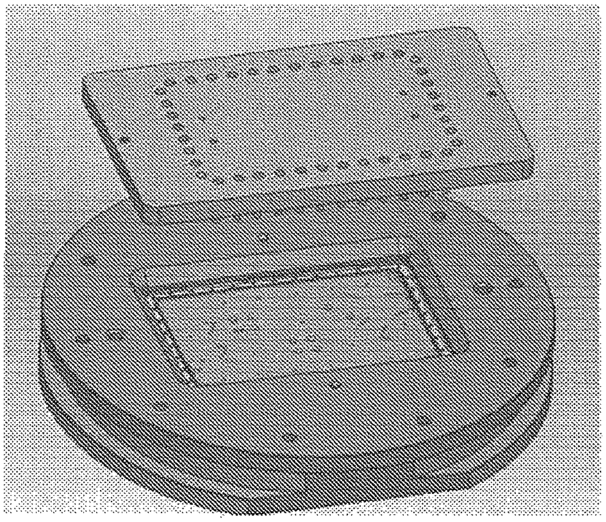

FIGS. 72A-72E illustrate examples of cartridge reservoir chambers, which may include an angled floor (FIG. 72A), a slot shaped filling port to prevent a pipette tip from sealing when inserting into the slot (FIG. 72B), a chimney feature to prevent draining (FIG. 72), and a cap (FIG. 72D). These reservoir chambers may include a p-trap (e.g., chimney). In some variations the p-trap/vent (e.g., chimney) may include a porous material (e.g., porex) to prevent low surface-tension fluids from wicking up and into the venting region. FIGS. 73A and 73B illustrate waste chambers features, including chimney regions in the corners to prevent back-flow of fluid into the channels, etc.

FIGS. 74A-74C illustrate the spacer forming the separation of the air gap in the cartridges described herein. In FIG. 74A the spacer is shown attached to the top surface. FIG. 74B shows the attachment of the spacer to the top over a layer (e.g., hydrophobic layer). FIG. 74C shows a profile of a portion of the edge of the cartridge including the spacer; the spacer has a ramped profile to help tension the dielectric film on the bottom.

Figure 77A:
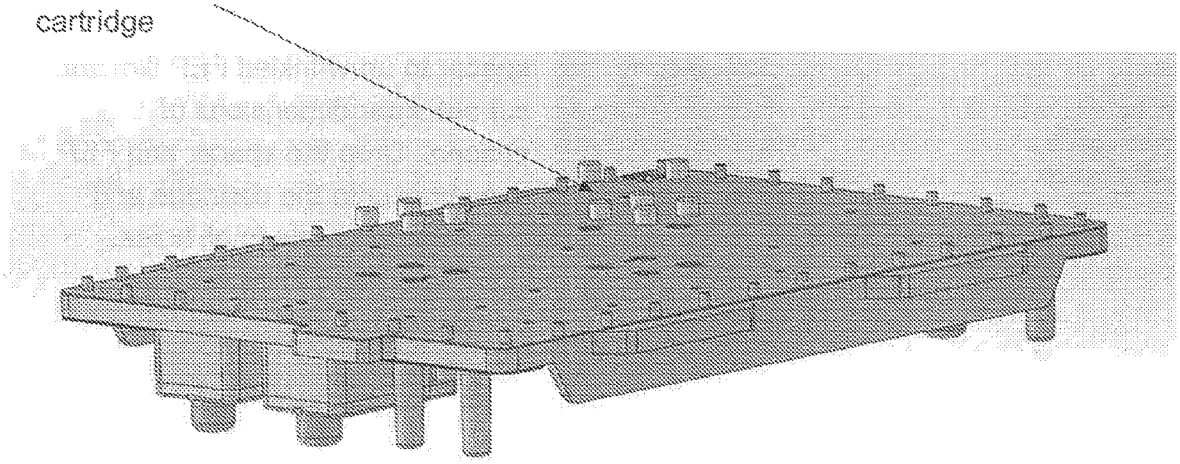
Figure 77B:
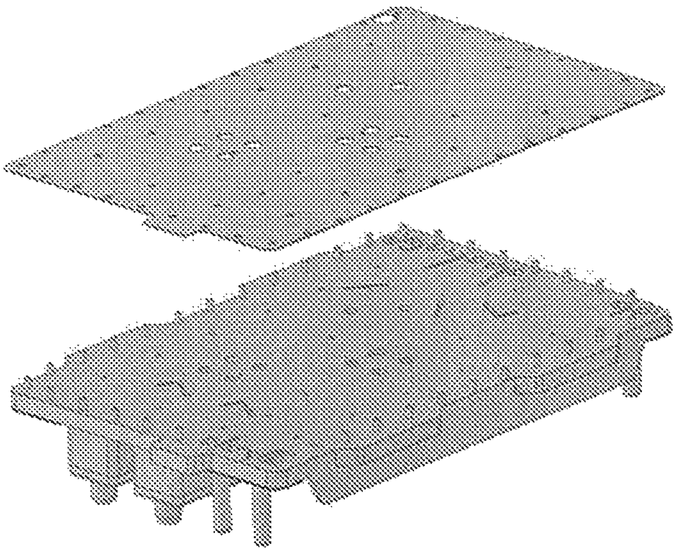
Figure 77C:
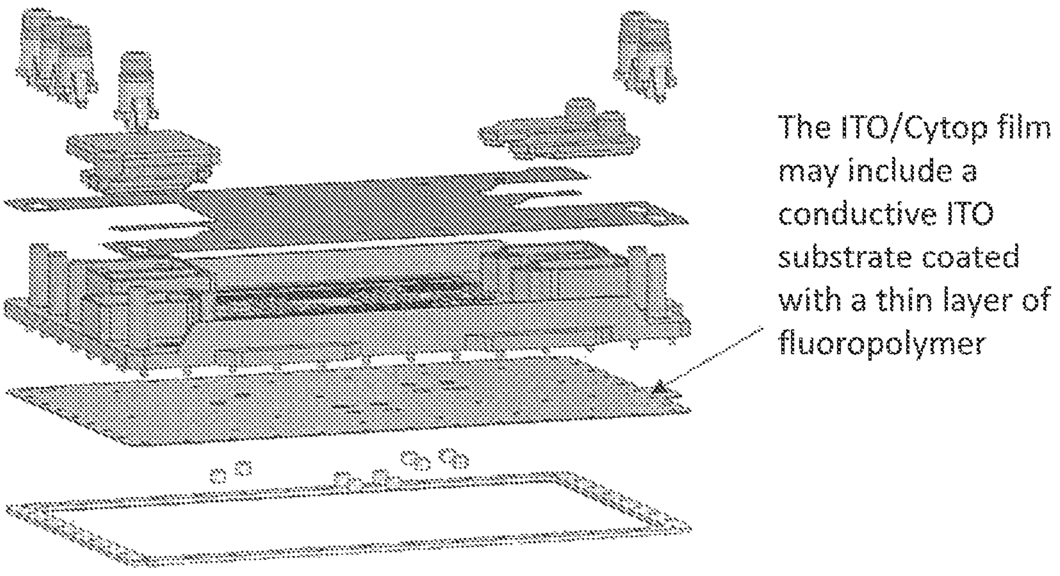

In general, the dielectric film may be applied and help in tension on the bottom of the cartridge. FIGS. 75A-75D illustrate a first method for tensioning the dielectric (e.g., FEP film). FIGS. 76A-76D illustrate a second method of tensioning the dielectric material when forming the cartridge. FIG. 77A illustrates one examples of the pinning features described herein. FIGS. 77B-77C show additional detail about the top layer of the air gap, formed in part from a film.

User Interfaces

Also described herein is control software, including user interfaces, for controlling one or more DMF controller (e.g., reader) apparatuses as described herein. These methods and apparatuses, and particularly these user interfaces allow a user to generate a protocol to be executed by the DMF apparatus, such as a biological protocol for preparing, forming, testing and/or modifying a polynucleotide (DNA, RNA, etc.) sample. These methods and apparatuses may allow the formation, modification and/or execution of a protocol such as life science protocols that provide individual sets of instructions that allow users (e.g., technicians, scientists, etc.) to perform experiments, such as instructions for the design and implementation of experiments. Laboratory protocols may include protocols for cell, developmental and/or molecular biology, genetics, protein science, computational biology, immunology, neuroscience, imaging, microbiology, virology, enzymology, etc. Non-limiting examples of protocols include polynucleotide sample preparation, genetic library preparation, etc.

The methods and apparatuses (including user interfaces) described herein, are configured to generate, modify and/or perform protocols for a DMF apparatus such as the DMF apparatuses (e.g., DMF controller/readers and/or cartridges) described above, which may tightly controlled and efficient mixing, incubating, thermocycling, washing, and/or eluting while allowing precisely controlled timing, temperature, and/or volumes.

For example, a user may (on a first computer, such as a laptop, desktop, tablet, smartphone, etc.) select, modify and/or create a protocol for execution by a DMF apparatus as described herein. When designing or modifying a protocol, the protocol may be automatically tested by the apparatus (which may simulate the protocol and apply various criterion to determine passing/failing). The apparatus may identify errors. The apparatus (including user interfaces) may assist a user in correcting the protocols. The error detection and correction may be performed iteratively (including automatically performed). Protocols designed or modified in this manner may be saved to a library of protocols specific to a user or institution, or may be published for general use. The protocol may be transmitted and/or downloaded to a DMF reader apparatus as described herein and may be executed on the DMF reader. In some variations the reader may implement the protocol and may guide (e.g., step) the user through the protocol, indicated what reagents should be added to what portion(s) of the cartridge, and/or if there are any problems during the performance of the protocol, and/or where to remove material from the cartridge. The user may be guided or instructed from the screen on the DMF reader apparatus.

For example, FIGS. 78-101C illustrate various examples of apparatuses (including user interfaces) and methods for designing, modifying, storing, selecting, and/or performing one or more user interface.

As mentioned above, in any of the DMF apparatuses (e.g., DMF controller/reader apparatuses) described herein, the apparatus may include a screen or display. In some variations this display may be a touchscreen. FIG. 78 is an example of a display for a reader apparatus showing a protocol (protocol "1") that is running on the apparatus. The display includes an indicator 7801 (e.g., timeline) on the bottom of the screen shown as a line having different regions, shown by different colors in this example, with a current time/progress indicator 7802 indicating where in the protocol the apparatus (e.g., DMF apparatus) currently is.

The DMF apparatus may also include one or more user-interfaces walking the user through selecting one or more protocols (e.g., from a library of available protocols) and/or modifying or creating a protocol. Alternatively or additionally, protocols may be selected and/or created and/or modified using a computer processor that is separate from the DMF apparatus but which may communicate with the DMF apparatus. For example a user may have a laptop computer, desktop computer, tablet, phone, or other device with a computer processor, or may use a cloud-based interface to select a protocol for running on a particular DMF controller/reader. All of these options (e.g., remote laptop, desktop, etc. and/or cloud-based processor) may be referred to generally as "remote processors" that communicate with the DMF apparatus. They may communicate wireless or via a wired connection. The remote processor may instruct the DMF controller/reader on what protocol to run (e.g., select). The remote processor may allow creation and/or modification of a protocol. In some variations the DMF controller/reader may also allow modification, creation and/or selection of the protocol.

In any of these methods and apparatuses, the DMF apparatus may walk a user through the operation of the DMF apparatus. For example, FIG. 79 illustrates a user interface for a DMF controller/reader showing a graphic indication of the ports (e.g., inputs/outputs) for applying or removing material from the cartridge. The numbered regions (1-20) in FIG. 79 illustrate chambers that may be preloaded or may be loaded by a user (e.g., via pipetting) with the materials indicated. The left side of this user interface shows a listing of the material to be input into each of these ports/chambers; this listing may be scrolled up/down. For example in FIG. 79, the first input 7901 is for inputting 50 μl of fragmented dsDNA. This menu may be specific to a particular protocol selected.

As mentioned, either in a remote processor and/or on the DMF controller/reader screen, the user may be provided user interfaces with tools for choosing, modifying and/or writing protocols. FIG. 80 illustrates an example of a user interface showing a protocol building window 8001 and an action icon window 8003. The top of the user interface also shows an illustration of a color-coded timeline for the protocol as it is being constructed. In FIG. 80, the action icon window of the user interface displays a plurality of action icons 8005 in the action icon window, wherein each action icon represents an action to be performed on a droplet, such as: modifying the temperature of the droplet, eluting a material from the droplet, mixing material in the droplet, incubating the droplet, and washing a material in a droplet. This user interface may act as a canvas, allowing the user to graphically interact to form or modify a protocol. For example, the user may repeatedly select an action icons from the action icon window and move the icon into the protocol building window, wherein the action icon may be shown as an action descriptor 8007 in the protocol building window. The user may arrange the action descriptor(s) in a sequence in the protocol building window. The user may also enter one or more user inputs into the action descriptor 8007, 8007' in the protocol building window. In FIG. 80, the first action descriptor is a 8007 is a "mix" action descriptor, and the second action descriptor 8007' is an incubation action descriptor. FIG. 80 also shows a user in the process of selecting an icon 8005' and moving it into the protocol building window 8001. Examples of action icons are shown in FIG. 84 in larger detail.

In general, as new action descriptors are added to the building protocol in the protocol building window, these display of the actor descriptors may be shifted over to accommodate the new actions. This is shown by the screenshots in the top of FIG. 94. In any of these methods and apparatuses the user interface may allow the user to add additional actions to the protocol anywhere, including in the middle, of the protocol, as shown in the bottom of FIG. 94.

The user may also interactively enter or select user inputs for entry into the action descriptor. For example the user inputs that may be selected (e.g., from a menu of options) may include one or more of: reagent type, reagent volume, duration, and/or temperature. The user interface may also include controls (e.g., inputs) for saving or checking the protocol. Checking the protocol may include manually or automatically identifying errors in the sequence of action descriptors (e.g., the user may inputs a request to check the sequence of action descriptors in the protocol building window). As will be described in detail below, this may include walking the user through the draft protocol and displaying an indicator of any errors identified to the user and prompting the user to modify that stage (e.g., modifying user input associated with each error). Once modified, the protocol may again be checked and/or corrected, until no errors are found.

The protocol may be formed based on the sequence in the protocol building window, and may include pathfinding the pathway for performing the protocol on a particular (or generic) cartridge and with a particular or generic DMF controller/reader. Thus, the apparatus (e.g., the software) may include determining, using the protocol, a path for one or more droplets within a cartridge implementing the protocol.

Thus, the user may create, edit, delete and save any protocol in a drag and drop interface, using a user interface such as that shown in FIG. 80. The user can select reagents, sample, unit operations of the system (heat, cool, mix, elute, wash, incubate, thermocycle) and build their own protocols. The protocol building window 8001 may scroll to allow display of multiple added action descriptors, and the user may add or remove action descriptors and modify the added action descriptors.

When forming testing and/or forming the protocol, the apparatus may apply a DMF pathfinding/pathfinder technique to determine an efficient pathway for performing the protocol on a particular cartridge and/or DMF controller/reader. The pathfinding may take into account limits based on arrangement of a particular (or generic) cartridge, such as the input/output ports of the reagents, the location of heating/cooling (or both heating and cooling), the location of magnetic controls, the location of aspiration ports, etc. The pathfinding may also apply constraints of the sample and reagents (avoiding contamination, accounting for volume and/or viscosity, etc.), electrode grid and cartridge constraints, and may find an optimal path between two points avoiding all identified constraints. Optionally, users can share their constructed protocols and/or can download and modify their own or others' protocols. The user interface operations may be automatically translated into a scripting language (e.g., cocoscript), for protocol execution. For example, sharing may be done between users within an organization or across different organizations. In some variations a cloud interface may be used. The protocols may be named and described. In some variations, the description may be done automatically by including a shorthand list for all or some of the reagents used and/or for all or some key steps. A lookup table of key reagents and/or steps may be used to identify key reagents and/or steps. The protocol may be named by the user. In some variations protocols generated by a particular user may be shared as part of a community market place of protocols. For example, a user from a first organization may read and download a particular protocol, may edit it and/or may load it directly in their DMF controller/reader and run it. Some of these options are illustrated in FIG. 81.

FIG. 82 illustrates an example of a display, which may be part of a remote processor (e.g., computer, tablet, phone, etc.) used in conjunction with a DMF controller/reader or it may be part of a user interface for a DMF controller/reader. In FIG. 82, three protocols 8201, 8201', 8201" are listed in the user interface, and can be selected, viewed, modified, etc. The user interface may organize (e.g., sort, categorize, etc.) the protocols). FIG. 88 shows another example of a user interface listing protocols, e.g., that may be selected for running on a DMF controller/reader. FIG. 96 illustrates a menu of selectable protocols, showing status indicators (e.g., download status, when last used, name of protocol, author of protocol, etc.).

FIG. 83 illustrates an example of another user interface that may be part of a remote processor and/or a DMF controller/reader interface. In FIG. 83, the user interface shows an example of a timeline (showing completed action descriptors arranged into the protocol), and a listing of reagents and time required displayed on the right side.

In some variations a user interface may be configured as a dashboard-style interactive display, as shown in FIG. 85. In this example, the dashboard includes controls showing existing protocols 8505, as well as controls for reviewing, modifying (editing) or sending the protocol to a DMF controller/reader. The user interfaced may also show the status of the protocol (e.g., completed/verified, unverified/uncompiled, includes an error, etc.). The user interface may also include status indicators 8507 showing the status of one or more DMF controller/readers as described herein (e.g., running a protocol, error, protocol complete, etc.). FIG. 85 also illustrates the selection, by a user, of a particular protocol to send to a particular DMF device. For example, the user may select the protocol 8509 and may then select which device to send the protocol to, from the list of available devices (and the list of available protocols). FIG. 86 illustrates examples of user interfaces (pop-up windows) displaying information related to the creating and editing of profiles as described herein. FIG. 87 illustrates examples of controls (e.g., pull down menus, buttons, etc.) that may be include as part of any of the user interfaces described herein.

A user interface such as the one shown in FIG. 80 may be toggled between different display types. For example, the right side of FIG. 89 shows the user interface including a protocol building window and an action icon window with the protocol building window in a zoomed-in (or uncompressed) view 8909, in which the action descriptors 8907 are sized within the window to reflect the duration (timing) of each action taking place in the action descriptor. FIG. 89 also shows the protocol building window in a zoomed out (or compressed) view 8911 in which the action descriptors 8907 are displayed in the same size, regardless of the duration.

FIG. 90 illustrates examples of the action icon window, including controls such as drop-down menus that provide tools for the user to modify the action descriptors in a protocol. For example, the user may select from a menu of regents, and/or action icons. The action icon window may also allow the user to select an action module that includes a plurality of preconfigured subsets of actions that may be inserted into the protocol during construction or modification of the protocol. In FIG. 90 the protocol building window shows a plurality of action descriptors with user inputs and controls, such as action toggles 9005 that allow the user to switch between two or more different action modes. Other inputs may include input areas 9007 (e.g., allowing the user to input a value, e.g., to specify an action temperature, time, or cycle number), an input step 9009 (e.g., allowing the user to add an additional step, such as to a thermocycling action), etc. The action descriptor may also include or show a secondary state, e.g., showing additional optional actions that may be taken depending on the value of other user inputs for the action descriptor. Similarly, FIGS. 91-92 illustrate user interface controls and methods for adding reagents in the action icon window, such as specifying the name of the reagent and/or the viscosity (e.g., low/high), or other property (e.g. concentration, etc.). A reagent may be added to an action descriptor in the protocol building window.

As mentioned and described above, any of these apparatuses may be configured to identify (e.g., automatically identify) errors in the protocol, during or after it has been assembled. Error detection may be triggered in the user interface by selecting one or more controls (e.g., buttons). The apparatus may simulate the protocol to identify steps in the protocol in which one or more pre-defined rules are broken (e.g., where user input value are missing and/or outside of predefined ranges, such as volume of solutions, times for performing an action, temperatures, etc.). During or after the error correction process the user interface may be modified to indicate the identified error, and allow the user to correct the error. This is illustrated in FIG. 93. The user interface may highlight 9305 the error in the protocol design window. The user interface may also show the number of errors remaining in the protocol 9307, and may provide inputs 9307 for saving, moving to the next error, etc. The system may require the user to correct all of the errors before finalizing the protocol. FIG. 95 also illustrates step-by-step error correction. In general, the user may be stepped through the error detection and correction process. In some variations, after identifying a number of errors, the user may be shown a highlighted value or input that is incorrect; in some variations an indicator of the type of error may be provided (e.g., value missing, value outside of permitted range, etc.). Alternatively or additionally, the user may be shown a user interface in which a plurality of errors are highlighted and the user may select them, to show a highlighted pop-up indicating the error and prompting them to correct it.

As mentioned, in any of these apparatuses, the protocol may be shown directly on the device (e.g., on the DMF controller/driver). An example of this is shown in FIG. 97. The protocol may be shown in text including the values previously entered for the protocol. The DMF controller/driver may then prepare to run the protocol by interactively prompting a user to pipette or otherwise enter the reagents into the cartridge at predefined and indicated locations on the cartridge, as shown in FIG. 98. A listing of reagents is shown on the left and a map of the pipetting locations corresponding to a cartridge loaded into the DMF controller/reader (e.g., seated in the DMF controller/reader, with the clamp engaged and the lid open, while vacuum is applied to the bottom of the cartridge). One the reagents are entered, the device may perform the protocol; the protocol may be aborted, e.g., during operation, as shown in FIG. 99. In FIG. 100, if the protocol is completed successfully, the DMF controller/reader may display a prompt indicating where the output material may be extracted 1001. Alternatively, if there is an error in running the protocol, but useful material may still be recovered the user may be shown a display 1003 prompting them to recover some of the sample material from an outlet on the cartridge. FIGS. 101A-101C illustrate examples of different run prompts that may be displayed, including completion of the protocol (FIG. 101A), an error-indicating prompt (FIG. 101B), and a screen indicating that the protocol is running (FIG. 101C).

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A digital microfluidics (DMF) reader device configured to operate with a removable cartridge, the device comprising:

a cartridge seat configured to seat the removable cartridge;

an array of drive electrodes in electrical communication with the cartridge seat, the array of drive electrodes configured to apply a voltage to move a droplet within the cartridge by electrowetting;

a clamp configured to move from an open clamp configuration in which the cartridge seat is exposed and a closed clamp configuration in which the clamp is latched over the cartridge seat so that one or more edges of the cartridge seat are covered by the clamp, wherein the clamp includes a window region allowing access to the cartridge when the cartridge is seated in the cartridge seat and the clamp is in the closed clamp configuration;

a lid having an open lid configuration exposing the clamp and cartridge seat and a closed lid configuration in which the lid covers cartridge seat and the clamp when the clamp is in the closed clamp configuration; and a safety interlock configured to disable application of the voltage to the array of drive electrodes unless the cartridge is seated in the cartridge seat and the clamp is in the closed clamp configuration, regardless of the configuration of the lid.

2. The device of claim 1, wherein the safety interlock is configured to permit application of the voltage to the array of drive electrodes when the lid is in the open lid configuration.

3. The device of claim 1, further comprising a cartridge sensor configured to sense the cartridge is seated in the cartridge seat.

4. The device of claim 1, further comprising a clamp latch sensor configured to sense when the clamp is latched in the closed clamp configuration.

5. The device of claim 1, further comprising one or more vacuum ports configured to apply a negative pressure to secure the cartridge in the cartridge seat.

6. The device of claim 1, further comprising a pressure sensor configured to sense when a negative pressure securing the cartridge is between 0.5 and 22 inches of mercury.

7. The device of claim 1, further comprising a lock configured to lock the lid.

8. The device of claim 7, wherein the lock comprises a magnetic lock.

9. The device of claim 8, further comprising a lid sensor configured to determine when the lid is in the closed lid configuration.

10. The device of claim 9, wherein the lid sensor comprises a magnetic sensor.

11. The device of any of claim 1, further comprising a controller configured to control the array of drive electrodes.

12. The device of any of claim 1, wherein the safety interlock comprises one or more of software and firmware.

13. A digital microfluidics (DMF) reader device configured to operate with a removable cartridge, the device comprising:

a cartridge seat configured to seat the removable cartridge;

one or more vacuum ports in the cartridge seat configured to apply a negative pressure to secure the cartridge in the cartridge seat;

an array of drive electrodes on the cartridge seat, the array of drive electrodes configured to apply a voltage to move a droplet within the cartridge by electrowetting;

a clamp configured to move from an open clamp configuration in which the cartridge seat is exposed and a closed clamp configuration in which the clamp is latched over the cartridge seat so that at least one or more edges of the cartridge seat are covered by the clamp, wherein the clamp includes a window region allowing access to the cartridge when the cartridge is seated in the cartridge seat and the clamp is in the closed clamp configuration;

a lid having an open lid configuration exposing the clamp and cartridge seat and a closed lid configuration in which the lid covers cartridge seat and the clamp when the clamp is in the closed clamp configuration; and a safety interlock configured to disable application of the voltage to the array of drive electrodes unless the cartridge is seated in the cartridge seat, the clamp is in the closed clamp configuration and the one or more vacuum ports are applying the negative pressure to secure the cartridge in the cartridge seat.

14. The device of claim 13, wherein the safety interlock is configured to permit application of the voltage to the array of drive electrodes when the lid is in the open lid configuration.

* * * * *